(12) United States Patent
Kondo et al.

(10) Patent No.: US 7,486,325 B2
(45) Date of Patent: Feb. 3, 2009

(54) METHOD AND APPARATUS FOR TAKING AN IMAGE, METHOD AND APPARATUS FOR PROCESSING AN IMAGE, AND PROGRAM AND STORAGE MEDIUM

(75) Inventors: Tetsujiro Kondo, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 10/454,402

(22) Filed: Jun. 4, 2003

(65) Prior Publication Data
US 2004/0032649 A1      Feb. 19, 2004

(30) Foreign Application Priority Data
Jun. 5, 2002   (JP)   ............... 2002-163681

(51) Int. Cl.
*H04N 5/225*   (2006.01)
(52) U.S. Cl. .................................... 348/335
(58) Field of Classification Search .................. 348/335
See application file for complete search history.

(56) References Cited

U.S. PATENT DOCUMENTS 5,657,117 A  *  8/1997  Kimmel .................. 356/239.1

6,194,735 B1  *  2/2001  Martin ........................ 250/573
2003/0128341 A1  *  7/2003  Li ................................ 353/53

FOREIGN PATENT DOCUMENTS

| CA | 2045287 A | * | 12/1992 |
| JP | 10-253841 | | 9/1998 |
| JP | 2001-257924 | | 9/2001 |
| WO | WO 02/23902 A1 | | 3/2002 |

OTHER PUBLICATIONS

English translation of abstract for CA 2045287 A, Dec. 1992.*

* cited by examiner

*Primary Examiner*—James M Hannett
(74) *Attorney, Agent, or Firm*—Frommer Lawrence & Haug LLP; William S. Frommer; Paul A. Levy

(57) ABSTRACT

An image producing apparatus is capable of producing image data representing an image of a subject seen from a wide range of directions. An elliptic mirror reflects light radiated from a subject located at one of two focal points of the elliptic mirror. The light reflected by the elliptic mirror travels toward the other one of the two focal points of the elliptic mirror and falls on a fisheye camera disposed at the other one of the two focal points. The fisheye camera senses the incident light and takes an image of the subject.

19 Claims, 70 Drawing Sheets

IMAGE PRODUCING APPARATUS

ENLARGED VIEW

IMAGE DISPLAY APPARATUS

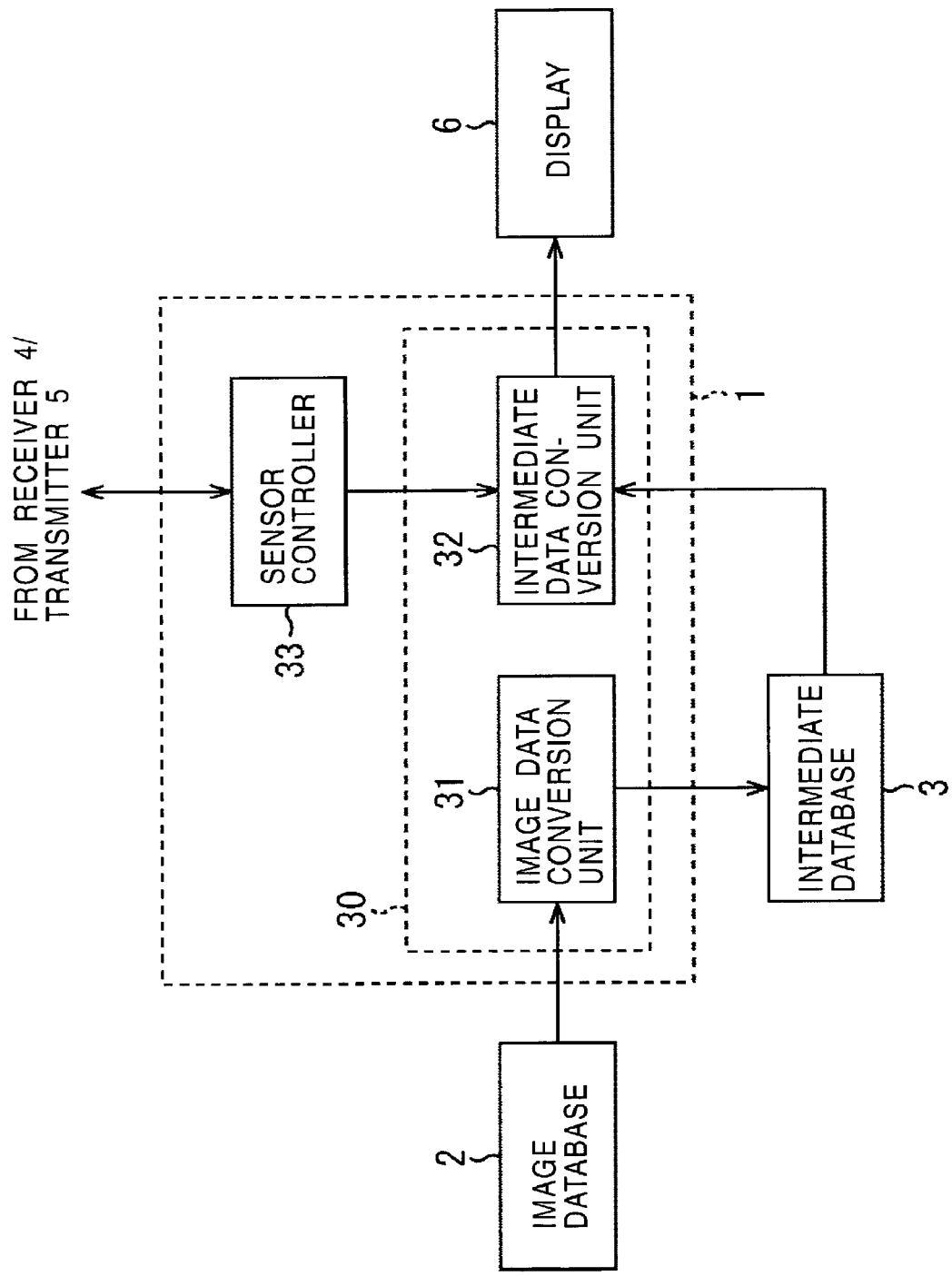

FIG. 35
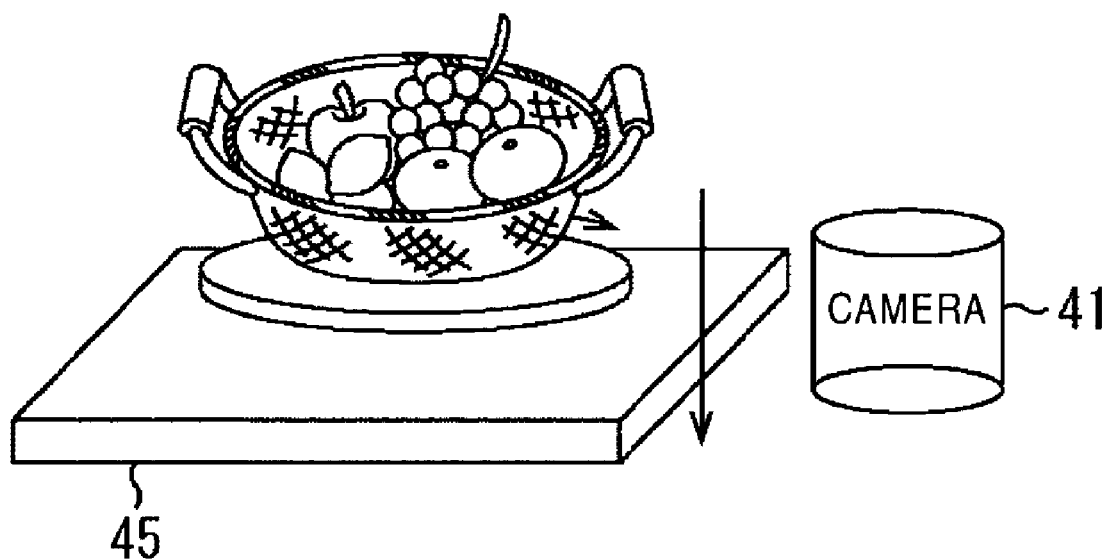
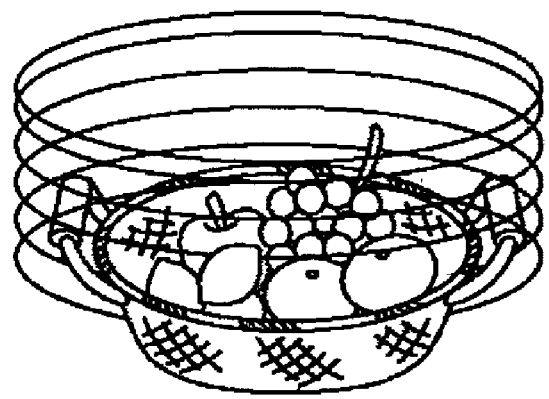

OMNIDIRECTIONAL IMAGE DATA
(IN REGION R1)

SUBJECT

FIG. 53A

| θ \ φ | −180 | −179 | −178 | --- | 0 | ----- | 178 | 179 |
|---|---|---|---|---|---|---|---|---|
| −90 | ☐ | ☐ | ☐ | --- | ☐ | ----- | ☐ | ☐ |
| −89 | ☐ | ☐ | ☐ | --- | ☐ | ----- | ☐ | ☐ |
| −88 | ☐ | ☐ | ☐ | --- | ☐ | ----- | ☐ | ☐ |
| ⋮ | ----- | ----- | ----- | ----- | ----- | ----- | ----- | ----- |
| 0 | ☐ | ☐ | ☐ | --- | ☐ | ----- | ☐ | ☐ |
| ⋮ | ----- | ----- | ----- | ----- | ----- | ----- | ----- | ----- |
| 89 | ☐ | ☐ | ☐ | --- | ☐ | ----- | ☐ | ☐ |
| 90 | ☐ | ☐ | ☐ | --- | ☐ | ----- | ☐ | ☐ |

FIG. 53B

| $y_\alpha$ \ $x_\alpha$ | $x_1$ | $x_1+1$ | $x_1+2$ | ---------------------- | $x_2$ |
|---|---|---|---|---|---|
| $y_1$ | $p(x_1, y_1)$ | | | | |
| $y_1+1$ | | | | | |
| $y_1+2$ | | | | | |
| ⋮ | | | | | |
| $y_2$ | | | | | $p(x_2, y_2)$ |

FIG. 59A

| $x_\alpha$ / $y_\alpha$ | $x_1$ | $x_1+1$ | $x_1+2$ | ----------------- | $x_2$ |
|---|---|---|---|---|---|
| $y_1$ | ☐ | ☐ | ☐ | | ☐ |
| $y_1+1$ | ☐ | ☐ | ☐ | | ☐ |
| $y_1+2$ | ☐ | ☐ | ☐ | | ☐ |
| ⋮ | | | | | |
| $y_2$ | ☐ | ☐ | ☐ | | ☐ |

FIG. 59B

| $\theta$ / $\phi$ | −180 | −179 | −178 | --- | 0 | ----- | 178 | 179 |
|---|---|---|---|---|---|---|---|---|
| −90 | | | | --- | p(−90, 0) | ----- | | |
| −89 | | | | --- | p(−89, 0) | ----- | | |
| −88 | | | | --- | p(−88, 0) | ----- | | |
| ⋮ | ----- | ----- | ----- | --- | ----- | ----- | ----- | ----- |
| 0 | | | | --- | p(0, 0) | ----- | | |
| ⋮ | ----- | ----- | ----- | --- | ----- | ----- | ----- | ----- |
| 89 | | | | --- | p(89, 0) | ----- | | |
| 90 | | | | --- | p(90, 0) | ----- | | |

SUBJECT

METHOD AND APPARATUS FOR TAKING AN IMAGE, METHOD AND APPARATUS FOR PROCESSING AN IMAGE, AND PROGRAM AND STORAGE MEDIUM

BACKGROUND OF THE INVENTION

1. Field of the Invention

The present invention relates to an apparatus and method for taking an image, an apparatus and method for processing an image, a program, and a storage medium and more particularly, to an apparatus and method for taking an image, an apparatus and method for processing an image, a program, and a storage medium, for allowing an image of a subject seen from all directions to be easily taken and displayed.

2. Description of the Related Art

In conventional displays using, for example, cathode ray tube (CRT), liquid crystal panel, or a projector, an image of a subject taken by a video camera (hereinafter, also referred to simply as a camera) or the like is displayed in a simple manner such that the image displayed represents, as shown in FIG. 1, the subject seen from a viewpoint at which the camera is located.

That is, the camera can take only an image of a subject seen from the location of the camera, and the image displayed simply represents the subject seen from the viewpoint corresponding to the location of the camera used to take the image.

If images of a subject are taken by many cameras placed around the subject, or if images of a subject are taken using a single camera while moving the camera around the subject, image data of the subject seen from various directions can be obtained.

However, in the method in which many cameras are placed around a subject, the problem is that many cameras are needed. In the method in which a single camera is moved from a location to another around a subject, it takes a long time to take images of the subject, and it is required that the subject should be at rest during that long time in which images are taken.

SUMMARY OF THE INVENTION

In view of the above, it is an object of the present invention to provide a technique of easily taking an image of a subject seen from a plurality of viewpoints by using a single camera.

According to an aspect of the present invention, there is provided an image taking apparatus comprising a concave mirror disposed so as to cover a subject, for reflecting light from a subject, and image taking means for taking an image of the subject by receiving the light reflected by the concave mirror.

According to another aspect of the present invention, there is provided an image taking method comprising the steps of reflecting light from a subject by a concave mirror disposed as to cover the subject, and taking an image of the subject by receiving the light reflected by the concave mirror.

According to still another aspect of the present invention, there is provided an image processing apparatus comprising light ray processing means for determining light ray directions of light rays traveling from the subject toward the concave mirror, for each light ray corresponding to a pixel value of each pixel of image data of the subject produced by taking the image of the subject, and then producing image information indicating the pixel value of each pixel and the corresponding light ray direction related to the pixel value of each pixel.

According to still another aspect of the present invention, there is provided an image taking method comprising the step of determining light ray directions of light rays traveling from the subject toward the concave mirror, for each light ray corresponding to a pixel value of each pixel of image data of the subject produced by taking the image of the subject, and then producing image information indicating the pixel value of each pixel and the corresponding light ray direction related to the pixel value of each pixel.

According to still another aspect of the present invention, there is provided a program comprising the step of determining light ray directions of light rays traveling from the subject toward the concave mirror, for each light ray corresponding to a pixel value of each pixel of image data of the subject produced by taking the image of the subject, and then producing image information indicating the pixel value of each pixel and the corresponding light ray direction related to the pixel value of each pixel.

According to still another aspect of the present invention, there is provided a recording medium including a program, stored therein, comprising the step of determining light ray directions of light rays traveling from the subject toward the concave mirror, for each light ray corresponding to a pixel value of each pixel of image data of the subject produced by taking the image of the subject, and then producing image information indicating the pixel value of each pixel and the corresponding light ray direction related to the pixel value of each pixel.

In the image taking apparatus and the image taking method according to the present invention, light radiated from a subject is reflected by a concave mirror disposed so as to cover the subject, and an image of the subject is taken by receiving light reflected by the concave mirror.

In the image processing apparatus, the image processing method, the program, and the recording medium, according to the present invention, directions of light rays traveling from a subject to a concave mirror are determined for each light ray corresponding to a pixel value of each pixel of image data produced by taking an image of the subject by receiving light radiated from the subject and reflected by the concave mirror disposed so as to cover the subject, and then image information indicating the light ray directions of light rays and the pixel values of pixels corresponding to the respective light rays.

BRIEF DESCRIPTION OF THE DRAWINGS

FIG. 29 is a block diagram showing an example of a functional configuration of a computer serving as an image processing apparatus;

FIG. 35 is a diagram showing a turn table system;

FIG. 53 is a diagram showing a format of intermediate image data;

FIG. 59 is a diagram showing another format of intermediate image data;

DESCRIPTION OF THE PREFERRED EMBODIMENTS

Figure 2:
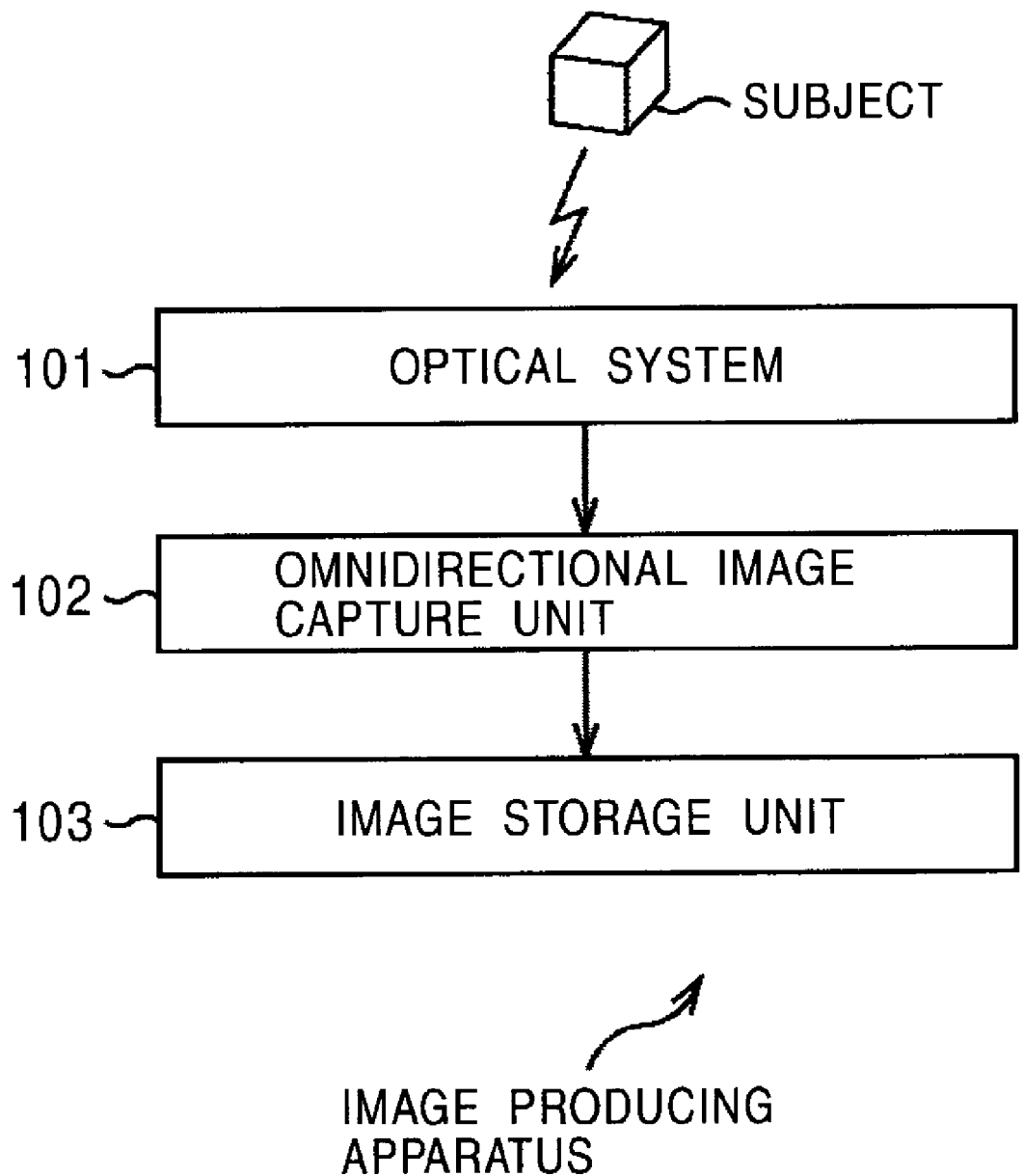
FIG. 2 is a block diagram showing an image producing apparatus according to a first embodiment of the present invention.

FIG. 2 shows an image producing apparatus according to an embodiment of the present invention. This image producing apparatus is designed to produce image data of a subject seen from a plurality of directions.

More specifically, an optical system 101 for capturing light rays at continuously varying viewpoints acquires light rays radiated from a subject and supplies the acquired light rays to an omnidirectional image capture unit 102. The optical system 101 for capturing light rays at continuously varying viewpoints is constructed in the form of a concave mirror and disposed so as to cover the subject so that light rays radiated from the subject are reflected by the concave mirror and incident on the omnidirectional image capture unit 102.

The omnidirectional image capture unit 102 includes at least a photoelectric conversion device for converting light, received from the optical system 101 for capturing light rays at continuously varying viewpoints, into an electric signal thereby taking an image of the subject at predetermined intervals equal to, for example, frames (or fields). The resultant image data of the subject is supplied to an image storage unit 103.

The image storage unit 103 includes a storage mediums, such as a semiconductor memory or a hard disk, for storing the image data supplied from the omnidirectional image capture unit 102.

Figure 3:
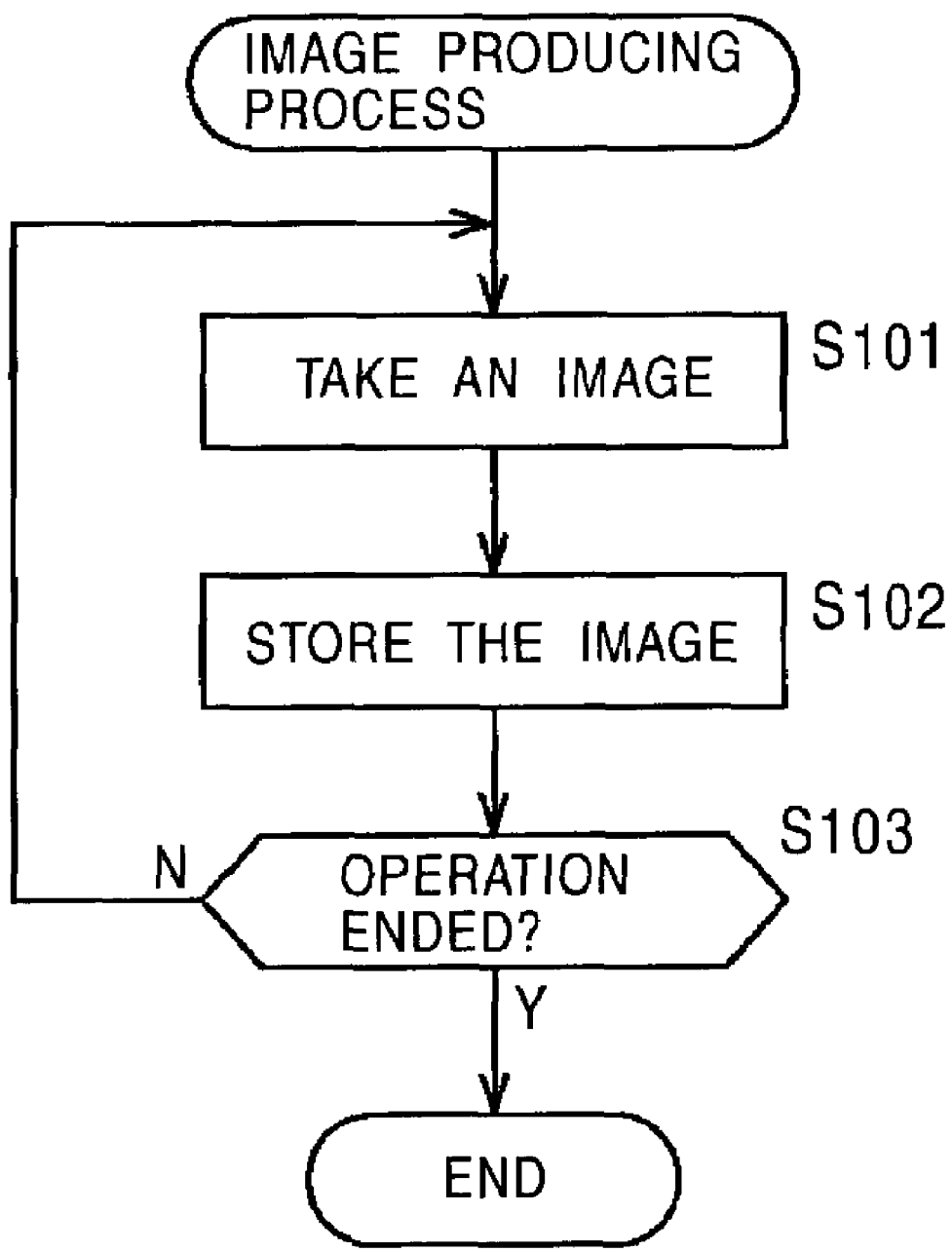
FIG. 3 is a flow chart of a process performed by the image producing apparatus.

Referring to a flow chart shown in FIG. 3, a process (image producing process) performed by the image producing apparatus shown in FIG. 2 is described below.

The optical system 101 for capturing light rays at continuously varying viewpoints reflects light radiated from a subject such that the reflected light is incident on the omnidirectional image capture unit 102.

In step S101, the omnidirectional image capture unit 102 converts the light, received from the optical system 101 for capturing light rays at continuously varying viewpoints, into an electric signal thereby taking an image of the subject and supplies resultant one frame of image data of the subject to the image storage unit 103. In step S102, the image storage unit 103 stores the image data supplied from the omnidirectional image capture unit 102. Thereafter, the process proceeds to step S103.

In step S103, it is determined whether a user has operated an operation control unit (not shown) to terminate the operation of producing the image data (hereinafter, such an operation performed by a user will be referred to as a take-image end operation).

If it is determined in step S103 that the take-image end operation has not been performed, the process returns to step S101 to repeat step S101 and following steps.

However, if it is determined in step S103 that the take-image end operation has been performed, the process is ended.

As described above, in the image producing apparatus shown in FIG. 2, the optical system 101 for capturing light rays at continuously varying viewpoints reflects light radiated from a subject such that the reflected light is incident on the omnidirectional image capture unit 102 thereby producing image data of the subject. This makes it possible to easily take an image of the subject seen from all continuous directions (or seen from a plurality of directions) in real time using the single omnidirectional image capture unit 102.

Figure 4:
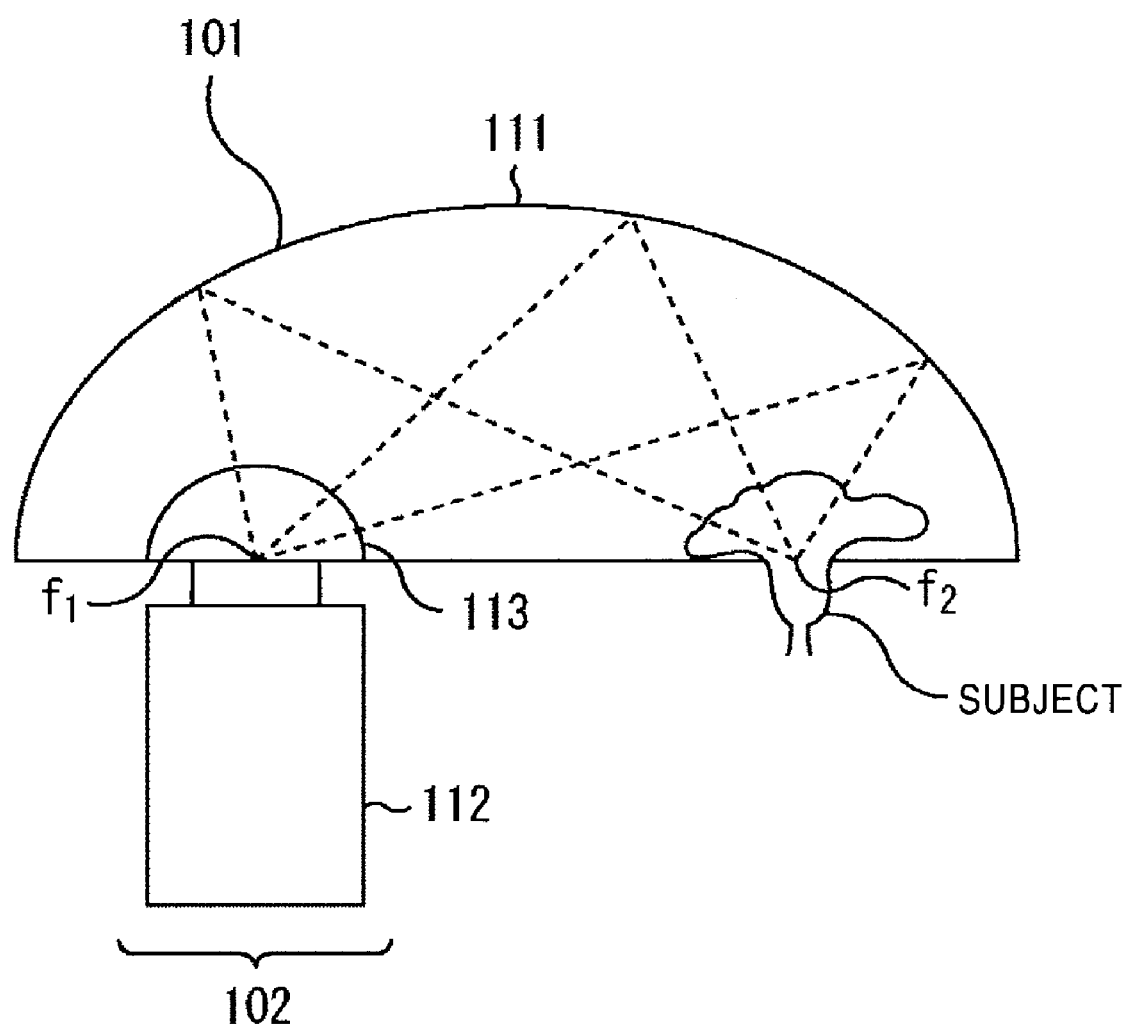
FIG. 4 is a diagram showing a first example of a construction of an unit for capturing light rays at continuously varying viewpoints and omnidirectional image capture unit.

FIG. 4 shows an example of a construction of the optical system 101 for capturing light rays at continuously varying viewpoints shown in FIG. 2 and an example of a construction the omnidirectional image capture unit 102 shown in FIG. 2, according to a first embodiment of the present invention.

In the embodiment shown in FIG. 4, the optical system 101 for capturing light rays at continuously varying viewpoints is constructed in the form of an elliptic mirror 111.

The elliptic mirror 111 has a shape obtained rotating an ellipse about a major axis (or minor axis) and dividing the resultant body of revolution into two pieces by cutting it along a plane containing the major axis (or the minor axis). The elliptic mirror 111 has a hollow space on the inner side thereof, and a reflecting surface for reflecting light is formed on the inner surface of the elliptic mirror 111. The elliptic mirror 111 is disposed such that a subject is located at one focal point $f_2$ of two focal points $f_1$ and $f_2$ of the elliptic mirror 111.

The omnidirectional image capture unit 102 is formed of a fisheye camera 112. More specifically, a camera (video camera) having a fisheye lens 113 is employed as the fisheye camera 112 of the omnidirectional image capture unit 102. The fisheye camera 112 is disposed such that the fisheye lens 113 thereof is located at the other focal point $f_1$ of the elliptic mirror 111, other than that at which the subject is located. That is, the fisheye camera 112 is located such that the optical center thereof is coincident with the focal point $f_1$ thereby allowing light rays, radiated from the focal point $f_2$ and reflected from the elliptic mirror 111 toward the focal point $f_1$, to be all incident on the fisheye lens 113.

In the above-described system including the optical system 101 for capturing light rays at continuously varying viewpoints and the omnidirectional image capture unit 102, of light rays radiated from a subject into the inside space of the elliptic mirror 111, only light rays passing through one focal point $f_2$ are reflected from the elliptic mirror 111 toward the other focal point $f_1$ because of the property of the elliptic mirror 111. As a result, the light rays, radiated from the subject and reflected by the elliptic mirror 111, are incident on the fisheye lens 113, located at the focal point $f_1$, of the fisheye camera 112, thereby allowing the fisheye camera 112 to take an image corresponding to the incident light rays.

Thus, the fisheye camera 112 can take an image of the subject seen from all continuous directions.

Figure 5:
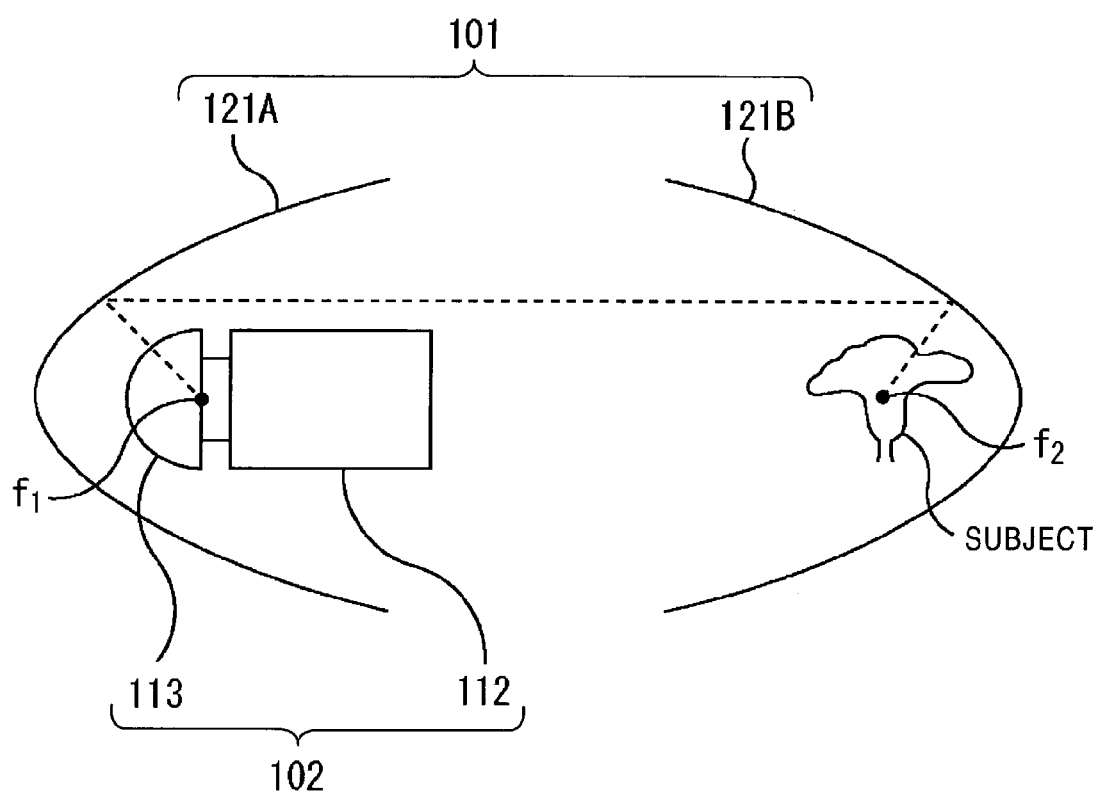
FIG. 5 is a diagram showing a second example of a construction of an unit for capturing light rays at continuously varying viewpoints and omnidirectional image capture unit.

FIG. 5 shows an example of a construction of the optical system 101 for capturing light rays at continuously varying viewpoints shown in FIG. 2 and an example of a construction the omnidirectional image capture unit 102 shown in FIG. 2, according to a second embodiment of the present invention. In FIG. 4, similar parts to those in FIG. 4 are denoted by similar reference numerals and they are not described unless a further description is necessary.

In the embodiment shown in FIG. 5, an optical system 101 for capturing light rays at continuously varying viewpoints is formed of two parabolic mirrors 121A and 121B.

The parabolic mirrors 121A and 121B each have a shape obtained by rotating a parabola expressed, for example, by $y=x^2$ about the y axis, and a reflecting surface for reflecting light is formed on the inner surface thereof. The parabolic mirrors 121A and 121B are disposed such that optical axes thereof are coincident with each other and such that their openings (at ends opposite to vertexes of the respective paraboloids) face each other. One parabolic mirror 121B, of the two parabolic mirrors 121A and 121B, is disposed such that the subject is covered by the parabolic mirror 121B and such that the subject is located at the focal point $f_2'$ of the parabolic mirror 121B.

The distance between the parabolic mirrors 121A and 121B may be set to an arbitrary value.

Also in the embodiment shown in FIG. 5, as in the embodiment shown in FIG. 4, a fisheye camera 112 having a fisheye lens 113 is employed as the omnidirectional image capture unit 102. The fisheye camera 112 is disposed such that the optical center thereof is coincident with the focal point $f_1'$ of the other parabolic mirror 121A of two parabolic mirrors 121A and 121B and such that the fisheye camera 112 points to the vertex of the parabolic mirror 121A (that is, the vertex of the parabola).

In the system including the above-described optical system 101 for capturing light rays at continuously varying viewpoints and the omnidirectional image capture unit 102, of light rays radiated from a subject into the inside space of the parabolic mirror 121B, light rays passing through the focal point $f_2'$ are reflected by the parabolic mirror 121B into parallel light rays parallel to the optical axis of the parabolic mirror 121B directed to the parabolic mirror 121A. This occurs because of the properties of the parabola.

As shown in FIG. 5, the optical axes of the parabolic mirrors 121A and 121B are coincident with each other, and thus light rays reflected by the parabolic mirror 121B become parallel to the optical axis of the parabolic mirror 121A and the parallel light rays are incident on the parabolic mirror 121A.

The parabolic mirror 121A reflects the incident light rays parallel to its optical axis. Herein, the property of the paraboloid causes the reflected light rays to be directed to the focal point $f_1'$ of the parabolic mirror 121A. Thus, the reflected light rays are incident on the fisheye lens 113 of the fisheye camera 112 located at the focal point $f_1$. Thus, the fisheye camera 112 produces an image corresponding to the incident light rays.

As described above, also in the system shown in FIG. 5, as in the system shown in FIG. 4, the fisheye camera 112 produces an image of a subject continuously seen from all directions.

Note that the optical axes of the parabolic mirrors 121A and 121B are not necessarily needed to physically coincide with each other as long as they are equivalently coincident with each other. For example, the parabolic mirrors 121A and 121B may be disposed such that their optical axes are perpendicular to each other in the same plane. However, in this case, in order to achieve equivalent coincidence between the optical axes of the parabolic mirrors 121A and 121B, it is required to dispose, for example, a mirror such that the mirror lies in a plane perpendicular to the plane in which the axes of the parabolic mirrors 121A and 121B lie and such that the mirror makes an angle of 45° with respect to each optical axis whereby the light rays from the parabolic mirror 121B are reflected by the mirror toward the parabolic mirror 121A.

Figure 6:
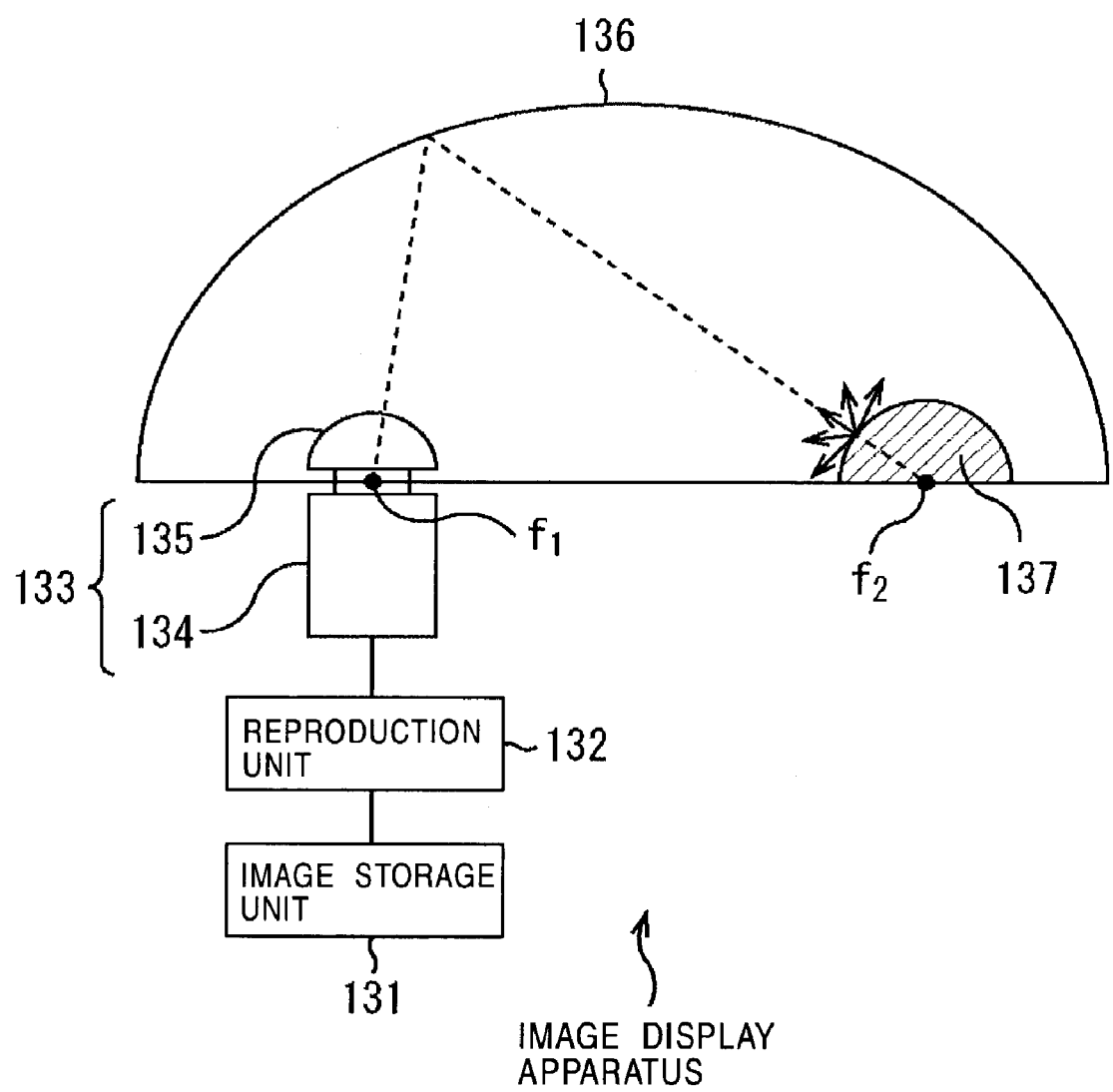
FIG. 6 is a block diagram showing an example of a construction of an image display apparatus according to the first embodiment of the present invention.

FIG. 6 shows an embodiment of an image display apparatus for displaying image data obtained by the image producing apparatus shown in FIG. 2. In this embodiment, it is assumed that in the image producing apparatus shown in FIG. 2, the optical system 101 for capturing light rays at continuously varying viewpoints is formed of an elliptic mirror 111 such as that shown in FIG. 4.

The image data stored in the image storage unit 103 in the image producing apparatus shown in FIG. 2 is supplied to an image storage unit 131, which stores the received image data. A reproduction unit 132 reads image data stored in the image storage unit 131, for example, in units of frames and supplies the read image data to the fisheye projector 133.

The fisheye projector 133 includes a projector 134 and a fisheye lens 135. The projector 134 emits light in accordance with the image data supplied from the reproduction unit 132. The fisheye lens 135 radiates the light received from the projector 134. The fisheye lens 135 has the same optical characteristics as those of the fisheye lens 113 of the fisheye camera 112 shown in FIG. 4. Therefore, in this fisheye projector 133, light rays travel in opposite directions along paths corresponding to the paths along which the light rays fall on the fisheye camera 112 shown in FIG. 4.

An elliptic half mirror 136 has a shape similar to that of the elliptic mirror 111 shown in FIG. 4 and reflects light emitted by the fisheye projector 133. As with the elliptic mirror 111 shown in FIG. 4, the elliptic half mirror 136 has two focal points $f_1$ and $f_2$, and the fisheye projector 133 is disposed at one focal point $f_1$ of the two focal points $f_1$ and $f_2$ such that the optical center of the fisheye projector 133 is coincident with the focal point $f_1$.

A hemispherical screen 137 is disposed at the other focal point $f_2$, other than the focal point $f_1$, of the elliptic half mirror 136. More specifically, the hemispherical screen 137 is disposed such that its center is coincident with the focal point $f_2$ thereby allowing light rays radiated from the focal point $f_1$ to be reflected at arbitrary points on the elliptic half mirror 136 toward the focal point $f_2$ and all incident on the surface of the hemispherical screen 137. The screen 137 reflects (diffuse-reflects) the incident light rays reflected from the elliptic half mirror 136. Thus, an image corresponding to the light rays is displayed on the spherical surface of the screen 137.

Figure 7:
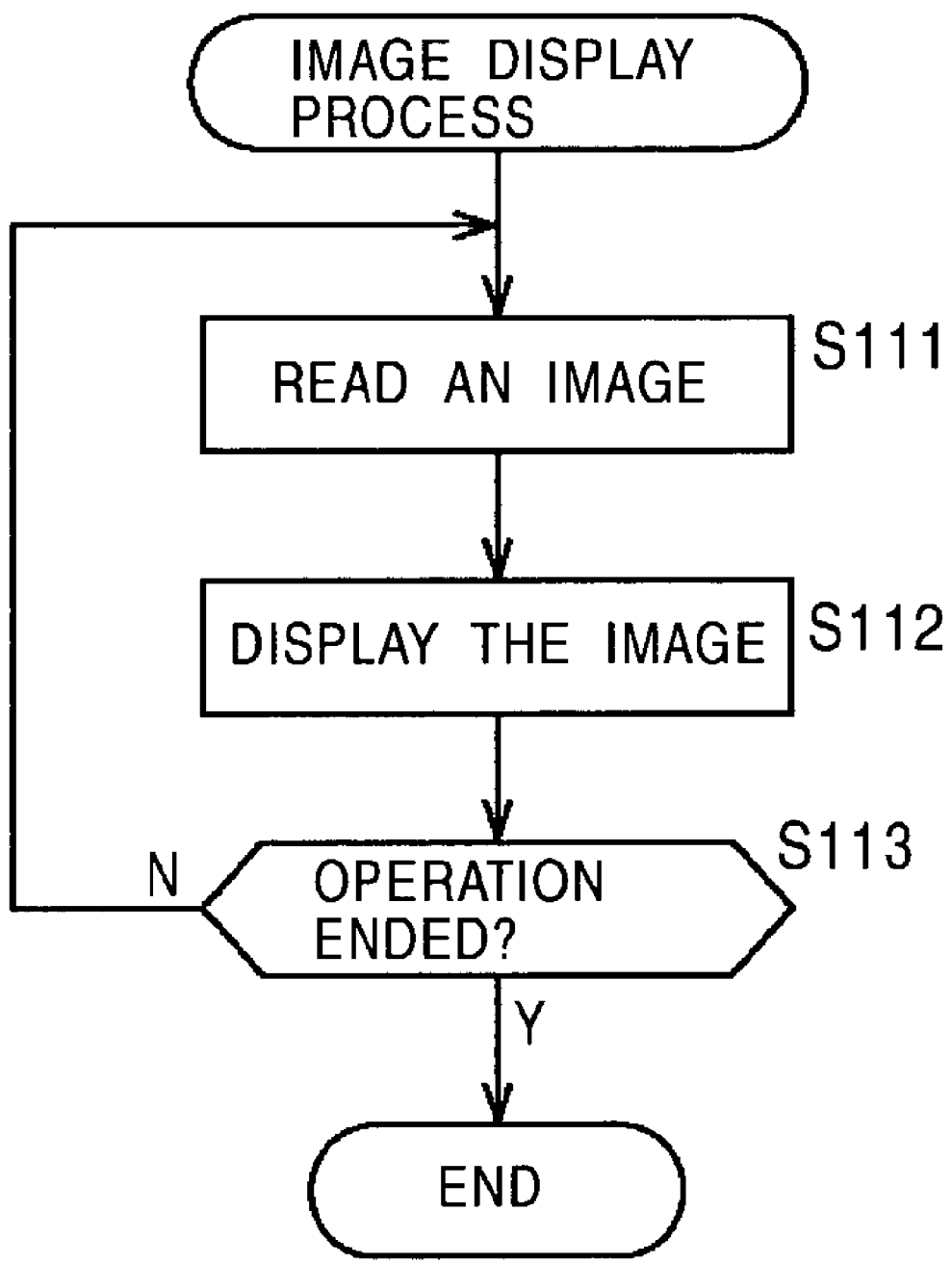
FIG. 7 is a flow chart showing a process performed by the image display apparatus.

Now, referring to a flow chart shown in FIG. 7, an operation of the image display apparatus shown in FIG. 6 is described.

First, in step S111, the playback unit 132 reads one frame of image data from the image storage unit 131 and supplies it to the fisheye projector 133. Thereafter, the process proceeds to step S112. In step S112, the fisheye projector 133 emits light in accordance with the image data supplied from the reproduction unit 132. Thus, an image corresponding to the light rays is displayed on the screen 137. Thereafter, the process proceeds to step S113.

That is, in the above-described step S112, the fisheye projector 133 emits light in accordance with the image data supplied from the reproduction unit 132. The light is reflected by the elliptic half mirror 136. In this process, as described above, the light emitted by the fisheye projector 133 travels in opposite directions along paths corresponding to the paths along which the light rays fall on the fisheye camera 112 shown in FIG. 4. That is, the light rays emitted from the fisheye projector 133 located at the focal point $f_1$ and reflected by the elliptic half mirror 136 travel along the same paths as those shown in FIG. 4 but in opposite directions toward the other focal point $f_2$. Those light rays fall on the screen 137 located at the focal point $f_2$ and form an image thereon. Thus, an image corresponding to the light rays radiated from the subject shown in FIG. 4, that is, an image of the subject, is displayed on the screen 137.

In step S113, it is determined whether a user has operated an operation control unit (not shown) to stop displaying the image data (hereinafter, such an operation performed by a user will be referred to as a display end operation).

If it is determined in step S113 that the display end operation has not been performed, the process returns to step S111. In step S111, the reproduction unit 132 reads a next frame of image data from the image storage unit 131 and repeats the above-described process on the read image data.

On the other hand, if it is determined in step S113 that the display end operation has been performed, the process is ended.

In the image display apparatus shown in FIG. 6, as described above, light rays are emitted by the fisheye projector 133 from the focal point $f_1$ into the inside space of the elliptic half mirror 136 and travel toward the focal point $f_2$ along the same paths as those shown in FIG. 4 but in opposite directions. Those light rays fall on the screen 137 located at the focal point $f_2$ and form an image. As a result, an image of the subject is displayed on the surface of the hemispherical screen 137 in such a manner the image looks as if the subject shown in FIG. 4 were actually present. That is, the image seen from all directions, of the subject shown in FIG. 4, is displayed on the spherical surface of the screen 137.

Thus, when a user sees the image displayed on the screen 137 from a location outside the screen 137 via the elliptic half mirror 136, the image looks like the actual subject seen from the same location.

In FIG. 6, the elliptic half mirror 136 partially transmits not only the light rays reflected from the screen 137 but also the light rays emitted from the fisheye projector 133. However, although the light rays falling on the screen 137 form an image, the light rays emitted from the fisheye projector 133 do not form an image, and thus the user sees only one image.

Figure 8:
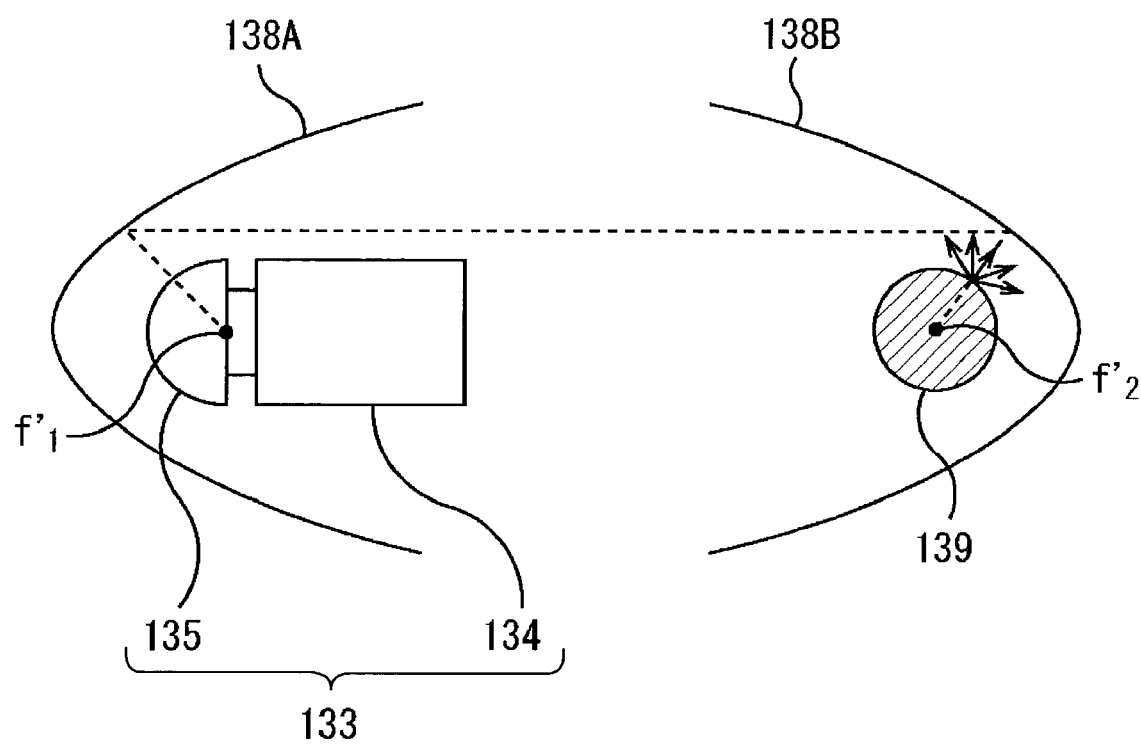
FIG. 8 is a block diagram showing an example of a construction of an image display apparatus according to a second embodiment of the present invention.

In a case in which the optical system 101 for capturing light rays at continuously varying viewpoints of the image producing apparatus shown in FIG. 2 is formed of two parabolic mirrors 121A and 121B as shown in FIG. 5, an image of a subject seen from all directions may be displayed by using, for example, an image display apparatus shown in FIG. 8.

In the image display apparatus shown in FIG. 8, the parabolic mirrors 138A and 138B have shapes similar to the parabolic mirrors 121A and 121B, respectively, shown in FIG. 5. The fisheye projector 133 described above with reference to FIG. 5 is disposed at the focal point $f_1'$ of one parabolic mirror 138A of the two parabolic mirror s. At the focal point $f_2'$ of the other parabolic mirror 138B, there is disposed, for example, a spherical screen 139. The parabolic mirrors 138A and 138B are disposed such that the positional relationship between them becomes similar to that between the parabolic mirrors 121A and 121B shown in FIG. 5.

Although not shown in FIG. 8, image data is supplied from the reproduction unit 132 to the fisheye projector 133 shown in FIG. 8, as with the fisheye projector shown in FIG. 6.

In the image display apparatus shown in FIG. 8, light rays corresponding to image data are emitted by the fisheye projector 133 from the focal point $f_1'$ into the inside space of the parabolic mirror 138A. The emitted light rays travel toward the focal point $f_2'$ of the parabolic mirror 138B along the same paths as those shown in FIG. 5 but in opposite directions. That is, when the light rays emitted by the fisheye projector 133 are reflected by the parabolic mirror 138A, the reflected light rays become parallel light rays and travel in a direction parallel to the optical axes of the parabolic mirrors 138A and 138B toward the parabolic mirror 138B. The parabolic mirror 138B reflects the light rays, received from the parabolic mirror 138A, toward the focal point $f_2'$. The light rays reflected by the parabolic mirror 138B fall on the screen 139 disposed at the focal point $f_2$ thereby forming an image on the spherical surface of the screen 139. Thus, the image of the subject shown in FIG. 5 is displayed in a three-dimensional fashion on the spherical screen 139 such that the image looks as if it were the actual subject present there. That is, the omnidirectional image of the subject shown in FIG. 5 is displayed on the spherical surface of the screen 139.

Thus, if a user sees the screen 139 from a location outside the screen 139 and inside the parabolic mirror 138B, the user can see the image which looks like the actual subject seen from the location at which the user sees the image.

Figure 9:
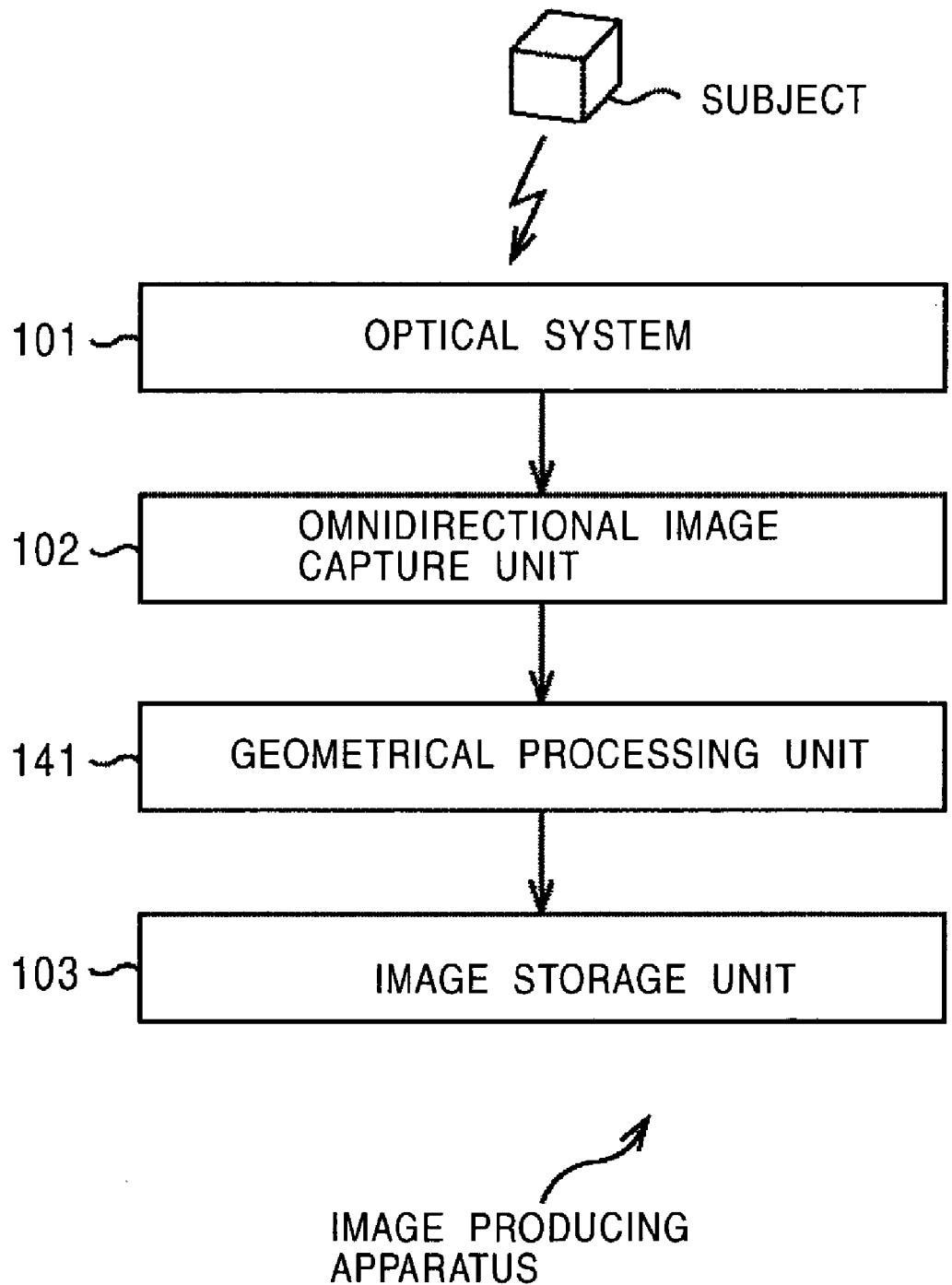
FIG. 9 is a block diagram showing an example of a construction of an image producing apparatus according to the second embodiment of the present invention.

FIG. 9 shows another embodiment of an image producing apparatus according to the present invention. In FIG. 9, similar parts to those in FIG. 2 are denoted by similar reference numerals, and they are not described in further detail herein. The image producing apparatus shown in FIG. 9 is constructed in a similar manner to the image producing apparatus shown in FIG. 2 except that it additionally includes a geometric processing unit 141.

The geometric processing unit 141 receives (acquires) image data output by the omnidirectional image capture unit 102 and performs a predetermined geometric process on the received image data thereby producing image information indicating the pixel values of pixels of the image data and the light ray directions of light rays corresponding to the pixel values of the respective pixels. The resultant image information is supplied to the image information storage unit 103 and stored therein.

In a case in which the optical system 101 for capturing light rays at continuously varying viewpoints is formed of an elliptic mirror 111 such as that shown in FIG. 4, the geometric processing unit 141 determines the light ray directions from a subject to the elliptic mirror 111 for respective pixels having particular pixel values of image data output by the fisheye camera 112 serving as the omnidirectional image capture unit 102, and the geometric processing unit 141 relates the determined light ray directions to the pixel values of pixels corresponding to the respective light rays. The geometric processing unit 141 supplies image information, including sets of data each indicating a pixel value and a corresponding light ray direction, to the image storage unit 103.

Figure 10:
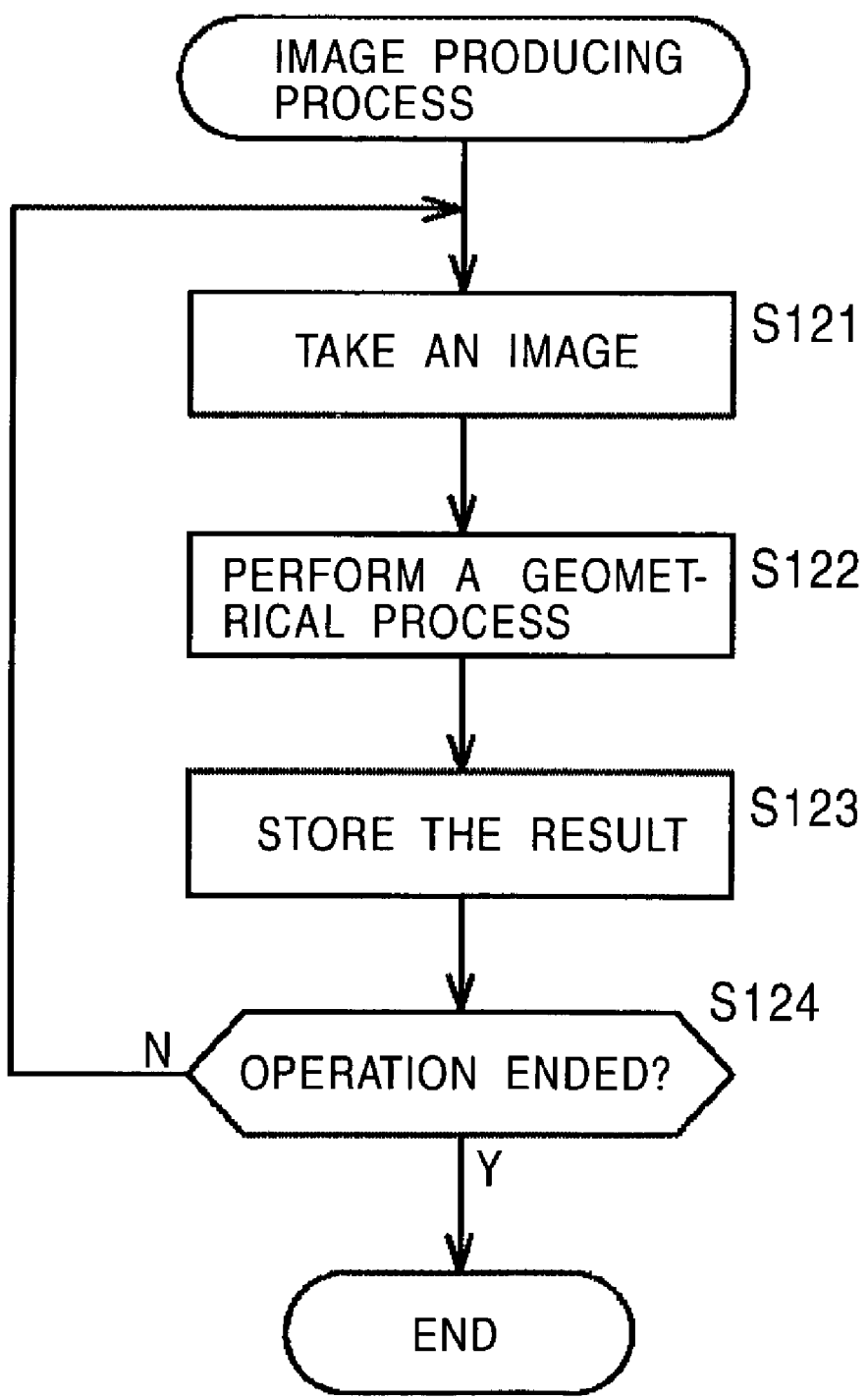
FIG. 10 is a flow chart of a process performed by the image producing apparatus.

Referring to a flow chart shown in FIG. 10, a process (image producing process) performed by the image producing apparatus shown in FIG. 9 is described below. The elliptic mirror 111 (FIG. 4) serving as the optical system 101 for capturing light rays at continuously varying viewpoints reflects light radiated from a subject, and the reflected light falls on the omnidirectional image capture unit 102.

In step S121, the fisheye camera 112 serving as the omnidirectional image capture unit 102 converts the light received from the elliptic mirror 111 into an electric signal thereby producing one frame of image data of the subject. The resultant one frame of image data is supplied to the geometric processing unit 141. In the next step S122, the geometric processing unit 141 determines the light ray directions of light rays from the subject to the elliptic mirror 111 for each light ray corresponding to the pixel value of each pixel of image data output by the fisheye camera 112, and the geometric processing unit 141 produces image information indicating the light ray directions of light rays and the pixel values of pixels corresponding to the respective light rays. Furthermore, in this step S122, the geometric processing unit 141 supplies the produced image information to the image storage unit 103. Thereafter, the process proceeds to step S123.

In step S123, the image storage unit 103 stores the image information received from the geometric processing unit 141. Thereafter, the process proceeds to step S124.

In step S124, it is determined whether the user has performed the take-image end operation on the operation control unit.

If it is determined in step S124 that the take-image end operation has not been performed, the process returns to step S121 to repeat step S121 and following steps.

However, if it is determined in step S124 that the take-image end operation has been performed, the process is ended.

As described above, in the image producing apparatus shown in FIG. 9, as with the image producing apparatus shown in FIG. 2, the optical system 101 for capturing light rays at continuously varying viewpoints reflects light radiated from the subject such that the reflected light is incident on the omnidirectional image capture unit 102 thereby producing image data of the subject. This makes it possible to easily take an image of the subject seen from all continuous directions (or seen from a plurality of directions) in real time using the single omnidirectional image capture unit 102.

The process performed by the geometric processing unit 141 shown in FIG. 9 is described in further detail below.

Figure 11:
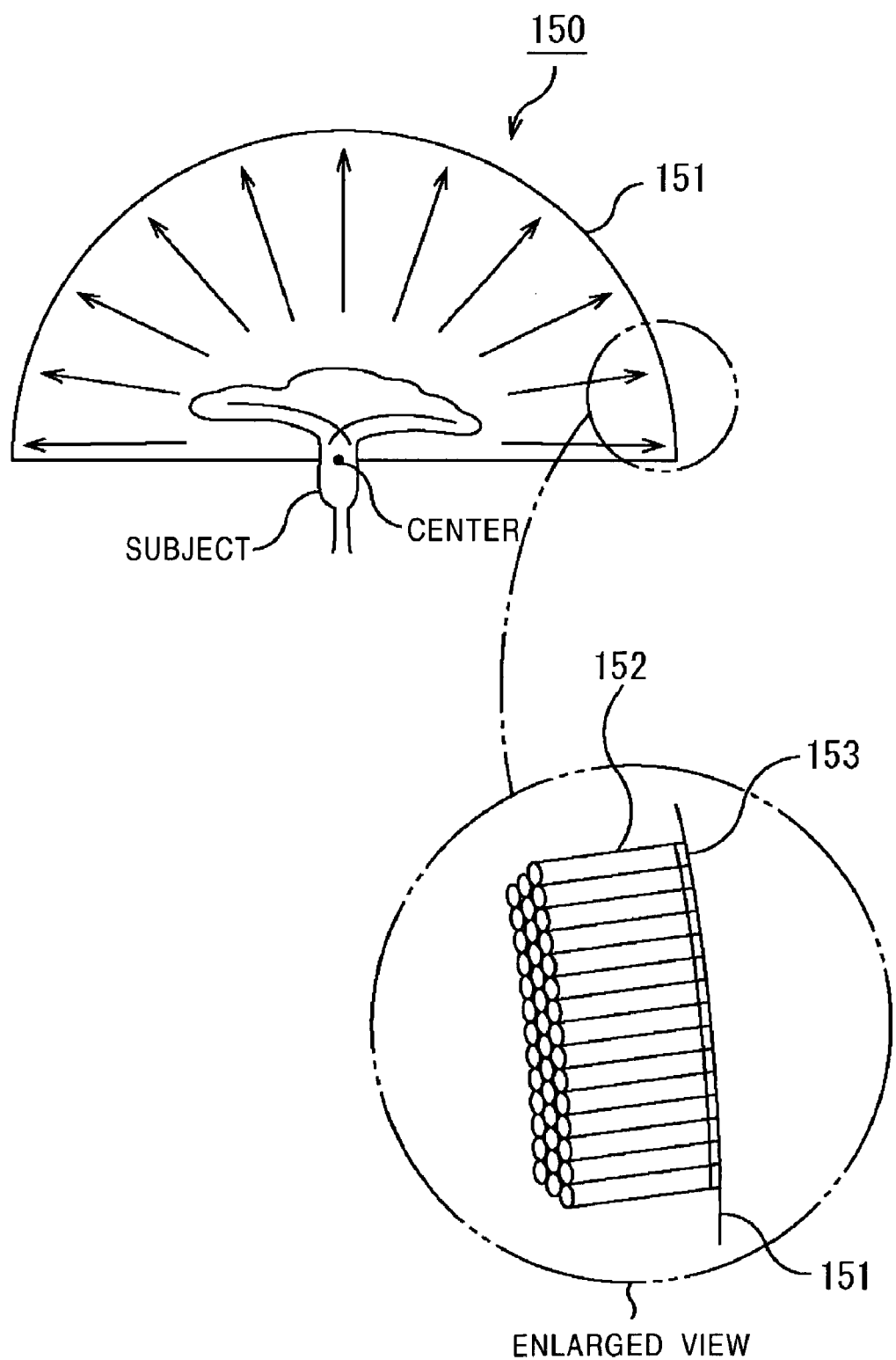
FIG. 11 is a diagram showing a reverse fisheye sensor.

The geometric processing unit 141 performs a process which allows the system including the optical system 101 for capturing light rays at continuously varying viewpoints and omnidirectional image capture unit 102 to function as an optical system equivalent to a reverse fisheye sensor 150 such as that shown in FIG. 11.

The reverse fisheye sensor 150 shown in FIG. 11 includes a hemispherical cover 151 the inside of which is hollow. As shown in an enlarged view in FIG. 11, a large number of sets of slits 152 and photosensors 153 are disposed on the inner wall of the hemispherical cover 151.

Each slit 152 is in the form of an elongated circular cylinder having a hole, like a straw. Each slit 152 is disposed such that the direction of the inner hole is perpendicular to the surface of the hemispherical cover 151. A light-blocking film is formed on the surface of each slit 152 so that only light rays directed from the center of the sphere of the hemispherical cover 151 toward the spherical surface of the hemispherical cover 151 (that is, only light rays in directions perpendicular to the hemispherical cover 151) can pass through the holes of the slits 152 but light rays in the other directions are blocked.

A photosensor 153 is disposed on an end of each slit 152, on the side closer to the hemispherical cover 151. Each photosensor 153 receives light through the hole of the corresponding slit 152 and converts the light into an electric signal thereby outputting a corresponding pixel value.

In the reverse fisheye sensor 150 constructed in the above-described manner, of light rays radiated from a subject, only light rays directed from the center of the sphere of the hemispherical cover 151 to the hemispherical cover 151 pass through slits 152 disposed on the inner wall of the hemispherical cover 151. The light rays passing through the slits 152 are received by the photosensors 153 disposed on the respective slits 152 a converted into electric signals. As a result, pixel values corresponding to the intensity of the light rays are output by the photosensors 153. Thus, the reverse fisheye sensor 150 is capable of producing image data of the subject seen from all directions.

The fisheye camera 112 shown in FIG. 4 is capable of producing image data of a subject seen from all directions around the optical axis of the fisheye camera 112. In this sense, the fisheye camera 112 can be regarded as a fisheye sensor capable of sensing a subject in all directions.

On the other hand, in the reverse fisheye sensor 150 shown in FIG. 11, a subject is sensed from all directions around the subject. In the reverse fisheye sensor 151, because the subject is sensed from all directions around the subject, the reverse fisheye sensor 151 has a function opposite to that of the fisheye camera 112 shown in FIG. 4 which senses a subject in all directions around the reverse fisheye sensor 151. That is, the reverse fisheye sensor 151 functions as a reverse fisheye sensor, in opposite to the fisheye camera 112 which functions as a fisheye sensor.

In order to obtain image data having a sufficiently high resolution using the reverse fisheye sensor 150 shown in FIG. 11, it is required that each set of a slit 152 and a photosensor 153 should be formed into a small size corresponding to the resolution of the image data. However, this needs a very high cost.

To avoid the above problem, as described above, the geometric processing unit 141 shown in FIG. 9 performs the process which allows the system including the optical system 101 for capturing light rays at continuously varying viewpoints and omnidirectional image capture unit 102 to function as an optical system equivalent to the reverse fisheye sensor 150 shown in FIG. 11.

Figure 12:
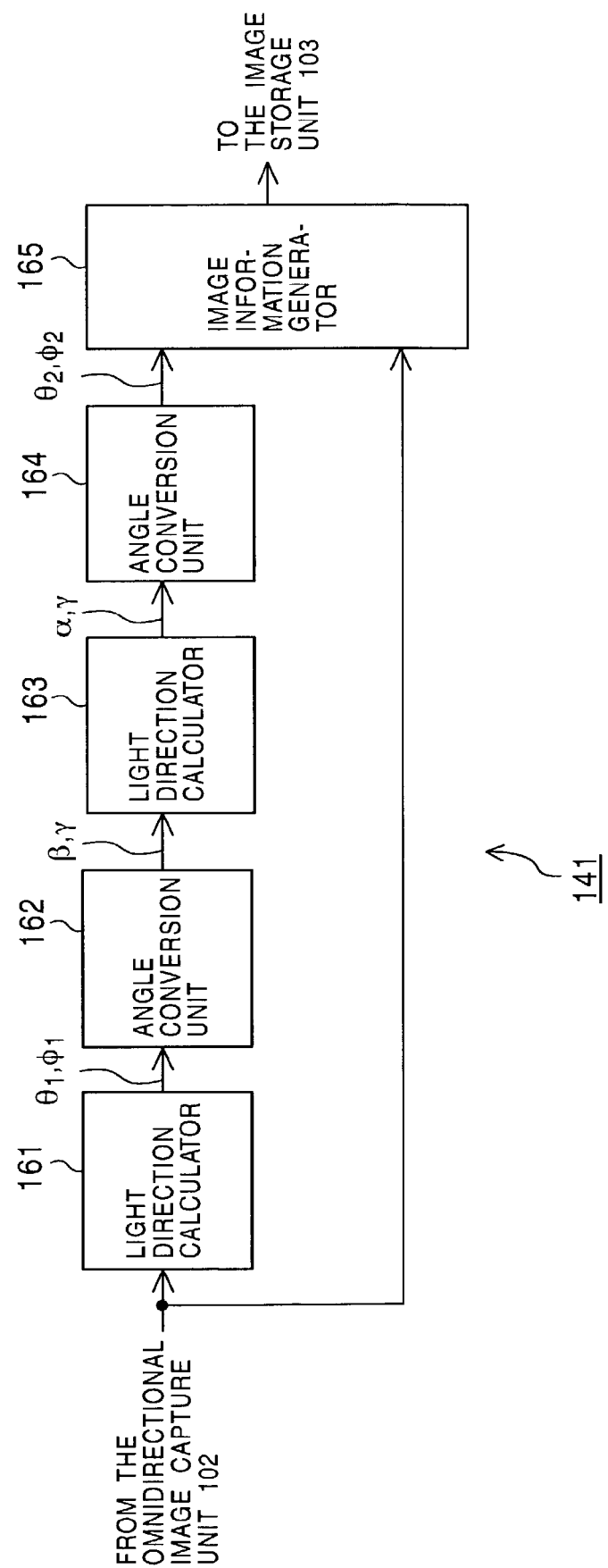
FIG. 12 is a block diagram showing an example of a construction of a geometric processing unit.

FIG. 12 shows an example of a construction of the geometric processing unit 141 shown in FIG. 9.

The geometric processing unit 141 includes a light direction calculator 161, an angle conversion unit 162, a light direction calculator 163, an angle conversion unit 164, and image information generator 165.

Image data of a subject output by the fisheye camera 112 (FIG. 4) serving as the omnidirectional image capture unit 102 is supplied to the light direction calculator 161. From the received image data, the light direction calculator 161 calculates the directions in which light rays reflected by the elliptic mirror 111 travel toward the fisheye camera 112. The calculated directions of light rays are supplied to the angle conversion unit 162.

On the basis of the light ray directions calculated by the light direction calculator 161, the angle conversion unit 162, the light direction calculator 163, and the angle conversion unit 164 calculate the directions in which light rays corresponding to respective pixels having particular pixel values of the image data of the subject travel from the subject to the elliptic mirror 111. The calculates directions of light rays are supplied to the image information generator 165.

In addition to the light ray directions calculated by the angle conversion unit 162, the light direction calculator 163, and the angle conversion unit 164, the image data of the subject output by the fisheye camera 112 (FIG. 4) serving as the omnidirectional image capture unit 102 is also supplied to the image information generator 165. The image information generator 165 relates the pixel values of the respective pixels of the image data to the directions of light rays thereby producing image information. The resultant image information is supplied to the image storage unit 103 (FIG. 9). That is, the image information generator 165 produces image information indicating the pixel values of respective pixels related to the directions in which light rays, corresponding to the respective pixel values of the pixels of the image data of the subject produced by the fisheye camera 112 by taking the image of the subject, travel from the subject to the elliptic mirror 111, and the resultant image information is supplied to the image storage unit 103 (FIG. 9).

Referring to FIGS. 13 to 20, processes performed by the light direction calculator 161, the angle conversion unit 162, the light direction calculator 163, and the angle conversion unit 164, which are shown in FIG. 12, are described below.

Figure 13:
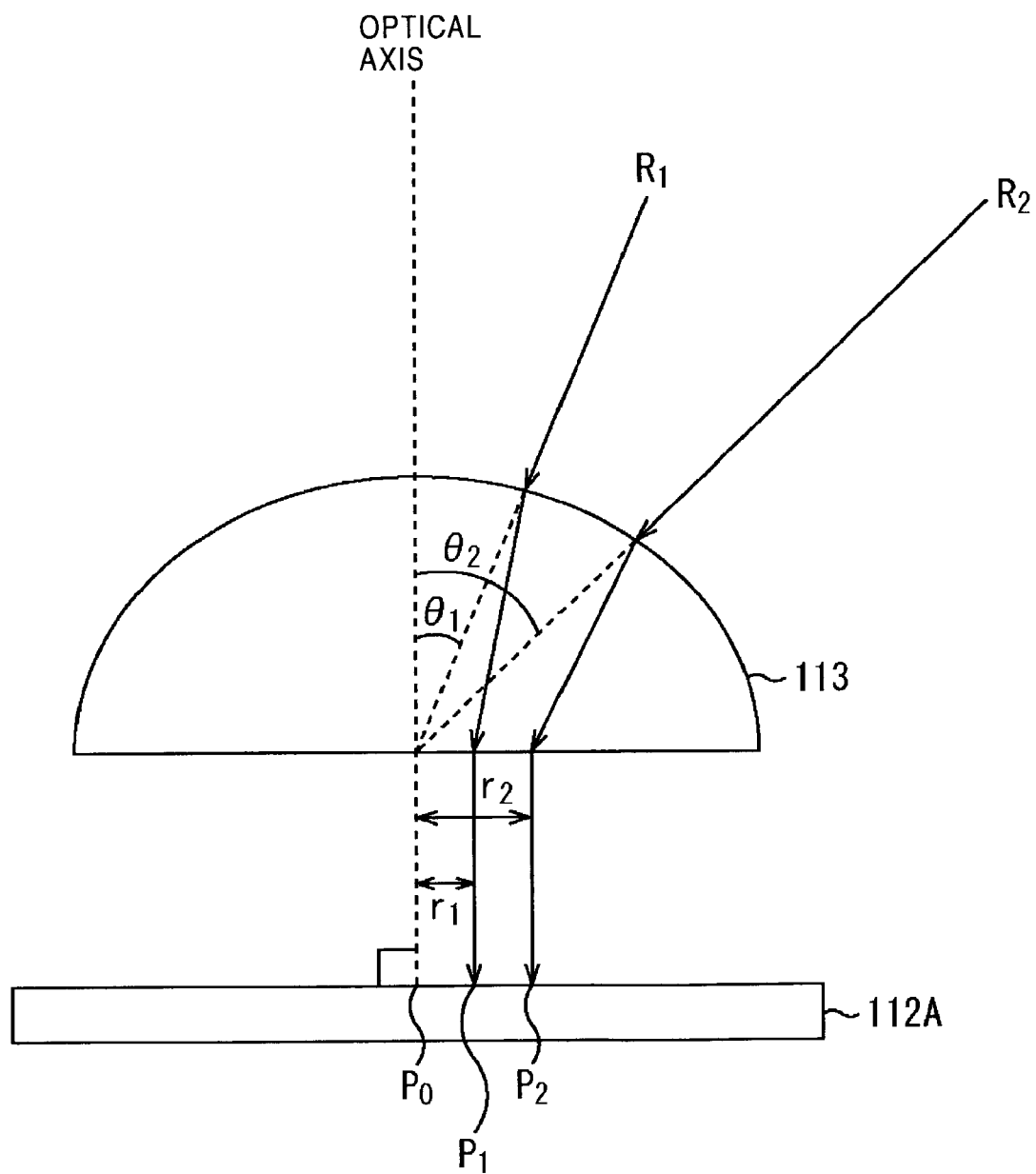
FIG. 13 is a diagram showing an equidistant projection fisheye lens.

Herein, for the purpose of simplicity, it is assumed that an equidistant projection fisheye lens (also called a fθ fisheye lens) such as that shown in FIG. 13 is employed as the fisheye lens 113 of the fisheye camera 112. Note that the fisheye lens 113 is not limited to the equidistant projection fisheye lens, but a fisheye lens of another type, such as a stereographic projection fisheye lens, an equi-solid angle projection fisheye lens, or an orthogonal projection fisheye lens may also be employed.

When an equidistant projection fisheye lens is employed as the fisheye lens 112, if the incidence angle of an incident light ray with respect to the optical axis of the fisheye lens 112 is denoted by θ and if the focal length of the fisheye lens 112 is denoted by f, then the image height y is given by fθ.

Herein, if, as shown in FIG. 13, the intersection of the optical axis of the fisheye lens 113 and the light receiving surface (such as the light receiving surface of a charge coupled device (CCD)) 112A of the fisheye camera 112 is taken as an origin $P_o$ in the light receiving surface, then, when incident light $R_1$ is incident on the fisheye lens 113 at an incidence angle $\theta_1$, the distance $r_1$ between the point $P_1$, the incident light $R_1$ falls on, in the light receiving surface 112A and the origin $P_o$ in the light receiving surface is given by $f\theta_1$. Similarly, when incident light $R_2$ is incident on the fisheye lens 113 at an incidence angle $\theta_2$, the distance $r_2$ between the point $P_2$, the incident light $R_2$ falls on, in the light receiving surface 112A and the origin $P_o$ in the light receiving surface is given by $f\theta_2$. If the incidence angle $\theta_2$ of the light ray $R_2$ is, for example, twice the incidence angle $\theta_1$ of the light ray $R_1$, the distance $r_2$ becomes twice the distance $r_1$.

Figure 14:
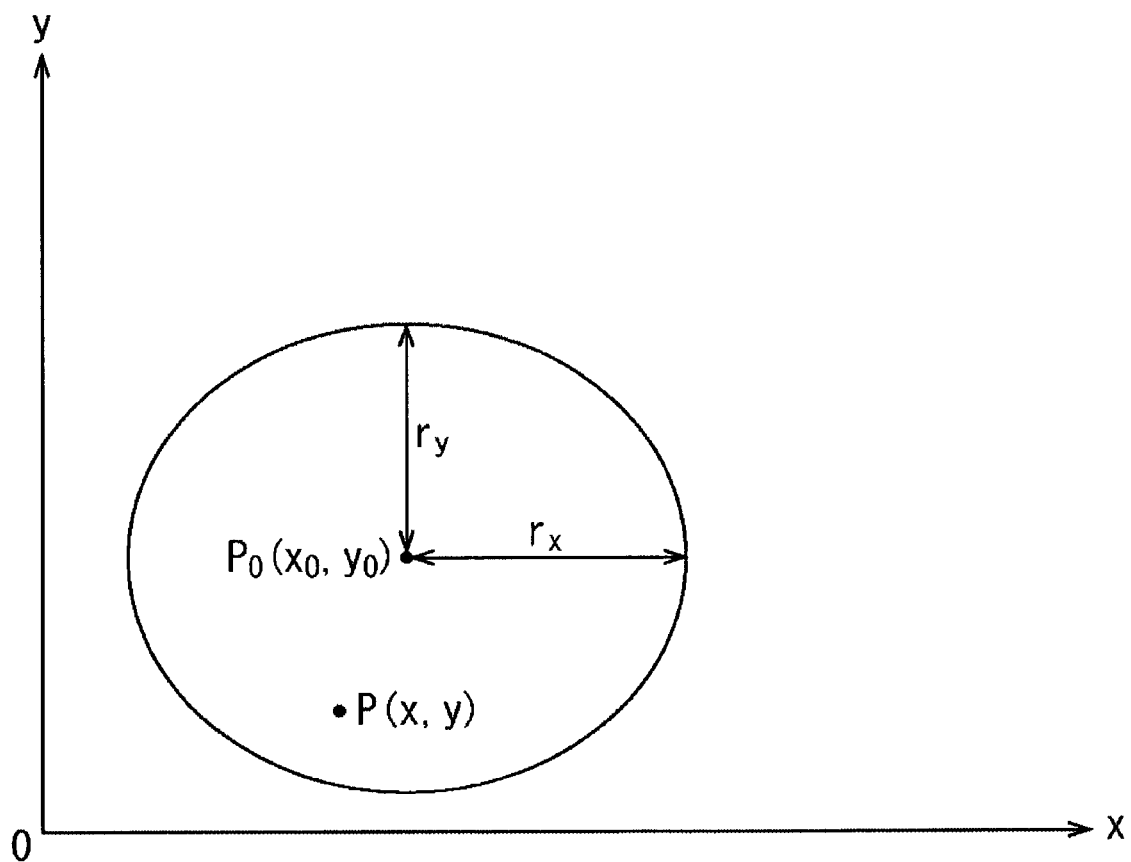
FIG. 14 is a diagram showing image data output by a fisheye camera having a fisheye lens.

Image data, output by the fisheye camera 112 with the equidistant projection fisheye lens 113 having above-described property, generally has an elliptic shape such as that shown in FIG. 14, because the aspect ratios of pixels forming the light receiving surface 112A of the fisheye camera 112 are generally not equal to 1:1. Conversely, if the aspect ratios of pixels forming the light receiving surface 112A of the fisheye camera 112 are equal to 1:1, image data output by the fisheye camera 112 has a circular shape.

Herein, for image data output by the fisheye camera 112A, let us define a 2-dimensional coordinate system as shown in FIG. 14 in which the coordinates of the origin $P_o$ taken in the light receiving surface are denoted as $(x_o, y_o)$. Note that the origin $P_o$ in the light receiving surface is located at the center of the ellipse of image data output by the fisheye camera 112. One of major and minor axes of the ellipse extends parallel to one of x and y axes of the 2-dimensional coordinate system, and the other one of major and minor axes of the ellipse extends parallel to the other one of x and y axes of the 2-dimensional coordinate system.

Figure 15:
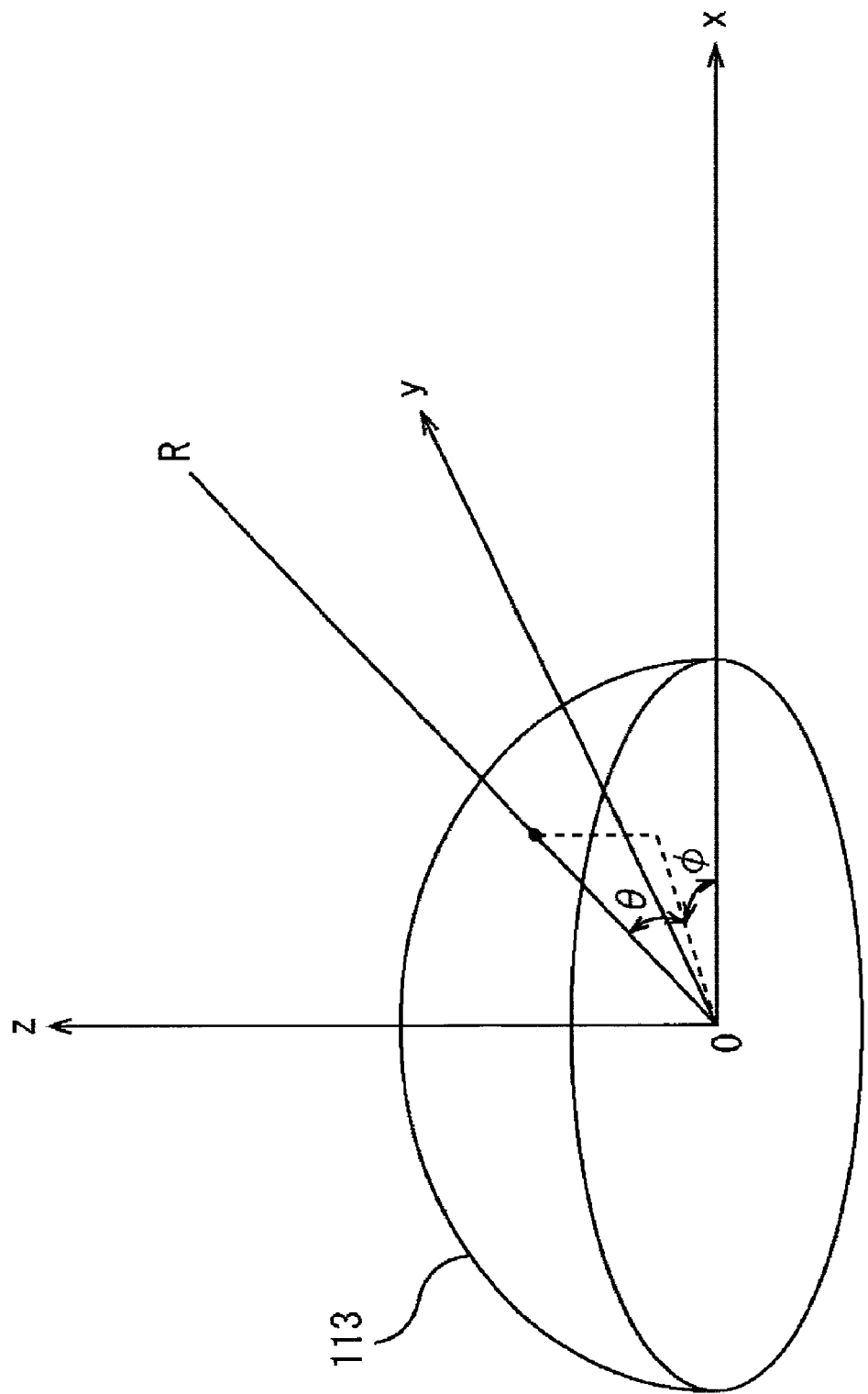
FIG. 15 is a diagram showing angles θ and φ indicating the direction of a light ray.

In this case, the relationship between the coordinates (x, y) of an arbitrary point (pixel) P of the ellipse of image data output by the fisheye camera 112 and the direction of a light ray falling on that point P can be represented by the following equation.

$$\begin{pmatrix} x \\ y \end{pmatrix} = \begin{pmatrix} x_0 + r_x \times \frac{\pi/2 - \theta}{\pi/2} \cos\phi \\ y_0 + r_y \times \frac{\pi/2 - \theta}{\pi/2} \sin\phi \end{pmatrix} \quad (1)$$

where $r_x$ is equal to one-half the length of the major or minor axis, parallel to the x axis, of the ellipse of the image data output by the fisheye camera 112, $r_y$ is equal to one-half the length of the major or minor axis parallel to the y axis, θ denotes the angle made, in a 3-dimensional coordinate system whose origin is taken at the optical center of the fisheye camera 112 and whose z axis is taken along the optical axis of the fisheye camera 112 (fisheye lens 113) as shown in FIG. 15, by a light ray R falling on the fisheye lens 113 with respect to the xy plane, and φ denotes an angle between the x axis and the projection, onto the xy plane, of the light ray R incident on the fisheye lens 113. Note that in equation (1), angles θ and φ are represented in radians.

From equation (1), tan φ can be represented as $$\tan\phi = \frac{r_x(y - y_0)}{r_y(x - x_0)} \quad (2)$$

From equation (2), the angle φ is given equation (3).

$$\theta = \tan^{-1} \frac{r_x(y - y_0)}{r_y(x - x_0)} \quad (3)$$

When arctangent ($\tan^{-1}$) in equation (3) is calculated, it is required to take into account which quadrant the point P lies. This is also required when arctangent is calculated in other equations described later.

From equations (1) and (3), the angle θ can be determined as $$\theta = \frac{\pi}{2}\left(1 - \sqrt{\frac{(x - x_0)^2 + (y - y_0)^2}{r_x^2 + r_y^2}}\right) \quad (4)$$

In accordance with equations (3) and (4), the light direction calculator 161 (FIG. 12) determines a set of angles θ and φ indicating the direction of light striking a pixel, wherein the set of angles is determined for each pixel of image data output by the fisheye camera 112 and the resultant data indicating the light directions (θ, φ) is supplied to the angle conversion unit 162 at the following stage.

The angle conversion unit 162 converts the expression form of the light direction (θ, φ) supplied from the light direction calculator 161.

As described above with reference to FIG. 15, the angle θ determined in the above process by the light direction calculator 161 indicates the angle between the light ray R incident on the fisheye lens 113 and the xy plane, and the angle φ indicates the angle between the x axis and the projection, on the xy plane, of the light ray R incident on the fisheye lens 113.

Figure 16:
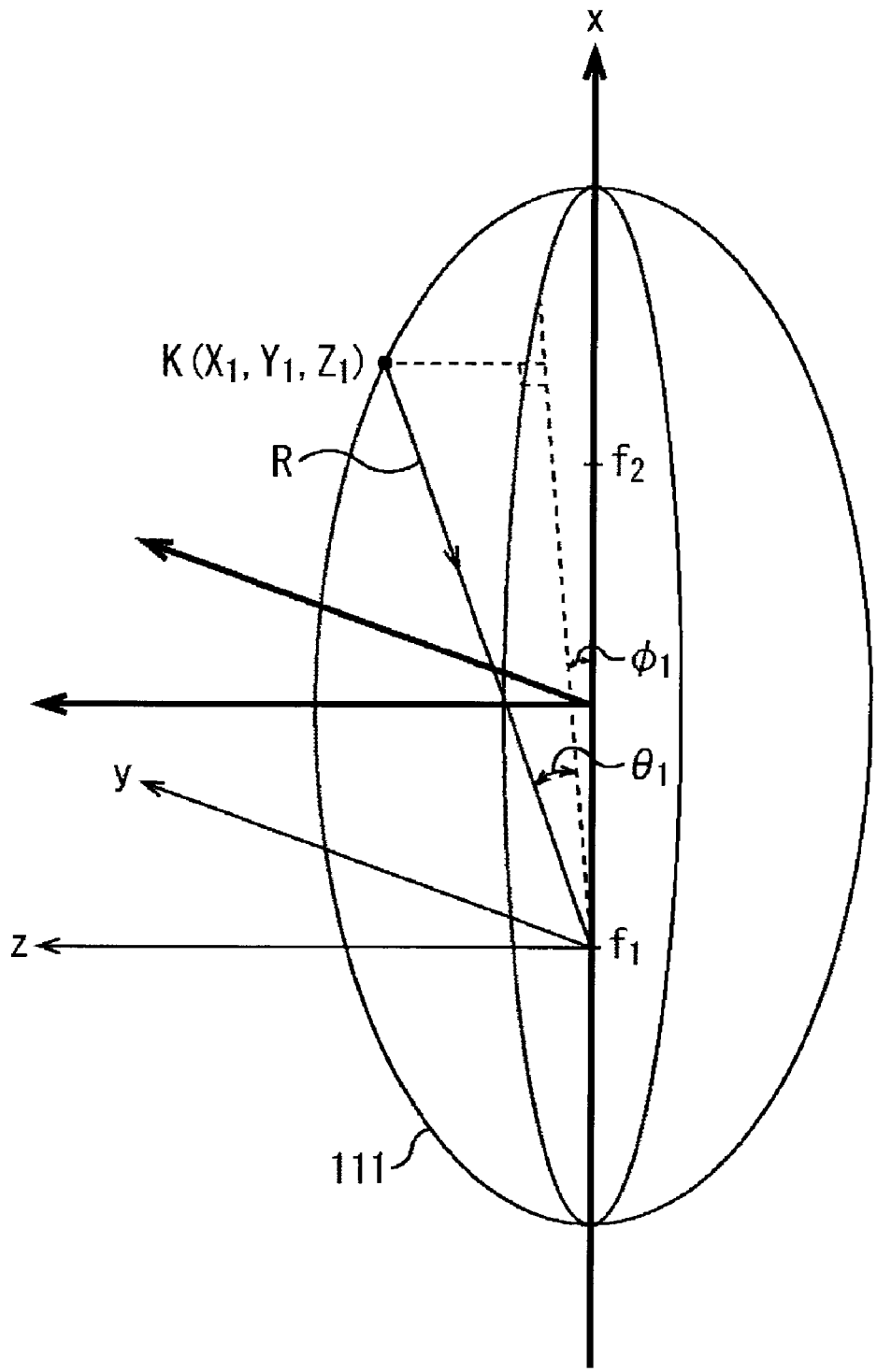
FIG. 16 is a diagram showing a process performed by an angle conversion unit.

Herein, let the x axis of the 3-dimensional coordinate system shown in FIG. 15 be taken so as to pass through the focal points $f_1$ and $f_2$ of the elliptic mirror 111 as shown in FIG. 16, and let the angles θ and φ be denoted as $\theta_1$ and $\phi_1$, respectively. In the 3-dimensional coordinate system shown in FIG. 15, the optical center of the fisheye camera 112 is taken as the origin. Therefore, the origin of the 3-dimensional coordinate system shown in FIG. 16 is given by the focal point $f_1$ at which the optical center of the fisheye camera 112 is located. Furthermore, in the 3-dimensional system shown in FIG. 16, the direction of the x axis is given as a direction from the focal point $f_1$ to $f_2$.

In FIG. 16, if the coordinates of the intersection K between the light ray R with the direction ($\theta_1, \phi_1$) and the elliptic mirror 111 are denoted by ($X_1, Y_1, Z_1$), the coordinates ($X_1, Y_1, Z_1$) can be represented by the following equation.

$X_1 = \cos\theta_1 \cos\phi_1$ $Y_1 = \cos\theta_1 \sin\phi_1$ $Z_1 = \sin\theta_1$ \quad (5)

Note that in equation (5), the distance between the point K and the focal point $f_1$ in FIG. 16 is assumed to be equal to 1 for the purpose of simplicity.

Figure 17:
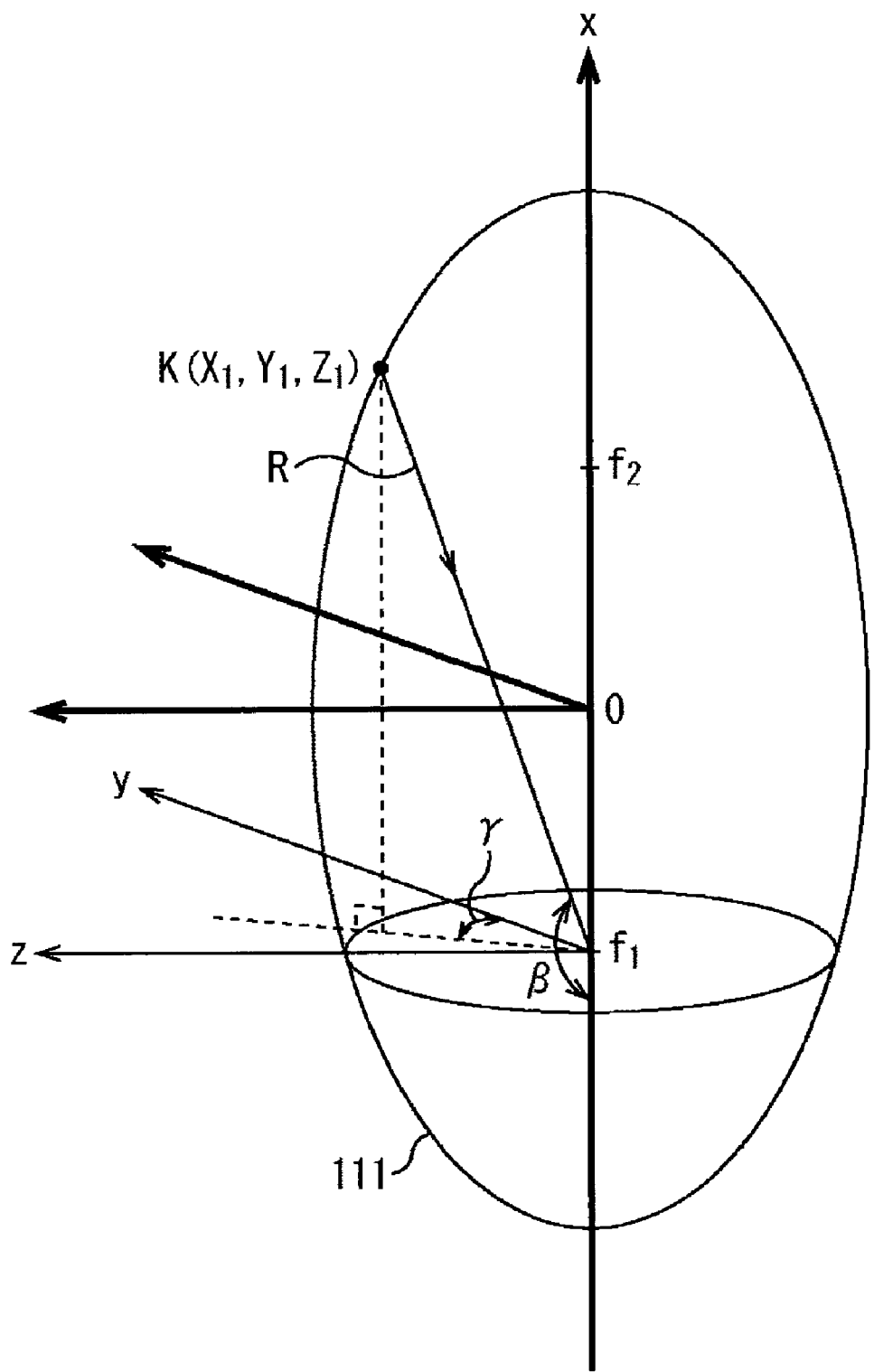
FIG. 17 is a diagram showing a process performed by the angle conversion unit.

In a 3-dimensional coordinate system shown in FIG. 17, similar to that shown in FIG. 16, if the angle between the light ray R falling on the focal point $f_1$ and the negative direction of the x axis is denoted by $\beta$, and the angle between the y axis and the projection, onto the yz plane, of the light ray R is denoted by $\gamma$, then the coordinates $(X_1, Y_1, Z_1)$ of the intersection point K between the light ray R and the elliptic mirror 111 are given by the following equation.

$$X_1 = -\cos\beta$$

$$Y_1 = \sin\beta\cos\gamma$$

$$Z_1 = \sin\beta\sin\gamma \qquad (6)$$

From equation (6), the angles $\beta$ and $\gamma$ are represented by equation (7).

$$\beta = \cos^{-1}(-X_1) \qquad (7)$$

$$\gamma = \tan^{-1}\left(\frac{Z_1}{Y_1}\right)$$

In equation (7) the coordinates $(X_1, Y_1, Z_1)$ of the point K can be determined using the angles $\theta_1$ and $\phi_1$ indicating the direction of the light ray R, in accordance with equation (5). By calculating equation (7) using the coordinates $(X_1, Y_1, Z_1)$ of the point K, it is possible to determine the angles $\beta$ and $\gamma$ indicating the direction of the light ray R.

As described above, the angle conversion unit 162 (FIG. 12) converts the light direction represented by the angles $\theta_1$ and $\phi_1$ supplied from the light direction calculator 161 into the light direction represented by the angles $\beta$ and $\gamma$, and the angle conversion unit 162 supplies the resultant light direction $(\beta, \gamma)$ to the light direction calculator 163 at the following stage.

From the light direction $(\beta, \gamma)$ of the light ray R supplied from the angle conversion unit 162, the light direction calculator 163 calculates the direction of a light ray R' traveling from the focal point $f_2$ to the point K.

Figure 18:
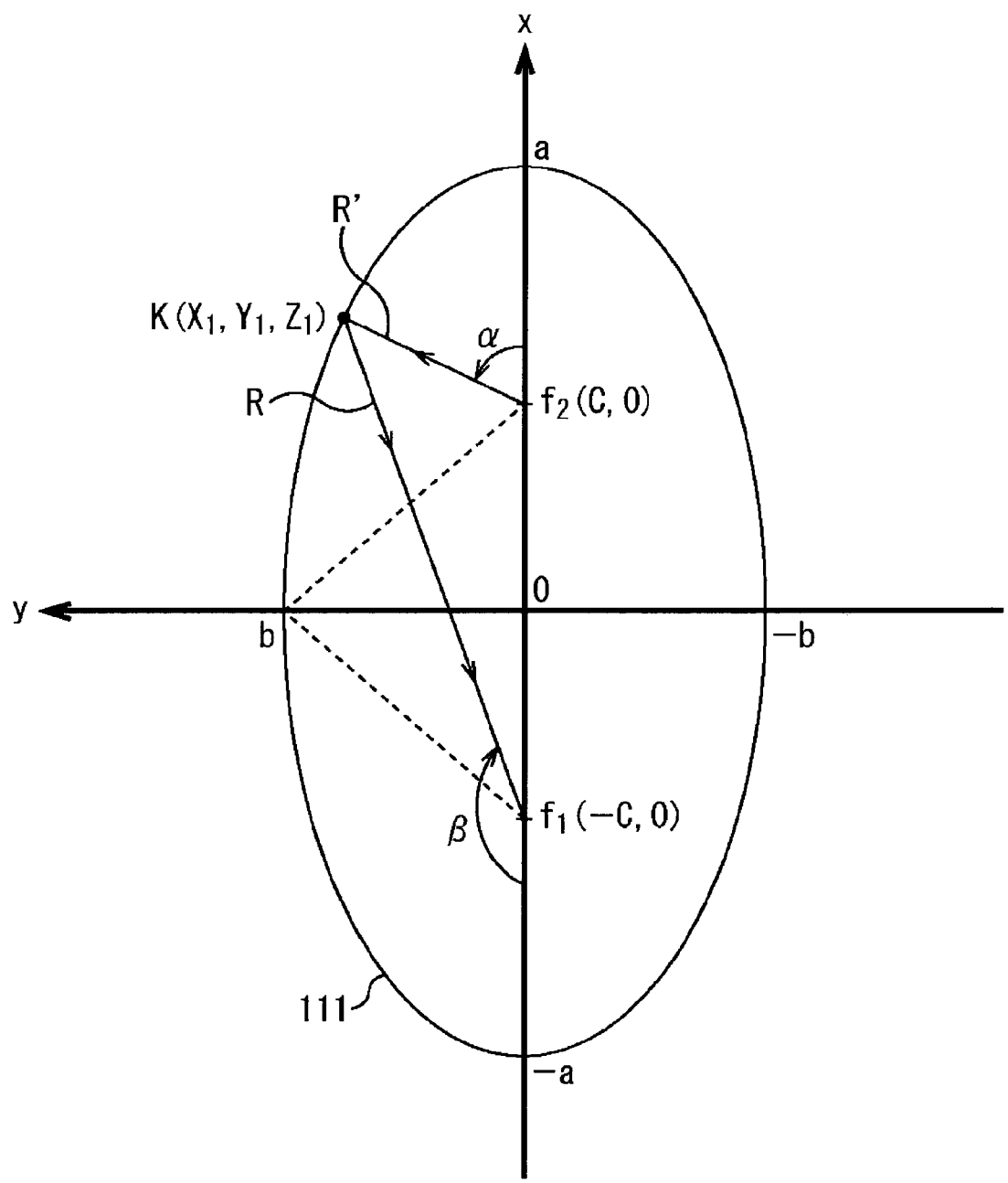
FIG. 18 is a diagram showing a process performed by a light direction calculator.

That is, as shown in FIG. 18, the light ray R, traveling from a point K on the elliptic mirror 111 (FIG. 4) to the focal point $f_1$ at which the fisheye camera 112 is located, originates from reflection, at the point K on the elliptic mirror 111, of the light ray R' which is one of light rays radiated from the subject and which is directed from the focal point $f_2$ to the point K. On the basis of this fact, the light direction calculator 163 determines the direction of the light ray R'.

Herein, as shown in FIG. 18, the angle made at the focal point $f_2$ between the light ray R' and the positive direction of the x axis is denoted by $\alpha$. Herein, in a plane defined by three points, that is, the focal points $f_1$ and $f_2$ and the point K on the elliptic mirror 111 at which the light ray R' is reflected into the light ray R, a 2-dimensional coordinate system is introduced such that the center of the elliptic mirror 111 is taken as the origin. In this 2-dimensional coordinate system, let the coordinates of the focal points $f_1$ and $f_2$ be $(-c, 0)$ and $(c, 0)$, respectively. Furthermore, let the major and minor axes of the elliptic mirror 111 be denoted by $2a$ and $2b$, respectively. In FIG. 18, the x axis is taken along the major axis and the y axis is taken along the minor axis.

In this case, the elliptic mirror 111 (more precisely, the ellipse of the elliptic mirror 111) shown in FIG. 18 can be expressed by the following equation.

$$\frac{x^2}{a^2} + \frac{y^2}{b^2} = 1 \qquad (8)$$

The sum of the length of a segment $f_1 K'$ from the focal point $f_1$ to an arbitrary point K' on the elliptic mirror 111 and the length of a segment $K'f_2$ from that point K' to the focal point $f_2$ is constant regardless of the point K'. Therefore, by considering two special cases in one of which the point K' is located at the intersection of the elliptic mirror 111 and the x axis and in the other one of which the point K' is located at the intersection of the elliptic mirror 111 and the y axis, equation (9) is obtained.

$$2\sqrt{b^2+c^2} = 2a \qquad (9)$$

From equation (9), the value of c in the coordinates of the focal points $f_1$ and $f_2$ is given as $$c = \sqrt{a^2 - b^2} \qquad (10)$$

In the 2-dimensional coordinate system shown in FIG. 18, the line of the light ray R' can be expressed using the angle $\alpha$ as $$y = (\tan\alpha)(x - c) \qquad (11)$$

The coordinates of the point K at which the light ray R' is reflected can be determined by substituting equation (11) into equation (8). Substituting equation (11) into equation (8) yields equation (12).

$$\frac{x^2}{a^2} + \frac{(\tan\alpha)^2(x-c)^2}{b^2} = 1 \qquad (12)$$

Herein, let $\tan\alpha$ be expressed as $$\tan\alpha = t \qquad (13)$$

In accordance with equation (13), if $\tan\alpha$ in equation (12) is replaced with t, the following equation (14) is obtained.

$$\left(\frac{1}{a^2} + \frac{t^2}{b^2}\right)x^2 - \frac{2ct^2}{b^2}x + \frac{t^2 c^2}{b^2} - 1 = 0 \qquad (14)$$

By solving equation (14) with respect to x, equation (15) representing the x coordinate of the point K is obtained.

$$x = \frac{ct^2 \pm \sqrt{(ct^2)^2 - \left(\frac{b^2}{a^2} + t^2\right)(t^2 c^2 - b^2)}}{\frac{b^2}{a^2} + t^2} \qquad (15)$$

Herein, let b/a be expressed by the following equation (16).

$$\frac{b}{a} = r \qquad (16)$$

Rewriting equation (10) using equation (16) yields equation (17).

$$c = \sqrt{a^2\left(1 - \frac{b^2}{a^2}\right)} \quad (17)$$
$$= \sqrt{a^2(1-r^2)}$$

Herein, let $\sqrt{(1-r2)}$ be expressed by the following equation (18).

$$r' = \sqrt{1-r^2} \quad (18)$$

Replacing $\sqrt{(1-r2)}$ in equation (17) with r' in accordance with equation (18) yields equation (19).

$$c = ar' \quad (19)$$

By substituting c given by equation (19) into equation (15), x in equation (15) is expressed as $$x = a \times \frac{r't^2 \pm r^2 t'}{r^2 + t^2} \quad (20)$$

where t' is given by $$t' = \sqrt{1+t^2} \quad (21)$$

By substituting equation (20) together with equation (13) into equation (11), the y coordinate of the point K on the elliptic mirror 111 at which the light ray R' is reflected is expressed as $$y = t(x - ar')$$
$$= \frac{tar^2}{r^2 + t^2}(\pm t' - r') \quad (22)$$

The line of the light ray R, which arises as the reflected light ray of the light ray R' at the point K on the elliptic mirror 111, can be expressed using the angle β as $$\tan(\pi - \beta) = \frac{y}{x+c} \quad (23)$$

Because the point K lies not only on the line of the light ray R' but also on the line of the light ray R, equation (24) can be obtained by substituting c, x, and y, given by equations (19), (20), and (22), respectively, into equation (23).

$$\tan(\pi - \beta) = \frac{tr^2(\pm t' - r')}{r'(2t^2 + r^2) \pm t'r^2} \quad (24)$$

In equation (24), tan(π−β) is equal to −tan β as shown in equation (25).

$$\tan(\pi - \beta) = -\tan(\beta - \pi) \quad (25)$$
$$= -\tan\beta$$

From equations (24) and (25), tan β can be expressed as $$\tan\beta = \frac{tr^2(r' \mp t')}{r'(2t^2 + r^2) \pm t'r^2} \quad (26)$$

Equation (27) is obtained by multiplying both the denominator and the numerator on the right side of equation (26) by ±t'+r' and rewriting the result.

$$\tan\beta = \frac{tr^2(r' \mp t')}{r'(2t^2 + r^2) \pm t'r^2} \cdot \frac{\pm t' + r'}{\pm t' + r'} \quad (27)$$
$$= \frac{-tr^2(\pm t' - r')}{r'(2t^2 + r^2) \pm t'r^2} \cdot \frac{\pm t' + r'}{\pm t' + r'}$$
$$= \frac{-tr^2}{2 - r^2 \pm 2t'r'}$$

By substituting t, r, r', and t' given by equations (13), (16), (18), and (21), respectively, into equation (27), equation (28) is obtained.

$$\tan\beta = \frac{-\left(\frac{b}{a}\right)^2 \tan\alpha}{2 - \left(\frac{b}{a}\right)^2 \pm \sqrt{1 - \left(\frac{b}{a}\right)^2}\sqrt{1 + \tan^2\alpha}} \quad (28)$$

Thus, in accordance with equation (28), the angle β indicating the direction of the light ray R can be converted into the angle α indicating the direction of the light ray R' which is reflected at the point K into the light ray R.

Figure 19:
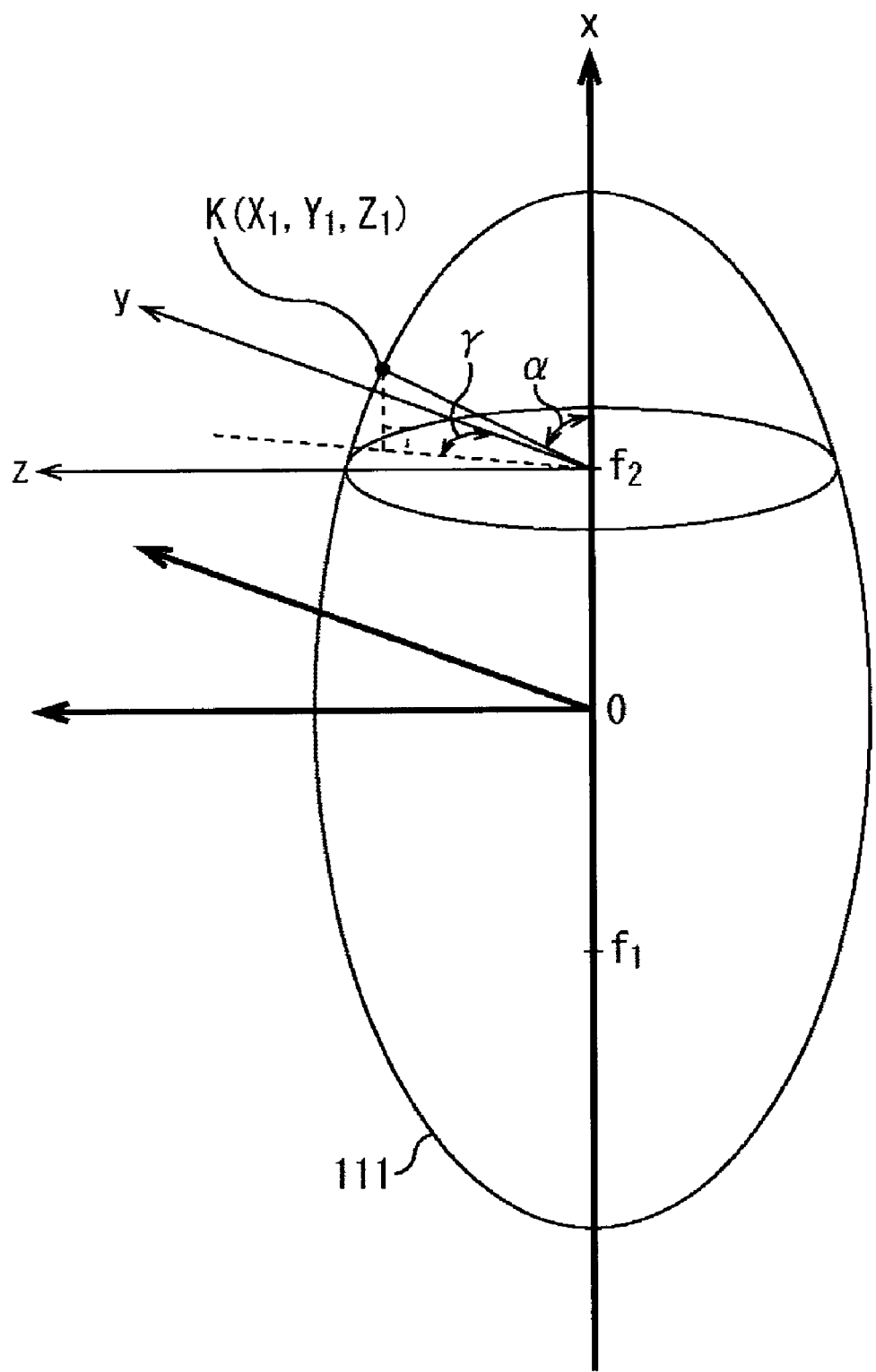
FIG. 19 is a diagram showing a process performed by the light direction calculator.

The angle α indicates the angle made, at the focal point $f_2$, between the light ray R' and the positive direction of the x axis. Thus, as shown in FIG. 19, if a 3-dimensional coordinate system is introduced by moving the origin the 3-dimensional coordinate system shown in FIG. 16 or 17 to the focal point $f_2$, the direction of the light ray R' can be represented by the angle α and, for example, an angle of the projection, onto the yz plane, of the light ray R' with respect to the y axis.

The light ray R' and the light ray R arising as a result of reflection, at the point K on the elliptic mirror 111, of the light ray R' both lie in the same plane including the x axis. Therefore, in FIG. 19, the angle between the y axis and the projection, onto the yz plane, of the light ray R' is identical to the angle γ, shown in FIG. 18, between the y axis and the projection, onto the yz plane, of the light ray R. Therefore, the angle γ indicating the direction of the light ray R supplied from the angle conversion unit 162 to the light direction calculator 163 may be directly employed as the angle between the y axis and the projection, onto the yz plane, of the light ray R'.

From the direction (β, γ) of the light ray R supplied from the angle conversion unit 162, the light direction calculator 163 calculates, as described above, the angles α and γ indicating the direction of the light ray R' which is reflected by the elliptic mirror 111 into the light ray R, and the light direction calculator 163 supplies the calculated direction (α, γ) to the angle conversion unit 164 at the following stage.

The angle conversion unit 164 converts the expression form of the light ray angle (α, γ) supplied from the light direction calculator 163.

That is, the light direction calculator 163 determines the angles α and γ indicating the light ray direction, wherein the angle α indicates, as described above with reference to FIG.

18, the angle made, at the focal point $f_2$, between the light ray R' and the positive direction of the x axis, and the angle γ indicates, as described above with reference to FIG. 19, the angle made between the y axis and the projection, onto the yz plane, of the light ray R'.

Figure 20:
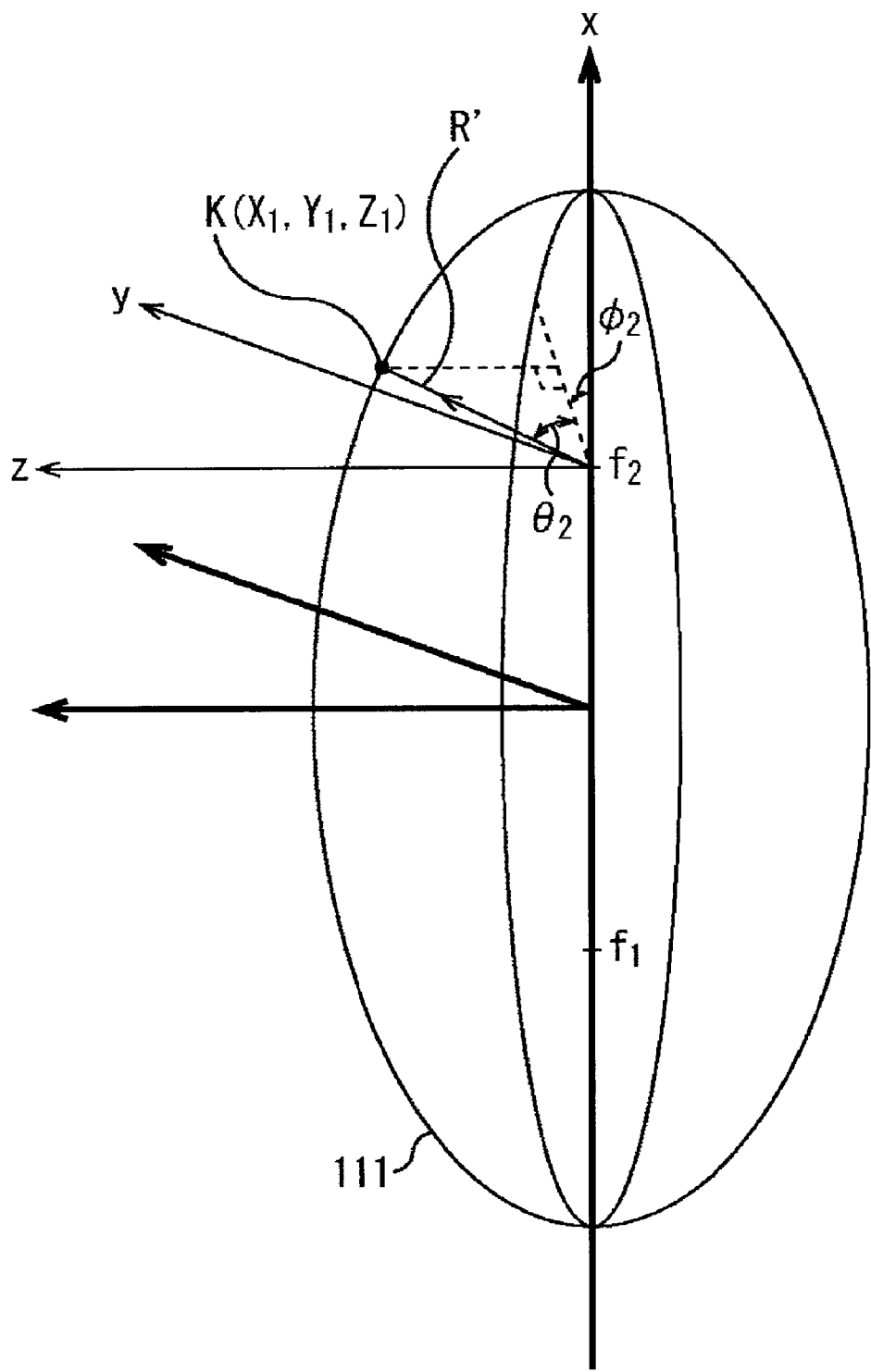
FIG. 20 is a diagram showing a process performed by an angle conversion unit.

The angle conversion unit 164 converts the angles α and γ indicating the direction of the light ray R' into, for example, angles $\theta_2$ and $\phi_2$ as shown in FIG. 20.

In FIG. 20, a 3-dimensional coordinate system is defined in a similar manner as in FIG. 19, and the angle conversion unit 164 determines the angles $\theta_2$ and $\phi_2$ indicating the direction of the light ray R', wherein $\theta_2$ is the angle between the light ray R' and the xy plane, and $\phi_2$ is the angle between the x axis and the projection, onto the xy plane, of the light ray R'.

Herein, if the earth is assumed to be placed at the origin of the 3-dimensional coordinate system shown in FIG. 20 such that the north pole faces in the positive direction of the z axis, the angles $\theta_2$ and $\phi_2$ correspond to latitude and longitude, respectively.

The angle conversion unit 164 converts the angles α and γ indicating the direction of the light ray R' supplied from the light direction calculator 163 into the angles $\theta_2$ and $\phi_2$ shown in FIG. 20, for example, as described below.

That is, in the 3-dimensional coordinate system shown in FIG. 19, if the coordinates of the point K at which the light ray R' is reflected are represented as $(X_2, Y_2, Z_2)$ the coordinates $(X_2, Y_2, Z_2)$ can be determined using the angles α and γ indicating the light ray angle in accordance with the following equation.

$$X_2 = \cos \alpha$$
$$Y_2 = \sin \alpha \cos \gamma$$
$$Z_2 = \sin \alpha \sin \gamma \quad (29)$$

where the length from the focal point $f_2$ to the point K is assumed to be equal to 1 for the purpose of simplicity.

On the other hand, as can be seen from FIG. 20, in the 3-dimensional coordinate system taken in FIG. 20 in the same manner as in the FIG. 19, the coordinates $(X_2, Y_2, Z_2)$ of the point K can be represented using the angles $\theta_2$ and $\phi_2$ indicating the light ray direction in accordance with the following equation.

$$X_2 = \cos \theta_2 \cos \phi_2$$
$$Y_2 = \cos \theta_2 \sin \phi_2$$
$$Z_2 = \sin \theta_2 \quad (30)$$

The coordinates $(X_2, Y_2, Z_2)$ of the point K in equation (30) can be determined from the angles α and γ using equation (29), and the angles $\theta_2$ and $\phi_2$ in equation (30) are given by equation (31).

$$\theta_2 = \sin^{-1} Z_2 \quad (31)$$
$$\phi_2 = \tan^{-1} \frac{Y_2}{X_2}$$

As described above, the angle conversion unit 164 determines the angles $\theta_2$ and $\phi_2$ indicating, in latitude and longitude, of the direction of the light ray R' and supplies the resultant angles $\theta_2$ and $\phi_2$ to the image information generator 165 at the following stage.

The image information generator 165 relates each light ray direction $(\theta_2, \phi_2)$ determined by the angle conversion unit 164 to a pixel value of a corresponding pixel of the image data of the subject output by the fisheye camera 112 (FIG. 4) serving as the omnidirectional image capture unit 102, thereby producing image information, which is supplied to the image storage unit 103 (FIG. 9).

The light ray direction $(\theta_2, \phi_2)$ indicates the direction of the light ray R' radiated from the subject located at the focal point $f_2$. When the light ray R' is reflected by the elliptic mirror 111, the light ray R' is converted into the light ray R (FIG. 18) and travels toward the focal point $f_1$ at which the fisheye camera 112 (FIG. 4) is located. Thus, the light ray R is sensed by a pixel on the light receiving surface 112A (FIG. 13) of the fisheye camera 112. The fisheye camera 112 outputs a pixel value corresponding to the intensity of the light ray R sensed by the pixel. The image information generator 165 relates the pixel value of that pixel to the light ray direction $(\theta_2, \phi_2)$ thereby producing image information.

As described above, for each light ray corresponding to the pixel value of each pixel of the image data of the subject produced by the fisheye camera 112 by taking the image of the subject, the geometric processing unit 141 (FIG. 9) produces image information indicating the pixel values of respective pixels related to the light ray directions $(\theta_2, \phi_2)$ (light ray directions of light rays R') in which light rays R, corresponding to the respective pixel values of the pixels of the image data of the subject produced by the fisheye camera 112 by taking the image of the subject, travel from the subject to the elliptic mirror 111.

Although in the embodiment described above, the process performed by the geometric processing unit 141 has been explained on the assumption that the elliptic mirror 111 (FIG. 4) is used as the optical system 101 for capturing light rays at continuously varying viewpoints (FIG. 9), image information may also be produced in a similar manner when the optical system 101 for capturing light rays at continuously varying viewpoints is formed of the parabolic mirrors 121A and 121B (FIG. 5).

Figure 21:
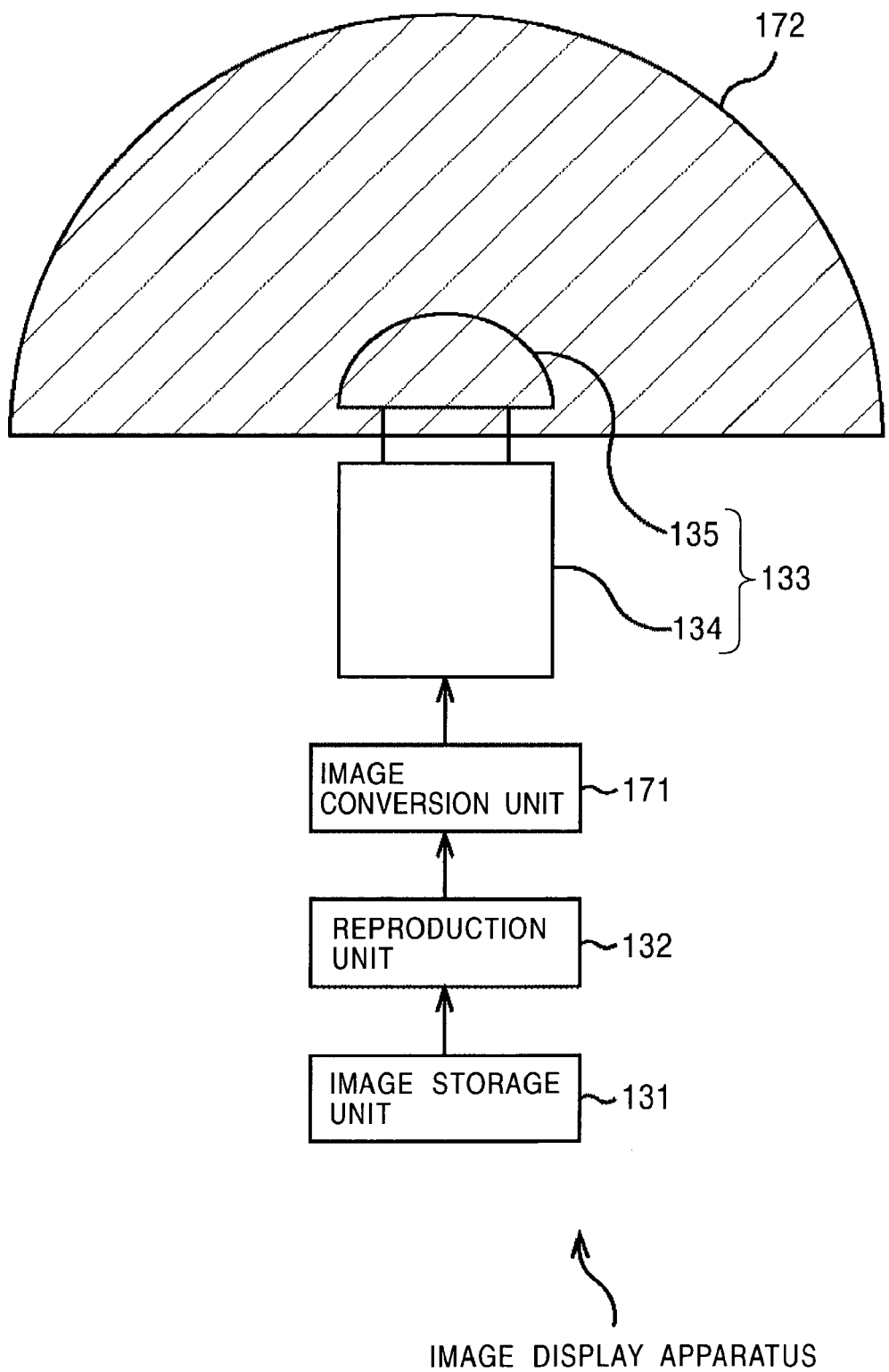
FIG. 21 is a block diagram showing an example of a construction of an image display apparatus according to a third embodiment of the present invention.

FIG. 21 shows an embodiment of an image display apparatus for displaying image data produced by the image producing apparatus shown in FIG. 9. In FIG. 21, similar parts to those in FIG. 6 are denoted by similar reference numerals, and they are not described in further detail herein. The image display apparatus shown in FIG. 21 is similar in structure to that shown n FIG. 6 except that it additionally includes an image conversion unit 171 and except that a screen 172 is used instead of the elliptic half mirror 136 and the screen 137.

In an image storage unit 131 in the embodiment shown in FIG. 21, the image information stored in the image storage unit 103 of the image producing apparatus shown in FIG. 9 is stored. A reproduction unit 132 reads the image information stored in the image storage unit 131 and supplies it to the image conversion unit 171.

The image conversion unit 171 converts the image data given as the image information from the reproduction unit 132 and supplies the converted image data to the fisheye projector 133.

More specifically, the image conversion unit 171 converts the image data of the image information so that the direction of a light ray emitted by the fisheye projector 133 for the pixel value of each pixel of the image data of the image information becomes coincident with the light ray direction related, in the image information, to the pixel value of that pixel.

In the image information, as described above, pixel values of respective pixels are related to light ray directions, wherein the light directions indicate the directions $(\theta_2, \phi_2)$ of light rays R' radiated from a subject, while the pixel values of pixels related to the light ray directions $(\theta_2, \phi_2)$ are the pixel values of pixels obtained when the light rays R, into which the light rays R' are converted by the reflection by the elliptic mirror 111 (FIG. 4), are sensed by the fisheye camera 112.

Therefore, if light rays with intensities corresponding pixel values of pixels represented by the image information are emitted in light ray directions ($\theta_2$, $\phi_2$) related to the pixel values of those pixels, the resultant light rays become equivalent to light rays actually radiated from the subject.

Thus, the image conversion unit 171 converts the image data of the image information so that the direction of a light ray emitted by the fisheye projector 133 for the pixel value of each pixel of the image data of the image information becomes coincident with the light ray direction ($\theta_2$, $\phi_2$) related, in the image information, to the pixel value of that pixel, and the image conversion unit 171 supplies the converted image data to the fisheye projector 133.

Herein, the image data produced by the image conversion unit 171 so as to correspond to light rays equivalent to light rays actually radiated from a subject is referred to as equivalent image data. A specific example of the process performed by the image conversion unit 171 to convert the image information supplied from the reproduction unit 132 into equivalent image data is described below.

The fisheye lens 135 of the fisheye projector 133 has, as described earlier, optical characteristics similar to those of the fisheye lens 113 of the fisheye camera 112 shown in FIG. 4. Therefore, if a 2-dimensional coordinate system is defined for equivalent image data in a similar manner to that shown in FIG. 14, coordinates (x, y) of arbitrary points P in this 2-dimensional coordinate system and directions ($\theta$, $\phi$) of light rays emitted from the fisheye lens 135 are related to each other by equation (1).

The angles $\theta$ and $\phi$ indicating the light ray direction in equation (1) correspond to the angles $\theta_2$ and $\phi_2$ indicating the light ray direction related, in the image information, to the pixel value of each pixel.

Therefore, equivalent image data can be obtained by employing the pixel value of a pixel related, in the image information, to the light ray direction ($\theta_2$, $\phi_2$) as the pixel value of a pixel at the coordinates (x, y) obtained by substituting the angles $\theta_2$ and $\phi_2$ indicating the light ray direction in the image information into the angles $\theta$ and $\phi$, respectively, in equation (1) and calculating equation (1).

The image conversion unit 171 supplies the equivalent image data, converted from the image data of the image information in the above described manner, to the fisheye projector 133.

The screen 172 is made of a material such as glass having a property of scattering light in the form of a hemisphere whose inside is hollow. When the screen 172 receives light emitted from the fisheye projector 133, the screen 172 diffuse-reflects (scatters) the received light thereby displaying a corresponding image on its surface. That is, the screen 172 displays an image by means of back projection. The hemispherical screen 172 is disposed such that its center is coincident with the optical center of the fisheye projector 133.

Figure 22:
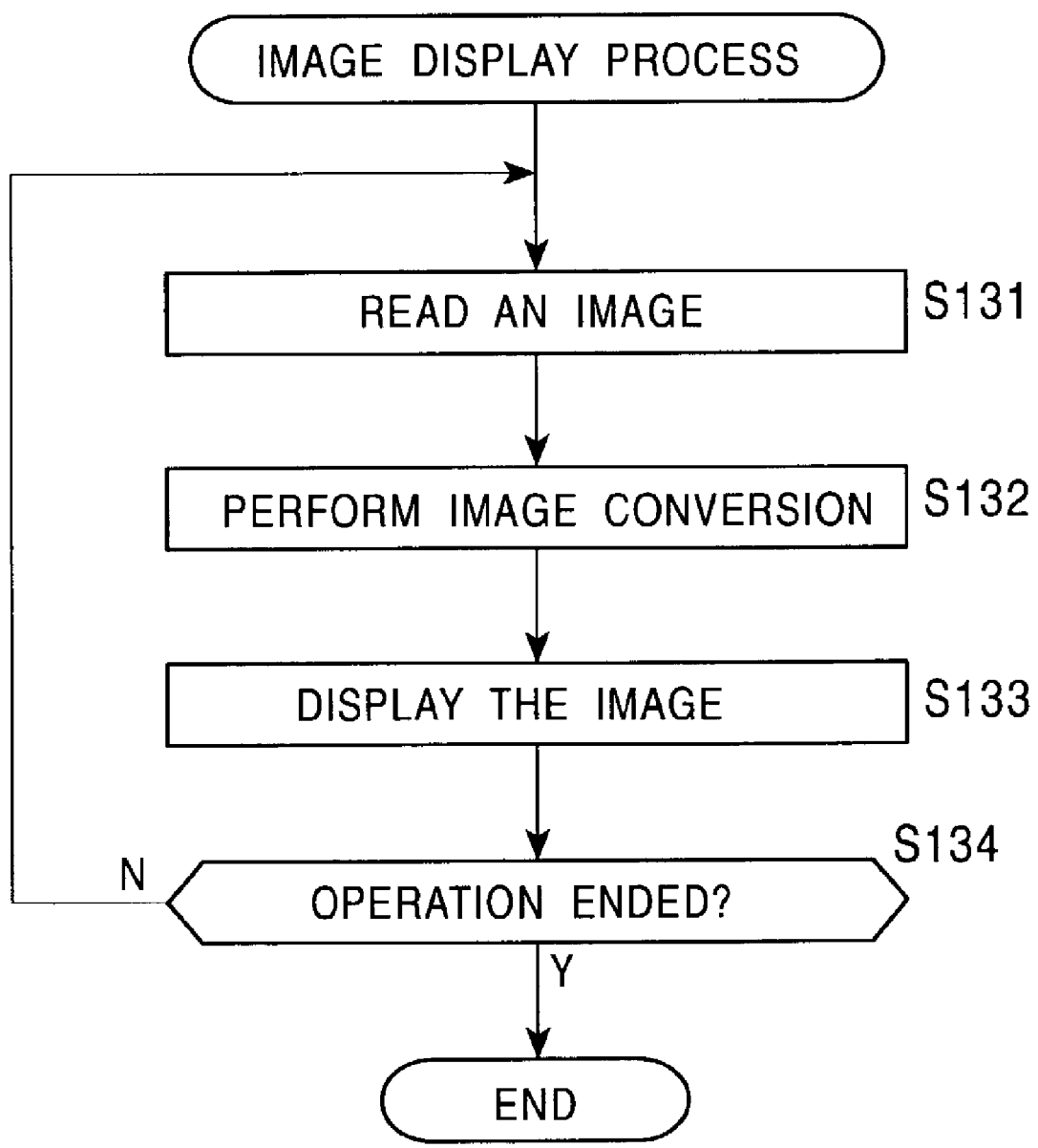
FIG. 22 is a flow chart showing a process performed by the image display apparatus.

Referring to a flow chart shown in FIG. 22, a process performed by the image display apparatus shown in FIG. 21 is described.

First in step S131, the reproduction unit 132 reads one frame of image information from the image storage unit 131 and supplies it to the image conversion unit 171. In the next step S132, the image conversion unit 171 converts the image data of the image information supplied from the reproduction unit 132 into equivalent image data in the above-described manner and supplies it to the fisheye projector 133. Thereafter, the process proceeds to step S133. In step S133, the fisheye projector 133 emits light corresponding to the equivalent image data of the image information supplied from the image conversion unit 171 thereby displaying an image corresponding to the light on the screen 172. Thereafter, the process proceeds to step S134.

That is, in the step S133 described above, the fisheye projector 133 emits light rays corresponding to pixel values of respective pixels of the equivalent image data supplied from the image conversion unit 171 such that the directions of the light rays are coincident with the light ray directions ($\theta_2$, $\phi_2$) related, in the image information, to the pixel values of the pixels. The emitted light rays fall on the inner surface of the screen 172 whereby a corresponding image is displayed. That is, an image corresponding to light radiated from a subject whose image is taken by the image producing apparatus shown in FIG. 9 is displayed. In other words, the image of the subject is displayed.

In step S134, it is determined whether a user has issued a display end command by operating an operation control unit (not shown) to end the operation of displaying the image data.

If it is determined in step S134 that the display end command has not been issued, the process returns to step S131. In step S131, the reproduction unit 132 reads a next frame of image data from the image storage unit 131 and repeats the above-described process on the read image data.

If it is determined in step S134 that the display end command has been issued, the process is ended.

In the image display apparatus shown in FIG. 21, as described above, the image conversion unit 171 converts the image data of the image information into equivalent image data and supplies it to the fisheye projector 133. In response, the fisheye projector 133 emits light rays equivalent to light rays actually radiated from the subject. The emitted light rays are received by the hemispherical screen 172 made of frosted glass. Thus, an image is displayed on the hemispherical surface of the hemispherical screen 172 such that the image looks as if the real subject taken by the image producing apparatus shown in FIG. 9 were actually present. That is, an image of a subject seen from all directions is displayed on the hemispherical surface of the screen 172.

Thus, if a user sees the screen 172 from a location outside the screen 172, the user can see the image which looks like the actual subject seen from the location at which the user sees the image.

In the image display apparatus shown in FIG. 21, equivalent image data converted from image data of image information produced by the image producing apparatus shown in FIG. 9 may be stored in advance in the image storage unit 131. In this case, the image display apparatus shown in FIG. 21 may not include the image conversion unit 171.

Figure 23:
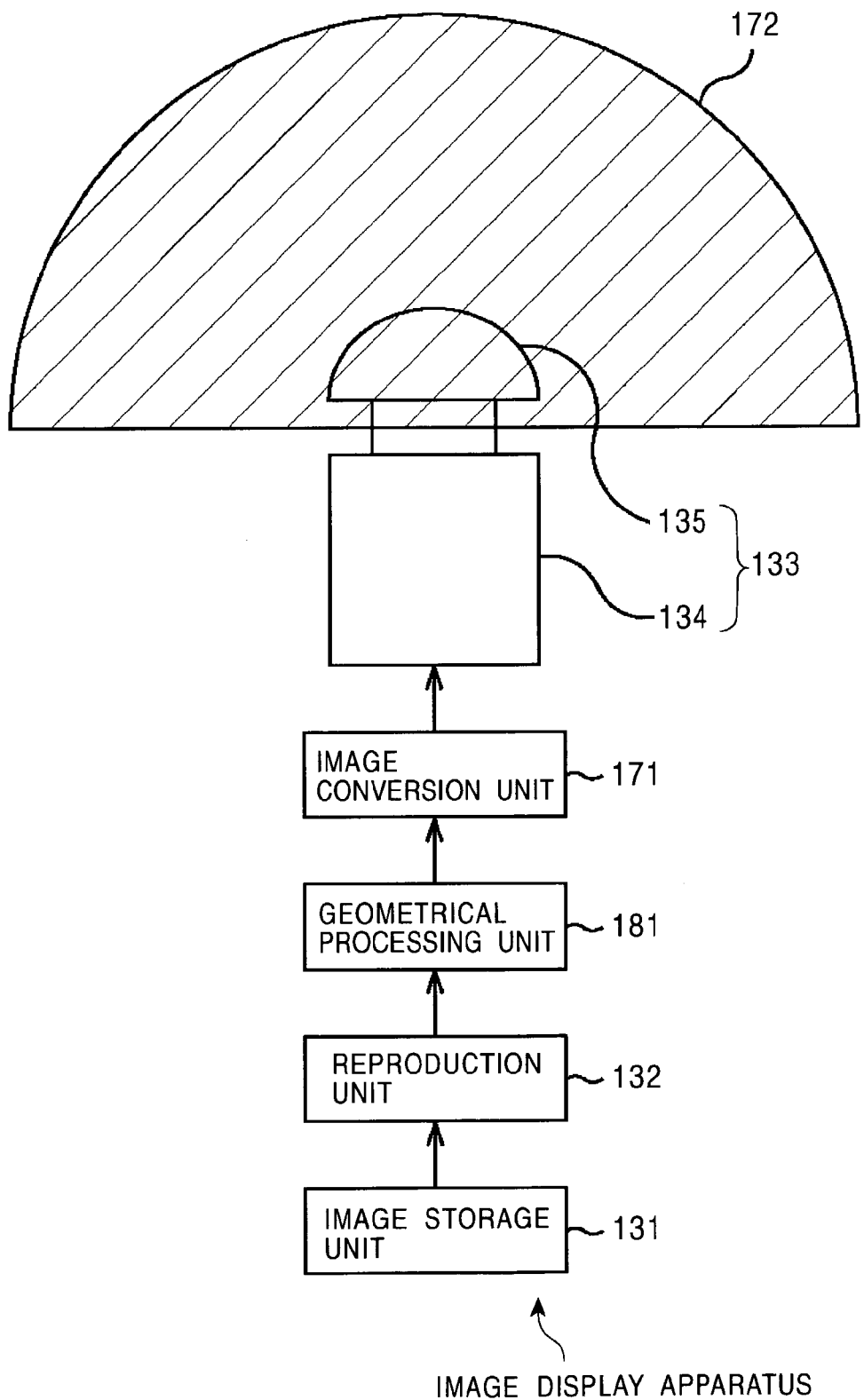
FIG. 23 is a block diagram showing an example of a construction of an image display apparatus according to a fourth embodiment of the present invention.

FIG. 23 shows another embodiment of an image display apparatus for displaying image data produced by the image producing apparatus shown in FIG. 2. In FIG. 23, similar parts to those in FIG. 6 or 21 are denoted by similar reference numerals, and they are not described in further detail herein unless description is necessary. The image display apparatus shown in FIG. 23 is constructed in a similar manner to the image producing apparatus shown in FIG. 21 except that it additionally includes a geometric processing unit 181.

In the embodiment shown in FIG. 23, the image data stored in the image storage unit 103 in the image producing apparatus shown in FIG. 2 is stored in an image storage unit 131. A reproduction unit 132 reads the image data stored in the image storage unit 131 and supplies it to the geometric processing unit 181.

The geometric processing unit 181, as with the geometric processing unit 141 shown in FIG. 9, performs a predetermined geometric process on the image data supplied from the reproduction unit 132 thereby producing image information indicating the pixel values respective pixels of the image data and also indicating the directions of light rays related to the respective pixel values of the pixels, and the geometric processing unit 181 supplies the resultant image information to the image conversion unit 171.

Figure 24:
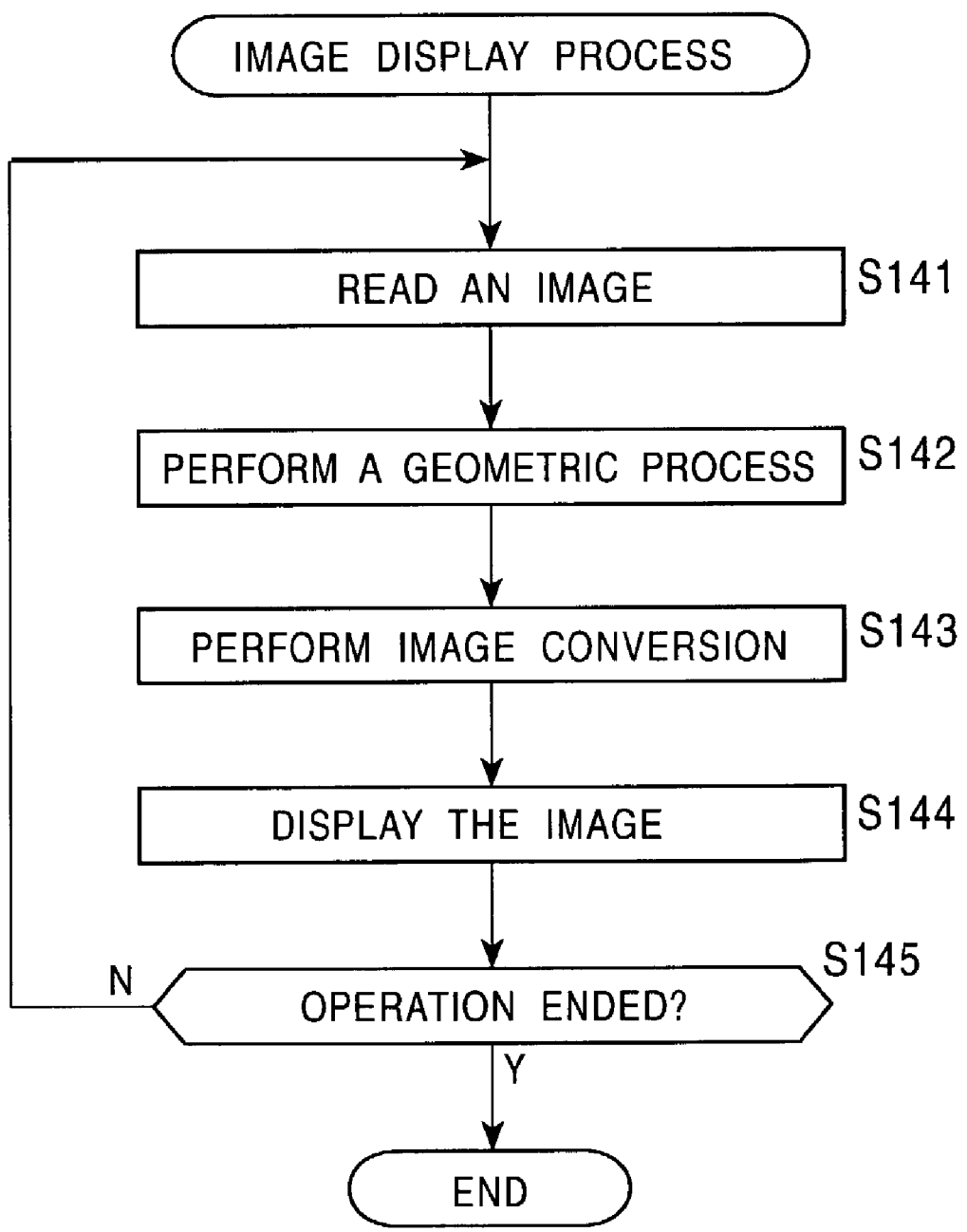
FIG. 24 is a flow chart showing a process performed by the image display apparatus.

Now, referring to a flow chart shown in FIG. 24, an operation of the image display apparatus shown in FIG. 23 is described.

First in step S141, the reproduction unit 132 reads one frame of image data from the image storage unit 131 and supplies it to the geometric processing unit 181. Thereafter, the process proceeds to step S142. In step S142, the geometric processing unit 181 processes the image data supplied from the reproduction unit 132 in a similar manner as performed by the geometric processing unit 141 shown in FIG. 9 so as to produce image information indicating the pixel values of the respective pixels of the image data supplied from the reproduction unit 132 and also indicating the light ray directions $(\theta_2, \phi_2)$ related to the corresponding pixel values, and the geometric processing unit 181 supplies the resultant image information to the geometric conversion unit 171. Thereafter, the process proceeds to step S143.

In step S143, the image conversion unit 171 converts the image data of the image information supplied from the geometric conversion unit 181 into equivalent image data in the manner described above with reference to FIG. 23 and supplies it to the fisheye projector 133. Thereafter, the process proceeds to step S144. In step S144, the fisheye projector 133 emits light corresponding to the equivalent image data of the image information supplied from the image conversion unit 171 thereby displaying an image corresponding to the light on the screen 172 in a similar manner as in step S133 shown in FIG. 22. Thereafter, the process proceeds to step S145.

In step S145, it is determined whether a user has issued a display end command. If it is determined in step S145 that the display end command has not been issued, the process returns to step S141. In step S141, the reproduction unit 132 reads a next frame of image data from the image storage unit 131 and repeats the above-described process on the read image data.

If it is determined in step S145 that the display end command has been issued, the process is ended.

Also in the image display apparatus shown in FIG. 23, as with the image display apparatus shown in FIG. 21, an image of a subject seen from all directions is displayed on the hemispherical surface of the screen 172. Thus, if a user sees the screen 172 from a location outside the screen 172, the user can see the image which looks like the actual subject seen from the location at which the user sees the image.

In the image conversion unit 171 shown in FIG. 21 or 23, the conversion into equivalent image data from image data of image information may be performed by a first method in which a pixel of image data of image information is selected one by one and a conversion process is performed for the selected pixel, or by a second method in which a pixel of equivalent image data is selected one by one and a conversion process is performed for the selected pixel. The second method is more desirable, as can be seen from the following discussion.

Figure 25A:
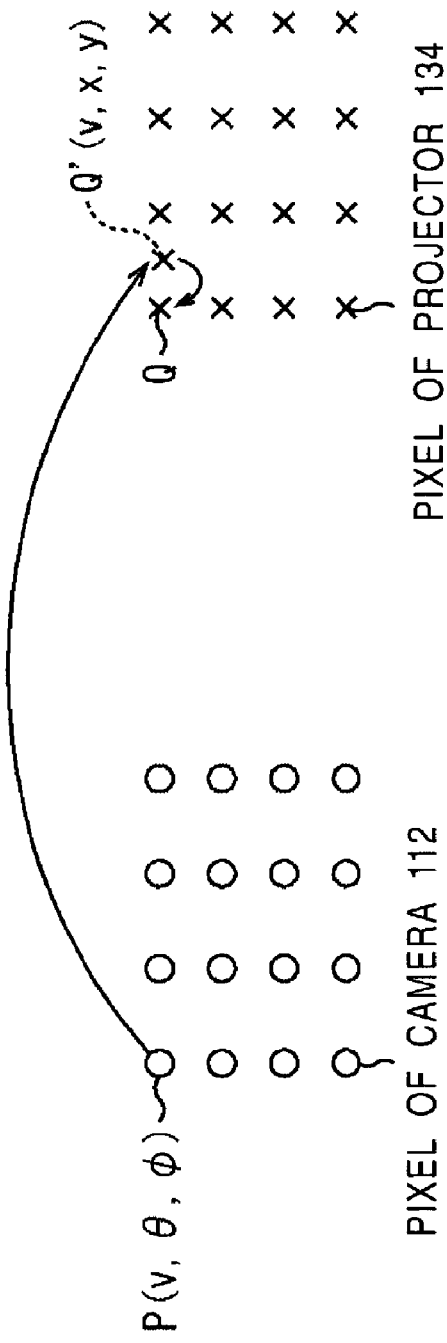
FIG. 25 is a diagram showing a method of converting image data of image information into equivalent image data.

In the first method in which a pixel of image data of image information is selected one by one and the conversion process is performed for the selected pixel, a pixel $P(v, \theta, \phi)$ having a pixel value v related, in the image information, to a light ray direction $(\theta, \phi)$ is employed as a pixel of interest and is converted, as shown in FIG. 25A, into a pixel $Q'(v, x, y)$ having a pixel value v at a location (x, y) in the equivalent image data.

The light ray direction $(\theta, \phi)$ of the pixel $P(v, \theta, \phi)$ of interest is converted into the location (x, y) of the pixel $Q'(v, x, y)$ in accordance with equation (1).

There is a possibility that no pixel of equivalent image data (no pixel of the fisheye projector 133) is present at the location (x, y) of the pixel $Q'(v, x, y)$ obtained by the first method. In this case, for example, as shown in FIG. 25A, a pixel Q closest to the location (x, y) of the pixel $Q'(v, x, y)$ is selected from the pixels of the equivalent image data, and the pixel value v of the pixel $P(v, \theta, \phi)$ of interest is set to the pixel value of the selected pixel Q of the equivalent image data.

In the first method described above, because the conversion process is performed not on the basis of pixels of equivalent image data, there is a possibility that no pixel values are set to many pixels of the equivalent image data. That is, there is a possibility that many pixels are lost in the equivalent image data.

Figure 25B:
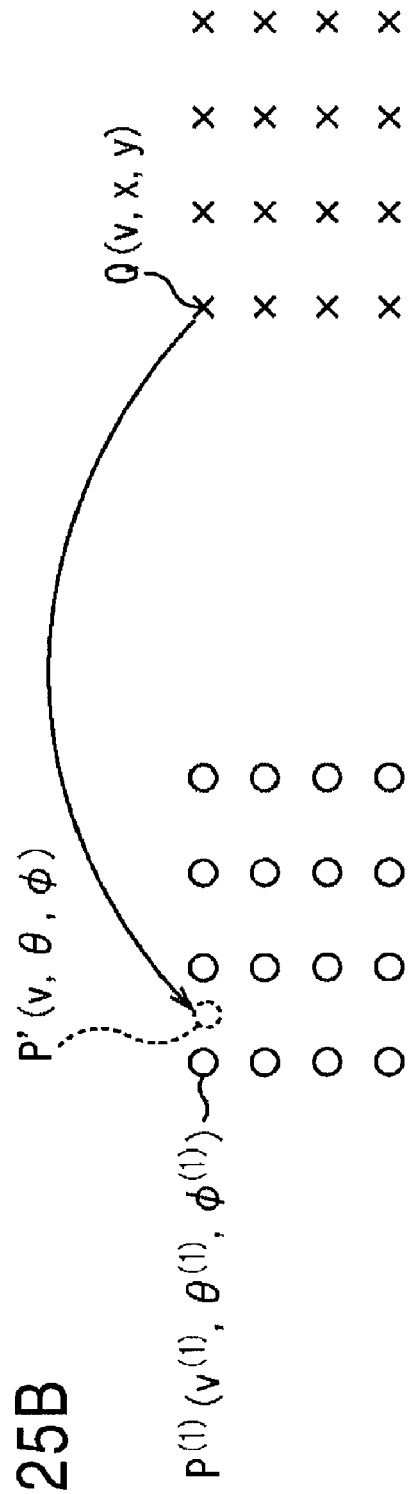

On the other hand, in the second method in which a pixel of equivalent image data is selected one by one and image data of image information is converted into equivalent image data, a pixel $Q(v, x, y)$ at a location (x, y) in the equivalent image data is selected as a pixel of interest, and a pixel $P'(v, \phi, \theta)$ related, in the image information, to a light ray direction $(\theta, \phi)$ is converted to the pixel $Q(v, x, y)$ of interest, as shown in FIG. 25B.

The location (x, y) of the pixel $Q(v, x, y)$ of interest is converted into the light ray direction $(\theta, \phi)$ related to the pixel $P'(v, \theta, \phi)$ in accordance with equation (1).

In this second method, there is a possibility that the light ray direction $(\theta, \phi)$ corresponding to the location (x, y) of the pixel $Q(v, x, y)$ of interest is not included in the image information. In this case, for example, as shown in FIG. 25B, the pixel value $v^{(1)}$ of a pixel $P^{(1)}(v^{(1)}, \theta^{(1)}, \phi^{(1)})$ related, in the image information, to a light ray direction $(\theta^{(1)}, \phi^{(1)})$ whose angles $\theta^{(1)}$ and $\phi^{(1)}$ are closest to the angles $\theta$ and $\phi$, respectively, is set to the pixel value v of the pixel $P(v, \theta, \phi)$ of interest.

In the second method, unlike the first method, because the conversion process is performed on the basis of pixels of equivalent image data, pixel values are set to all pixels of the equivalent image data without producing a lack of pixel.

The image producing apparatus shown in FIG. 2 or 9 may be used to produce image data to be used by a "TV capable of displaying every part users want to see", as described below.

Figure 26:
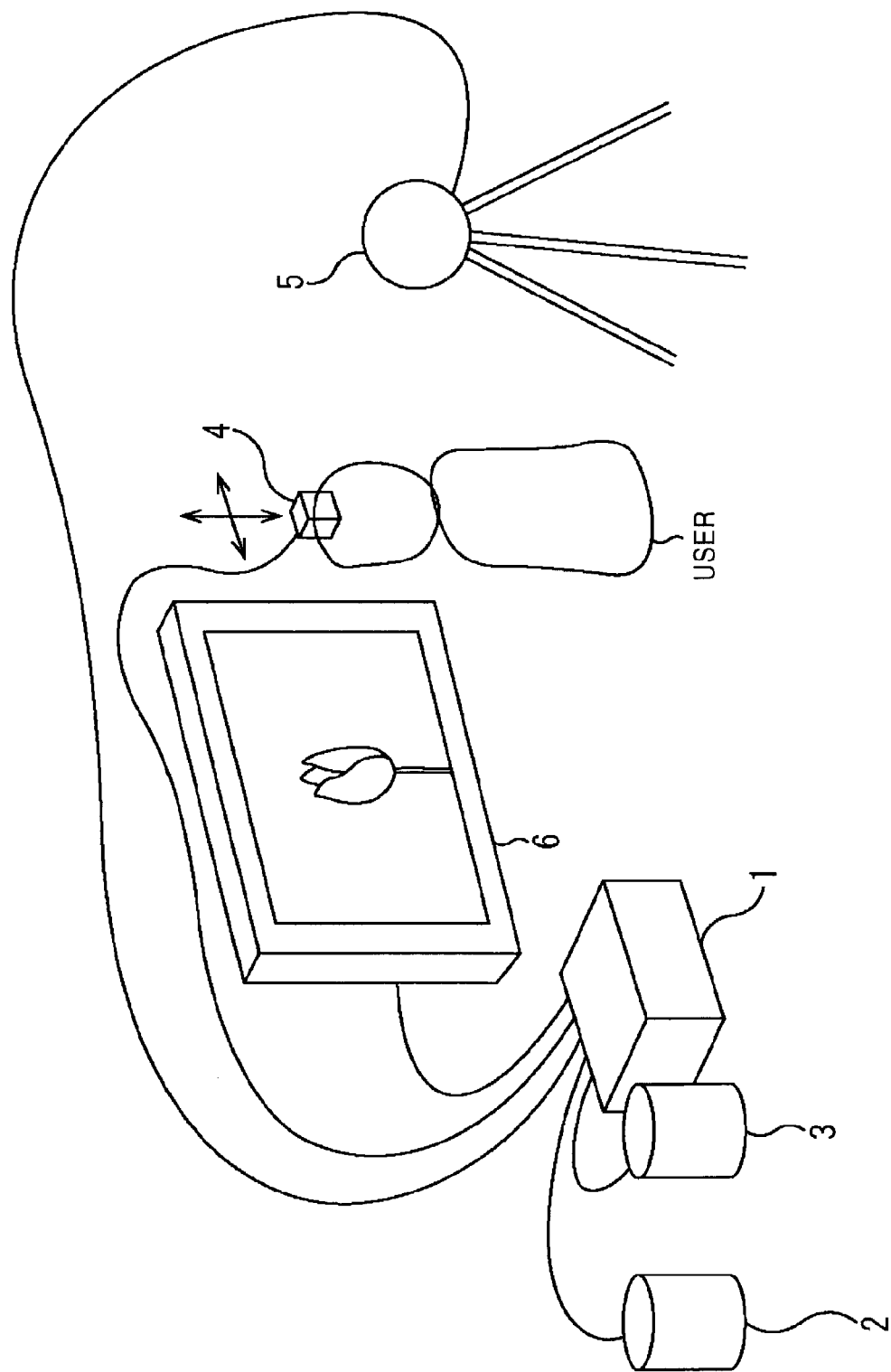
FIG. 26 is a diagram showing an image display apparatus serving as a TV capable of displaying every part users want to see.

FIG. 26 shows an embodiment of an image display apparatus serving as a "TV capable of displaying every part users want to see".

For example, a workstation is used as a computer 1 for converting original image data stored in an image database 2 into intermediate image data and storing the resultant intermediate image data into an intermediate image database 3. The intermediate image data will be described in detail later. The computer 1 controls a receiver 4 and transceiver 5 serving as a location sensor to detect the location (and also the attitude if necessary) of a user on the basis of the output of the receiver 4. The computer 1 then sets the location of the user as the location of the user's viewpoint and converts the intermediate image data stored in the intermediate image database 3 into image data seen from the user's viewpoint (hereinafter, such image data will be referred to as presentation image data). The computer 1 supplies the resultant presentation image data to a display 6 to display the presentation image data.

Original image data, that is, image data of a subject taken by an image taking apparatus such as a camera, is stored in the image database 2, as will be described in further detail later. The intermediate image database 3 stores the intermediate image data converted from the original image data and supplied by the computer 1.

The receiver 4 is worn by the user. If the receiver 4 detects a magnetic field generated by the transmitter 5, the receiver 4 informs the computer 1 of the strength of the detected magnetic field. The transmitter 5 generates a magnetic field under the control of the computer 1. In the embodiment shown in FIG. 26 the receiver 4 and the transmitter 5 form a magnetic sensor serving as the location sensor. More specifically, the receiver 4 detects the strength of the magnetic field generated by the transmitter 5 thereby detecting the location of the receiver 4 and thus the location of the user.

The receiver 4 is worn, for example, on the head of the user. In a case in which the user wears a necktie pin or glasses, the receiver 4 may be mounted on the necktie pin or the frame of the glasses.

A specific example of the magnetic sensor usable as the location sensor is a 3-dimensional location sensor available from Polhemus Inc.

The location sensor is not limited to a magnetic sensor. Other types of location sensors such as a mechanical-link location sensor (a 3-dimensional digitizer or the like) may also be used. Furthermore, a joystick, a trackball, or the like for inputting the location of a user may also be used. That is, the location sensor is not necessarily need to detect the actual location of a user but may input a virtual location of a user.

A CRT or a liquid crystal panel may be used as the display 6 for displaying presentation image data supplied from the computer 1. The display 6 is not limited to a CRT or a liquid crystal panel, but other types of displays such as a projector or a head mount display) (HMD) may also be used.

Figure 1:
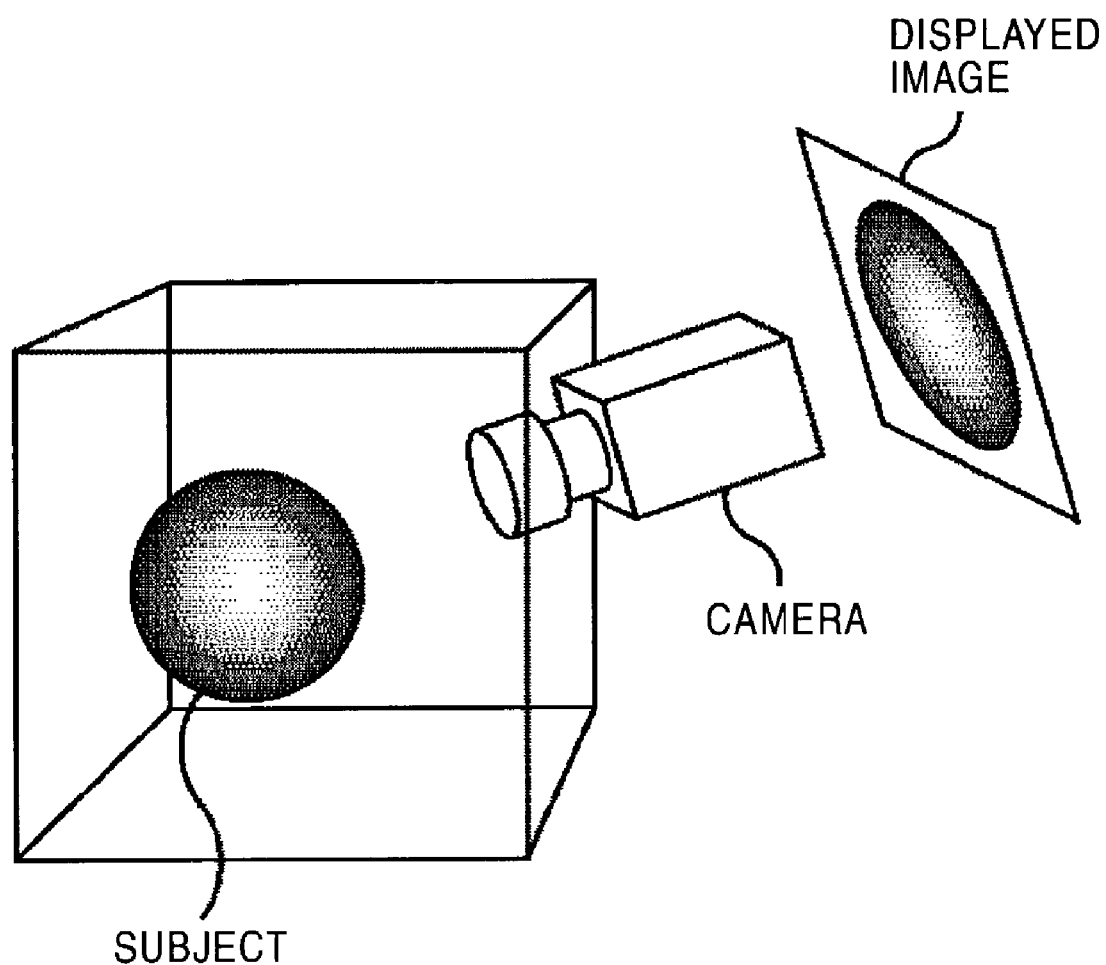
FIG. 1 is a diagram showing a conventional method of taking and displaying an image.
Figure 27:
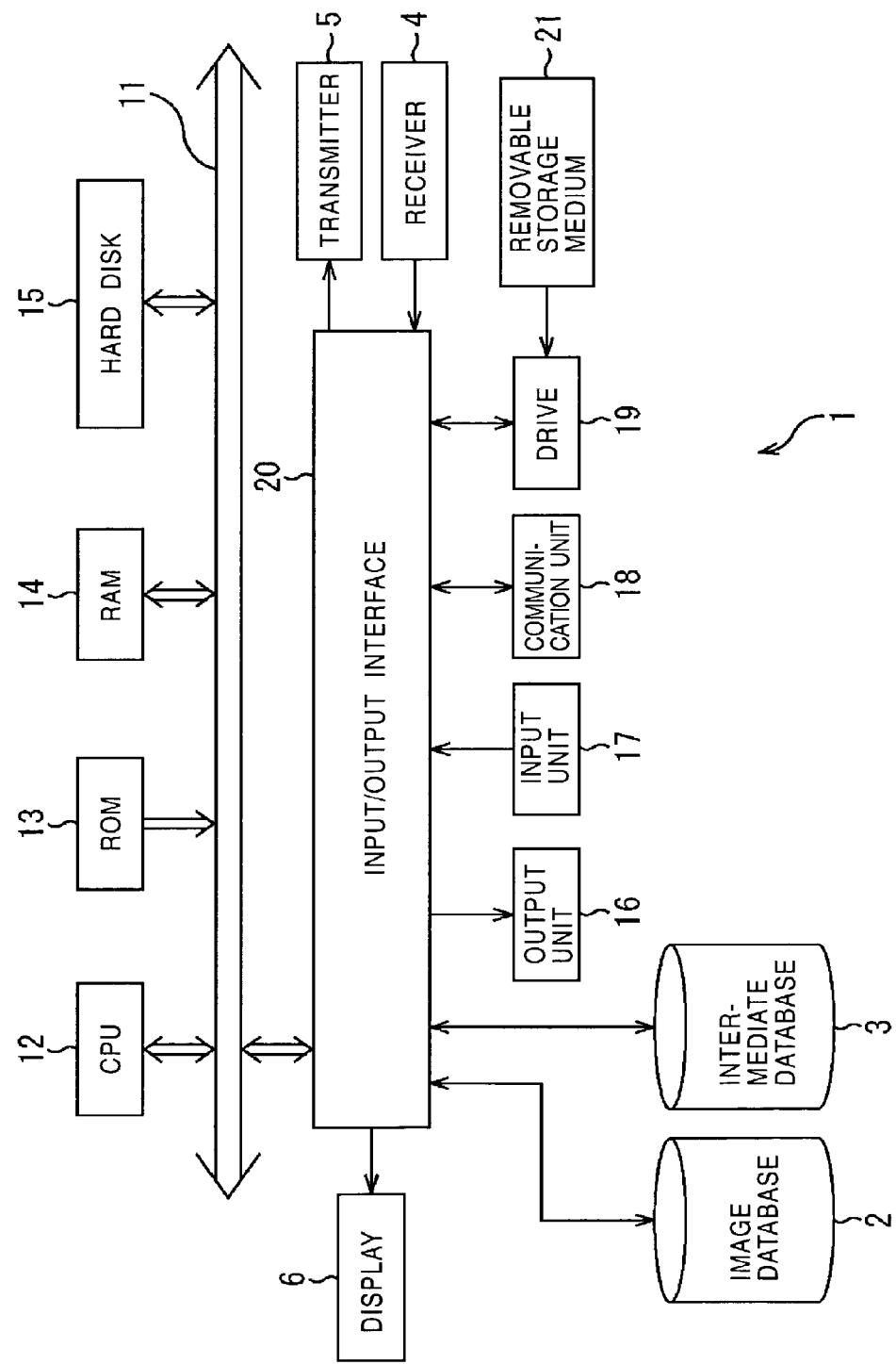
FIG. 27 is a block diagram illustrating an example of a hardware configuration of a computer.

FIG. 27 shows an example of hardware configuration of the computer 1 shown in FIG. 1.

A program executed by the computer 1 to perform a sequence of processes described below is installed on the computer 1.

The program may be stored, in advance, on a hard disk 15 serving as a storage medium or in a ROM 13 which are disposed inside the computer 1.

Alternatively, the program may be stored (recorded) temporarily or permanently on a removable storage medium 21 such as a flexible disk, a CD-ROM (Compact Disc Read Only Memory), a MO (Magnetooptical) disk, a DVD (Digital Versatile Disc), a magnetic disk, or a semiconductor memory. Such a removable recording medium 21 may be provided in the form of so-called package software.

Instead of installing the program from the removable storage medium 21 onto the computer 1, the program may also be transferred to the computer 1 from a download site via a digital broadcasting satellite by means of radio transmission or via a network such as a LAN (Local Area Network) or the Internet by means of wire communication. In this case, the computer receives, using a communication unit 18, the program transmitted in such a manner and installs the program on the hard disk 15 disposed in the computer 1.

The computer 1 includes a central processing unit (CPU) 12. The CPU 12 is connected to an input/output interface 20 via a bus 11. When a user inputs a command by operating an input unit 17 including a keyboard, a mouse, and a microphone, the command is transferred to the CPU 12 via the input/output interface 20. In accordance with the command, the CPU 12 executes a program stored in a read only memory (ROM) 13. Alternatively, the CPU 12 may execute a program loaded in a RAM (Random Access Memory) 14 wherein the program may be loaded into the RAM 14 by transferring a program stored on the hard disk 15 into the RAM 14, or transferring a program which has been installed on the hard disk 15 after being received from a satellite or a network via the communication unit 18, or transferring a program which has been installed on the hard disk 15 after being read from a removable recording medium 21 loaded on a drive 19. By executing the program, the CPU 12 performs processes described later with reference to flow charts or processes described later with reference to block diagrams. The CPU 12 supplies the result of the process, as required, to an output device 16 including a speaker or the like via an input/output interface 20 to output it from the output device 16. The result of the process may also be transmitted via the communication unit 18 or may be stored on the hard disk 15.

In the embodiment shown in FIG. 27, the image database 2, the intermediate image database 3, the receiver 4, the transmitter 5, and the display 6 are connected to the input/output interface 20. The CPU 12 reads original image data stored in the image database 2 via the input/output interface 20 and converts it into intermediate image data. The CPU 12 stores the resultant intermediate image data into the intermediate image database 3 via the input/output interface 20. Furthermore, via the input/output interface 20, the CPU 12 controls the transmitter 5 and receives a signal output from the receiver 4 to detect the location of a user. The CPU 12 sets the detected location of the user as the location of the user's viewpoint. Depending on the viewpoint of the user, the CPU 12 converts the intermediate image data stored in the intermediate image database 3 into presentation image data. The CPU 12 supplies, via the input/output interface 20, the resultant presentation image data to the display 6 to display the presentation image data.

In the present invention, the processing steps described in the program to be executed by the computer 1 to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

Figure 28A:
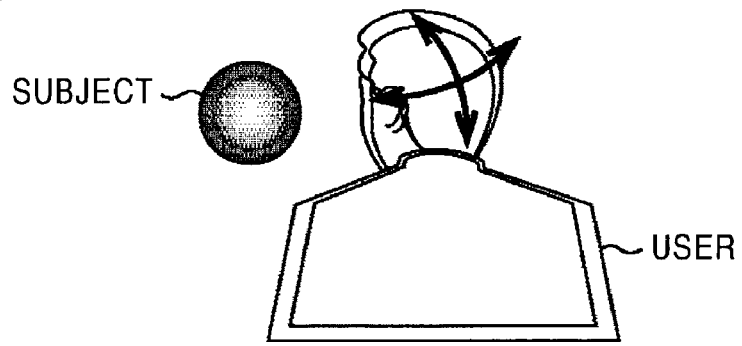
FIG. 28 is a diagram showing a method for the image display apparatus to display an image.

In the image display apparatus shown in FIG. 26, constructed on the basis of the computer 1 shown in FIG. 27, for example, as shown in FIG. 28A, an image is displayed in accordance with presentation image data such that the image looks like an actual subject seen by a user in the real world.

In the real world, when a user sees a subject, if the user moves its viewpoint, the subject is seen from a new viewpoint. That is, in the real world, a part of the subject which can be seen and a part of the subject which cannot be seen vary with the movement of the viewpoint of the user.

Figure 28B:
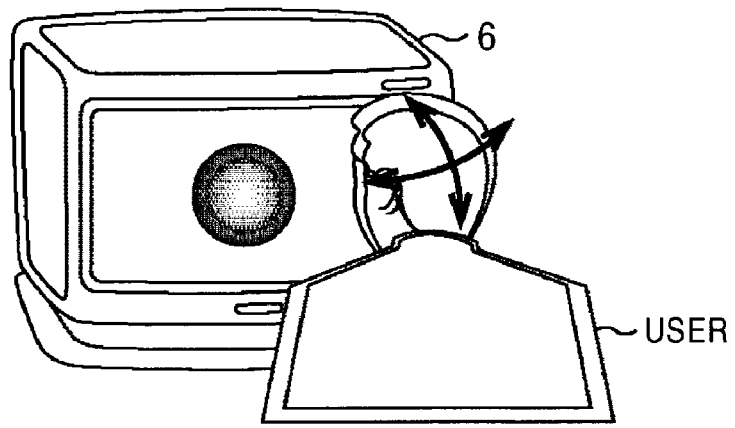
Figure 28C:
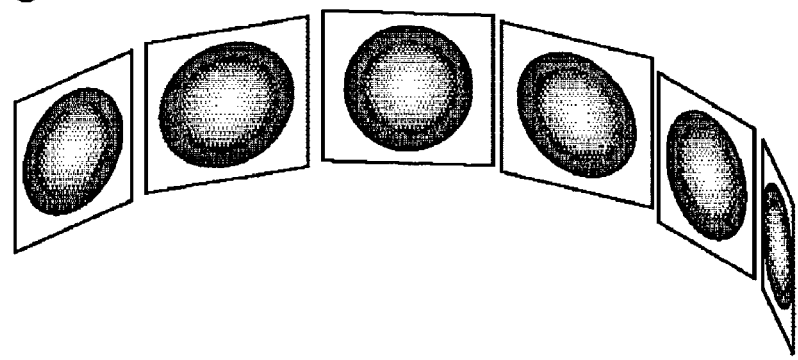

In the image display apparatus shown in FIG. 26, as shown in FIG. 28B, if the user moves the viewpoint, the presentation image data displayed on the display 6 varies in accordance with the movement of the viewpoint so that the displayed image looks like the actual subject which could be seen by the user in the real world. That is, in the image display apparatus shown in FIG. 26, if the user moves his/her viewpoint, the image displayed on the display 6 is changed into an image of the subject seen from a new viewpoint, as shown in FIG. 28C.

Thus, in the image display apparatus shown in FIG. 26, when the user moves his/her viewpoint, for example, a part of the subject which was not seen from the previous viewpoint is now seen in the image displayed according to the presentation image data. For example, the user moves his/her viewpoint to see a side part of the image of the subject displayed on the display 6, the presentation image data is modified in response to the change in the viewpoint so that the image displayed on the display 6 is changed into an image showing the side part of the subject, which would be seen by the user in the real world. In this sense, the image display apparatus shown in FIG. 26 can be called a "TV capable of displaying every part users want to see".

FIG. 29 shows an example of a functional configuration of an image processing apparatus realized by executing a program on the computer 1 shown in FIG. 27.

This image processing apparatus realized by executing the program on the computer 1 (the CPU 12 of the computer 1) includes a data conversion unit 30 and a sensor control unit 33.

The data conversion unit 30 includes an image data conversion unit 31 and an intermediate image data conversion unit 32. The data conversion unit 30 converts original image data into presentation image data indicating an image of a subject seen from an user's viewpoint informed by the sensor control unit 33, on the basis of light ray information indicating the trajectories of light rays used in taking the original image data stored in the image database 2 and also indicating the pixel values corresponding to the respective light rays, and the data conversion unit 30 supplies the resultant presentation image data to the display 6 to display it.

More specifically, the data conversion unit 31 reads original image data from the image database 2 and performs a geometric conversion on the original data thereby produce intermediate image data. The data conversion unit 31 supplies the resultant intermediate image data to the intermediate image database 3 to store it therein.

The intermediate image data conversion unit 32 converts the intermediate image data into presentation image data depending on the user's viewpoint informed by the sensor control unit 33. That is, the intermediate image data conversion unit 32 reproduces image data seen from the user's view point and supplies it to the display 6 to display it thereon.

The sensor control unit 33 detects the viewpoint of the user by controlling the receiver 4 and the transmitter 5 serving as the location sensor and informs the intermediate image data conversion unit 32 of the detected viewpoint of the user. More specifically, the sensor control unit 33 controls the transmitter 5 so as to generate a magnetic field. The magnetic field generated by the transmitter 5 is detected by the receiver 4 and the detected result is supplied to the sensor control unit 33. On the basis of the detected result supplied from the receiver 4, the sensor control unit 33 detects the location of the user and sets the detected location as the viewpoint of the user. The data indicating the viewpoint is supplied to the intermediate image data conversion unit 32.

Referring to a flow chart shown in FIG. 30, image processing performed by the image processing apparatus shown in FIG. 29 (computer) 1 is described below.

First, in step S1, the data conversion unit 31 reads original image data from the image database 2 and converts it into intermediate image data. Furthermore, in this step S1, the data conversion unit 31 supplies the resultant intermediate image data to the intermediate image database 3 to store in therein. Thereafter, the process proceeds to step S2.

In step S2, the sensor control unit 33 detects the location of a user on the basis of the output of the receiver 4 and sets the detected location of the user as the viewpoint of the user. The sensor control unit 33 supplies data indicating the viewpoint of the user to the intermediate image data conversion unit 32.

The process then proceeds to step S3. In step S3, the intermediate image data conversion unit 32 converts the intermediate image data into presentation image data depending on the user's viewpoint informed by the sensor control unit 33. Thereafter, the process proceeds to step S4.

In step S4, the intermediate image data conversion unit 32 supplies the resultant presentation image data to the display 6 to display it thereon. Thereafter, the process proceeds to step S5.

In step S5, the CPU 12 (FIG. 27) determines whether the user has issued a command to end the image processing via the input unit 17 (FIG. 27). If it is determined in step S5 that the command to end the image processing has not been issued via the input unit 17, the process returns to step S2, and the above-described process is repeated.

On the other hand, if it is determined in step S5 that the command to end the image processing has been issued via the input unit 17, the process is ended.

Figure 30:
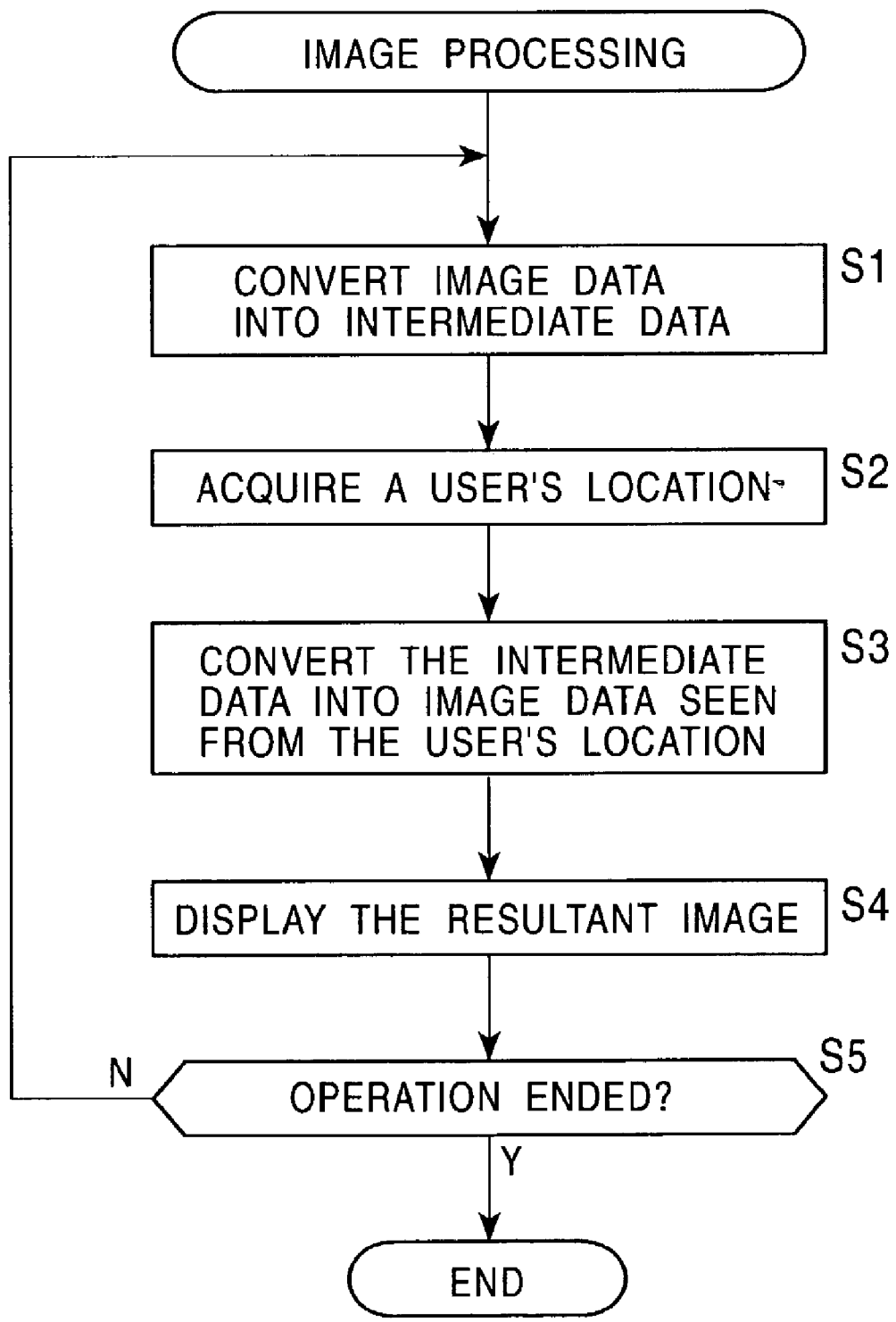
FIG. 30 is a flow chart showing image processing performed by the image processing apparatus.

In a case in which the image processing shown in FIG. 30 has been performed in the past and thus intermediate image data converted from the original data stored in the image database 2 is already in the intermediate image database 3, step S1 may be skipped.

Figure 31:
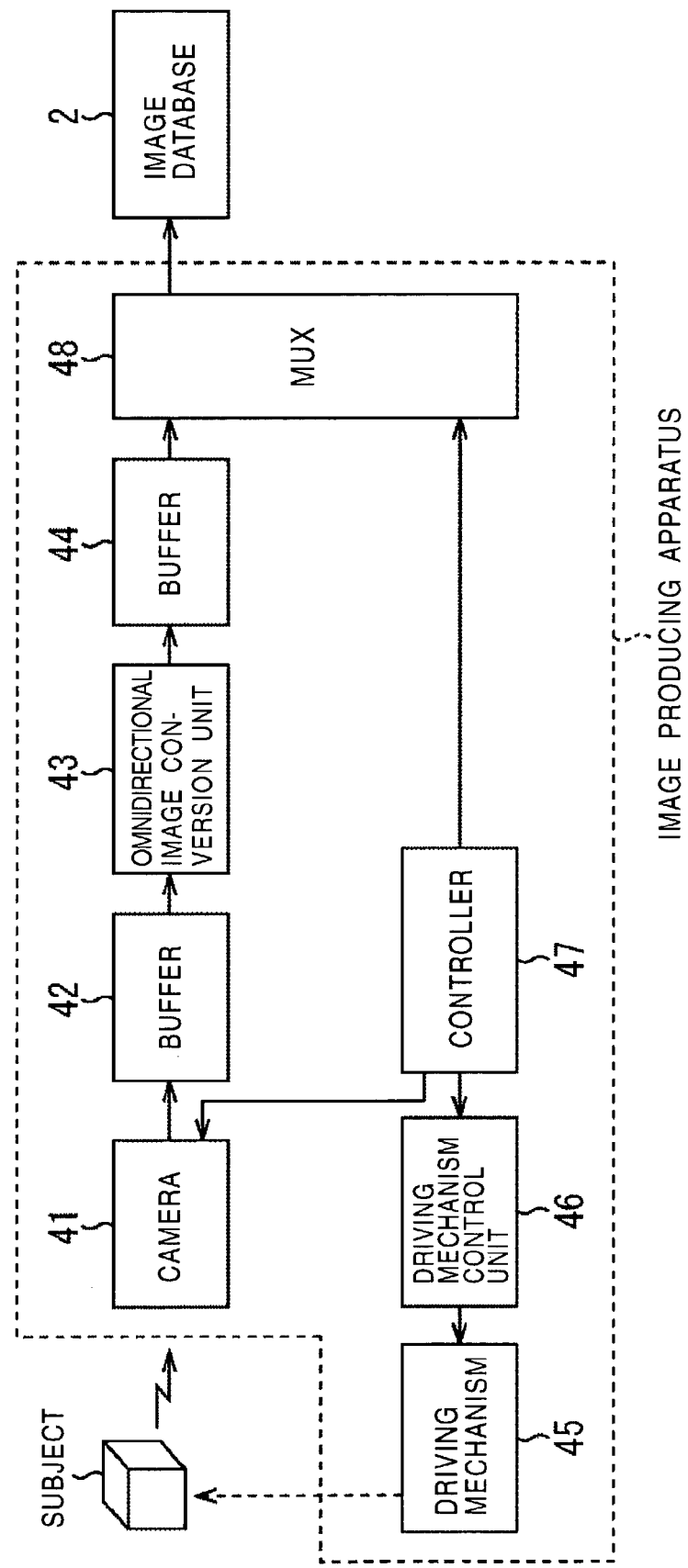
FIG. 31 is a block diagram showing an example of a construction of an image producing apparatus for producing image data to be stored in an image database.

FIG. 31 shows an embodiment of an image producing apparatus for producing original image data (by taking an image of a subject) to be stored in the image database 2.

In the embodiment shown in FIG. 31, a camera 41 is an omnidirectional camera for taking an image including a subject thereby producing omnidirectional image data under the control of a controller 47 and supplies the resultant omnidirectional image data to a buffer 42.

The buffer 42 temporarily stores the omnidirectional image data supplied from the camera 41.

An omnidirectional image data conversion unit 43 reads the omnidirectional image data stored in the buffer 42 and converts it into original image data expressed in latitude and longitude and supplies the resultant original data to a buffer 44.

The buffer 44 temporarily stores the original image data supplied from the omnidirectional image data conversion unit 43.

A driving mechanism 45 moves the subject whose image is taken by the camera 41, under the control of the driving mechanism control unit 46. That is, by moving the subject using the driving mechanism 45, the viewpoint (optical center) of the camera 41 with respect to the subject is changed to a plurality of locations.

The driving mechanism control unit 46 drives the driving mechanism under the control of the controller 47.

The controller 47 controls the timing of taking an image performed by the camera 41 and the driving speed or driving direction of the driving mechanism 45 driven by the driving mechanism control unit 46. The controller 47 supplies, to a multiplexer 48, information indicating the timing of taking an image performed by the camera 41 (a time at which an image is taken by the camera 41) and the location of the subject moved by the driving mechanism 45 (and further, if necessary, the attitude of the subject).

The multiplexer (MUX) 48 adds, to each frame of the original image data stored in the buffer 44, information associated with each frame output from the controller 47. The resultant original image data added with the information is supplied to the image database 2 and stored therein.

Figure 32:
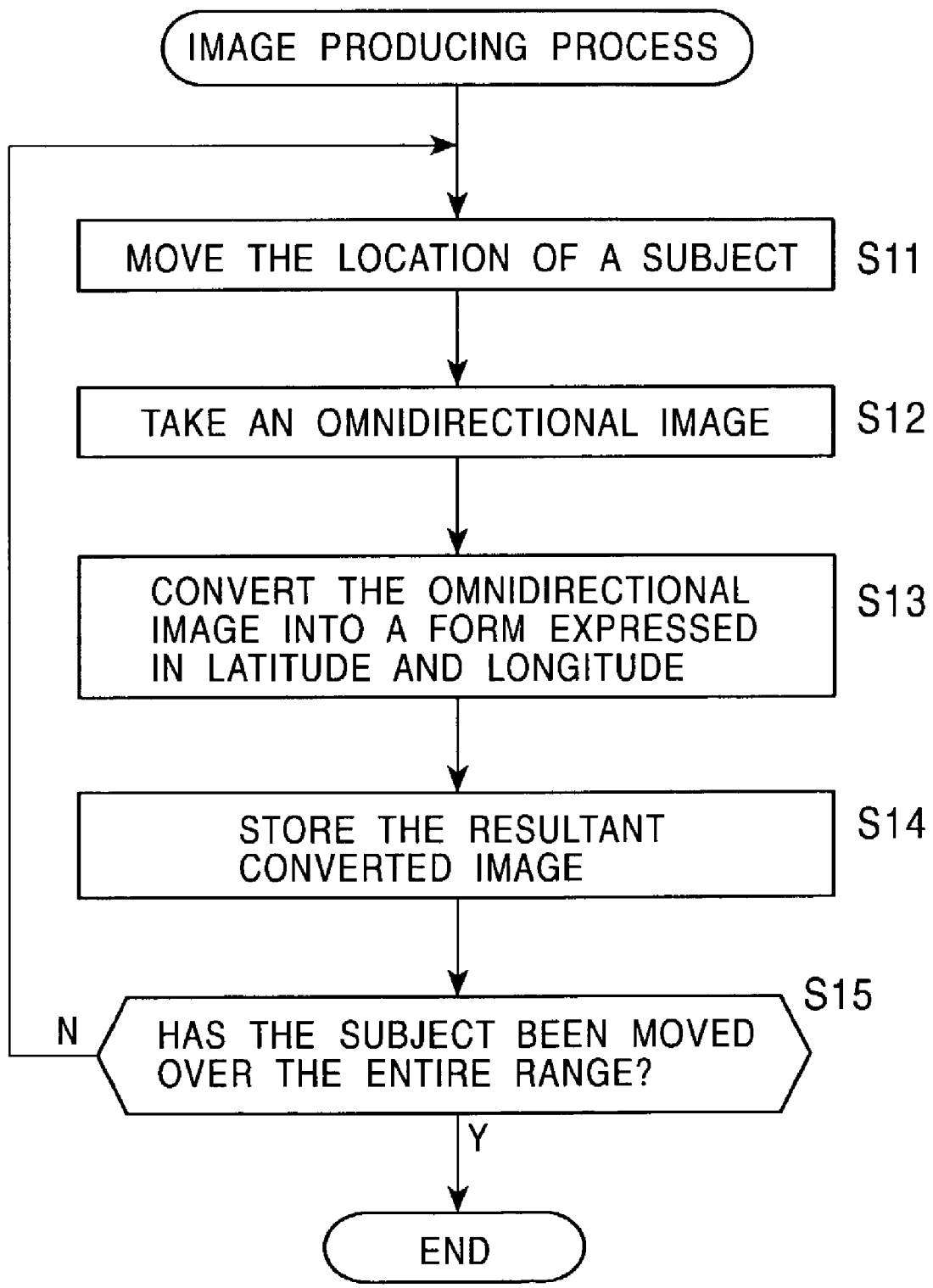
FIG. 32 is a flow chart of an image producing process performed by the image producing apparatus.

Referring to a flow chart shown in FIG. 32, an image producing process performed by the image producing apparatus shown in FIG. 31 is described below.

First, the controller 47 moves the subject to a particular location and controls the camera 41 and the driving mechanism control unit 46 to take an image of the subject. The controller 47 then supplies, to the MUX 48, information indicating the location of the subject and the time at which the image of the subject was taken.

The controller 47 sets, in advance, a 3-dimensional coordinate system in the real world (hereinafter, such a 3 dimensional coordinate system will be referred to as an image taking coordinate system) and outputs data indicating the coordinates of the subject in the image taking coordinate system as subject location information. The location information output by the controller 47 includes information indicating the attitude of the subject wherein the attitude is represented by an angle of the present attitude with respect to a reference attitude (for example, the attitude taken by the subject at the beginning of the process of taking the image of the subject). Furthermore, the location information output by the controller 47 also includes information indicating the coordinates of the location of the camera 41 (for example, the location of the center of the lens of the camera 41) expressed in the image taking coordinate system and also information indicating the direction of the optical axis of the camera 41 (that is, the viewing direction).

In a case in which the subject is moved by a motion base system described later with reference to FIG. 33 or by a turn table system described later with reference to FIG. 35, the location of the center (optical center) of the lens of the camera 41 and the direction of the optical axis of the camera 41 are fixed without being varied. In this case, the location of the center (optical center) of the lens of the camera 41 and the direction of the optical axis of the camera 41 are set, in advance, in the controller 47.

In practice, the coordinates and the attitude of the subject are detected from the state of the driving mechanism 45 which moves the subject, wherein the state of the driving mechanism 45 is detected by the controller 47 which controls the driving mechanism 45 via the driving mechanism control unit 46.

In step S11, the driving mechanism control unit 46 moves the location of the subject by controlling the driving mechanism 45 under the control of the controller 47. Thereafter, the process proceeds to step S12. In step S12, the camera 41 takes an image of the subject under the control of the controller 47 and supplies obtained omnidirectional image data to the buffer 42 to store it therein.

In the next step S13, the omnidirectional image data conversion unit 43 reads omnidirectional image data stored in the buffer 42 and converts it into original image data expressed in latitude and longitude. The resultant original image data is supplied to the buffer 44. The process then proceeds to step S14. In step S14, the MUX 48 adds information, supplied from the controller 47, to a frame of original image data stored in the buffer 44 and supplies the original image data added with the information to the image database 2 to store it therein.

After completion of step S14, the process proceeds to step S15. In step S15, the controller 47 determines whether the subject has been moved over an entire range including predetermined locations (and further determines, if necessary, whether the subject has been brought into all predetermined attitude s). If it is determined that the subject has not been moved over the entire range, the subject is moved to a location to which the subject has not yet been moved, and the controller 47 controls the camera 41 and the driving mechanism control unit 46 to take an image of the subject. The controller 47 then supplies, to the MUX 48, information indicating the location to which the subject has been moved and information indicating the time at which the image of the subject was taken. The process then returns to step S11 and the above-described process is repeated.

On the other hand, if it is determined in step S15 that the subject has been moved over the entire ranges including the predetermined locations, that is, if images of the subject have been taken at all predetermined locations, the process is ended.

A method of moving a subject in the image producing apparatus shown in FIG. 31 is described below.

In the image producing apparatus shown in FIG. 31, when images of the subject are taken while moving the subject, it is required to precisely control the location of the subject. As a specific method for such a purpose, a motion base system or a turn table system may be used.

Figure 33:
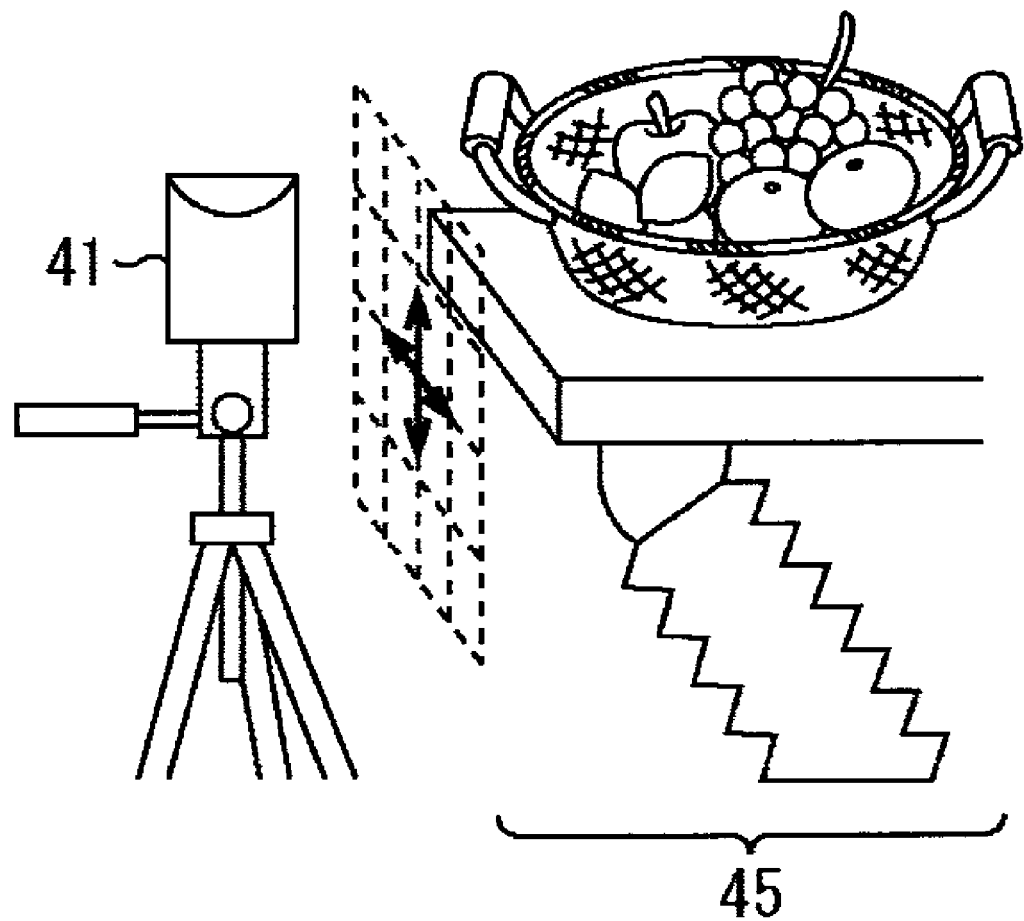
FIG. 33 is a diagram showing a motion base system.

In the motion base system, as shown in FIG. 33, a motion base is used as the driving mechanism 45. A subject is placed on the motion base serving as the driving mechanism 45, and the motion base is moved together with the subject in a vertical direction and/or in a horizontal direction (with respect to the camera 41).

Figure 34B:
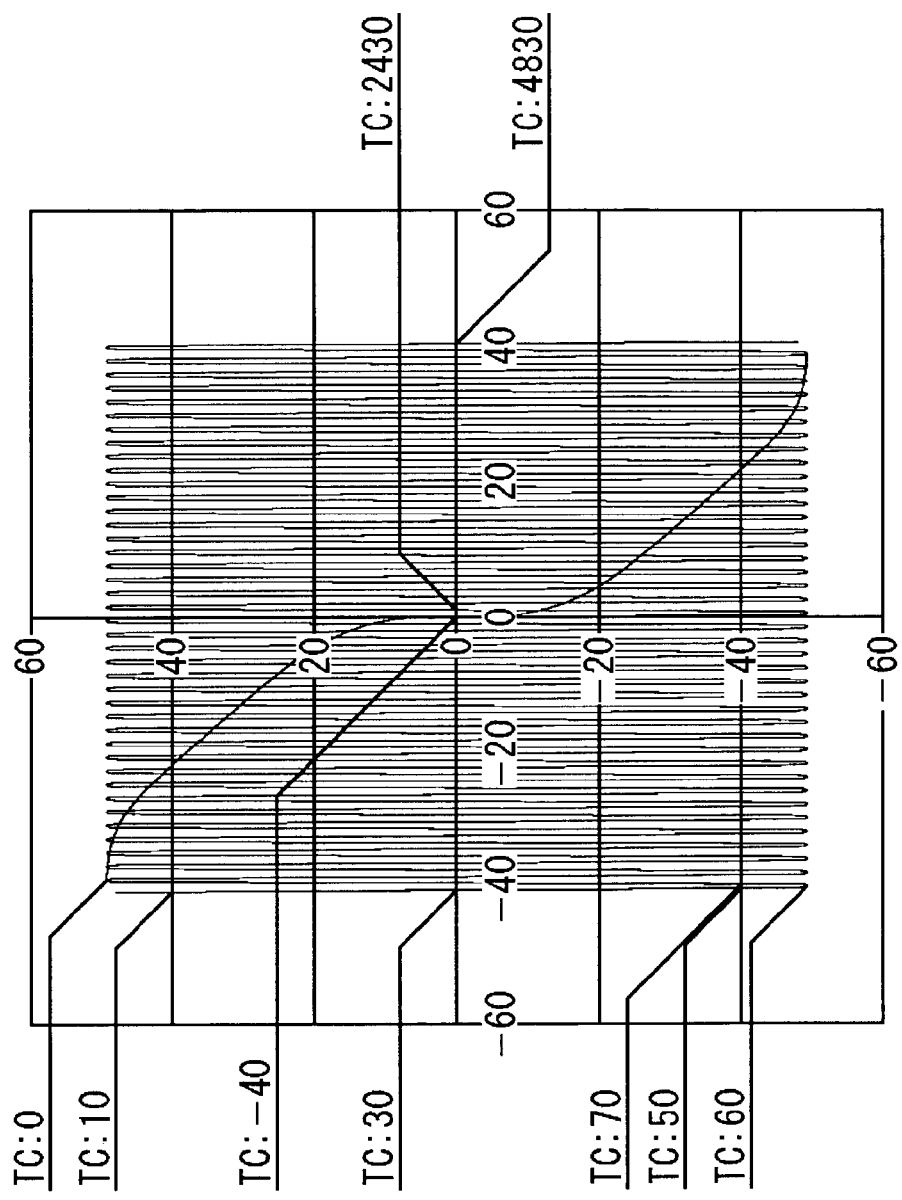
FIG. 34 is a diagram showing an example of motion of the motion base.
Figure 34A:
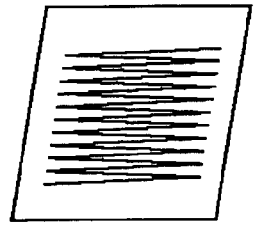

In the case of the motion base system, for example, as shown in FIG. 34A, the motion base serving as the driving mechanism 45 is gradually moved from the left to the right while being periodically moved up and down. FIG. 34B shows an example of a trajectory of the motion base. In FIG. 34B, in addition to the trajectory of the motion base, a numeral is described after "TC:" to indicate a time code indicating a time at which an image was taken by the camera 41. That is, as shown in FIG. 34B, because time codes are related to the trajectory of the motion base, it is possible to detect the correspondence between the location (attitude) of the subject and the frame of image data taken at the particular location (attitude).

In the motion base system shown in FIG. 33, it is possible to obtain light ray information indicating the trajectories of light rays and corresponding pixel values wherein the light rays originate from a subject whose images are taken at a plurality of points selected as viewpoints on an open surface such as a plane supposed to be present between the subject and the camera 41. The pixel values corresponding to light rays from the subject can be obtained from image data output by the camera 41, and the trajectories of the light rays from the subject can be obtained from the locations of the camera 41 and the subject.

In the turn table system, as shown in FIG. 35, a turn table (stage) is used as the driving mechanism 45. A subject is placed on the turn table serving as the driving mechanism 45, and the turn table is rotated at a fixed angular velocity while being moved upward or downward at a very low speed.

In the turn table system shown in FIG. 35, it is possible to obtain light ray information indicating the trajectories of light rays and corresponding pixel values wherein the light rays originate from a subject whose images are taken at a plurality of points selected as viewpoints on an open surface such as a side face of a cylinder, supposed to be present around the subject.

Although in the image producing apparatus shown in FIG. 31, image data of a subject seen from a plurality of viewpoints is produced by moving the subject, such image data may also be obtained by moving the camera 41 instead of the subject.

Although in the image producing apparatus shown in FIG. 31, image data of a subject seen from a plurality of viewpoints is produced with a single camera 41 by moving the subject, image data of a subject seen from a plurality of viewpoints may also be produced using a plurality of cameras disposed at those viewpoints.

In the image producing apparatus shown in FIG. 31, an omnidirectional camera is used as the camera 41. A process performed by this omnidirectional camera to take an image of a subject, and a conversion of omnidirectional image data performed by the omnidirectional image data conversion unit 43 are described below.

Figure 36:
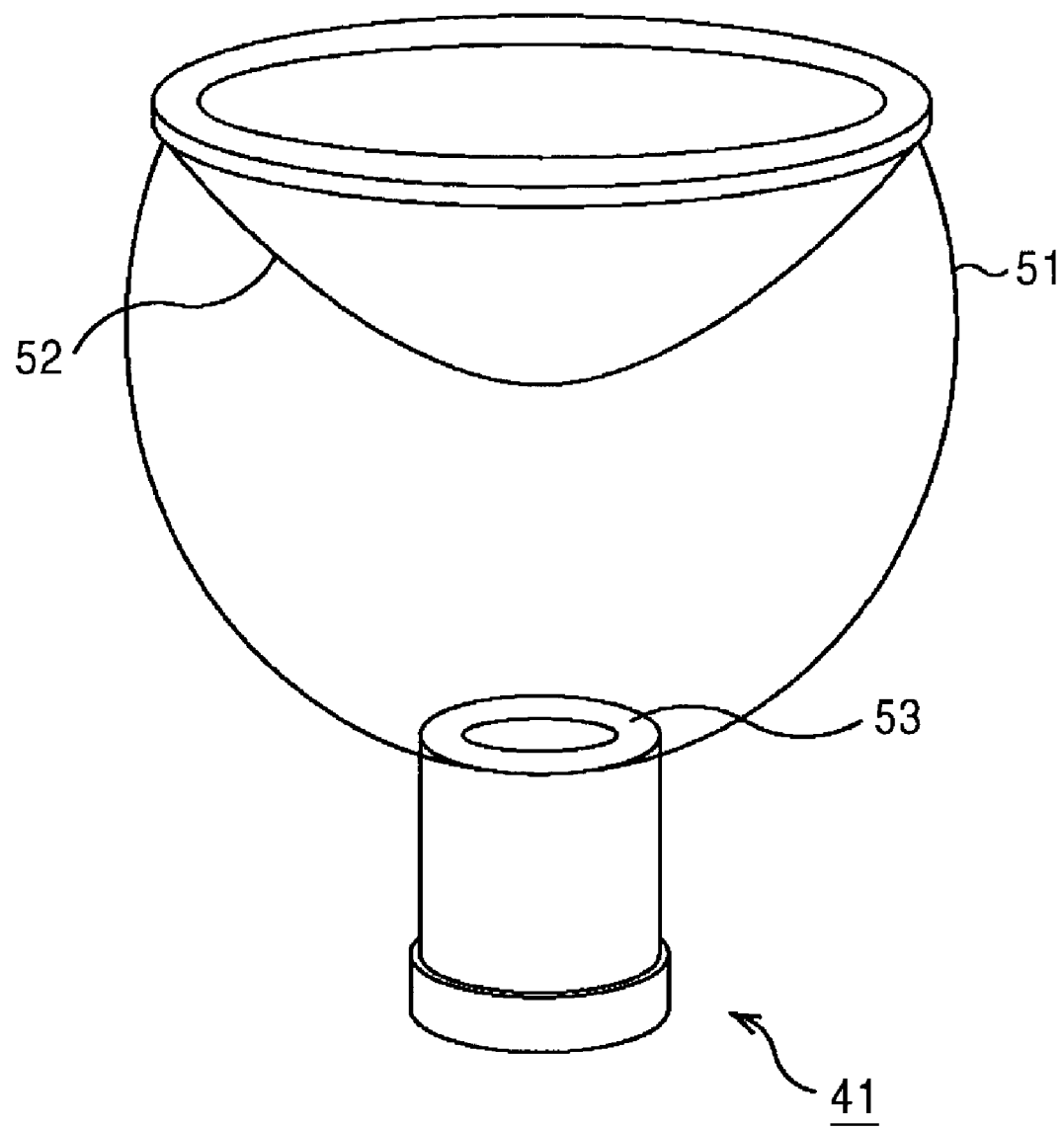
FIG. 36 is a perspective view showing an example of a construction of a camera.

FIG. 36 shows an example of an optical system of the omnidirectional camera used as the camera 41 shown in FIG. 31.

In the example shown in FIG. 36, the camera 41 includes a light collection unit 52 supported by a supporting member 51 disposed on an image sensing device 53 so that an image can be taken over an entire range of 360° around the light collection unit 52.

The supporting member 51 is formed of a transparent material such as glass having a low reflectivity. In order to minimize refraction of light at the glass surface, the supporting member 51 is formed in the shape of a spherical shell whose center is located at the focal point of the light collection unit 52 described later.

The light collection unit 52 is formed, for example, of a hyperbolic-shaped mirror (hyperbolic mirror) for reflecting light received via the supporting member 51 toward the image sensing device 53.

The image sensing device 53 includes a photoelectric conversion device such as a charge coupled device (CCD) for converting the received light into an electrical signal thereby producing image data. The image data produced by the image sensing device 53 is output from the camera 41 to the buffer 42 shown in FIG. 31.

The construction of the omnidirectional camera shown in FIG. 36 and the principles of collecting light are described below. (A further detailed description may be found, for example, in "Development of a Omnidirectional Vision Sensor for Use by a Moving Robot" (Automation, Vol. 29, No. 6, 1997) (hereinafter, referred to as Ref. 1).)

Figure 37:
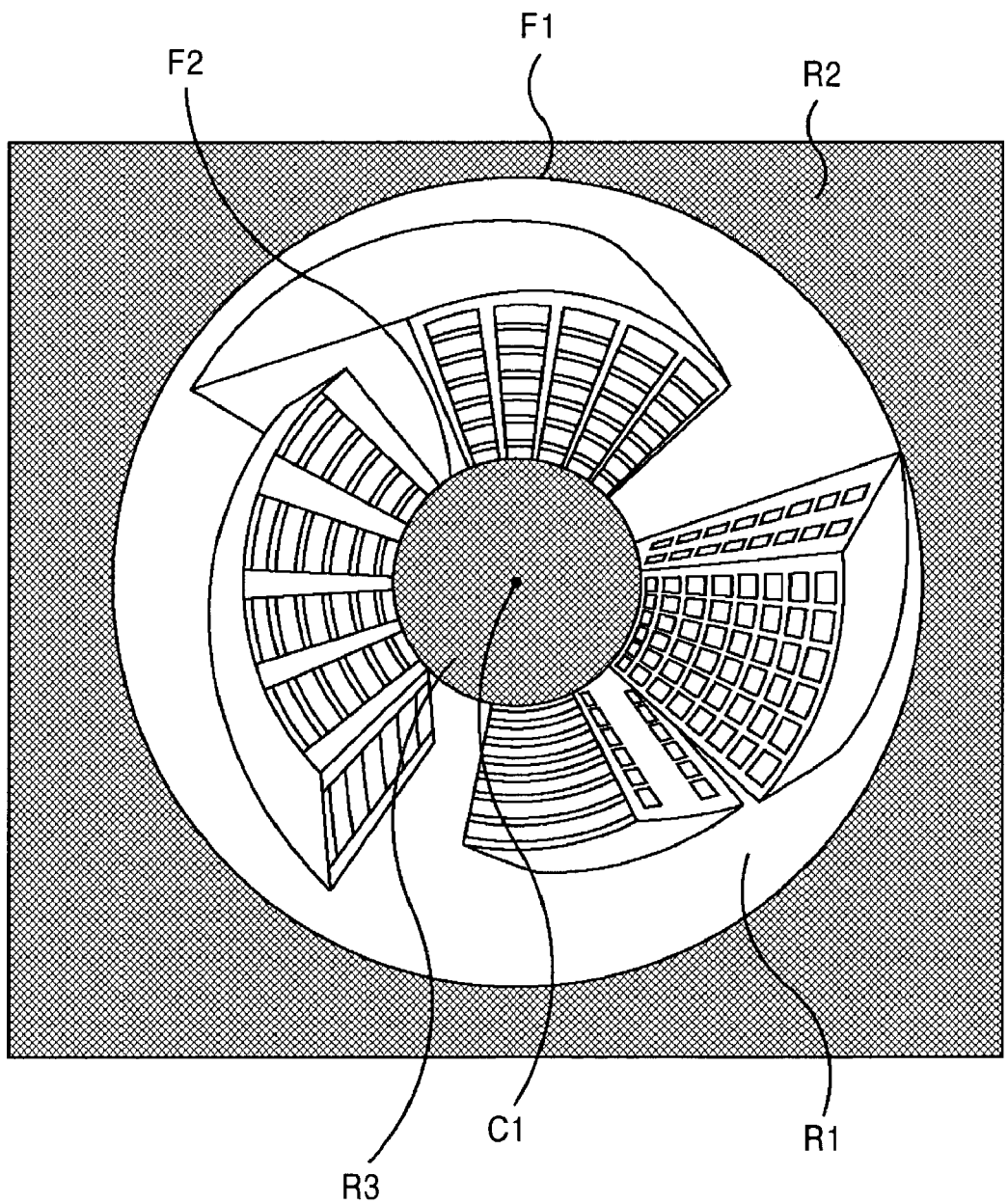
FIG. 37 is a diagram showing omnidirectional image data.

FIG. 37 shows an example of omnidirectional image data produced by the camera 41 shown in FIG. 36.

The omnidirectional image data is divided by two circumferences F1 and F2 of two concentric circles centered at point C1. In the example shown in FIG. 37, the circumference F1 is greater in radius than circumference F2.

That is, the omnidirectional image data includes a region R1 enclosed between the greater circumference F1 and the smaller circumference F2, a region R2 outside the greater circumference F1, and a region R3 inside the smaller circumference F2.

Of those three regions R1 to R3, the region R1 includes image data corresponding to light rays from the surroundings and collected and reflected by the light collection unit 52. The region R2 includes image data of a part of a scene in a region outside the light collection unit 52. The region R3 includes image data of an image of the image sensing device 53.

In the example shown in FIG. 37, the region R1 includes images of a plurality of buildings, wherein an upper part of each building is located close to the circumference F1 and a lower part of each building is located close to the circumference F2.

Figure 38:
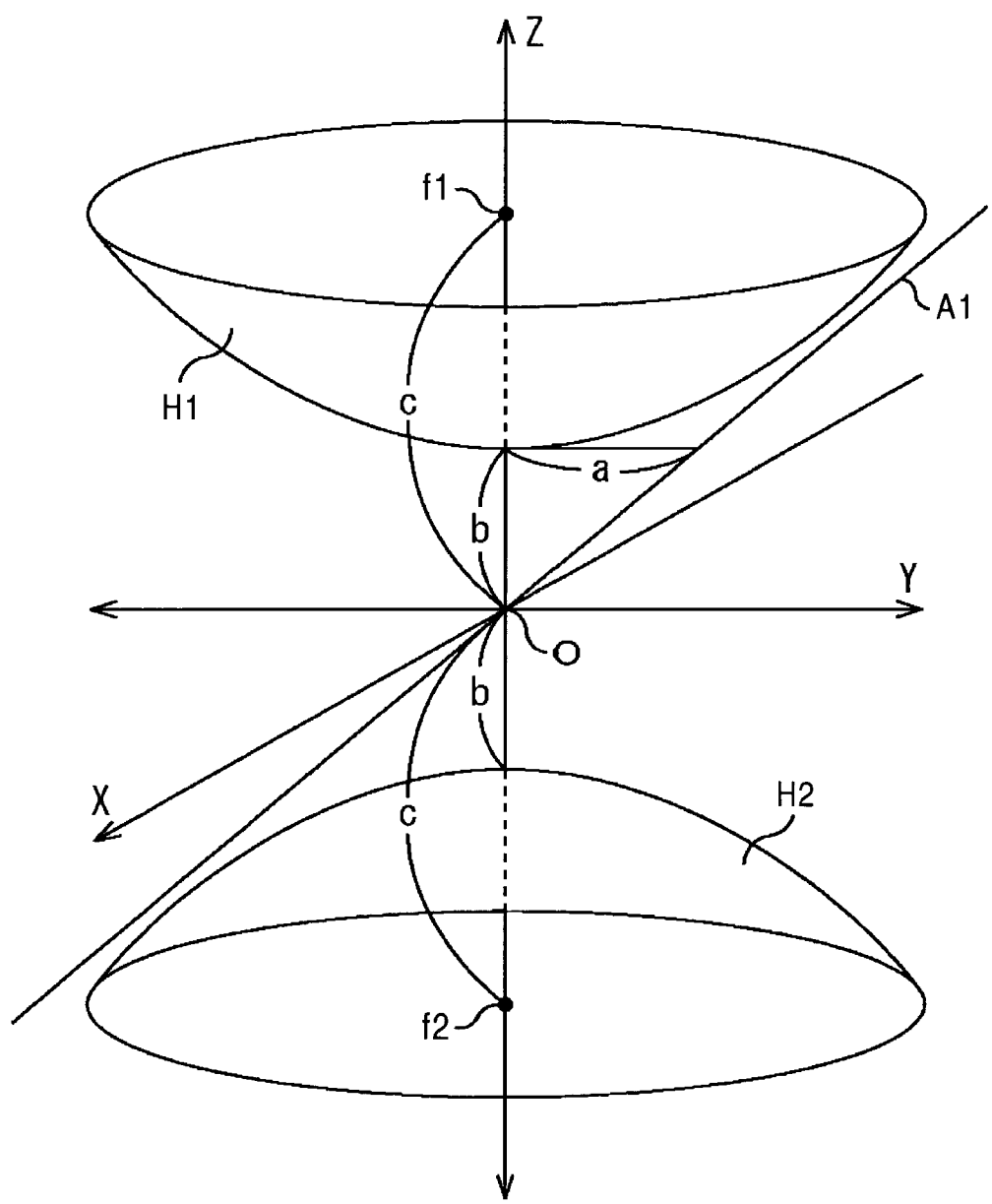
FIG. 38 is a diagram showing hyperboloid of a light collection unit.

Referring to FIG. 38, the hyperboloid of the light collection unit 52 shown in FIG. 36 is described.

The light collection unit 52 is formed in the shape of a part of a hyperboloid. More specifically, a hyperboloid is cut by a plane perpendicular to the axis of the hyperboloid and a mirror surface is formed on a convex end part of the hyperboloid obtained by cutting the hyperboloid.

A hyperboloid of two sheets, which is one type of hyperboloids, may be employed for the light collection unit 52. A hyperboloid of two sheets is a curved surface obtained, as shown in FIG. 38, by rotating a hyperbola about an axis (the Z axis, in the example shown in FIG. 38), and includes a downwards convex sheet H1 in a region of Z>0 and an upwards convex sheet H2 in a region of Z<0.

For the light collection unit 52, of two sheets H1 and H2 of the hyperboloid, the sheet H1 in the region of Z>0 is used. Hereinafter, the Z axis will also be referred as the center axis of the hyperbola or more simply as the axis.

In the 3-dimensional rectangular coordinate system (X, Y, Z) shown in FIG. 38, a hyperboloid including two sheets H1 and H2 can be expressed by equation (32).

$$\frac{X^2+Y^2}{a^2} - \frac{Z^2}{b^2} = -1 \quad (32)$$

where an and b are constants defining the shape of the hyperboloid having sheets H1 and H2. More specifically, constant b indicates the distance from the origin O to the intersection point of the sheet H1 (H2) and the Z axis, and constant an indicates the radius of a circle formed, in a plane passing through that intersection point and parallel to the XY plane, by an intersection line of the sheet H1 (H2) and an asymptotic plane A1.

In equation (32), c is a constant defining the locations of focal points of sheets H1 and H2 of the hyperboloid. More specifically, the focal point f1 of the sheet H2 of the hyperboloid is located at a point (0, 0, +c) on the Z axis, and the focal point f2 of the sheet H1 of the hyperboloid is located at a point (0, 0, −c) on the Z axis.

Constants a, b, and c are related with each other by the following equation.

$$C=\sqrt{a^2+b^2} \quad (33)$$

Figure 39:
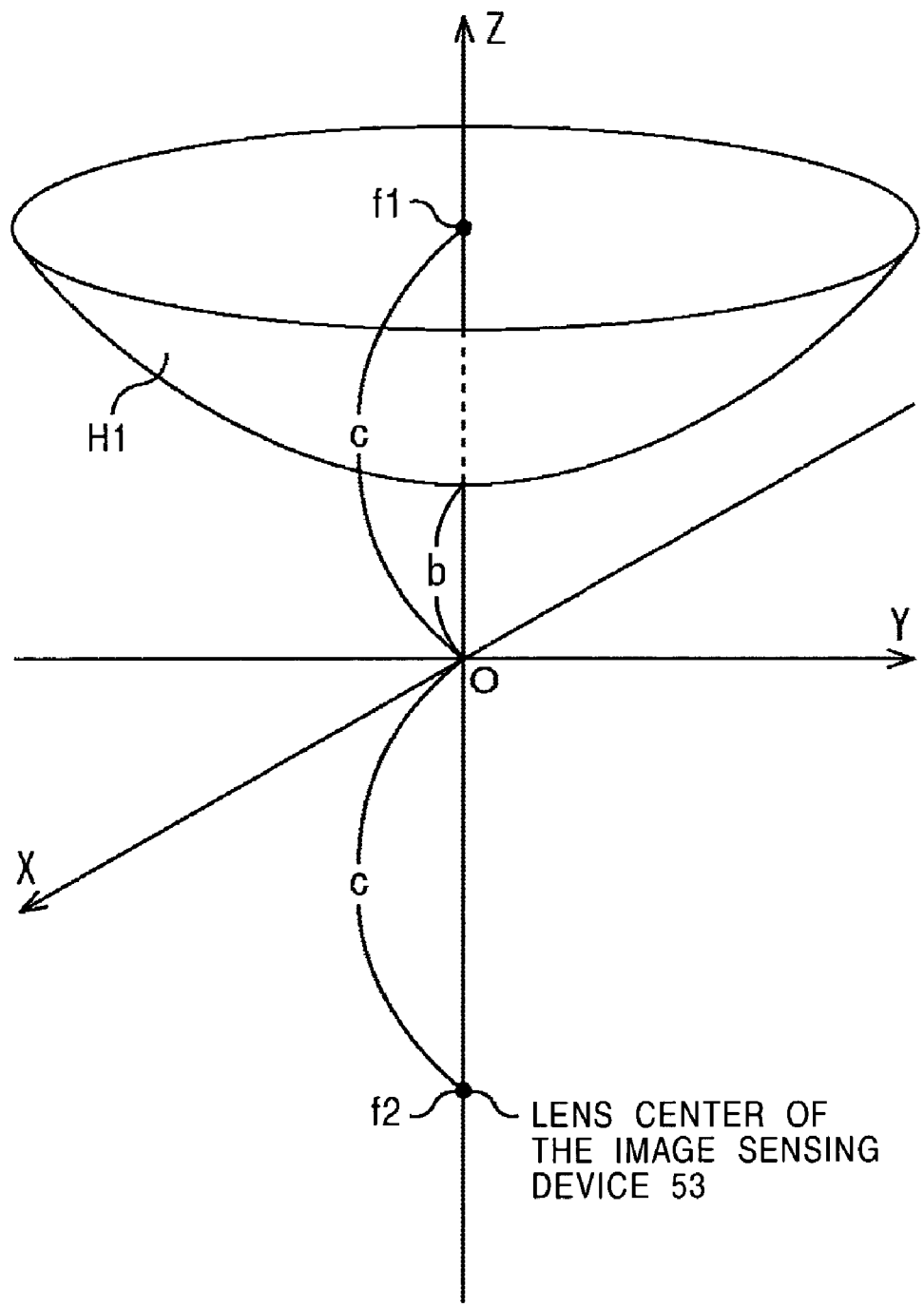
FIG. 39 is a diagram showing the positional relationship between the light collection unit and the image sensing device.

In the case in which the light collection unit 52 is formed in the shape of a sheet H1 of a hyperboloid such as that shown in FIG. 38, the image sensing device 53 is disposed, as shown in FIG. 39, such that the center axis (optical axis) of its lens is coincident with the Z axis and such that the center of the lens (of the camera 41) is coincident with the focal point f2 of the sheet H1 of the hyperboloid.

Figure 40:
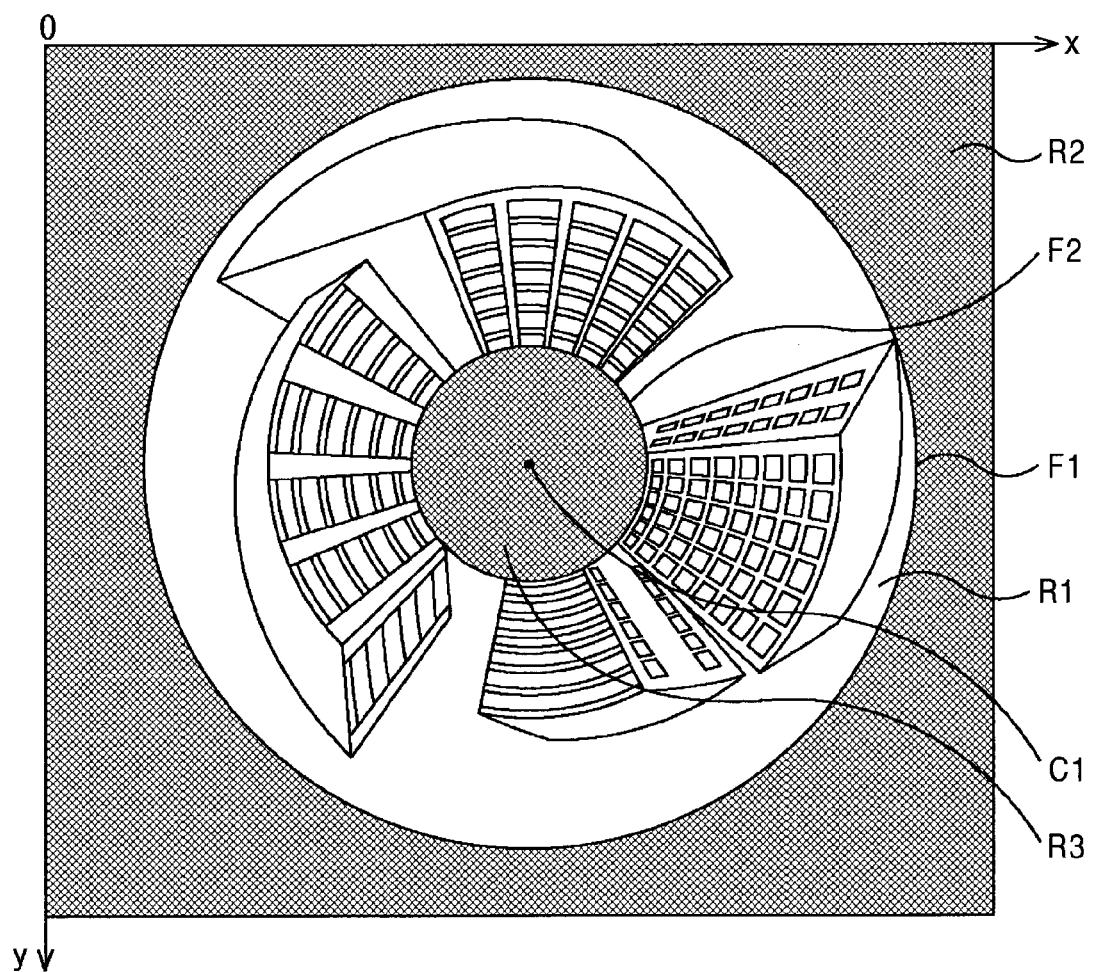
FIG. 40 is a diagram showing omnidirectional image data.

An example of omnidirectional image data output by the image sensing device 53 has been shown in FIG. 37. In such omnidirectional image data, let a 2-dimensional rectangular coordinate system be defined, as shown in FIG. 40, such that its origin O is taken at the upper left corner, the x axis is taken so as to extend from the origin O in a horizontal direction from left to right, and the y axis is taken so as to extend from the origin O in a vertical direction from up to down.

Let $(X_o, Y_o)$ be the coordinates of the center C1 of the two circles having circumferences F1 and F2, $r_{F1}$ be the radius of the circle with the circumference F1, and $r_{F2}$ be the radius of the circle with the circumference F2, then an arbitrary point (x, y) in the regions R2 outside the circumference F1 is expressed by equation (34), and an arbitrary point (x, y) in the regions R3 inside the circumference F2 is expressed by equation (35).

$$(x-X_0)^2+(y-Y_0)^2 > r_{F1}^2 \quad (34)$$

$$(x-X_0)^2+(y-Y_0)^2 < r_{F2}^2 \quad (35)$$

The omnidirectional image data conversion unit 43 shown in FIG. 31 first converts, before converting omnidirectional image data into original image data expressed in latitude and longitude, pixels values in the region R2 expressed in equation (34) and pixels values in the region R3 expressed in equation (35) into a value (for example, 0) which cannot be taken as actual pixel values.

In the above conversion of pixel values, it is required that the coordinates $(X_o, Y_o)$ of the center point C1 and radii $r_{F1}$ and $r_{F2}$ are known. Information indicating those values is supplied to the omnidirectional image data conversion unit 43 from the camera 41 via the buffer 42.

Herein, for simplicity, the exposure time, the aperture, and the zooming ratio are fixed.

Figure 41:
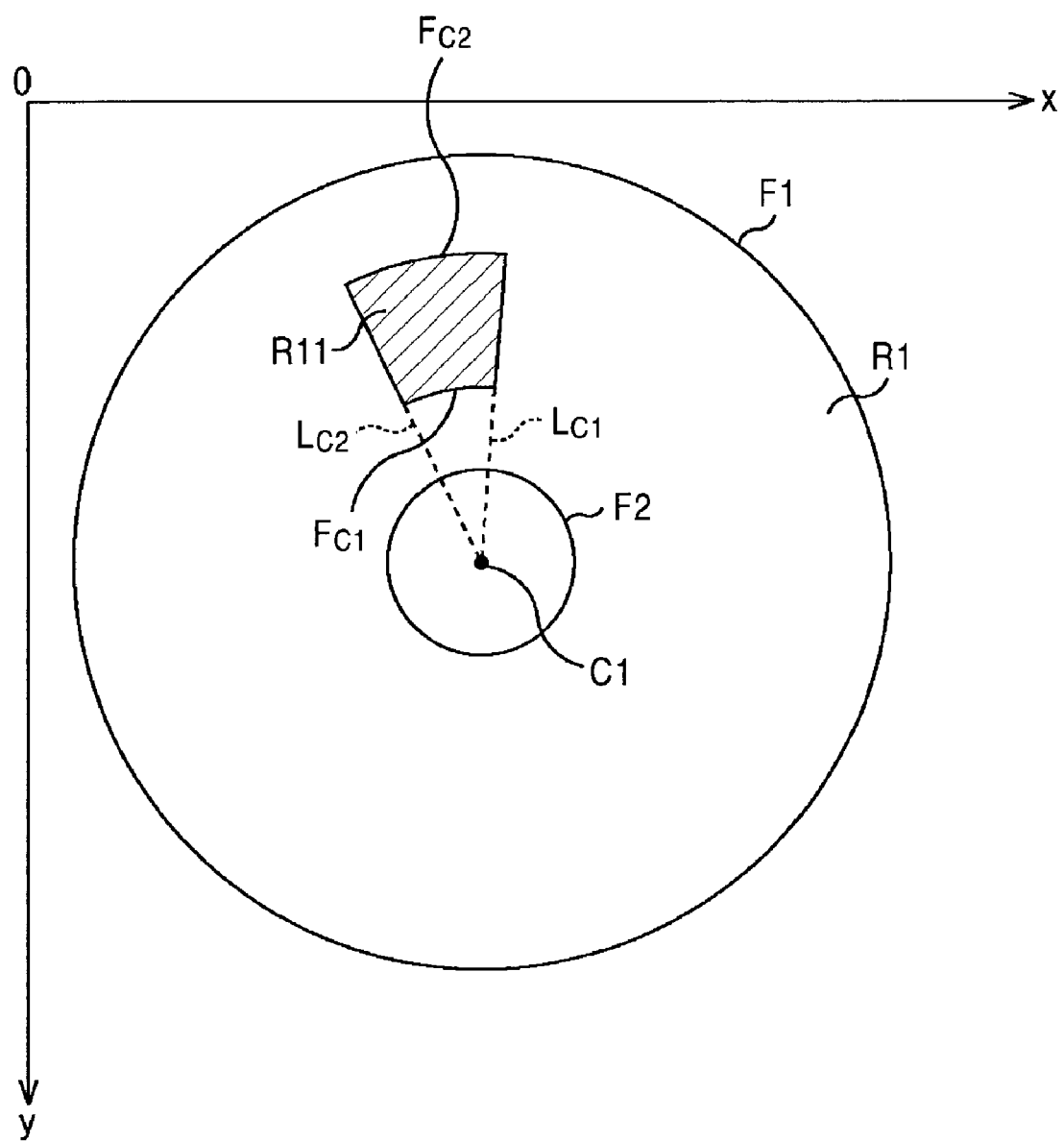
FIG. 41 is a diagram showing a manner of extracting a part of omnidirectional image data.

In some cases, in the omnidirectional image data that is image data in the region R1 shown in FIG. 37 or 40, only a part of the omnidirectional image data including an image of a desired subject is needed. In such a case, it is required to extract a necessary part from the omnidirectional image data. This can be performed by the omnidirectional image data conversion unit 43. That is, as shown in FIG. 41, the omnidirectional image data conversion unit 43 extracts image data in a sectoral region R11 including the desired subject, wherein the regions R11 is enclosed between two radial lines $L_{c1}$ and $L_{c2}$ passing through the center point C1 and enclosed between circumferences $F_{c1}$ and $F_{c2}$ of the two concentric circles centered at point C1.

As shown in FIG. 37 or 40, the omnidirectional image data has distortion in which data is condensed as the position approaches the center point C1 and, conversely, expanded as the point goes away from the center point C1. This is also true in the sectoral region of image data extracted by the omnidirectional image data conversion unit 43 from the omnidirectional image data. It is required to remove such distortion from the image data before the image data is processed by the image processing apparatus shown in FIG. 29.

The distortion of omnidirectional image data output by the omnidirectional camera 41 can be divided into a circumferential distortion component in a circumferential direction of circles having the center point C1 and a radial distortion component.

As for the circumferential distortion component, the omnidirectional image data shown in FIG. 37 or 40 has no distortion on a circumference of an arbitrary circle centered at point C1, because the scale is constant on the circumference.

Figure 42:
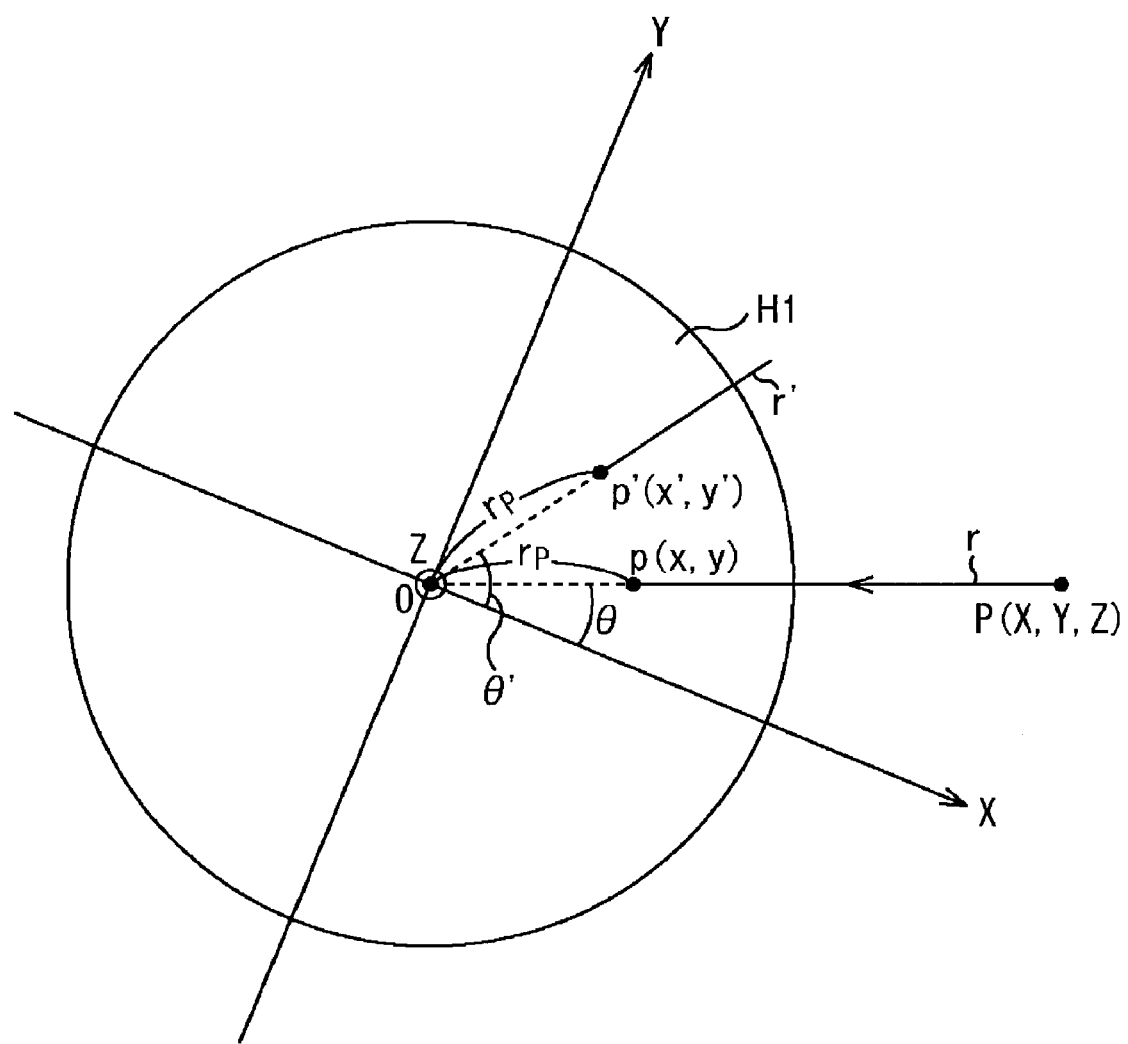
FIG. 42 is a diagram showing distortion in a circumferential direction.

FIG. 42 shows the sheet H1 of the paraboloid of the light collection unit 52 seen from the Z axis.

In FIG. 42, a light ray r is incident from a point P (X, Y, Z) on a subject, at an angle θ as measured from the X axis (XZ plane) toward the Z axis. The light ray is reflected by the sheet H1 of the paraboloid and falls on a point p (x, y) on a light receiving surface (an image plane, or a virtual screen) A3, shown in FIG. 43, of the image sensing device 53. Herein, the point p (x, y) makes an angle, with respect to the X axis (XZ plane), equal to the angle θ made by the light ray r with respect to the X axis.

In a case of an incident light ray r' making an angle θ' with respect to the X axis toward the Z axis, the light ray r' is reflected by the sheet H1 of the paraboloid and falls on a point p'(x', y') on the light receiving surface (image plane) A3. Also in this case, the point p'(x', y') makes an angle, with respect to the X axis, equal to the angle θ' made by the light ray r' with respect to the X axis.

If the angle of elevation (described later) with respect to the Z axis is equal for both light rays r and r', the light rays r and r' fall on points, on the light receiving surface A3, whose distances from the Z axis are equally rp, although they do not fall on the same single point.

From the above discussion, it can be concluded that light rays with an equal angle of elevation with respect to the Z axis are received by the light receiving surface A3 at points which are located apart by an equal distance from the Z axis a which make angles, with respect to the X axis, equal to the angles made by the light rays with respect to the X axis.

Thus, light rays having an equal angle of elevation with respect to the Z axis and having an equal angle with respect to the X axis are incident, on the light receiving surface A3, at equal intervals on a circumference whose center is on the Z axis. Therefore, the omnidirectional image data has no distortion in the circumferential direction of any circle whose center C1 is located at the intersection point of the light receiving surface A3 and the Z axis.

On the other hand, on a radial line passing through the center point C1, the omnidirectional image data shown in FIG. 37 or 40 has a scale which decreases as the point approaches the center point C1 and, conversely, increases as the point goes away from the center point C1. This means that the omnidirectional image data has distortion in radial directions.

Figure 43:
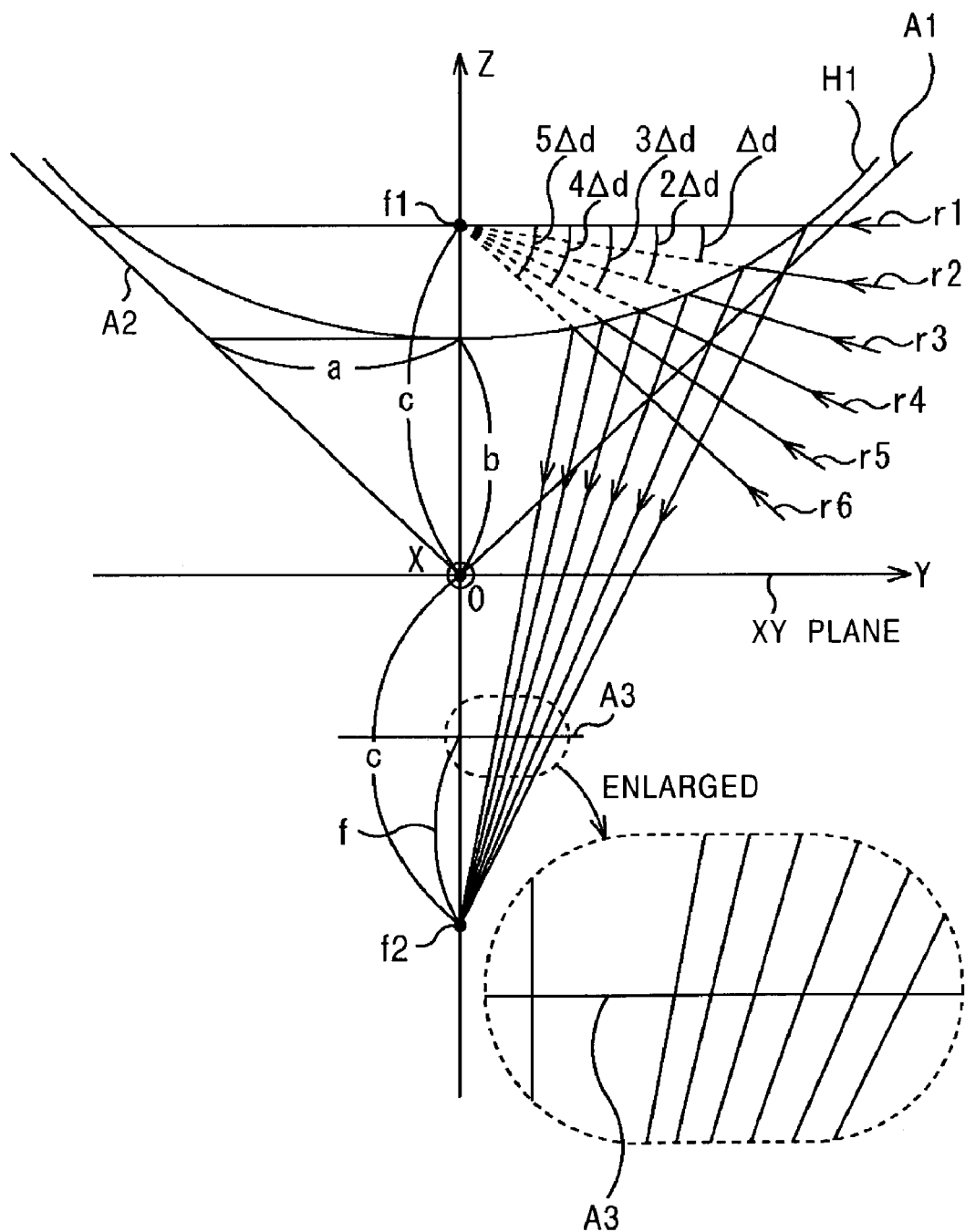
FIG. 43 is a diagram showing distortion in a radial direction.

FIG. 43 shows the sheet H1 of the paraboloid of the light collection unit 52 seen from the X direction.

In FIG. 43, a light ray r1 being incident in a direction toward the focal point f1 and having an angle of elevation of 0 with respect to the Z axis is reflected by the sheet H1 of the paraboloid toward the focal point f2 and received by the light receiving surface (image plane) A3 of the image sensing device 53.

Herein, the angle of elevation with respect to the Z axis refers to an angle made between the light ray incident in the direction toward the focal point f1 and a plane which contains the focal point f1 on the Z axis and which is parallel to the XY plane. The light receiving surface A3 of the image sensing device 53 is located apart by a distance equal to f from the focal point f2 toward the origin O along the Z axis wherein f is the focal length of the camera 41.

On the other hand, a light ray r2 being incident in a direction toward the focal point f1 and having an angle of elevation of Δd with respect to the Z axis is reflected by the sheet H1 of the paraboloid toward the focal point f2 and received by the light receiving surface A3. A light ray r3 being incident in a direction toward the focal point f1 and having an angle of elevation of 2Δd with respect to the Z axis is reflected by the sheet H1 of the paraboloid toward the focal point f2 and received by the light receiving surface A3. Light rays r4, r5, and r6 having angles of elevation increasing by Δd from one to another are also received in a similar manner by the light receiving surface A3.

As described above, the light rays r1 to r6 which are different in angle of elevation by Δd from one to another are received by the light receiving surface A3 at points, the point-to-point distance of which is not equal but decreases with decreasing distance of points with respect to the Z axis as shown in an enlarged view in FIG. 43 (in other words, the point-to-point distance increases with increasing distance of points from the Z axis). That is, the point-to-point distance for light rays decreases with increasing angle of elevation of those light rays (conversely, the point-to-point distance for light rays increases with decreasing angle of elevation of those light rays.

Because the point-to-point distance on the light receiving surface A3 for light rays whose angle of elevation varying equally from one to another is not constant but varies, the omnidirectional image data has distortion in radial directions.

From the above discussion, it can be seen that the distortion in radial directions can be removed from the omnidirectional image data by modifying the locations, on the light receiving surface A3, at which light rays are received such that the point-to-point distance becomes equal for light rays whose angle of elevation varies equally from one to another.

Figure 44:
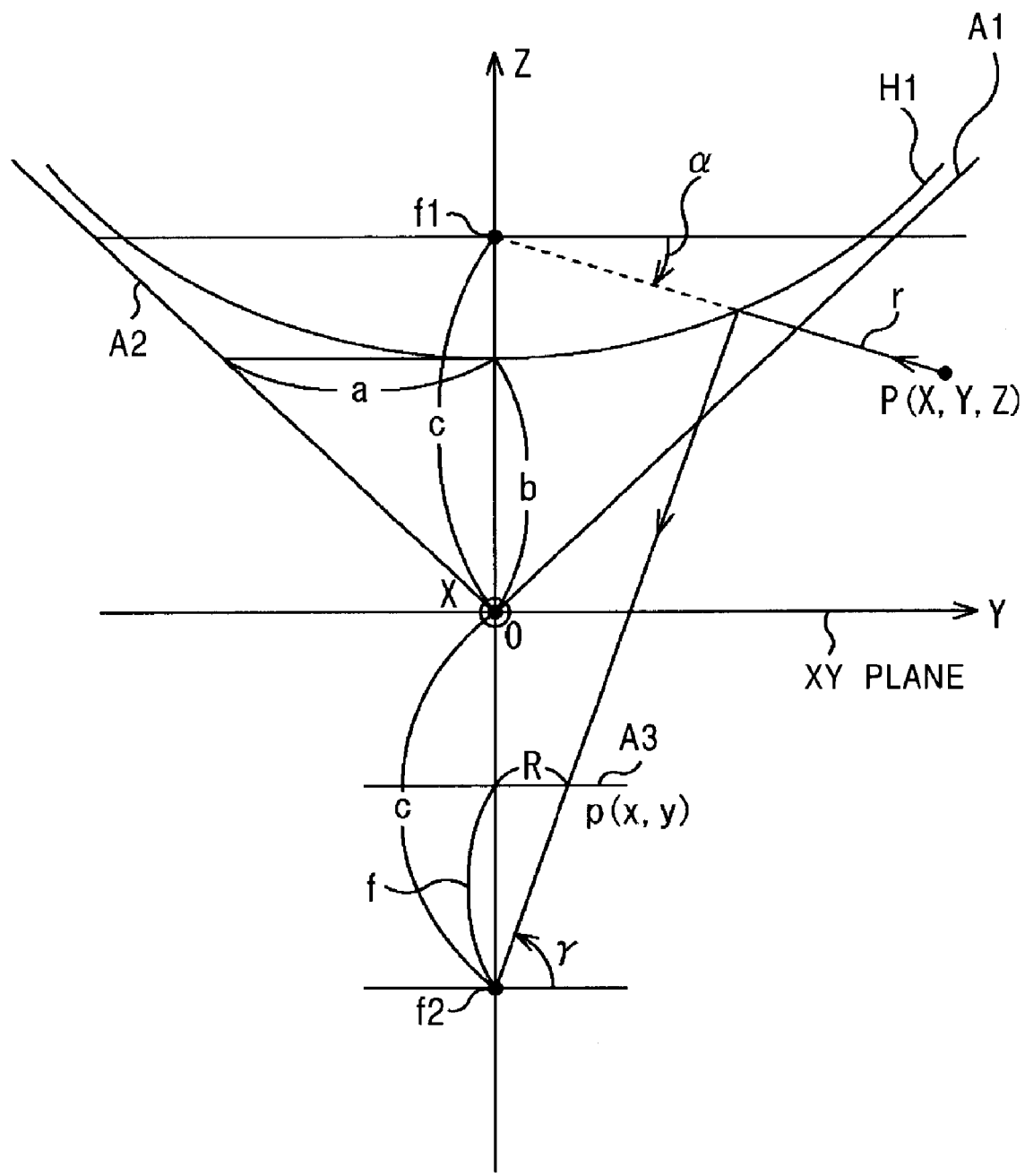
FIG. 44 is a diagram showing a method of removing distortion in a radial direction.

Herein, let us consider a light ray r being radiated from a point P(X, Y, Z) on a subject and incident in a direction toward the focal point f1 with an angle of elevation α, as shown in FIG. 44.

This light ray r, as described above with reference to FIG. 43, is reflected by the sheet H1 of the paraboloid of the light collection unit 52 toward the focal point f2 and received by the light receiving surface A3.

Herein, let γ be an angle between the light ray r directed to the focal point f2 and a plane which contains the focal point f2 and which is parallel to the XY plane. In the 2-dimensional rectangular coordinate system defined by the X axis and the Y axis, let (x, y) be the coordinates of the point (light receiving point) p at which the light ray r falls on the light receiving surface A3 and let R be the distance between the point p(x, y) and the Z axis.

The angle α shown in FIG. 44 can be determined by calculating the coordinates of a point, on the sheet H1 of the paraboloid expressed by equation (32), at which the light ray r is reflected. That is, the angle α is given by $$\alpha = \tan^{-1} \frac{(b^2+c^2)\sin\gamma - 2bc}{(b^2-c^2)\cos\gamma} \tag{36}$$

From equation (36), tan α is obtained as $$\tan\alpha = \frac{(b^2+c^2)\sin\gamma - 2bc}{(b^2-c^2)\cos\gamma} \tag{37}$$

Herein, let cos γ be expressed by the following equation.

$$\cos\gamma = X \tag{38}$$

Substituting equation (38) into equation (37) yields equation (39).

$$\{(b^2-c^2)\tan\alpha\}\cdot X = (b^2+c^2)\sqrt{1-X^2} - 2bc \tag{39}$$

Rewriting equation (39) yields equation (40).

$$\frac{(b^2-c^2)\tan\alpha}{b^2+c^2} \cdot X + \frac{2bc}{b^2+c^2} = \sqrt{1-X^2} \tag{40}$$

Herein, let A and B be defined by equations (41) and (42), respectively.

$$A = \frac{(b^2-c^2)\tan\alpha}{b^2+c^2} \tag{41}$$

$$B = \frac{2bc}{b^2+c^2} \tag{42}$$

Substituting equations (41) and (42) into equation (40) yields equation (43).

$$AX+B=\sqrt{1-X^2} \tag{43}$$

Equation (43) can be rewritten into a quadratic equation of X as shown below.

$$(A^2+1)X^2+2ABX+B^2-1=0 \tag{44}$$

By solving the quadratic equation (44), the following equation is obtained.

$$X = \frac{-AB+\sqrt{A^2-B^2+1}}{A^2+1} \tag{45}$$

From equation (38), the angle γ can be obtained as follows.

$$\gamma=\cos^{-1}(X) \tag{46}$$

In equation (46), X is given by equation (45), and A and B in equation (45) are respectively given by equations (41) and (42).

From the coordinates of the point p shown in FIG. 44, the angle γ is given by the following equation.

$$\gamma = \tan^{-1}\left(\frac{f}{R}\right) \tag{47}$$

On the other hand, in FIG. 44, the distance R between the point p(x, y) and the Z axis is given as $\sqrt{(x^2+y^2)}$, and thus equation (47) can be rewritten as follows.

$$R = \sqrt{x^2+y^2} = \left(\frac{f}{\tan\gamma}\right) \tag{48}$$

Thus, by determining the angle γ in accordance with equation (46) and then calculating equation (48) using the angle γ, it is possible to determine the distance R between the Z axis and the point p(x, y) at which the light receiving surface A3 receives the light ray r incident in a direction toward the focal point f1 with an angle of elevation α with respect to the Z axis is received.

Thus, if a predetermined range of angle of elevation (for example, from 0 to 80°) with respect to the Z axis is equally divided into subangles Δd, and if distances $R_{p1}$, $R_{p2}$, $R_{p3}$ and so on of the respective points p1, p2, p3 and so on, on the light receiving surface A3, at which light rays with angles of elevation Δd, 2Δd, 3Δd increasing by an equal angle Δd from one to another with respect to the Z axis, are determined in advance, it is possible to obtain omnidirectional image data having no distortion in radial directions by converting the omnidirectional image data output by the camera 41 into data in which distance differences between adjacent points, $|R_{p1}-R_{p2}|$, $|R_{p2}-P_{p3}|$, and so on become constant.

The above-described conversion of the omnidirectional image data into data having no distortion is performed by the omnidirectional image data conversion unit 43 shown in FIG. 31, as described below.

Figure 45:
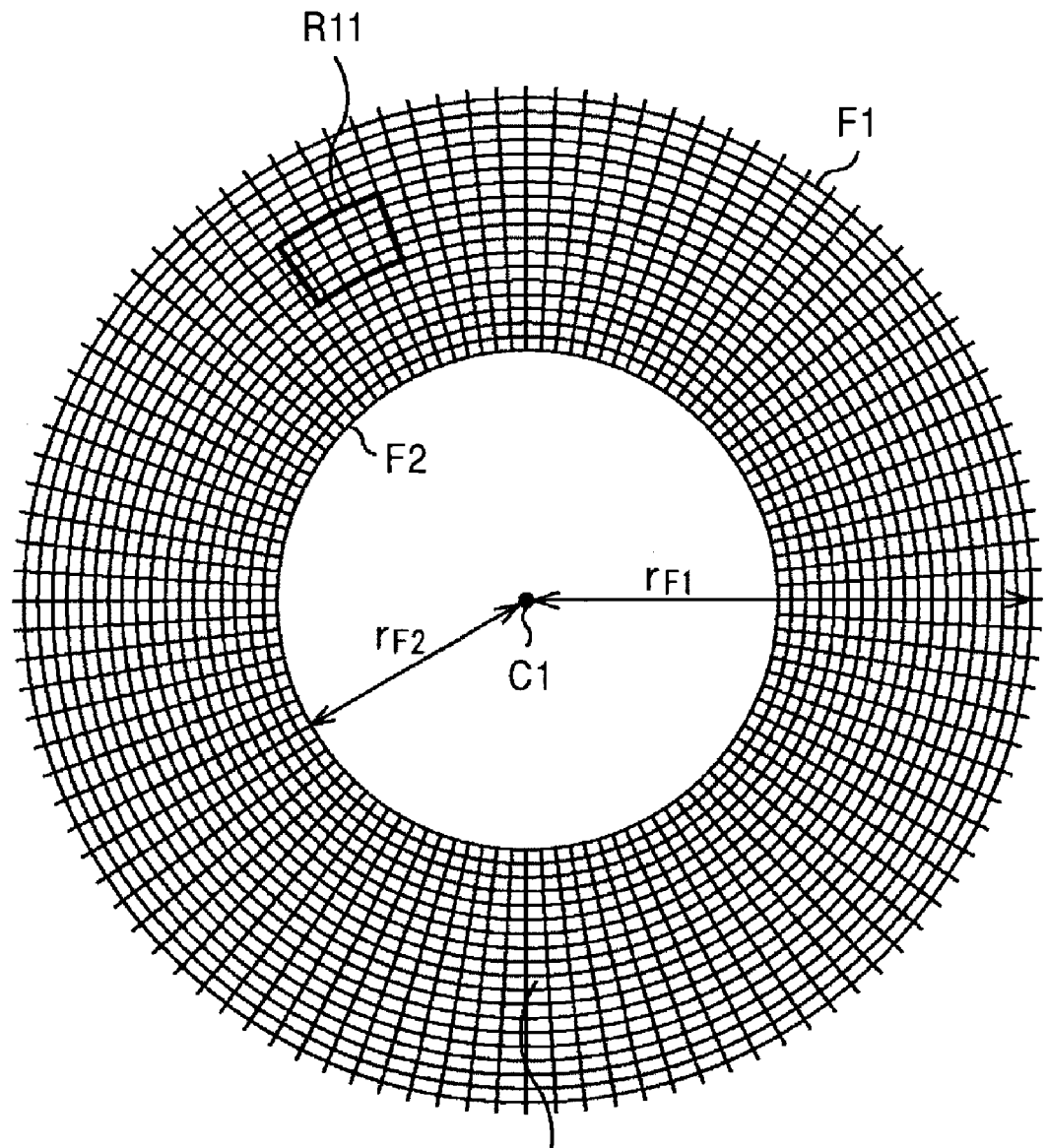
FIG. 45 is a diagram showing a method of removing distortion in a radial direction.

That is, as shown in FIG. 45, the omnidirectional image data conversion unit 43 receives omnidirectional image data having distortion in radial directions from the camera 41 via the buffer 42 together with data indicating the center point C1, the radius $r_{F1}$ of the circumference F1, and the radius $r_{F2}$ of the circumference F2.

The omnidirectional image data conversion unit 43 draws a plurality of concentric circles having radii $R_{p1}$, $R_{p2}$, $R_{p3}$, and so on, whose centers are located at the center point C1, in the region R1 enclosed between the circumference F1 of the circle having radius $r_{F1}$ whose center is located at the center point C1 and the circumference F2 of the circle having radius $r_{F2}$ whose center is located at the center point C1. The omnidirectional image data conversion unit 43 further draws a plurality of lines such that the lines pass through the center point C1 and such that the plurality of concentric circles are equally divided by the plurality of lines. Thus, the omnidirectional image data conversion unit 43 obtains a large number of intersection points between the plurality of concentric circles and the plurality of lines in the region R1.

Hereinafter, the intersection points between the plurality of concentric circles and the plurality of lines are referred to as conversion points.

As discussed earlier, by rearranging the conversion points such that distances between adjacent conversion points become equal, it is possible to convert the omnidirectional image data having distortion into image data having no distortion.

Now, in FIG. 45, let us convert a part of image data in a sectoral region R11 similar to that shown in FIG. 41 into image data having no distortion.

Figure 46A:
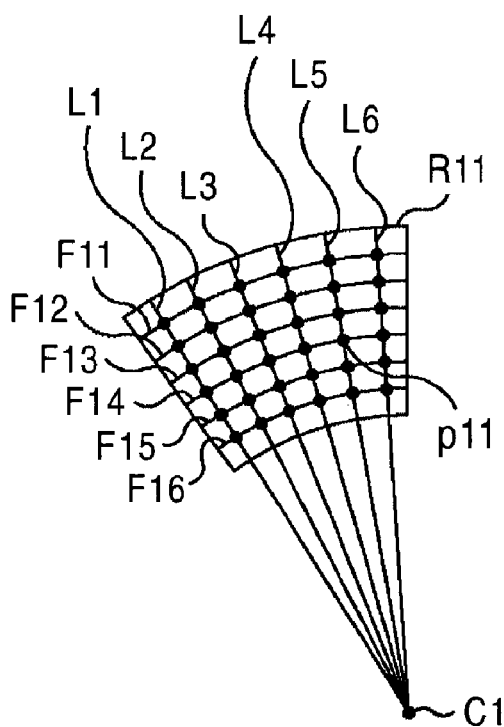
FIG. 46 is a diagram showing an omnidirectional image conversion for removing distortion in a radial direction.

In this region R11, as shown in FIG. 46A, there are many conversion points which are intersection points between a plurality of arcs F11, F12, F13, F14, F15, and F16 of concentric circles whose centers are located at the center point C1 and a plurality of lines L1, L2, L3, L4, L5, and L6 passing though the center point C1.

Figure 46B:
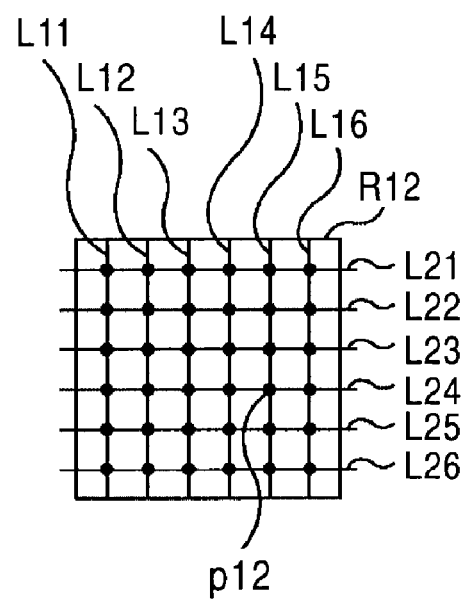

The omnidirectional image data conversion unit 43 rearranges the those many conversion points in the region R11 such that the distances between adjacent points become equal as shown in FIG. 46B.

More specifically, the omnidirectional image data conversion unit 43 draws virtual horizontal lines L21, L22, L23, L24, L25, and L26 corresponding to the arcs F11, F12, F13, F14, F15, and F16, respectively, shown in FIG. 46A such that the virtual lines L21, L22, L23, L24, L25, and L26 are equally spaced from each other, and also draws virtual vertical lines L11, L12, L13, L14, L15, and L16 corresponding to the lines L1, L2, L3, L4, L5, and L6, respectively, shown in FIG. 46A such that the virtual lines are equally spaced from each other, and the omnidirectional image data conversion unit 43 moves the conversion points to the corresponding intersection points of the horizontal lines L21 to L26 and the vertical lines L11 to L16 (that is, the conversion points are assigned to the corresponding intersection points of the horizontal lines L21 to L26 and the vertical lines L11 to L16).

As a result, for example, a conversion point p11 at an intersection point of the arc F14 and the line L5 shown in FIG. 46A is converted into an intersection point p12 of the line L24, in FIG. 46B, corresponding to the arc F14 and the line L15, in FIG. 46B, corresponding to the line L5.

If it is assumed that the camera 41 is disposed in a sphere whose surface is formed to be a mirror, omnidirectional image data includes an image, reflected in the mirror, of a scene outside the sphere. If the sphere, in which the camera 41 is disposed, is thought to be the earth, the vertical and horizontal lines in the image data produced by the omnidirectional image data conversion unit 43 correspond to longitude lines and latitude lines, respectively. Thus, in the present embodiment, omnidirectional image data having no distortion output by the omnidirectional image data conversion unit 43 is referred to as image data expressed in latitude and longitude.

In the process performed by the omnidirectional image data conversion unit 43 to convert (change) conversion points in the above-described manner thereby converting image data (omnidirectional image data) having distortion in radial directions into image data (image data expressed in latitude and longitude) having no distortion in radial directions, the conversion points are, as described above, intersection points of circles whose centers are location at the center point C1 and lines passing through the center point C1. Therefore, the conversion points are not necessarily coincident with pixel centers of pixels of the light receiving surface A3 (FIG. 43 or 44) of the image sensing device 53 (FIG. 36). On the contrary, the conversion points do not generally coincide with pixel centers.

Because the conversion points generally deviate from pixel centers as described above, it is required to determine pixel values at respective conversion points before the omnidirectional image data conversion unit 43 converts the conversion points.

Thus, the omnidirectional image data conversion unit 43 determines the pixel values at the respective conversion points, for example, as follows.

Figure 47:
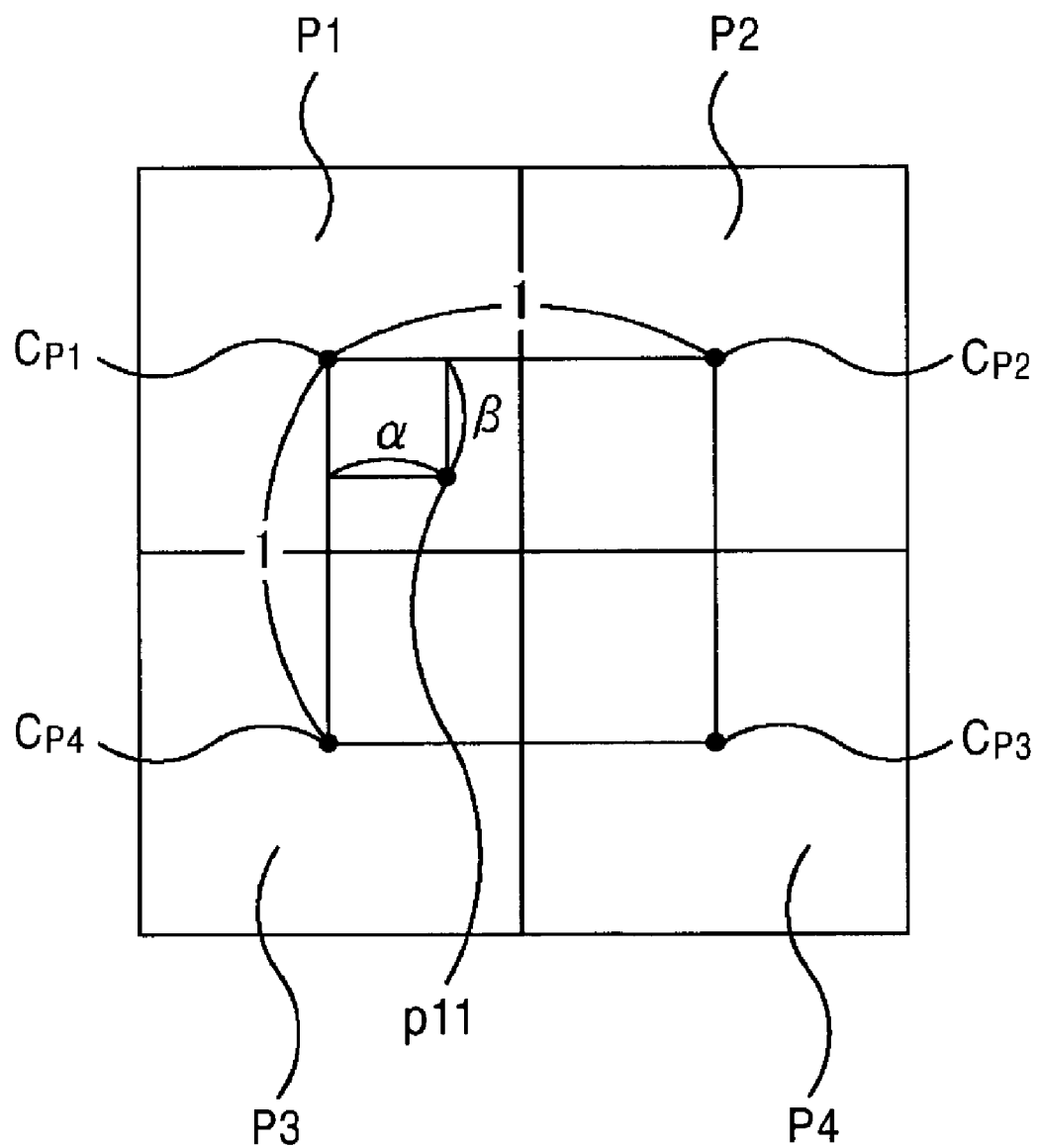
FIG. 47 is a diagram showing a method of determining a pixel value at a conversion point.

Herein, let it be assumed that, as shown in FIG. 47, the conversion point pit shown in FIG. 46 is located within a rectangle (square) formed by taking their vertices at pixel centers $C_{p1}$, $C_{p2}$, $C_{p3}$, and $C_{p4}$ of 2×2 (four) neighboring pixels P1, P2, P3, and P4 on the light receiving surface A3. In the example shown in FIG. 47, the distance between horizontally or vertically adjacent pixels is assumed to be equal to 1.

In a case in which the conversion point p11 is located at a position deviated from the pixel center $c_{p1}$ by a distance α to the right and by a distance β in a downward direction, the omnidirectional image data conversion unit 43 calculates the pixel value $S_s$ in accordance with the following equation and employs it as the pixel value for the conversion point p11.

$$S_s = \{S_a \cdot (1-\alpha) + \alpha \cdot S_b\}(1-\beta) + \beta \cdot \{S_c \cdot (1-\alpha) + \alpha \cdot S_d\} \quad (49)$$

where $S_a$, $S_b$, $S_c$, and $S_d$ are the pixel values of respective pixels P1, P2, P3, and P4, and α and β have a value, within the range of 0 to 1, corresponding to the location of the conversion point p11.

Although in the embodiment shown in FIG. 36, a hyperbolic mirror is employed as the light collection unit 52, another type of mirror such as a spherical mirror may also be used as the light collection unit 52.

Although in the embodiment shown in FIG. 31, an omnidirectional camera capable of producing omnidirectional image data is used as the camera 41, another type of camera such as a video camera having a fisheye lens or an usual lens may be used as the camera1 41.

In the case in which a video camera having an usual lens is used, if a rectangular plane, which is perpendicular to the optical axis of the video camera and whose center of gravity lies on the optical axis and which is located between the center of the lens of the video camera and a subject, is employed as a virtual screen, then an image formed on the virtual screen by light rays originating from various points on the subject and falling on the center of the lens is taken as image data. Herein, ideally, light rays incident on the virtual screen are not subjected to any conversion, and thus an image of a real world in a 3 dimensional space is faithfully formed on the 2-dimensional virtual screen.

However, in the case of an omnidirectional camera or a video camera using a fisheye lens, although a wide angle of image or an omnidirectional image can be taken, light rays incident on the virtual screen are subjected to a nonlinear conversion. Therefore, for example, in the case of the omnidirectional camera, as shown in FIG. 43, because light rays are reflected by a hyperbolic mirror (with a shape of a sheet H1 of a paraboloid), image data of a real world formed on the virtual screen has distortion.

Therefore, the omnidirectional image data conversion unit 43 shown in FIG. 31 converts such omnidirectional image data having distortion into image data expressed in latitude and longitude as with a camera using an usual lens. Herein, if this image data expressed in latitude and longitude is thought to be taken by a camera using an usual lens, because the image data expressed in latitude and longitude includes an image over the entire range in a longitude direction around the optical axis of the omnidirectional camera, the virtual screen associated with the camera using the usual lens is infinite in length in a horizontal direction (in the longitude direction).

When an omnidirectional camera is used, as for the latitude direction, an image is taken in directions over the entire range from 0° to −90° in an ideal case (in FIG. 43, in directions from arbitrary points below the XY plane to the origin). Therefore, if image data expressed in latitude and longitude is thought to be taken by a camera using an usual lens, the virtual screen associated with the camera is infinite in length in a downward direction (in the negative latitude direction).

When an image is displayed by the image display apparatus shown in FIG. 26, all image data expressed in latitude and longitude converted from omnidirectional image data produced by the omnidirectional camera is not necessarily needed. That is, when an image is displayed by the image display apparatus shown in FIG. 26, it is basically sufficient that a certain part of image data expressed in latitude and longitude including an image of a desired subject is displayed.

In the following description, it is assumed that when an image of a subject is taken by a camera having an usual lens, image data in a range displayed on a virtual screen is extracted from image data expressed in latitude and longitude, and processing is performed on the extracted image data. The extraction of image data may be performed, for example, by the omnidirectional image data conversion unit 43 shown in FIG. 31.

Furthermore, in the following description, the term "lens center" or "optical axis" of the camera 41 is used to describe, on the assumption that an usual lens is used by the camera 41, the lens center or the optical axis of that camera using the usual lens. Therefore, in the case of image data extracted from image data expressed in latitude and longitude, it is assumed that the image data is produced by taking an image of a subject by a camera having an usual lens, and the "optical axis" or "lens center" of the camera 41 refers to the optical axis or the lens center of that camera used to take the image of the subject.

In the image processing apparatus shown in FIG. 29, the data conversion unit 30 converts image data stored in the image database 2 into image data of a subject seen from a viewpoint of a user, and the image data is displayed on the display 6 such that the displayed subject looks like a real subject seen in the real world by the user, as shown in FIG. 28.

The process performed by the data conversion unit 30 to produce image data of a subject looking like an actual subject seen in the real world by a user is described in further detail below.

Figure 48:
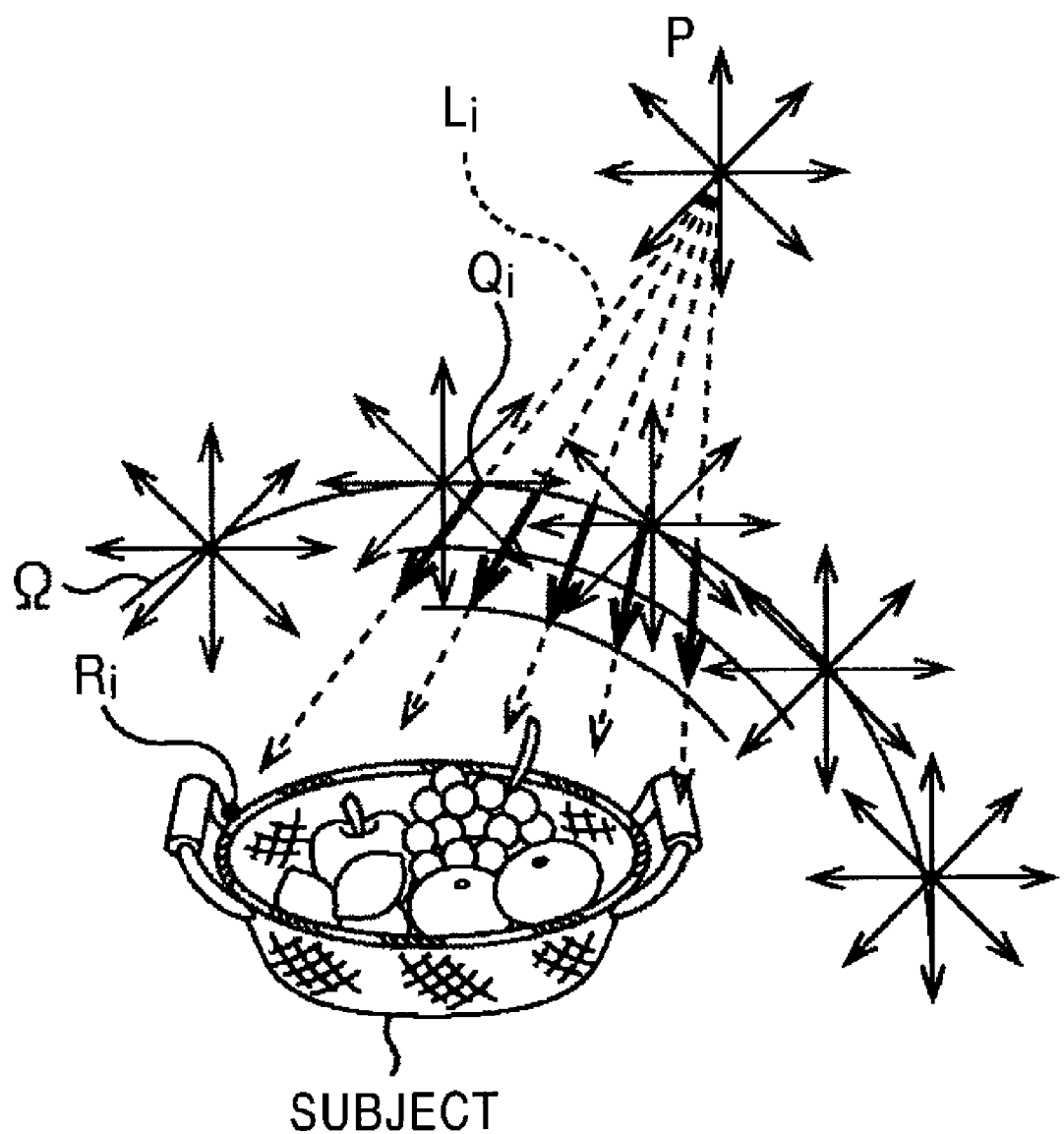
FIG. 48 is a diagram showing the principles of converting original image data into presentation image data representing an image of a subject seen from a user.

The image database 2 has original image data expressed in latitude and longitude produced by the image producing apparatus shown in FIG. 31 for images taken (by the camera 41) at a plurality of viewpoints. That is, as shown in FIG. 48, the image data stored in the image database 2 can be regarded as being of images of a subject taken at a plurality of viewpoints on a curved surface Ω.

Herein, let it be assumed that a viewpoint P is set at a location on a side of the curved surface Ω opposite to the side where the subject is located, and an image of the subject is taken at the viewpoint P.

It is further assumed that the viewpoint is set such that a line from the viewpoint to an arbitrary point on the subject intersects with the curved surface Ω.

For simplicity, the image data stored in the image database 2 is assumed to be of images of the subject taken at arbitrary viewpoints on the curved space Ω. It is also assumed that light rays travel straight through a space (medium) in which a subject is viewed by a user, without encountering any attenuation.

When a subject is seen from a viewpoint P, trajectories of light rays (trajectories of light rays radiated from the subject and incident on the viewpoint P) can be expressed by lines extending from the viewpoint P to respective points on the subject. Because those light rays must intersect with the curved surface Ω, the image data stored in the image database 2 must include pixel values corresponding to the light rays having the same trajectories as those described above (that is, the image database 2 must have information indicating the same light rays as those from the viewpoint P to the subject).

Herein, let a line $L_i$ extending from the viewpoint P to a point $R_i$ on the subject be selected and let the intersection point of the selected line $L_i$ and the curved surface Ω be denoted by $Q_i$. Because the image data stored in the image database 2 includes image data of images of the subject taken at all viewpoints on the curved surface Ω, the image data of an image of the subject taken at a viewpoint at point $Q_i$ can be found in the image data stored in the image database 2. Furthermore, in this specific case, all light rays travel straight without being attenuated, and thus a light ray radiated from the point $R_i$ on the subject and incident on the point $Q_i$ on the curved surface Ω is identical to a light ray incident on the viewpoint P. Therefore, when the subject is viewed from the viewpoint P, a pixel value corresponding to the light ray radiated from the point $R_i$ on the subject toward the viewpoint P is identical to a pixel value corresponding to the light ray radiated from the point $R_i$ toward the point $Q_i$ on the curved surface Ω, wherein the pixel values corresponding to the light ray traveling from the point $R_i$ to the point $Q_i$ is included in the image data stored in the image database 2.

Thus, the pixel value for the point $R_i$ on the subject seen from the viewpoint P can be obtained from the image data for the image taken at the viewpoint $Q_i$ on the curved surface Ω.

Similarly, pixel values for other points on the subject seen from the view point P can also be obtained from the image data for the image taken at the viewpoint $Q_i$ on the curved surface Ω. Thus, if there exists image data of images taken at arbitrary viewpoints on the curved surface Ω, it is possible to obtain image data for an image of a subject seen from a viewpoint P by selecting, from pixel values included in the image data, those pixel values corresponding to light rays identical to light rays traveling the subject to the viewpoint P.

Figure 49:
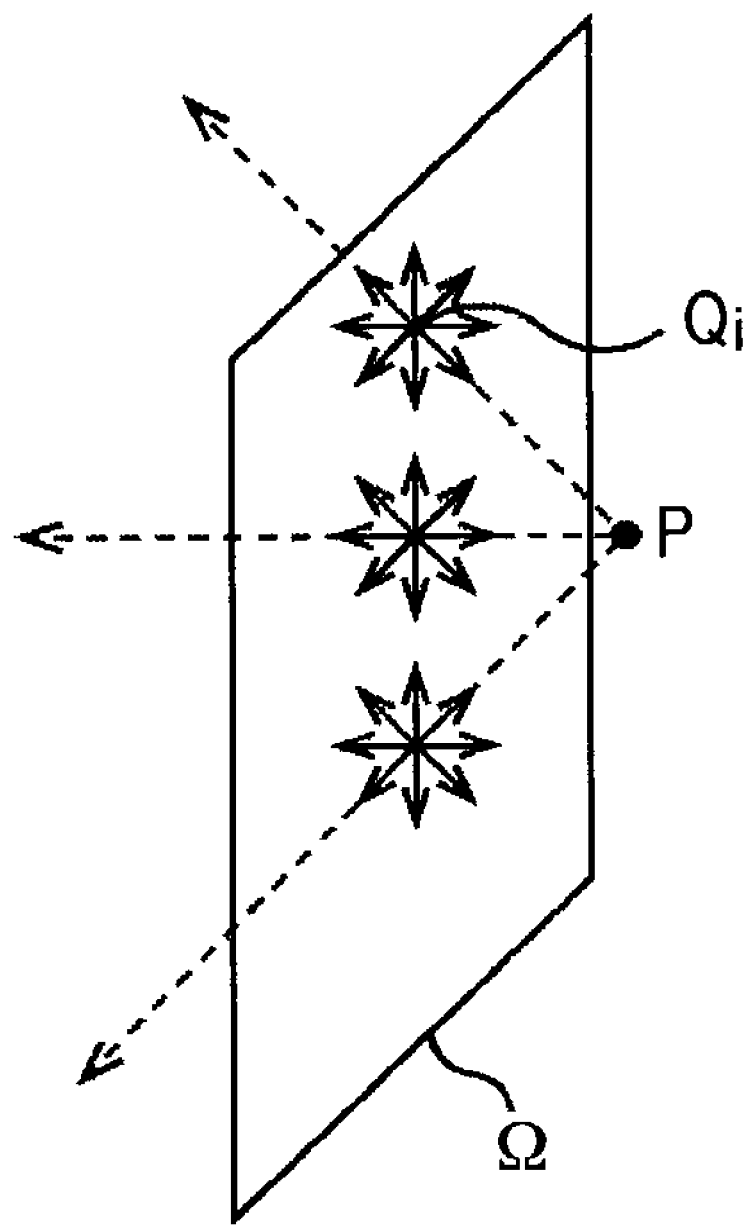
FIG. 49 is a diagram showing the principles of converting original image data into presentation image data representing an image of a subject seen from a user.

The curved surface Ω shown in FIG. 48 is not necessarily needed to have a particular shape, but the curved surface Ω may have an arbitrary shape. This means that the curved surface Ω may be a flat plane such as that shown in FIG. 49.

The curved surface Ω may be a closed surface or an open surface. However, in the case in which the curved surface Ω is an open surface, the viewpoint P must be selected such that a line extending from the viewpoint to an arbitrary point on the subject can intersect with the curved surface Ω.

In the case in which the curved surface Ω is a closed surface enclosing the subject, the following can be concluded.

If light ray information associated with light rays in all directions is given for all points on the closed surface enclosing the subject (wherein the term "light ray information" refers to information indicating trajectories of light rays and pixel values corresponding to those light rays), it is possible to reconstruct an image seen from an arbitrary point outside the closed surface.

In the above discussion, the image data is assumed to represent images taken for a subject seen from arbitrary viewpoints on the curved surface Ω. However, the viewpoints at which images of a subject are taken are not limited to points on the curved surface Ω, but a point which is not on the curved surface Ω may be employed as a viewpoint. That is, in the case in which a closed surface surrounding a subject is employed as the curved surface Ω, if given light ray information includes information associated with light rays in all directions at all points on the closed surface, it is possible, in principle, to reconstruct an image of a subject seen from an arbitrary point outside the closed surface regardless of whether the light ray information is for images taken at viewpoints on the closed surface or for images taken at viewpoints outside the closed surface. This is also true when an open surface is employed as the curved surface Ω.

As described above, the data conversion unit 30 shown in FIG. 29 converts the original image data into presentation image data by extracting light ray information associated with light rays directed to the viewpoint of the user from the light ray information associated with light rays which pass through the curved surface Ω and which form an image of original image data stored in the image database 2.

More specifically, the data conversion unit 30 shown in FIG. 29 sets, between the subject and the viewpoint of the user, a virtual screen on which an image seen from the viewpoint of the user is displayed, and the data conversion unit 30 shown in FIG. 29 detects a light ray having the same trajectory as that between the viewpoint of the user and a pixel on the virtual screen. The data conversion unit 30 then employs the pixel value corresponding to the detected light ray as the pixel value of that pixel on the virtual screen. The data conversion unit 30 performs the above process for all pixel values on the virtual screen thereby reconstructing, on the virtual screen, the image data (presentation image data) seen from the viewpoint of the user.

Thus, for example, reconstruction of presentation image data seen from a viewpoint outside a closed surface enclosing a subject can be performed if light ray information is given for light rays in all directions at all points on the closed surface. In theory, there are an infinite number of points on the closed surface and there are an infinite number of direction at each point. However, in practice, light ray information is given for a finite number of points on the closed surface and for a finite number of directions at each point.

When presentation image data seen from an arbitrary point outside the closed surface is reconstructed using light ray information associated with all directions at all points on the closed surface, if the viewpoint is located on the closed surface, the presentation image data can be directly reconstructed using the light ray information associated with light rays passing through the point on the closed surface at which the viewpoint is located.

However, in the case in which the viewpoint is not on the closed surface, it is required to determine such points at which lines from the viewpoint to pixels on a virtual screen set for the viewpoint intersect with the closed surface, for all pixels on the virtual screen. Depending on the performance of the CPU 12 of the computer 1 (FIG. 27) used as the image processing apparatus, it can be difficult to display the presentation image data in real time.

To avoid the above problem, in the data conversion unit 30, the image data conversion unit 31 may convert, in advance, the original image data stored in the image database 2 into intermediate image data in a predetermine format composed of pixel values corresponding to light rays incident on the pixels, and the intermediate image data conversion unit 32 may convert the intermediate image data into presentation image data seen from the viewpoint of the user thereby making it possible to display the presentation image data in real time.

More specifically, the image data conversion unit 31 produces intermediate image data, on a plane which is perpendicular to a light ray incident on a pixel of the original image data and which contains a particular point, by employing the pixel value of that pixel of the original image data as the pixel value at the intersection point between the light ray incident on the pixel of the original image data and the plane.

Figure 50:
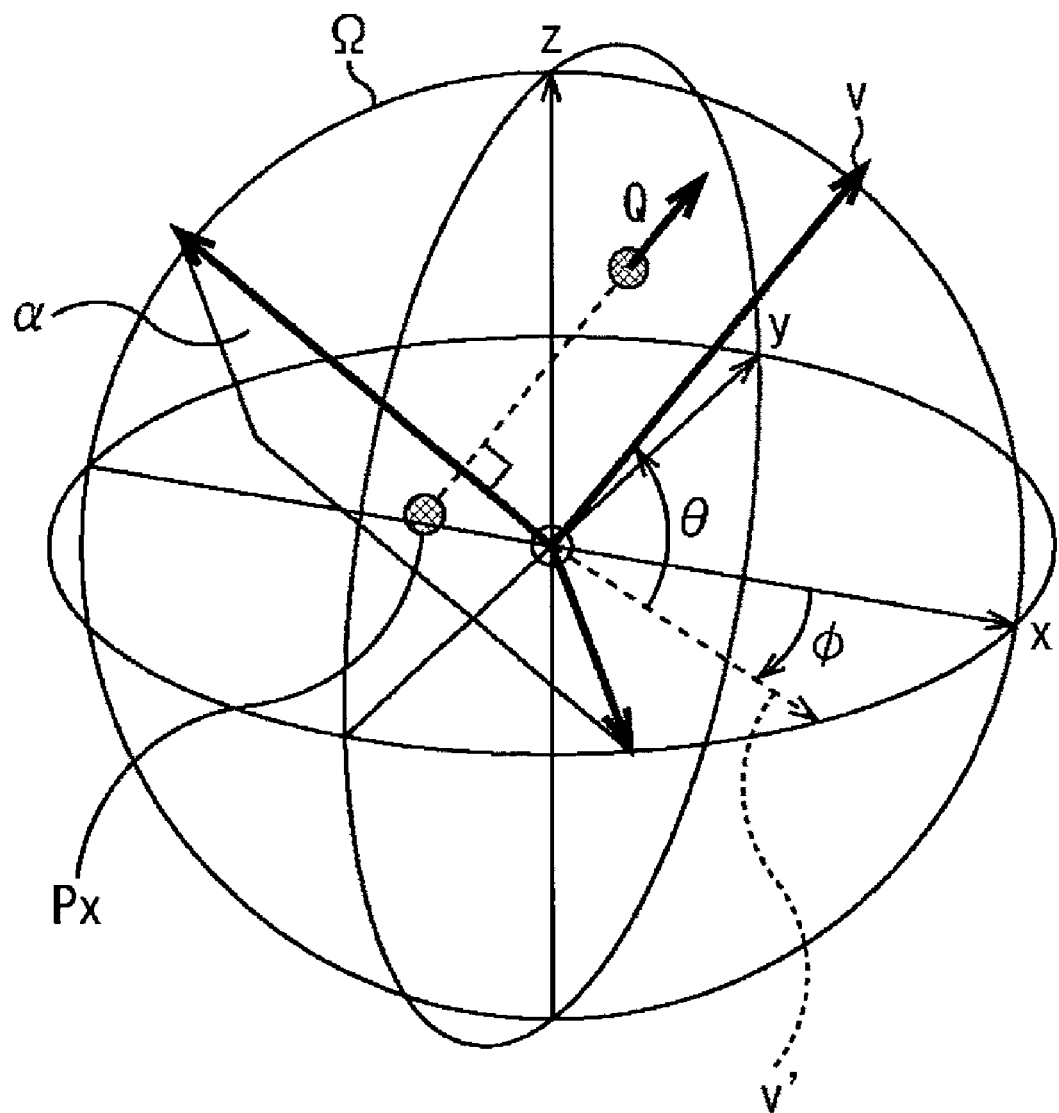
FIG. 50 is a diagram showing a method of converting original image data into intermediate image data.

For example, as shown in FIG. 50, when a spherical surface is employed as the closed surface Ω, a light ray in a certain direction at a point Q on the spherical surface is selected as a light ray of interest, and the image data conversion unit 31 determines a point $P_x$ which is on a plane α being perpendicular to the light ray of interest and containing, for example, the origin selected as the predetermined point and through which the light ray of interest passes. The image data conversion unit 31 then determines the pixel value of a pixel at that point $P_x$ such that the pixel value becomes equal to the pixel value of the original image data corresponding to the light ray of interest. The image data conversion unit 31 sets pixels on the plane α and their pixel values for light rays in the same direction at other points on the spherical surface in a similar manner to the point Q, thereby producing, on the plane α, image data composed of pixel values corresponding to light rays in the same direction.

Herein, in a 3-dimensional coordinate system whose origin is taken at the center of the sphere in FIG. 50, let v denote a vector which passes through the origin and whose direction is identical to the direction of a light ray passing through the point Q on the spherical surface. Furthermore, let v' denote a vector which is obtained by projecting the vector v onto the xy plane in the 3-dimensional coordinate system. Let the angle θ between the vectors v and v' be referred to as latitude, and let the angle φ between the x axis and the vector v' be referred to as longitude. Thus, the direction of the vector v can be specified by latitude θ and longitude φ.

Image data is produced on the plane α such that pixel values of the image data become equal to pixel values of the original image data corresponding to light rays with the same direction as the vector v. The image data produced on the plane α in such a manner represents an image seen from an infinite point in the direction of the vector v.

The data conversion unit 31 also produces similar image data on a plane which passes through the origin and which is perpendicular to a vector v specified by various values of latitude θ and longitude φ, and outputs the produced image data as intermediate image data.

Referring to a flow chart shown in FIG. 51 and referring to FIG. 52, the image data conversion process performed in step S1 shown in FIG. 30 by the image data conversion unit 31 shown in FIG. 29 to convert the original image data into intermediate image data is described in further detail below.

First, in step S21, from viewpoints which were employed when images of original image data stored in the image database 2 were taken by the camera 41 (hereinafter, such viewpoints will be referred to as image taking point s) the image data conversion unit 31 selects an image taking point of interest Pc.

In the case of the image producing apparatus described earlier with reference to FIG. 31, images of original image data are taken using the camera 41 disposed at a fixed position while moving a subject. This is equivalent to taking images of the subject disposed at a fixed position while moving the camera 41. That is, the original image data includes a large number of image taking points at which images of the subject were taken by the camera 41. In the present step S21, from those many image taking points, an arbitrary image taking point which has not been employed as an image taking point of interest is selected as an image taking point $P_c$.

In the image database 2, as described earlier, each frame of image original data is stored together with information indicating the location of the subject, the location of the camera 41, and the direction of the optical axis of the camera 41, employed when the image of the original image data was taken. On the basis of the information described above, the data conversion unit 31 determines image taking points expressed in the image taking coordinate system at which images of the subject, whose location (and attitude) was fixed, were taken by the camera 41 for respective frames of original image data. Of those image taking points, the data conversion unit 31 selects, as the image taking point of interest $P_c$, an image taking point which has not yet been employed as the image taking point of interest.

The process then proceeds to step S22. In step S22, the image data conversion unit 31 sets a virtual screen for the image taking point of interest $P_c$ and selects a pixel of interest, which has not yet been employed as a pixel of interest $P_s$, from pixels on the virtual screen.

Figure 52:
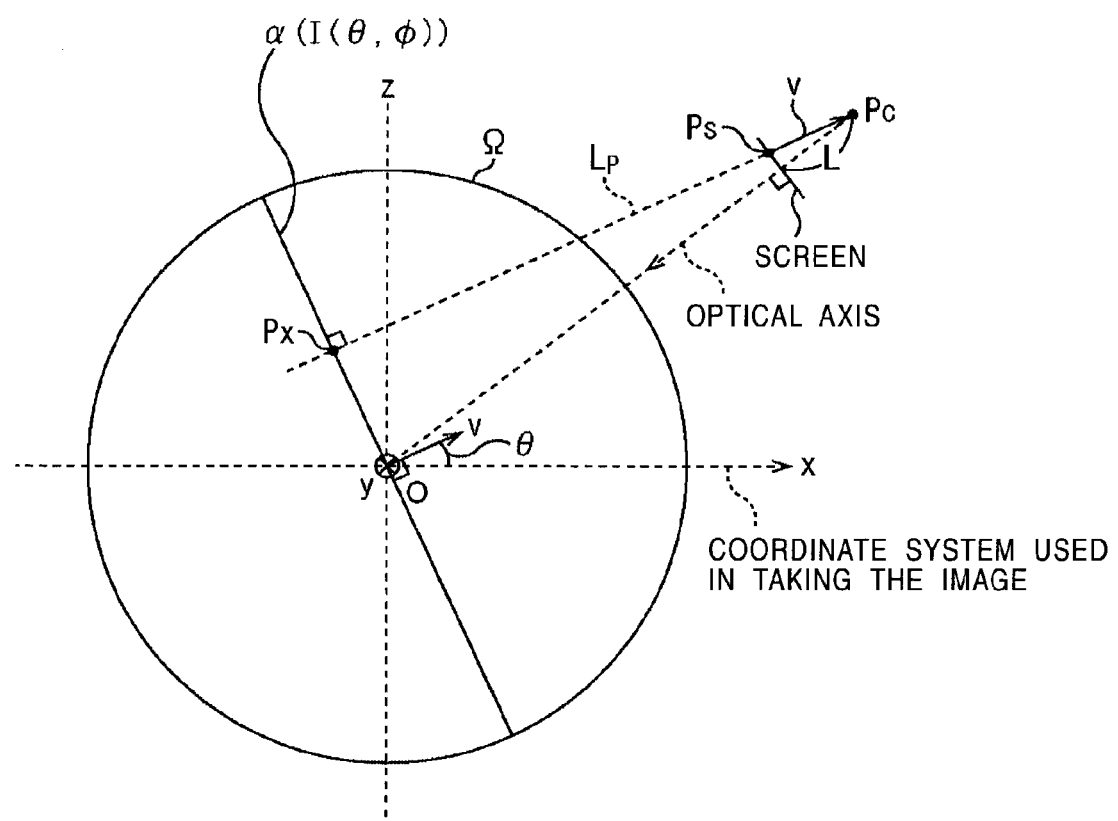
FIG. 52 is a diagram showing the image data conversion process for converting original image data into intermediate image data.

More specifically, as shown in FIG. 52, the image data conversion unit 31 determines, as a virtual screen for the image taking point of interest $P_c$, a rectangular plane which is perpendicular to the optical axis of the camera 41 and is located a distance L apart from the image taking point of interest $P_c$ in a direction along the optical axis of the camera 41. The image data conversion unit 31 selects a pixel as the pixel of interest $P_s$, which has not yet been selected as the pixel of interest, from the pixels on the virtual screen, for example, in the order of raster scanning.

In the above process, the image data conversion unit 31 detects the direction of the optical axis of the camera 41 at the image taking point of interest from the information stored in the image database 2.

The numbers of pixels in horizontal and vertical directions of the virtual screen are set to be equal to the numbers of pixels in horizontal and vertical directions of the frame of the original image data produced by taking the image from the image taking point of interest $P_s$, and the original image data produced by taking the image from the image taking point of interest $P_s$ is assumed to be displayed on the virtual screen.

After completion of step S22, the process proceeds to step S23. In step S23, the image data conversion unit 31 determines a vector v starting from the pixel of interest $P_s$ and ending at the image taking point of interest $P_c$, and the process proceeds to step S24.

In the specific example shown in FIG. 52, the vector v is a vector which lies in the xz plane in the image taking coordinate system and which points in a direction making an angle θ from the xy plane toward the z axis. That is, in the specific example shown in FIG. 52, the vector v points in the direction with latitude of θ and longitude of 0.

Although in the example shown in FIG. 52, the optical axis of the camera 41 at the image taking point $P_c$ passes through the origin of the image taking coordinate system, the optical axis of the camera 41 is not necessarily needed to pass through the origin of the image taking coordinate system.

In FIG. 52, a spherical surface whose center is located at the origin and which is employed as the closed surface Ω enclosing the subject is also shown.

In step S24, the image data conversion unit 31 determines a plane α which is perpendicular to the vector v and which contains a predetermined point (the origin, for example) in the image taking coordinate system. Thereafter, the process proceeds to step S25.

Note that the plane α is not necessarily needed to contain the origin.

In step S25, the image data conversion unit 31 determines the latitude θ and the longitude φ of the vector v determined in step S23, wherein the latitude θ is an angle made by the vector v and the xy plane, and the longitude φ is an angle made by the vector v and the xz plane, and the process proceeds to step S26.

Herein, the latitude θ and the longitude φ of the vector v are identical to the latitude θ and the longitude φ of the normal of the plane α determined in step S24. This means that the plane α containing the origin selected as the predetermined point can be specified by the latitude θ and the longitude φ. Thus, hereinafter, the plane α specified by latitude θ and the longitude φ will also be expressed as plane I(θ, φ).

The sign of the latitude θ is defined such that angles made in the positive region of the z axis are defined as being positive, and angles made in the negative region of the z axis are defined as being negative. The sign of the longitude φ is defined such that angles made in the positive region of the y axis are defined as being positive, and angles made in the negative region of the y axis are defined as being negative.

In step S26, as shown in FIG. 52, the image data conversion unit 31 determines a line $L_p$ that links the image taking point of interest $P_c$ and the pixel of interest Ps. Furthermore, in this step S26, the image data conversion unit 31 determines the intersection point $P_x$ of the line $L_p$ and the plane α (I(θ, φ)) determined in step S24. The process then proceeds to step S27. In step S27, the image data conversion unit 31 determines the coordinates ($x_α$, $y_α$) of the point $P_x$ on the plane α.

The coordinates ($x_α$, $y_α$) of the point $P_x$ on the plane α can be determined as follows.

Let a 2-dimensional coordinate system be introduced on the plane α, and let unit vectors in directions of x and y axes in the image taking coordinate system be denoted by $v_x$ and $v_y$, respectively.

The x coordinate $x_α$ and the y coordinate $y_α$ of the point $P_x$ are respectively given by $v_x \cdot OP_s$ (or $v_x \cdot OP_c$) and $v_y \cdot OP_s$ (or $v_y \cdot OP_c$), where · denotes an inner product and $OP_s$ ($OP_c$) denotes a vector starting at the origin of the image taking coordinate system and ending at the pixel of interest $P_s$ (image taking point of interest Pc).

The unit vector $v_x$ is a vector having a length of 1 and satisfying conditions $v_x \cdot v = 0$ and $v_x \cdot Z_v = 0$, and the unit vector $v_y$ is a vector having a length of 1 and satisfying conditions $v_y \cdot v = 0$ and $v_y \cdot v_x = 0$, where $Z_v$ is an unit vector (=(0, 0, 1)) in a direction along the z axis in the image taking coordinate system.

In a case in which the optical axis of the camera 41 at the image taking point of interest $P_c$ does not pass through the origin of the image taking coordinate system, it is needed to offset the coordinates ($x_α$, $y_α$) of the point $P_x$ by amounts corresponding the coordinates, expressed in the 2-dimensional coordinates system on the plane α, of the intersection point between the optical axis and the plane α.

That is, when the coordinates $(x_\alpha, y_\alpha)$ of the point $P_x$ on the plane $\alpha$ are determined in the above-described manner, the coordinates $(x_\alpha, y_\alpha)$ of the point $P_x$ are expressed in the coordinate system whose origin is located at the intersection point between the plane $\alpha$ and the optical axis of the camera 41 at the image taking point of interest Pc. This can cause a plurality of 2-dimensional coordinate systems, the origin of which is located at different points, to be defined for light rays which travel in the same direction but the optical axes associated with which intersect with the plane $\alpha$ at different points on the plane $\alpha$.

To avoid the above problem, it is needed that the origin of the 2-dimensional coordinate system defined on the same plane $\alpha$ be fixed at a particular point such as the origin of the image taking coordinate system. To this end, in the case in which the optical axis of the camera 41 at the image taking point of interest $P_c$ does not pass through the origin of the image taking coordinate system, the image data conversion unit 31 offsets, in step S27, the coordinates of the point $P_x$ by amounts corresponding the coordinates, expressed in the 2-dimensional coordinates system on the plane $\alpha$, of the intersection point between the optical axis and the plane $\alpha$.

More specifically, the image data conversion unit 31 expresses the coordinates of the point $P_x$ determined in the above-described manner as $(x_\alpha', y_\alpha')$ and the coordinates, in the 2-dimensional coordinate system on the plane $\alpha$, of the intersection point between the plane $\alpha$ and the optical axis of the camera 41 at the image taking point of interest $P_c$ as $(x_{\alpha o}, y_{\alpha o})$, and the image data conversion unit 31 adds the coordinates $(x_\alpha', y_\alpha')$ and $(x_{\alpha o}, y_{\alpha o})$. The image data conversion unit 31 employs the resultant coordinates $(x_\alpha' + x_{\alpha o}, y_\alpha' + y_{\alpha o})$ as the coordinates $(x_\alpha, y_\alpha)$ of the point $P_x$ on the plane $\alpha$.

The process then proceeds to step S28. In step S28, the image data conversion unit 31 employs the pixel value of the pixel of interest $P_s$ selected from the pixels of the original image data on the virtual screen as the pixel value of a pixel at the point $P_x$ on the plane $\alpha$. If the pixel value of the pixel at the point $P_x$ on the plane $\alpha$ is expressed as $I(\theta, \phi)(x_\alpha, y_\alpha)$ using $I(\theta, \phi)$ indicating the plane $\alpha$ and $(x_\alpha, y_\alpha)$ indicating the coordinates of the point $P_x$ on the plane $\alpha$, then, in the present step S28, the image data conversion unit 31 sets a pixel value equal to the pixel of the pixel of interest $P_s$ to the pixel value $I(\theta, \phi)(x_\alpha, y_\alpha)$ of the pixel at the point $P_x$ on the plane $\alpha$. As a result, the pixel of interest $P_s$ is orthogonally projected to the point $P_x$ on the plane $I(\theta, \phi)$ perpendicular to the vector v, and the pixel value equal to that of the pixel of interest $P_s$ is set to the pixel value $I(\theta, \phi)(x_\alpha, y_\alpha)$ of the pixel at the point $P_x (=(x_\alpha, y_\alpha))$ on the plane $I(\theta, \phi)$. That is, intermediate image data is given by the pixel value $I(\theta, \phi)(x_\alpha, y_\alpha)$ of the pixel at the point $P_x$ on the plane $I(\theta, \phi)$ to which the pixel of interest $P_s$ is orthogonally projected.

The process then proceeds to step S29. In step S29, the image data conversion unit 31 determines whether all pixels (of the original image data) on the virtual screen set for the image taking point of interest $P_c$ have been employed as the pixel of interest. If it is determined that there is a pixel which has not yet been employed as the pixel of interest, the process returns to step S22, and the above-described process is repeated.

On the other hand, if it is determined in step S29 that all pixels on the virtual screen have been employed as the pixel of interest, the process proceeds to step S30. In step S23, the image data conversion unit 31 determines whether all image taking points of frames of the original image data stored in the image database 2 have been employed as the image taking point of interest.

If it is determined in step S30 that there are more image taking points of frames which have not yet been employed as the image taking point of interest in the original image data stored in the image database 2, the process returns to step S21, and the above-described process is repeated.

On the other hand, if it is determined in step S30 that all image taking points of frames of the original image data stored in the image database 2 have been employed as the image taking point of interest, the process is ended.

In the image data conversion process described above, ideally, image data indicating the image of the subject seen from an infinite point in the direction specified by latitude $\theta$ and longitude $\phi$ is produced on the plane $I(\theta, \phi)$ specified by the latitude $\theta$ and the longitude $\phi$. The image data produced in such a manner for various values of the latitude $\theta$ and the longitude $\phi$ is supplied as intermediate image data to the intermediate image database 3 and stored therein.

FIG. 53 schematically shows a format of the intermediate image data produced by the image data conversion process described above with reference to FIG. 51.

Figure 51:
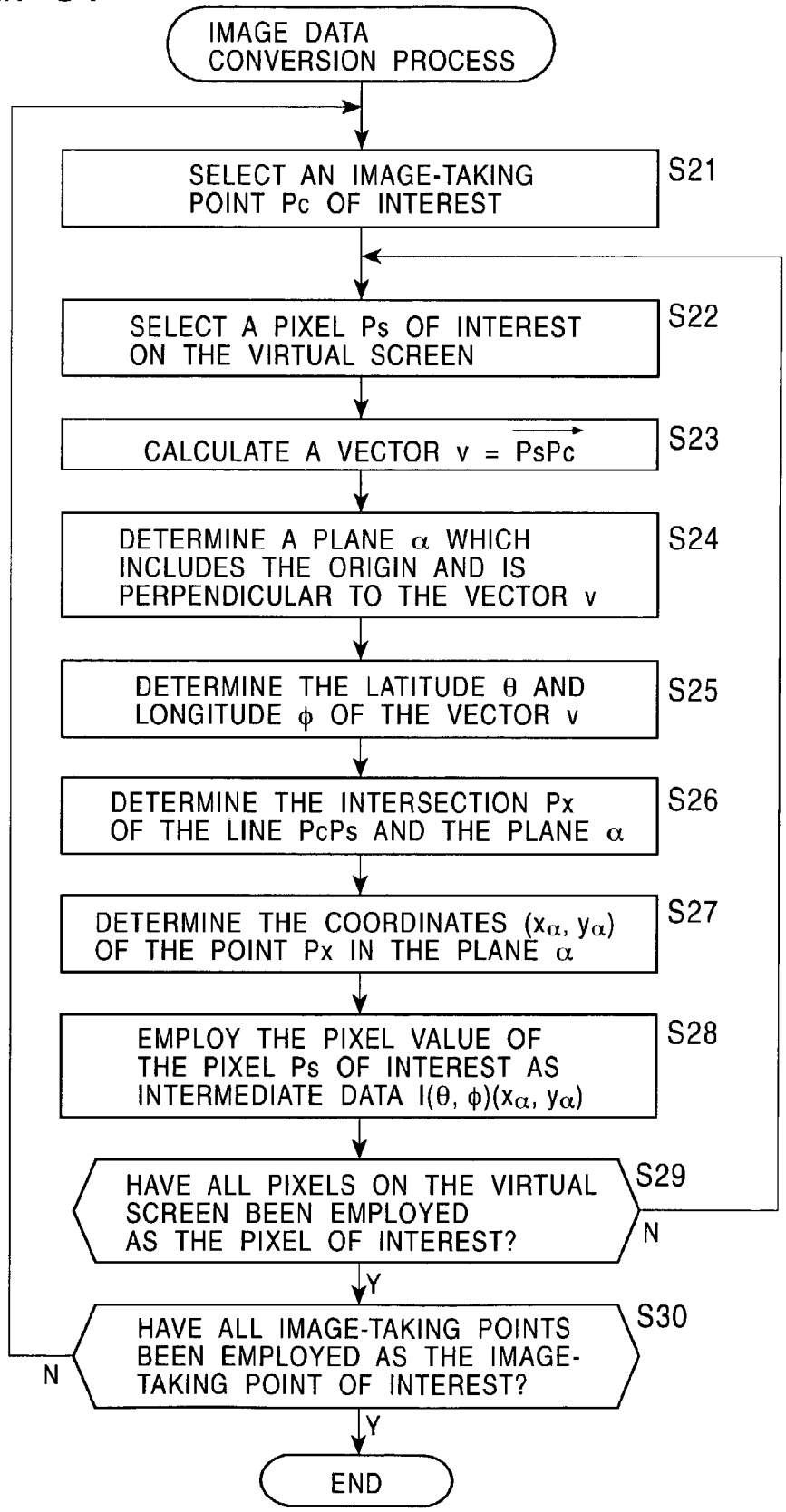
FIG. 51 is a flow chart of an image data conversion process for converting original image data into intermediate image data.

The intermediate image data produced by the image data conversion process shown in FIG. 51 is image data representing the image of the subject which is seen from the infinite point in the direction specified by latitude $\theta$ and longitude $\phi$ and which is displayed on the plane $I(\theta, \phi)$, and the intermediate image data is produced for each value of latitude $\theta$ and longitude $\phi$. Thus, the intermediate image data can be described in a table sectioned by the values of latitude $\theta$ and longitude $\phi$ as shown in FIG. 53A (hereinafter, the table will be referred to as a latitude-longitude table).

In the example shown in FIG. 53A, for each plane $I(\theta, \phi)$ specified by the latitude $\theta$ varying in steps of 1 in the range from $-90°$ to $90°$ and the longitude $\phi$ varying in steps of 1 in the range from $-180°$ to $179°$, image data representing an image of a subject seen from an infinite point is produced and stored in a corresponding field of the latitude-longitude table. Note that the steps in which latitude $\theta$ and longitude $\phi$ are changed are not limited to particular values. The latitude $\theta$ and the longitude $\phi$ may be changed in fixed steps or varying steps. In the case in which the latitude $\theta$ and the longitude $\phi$ are limited to integral numbers as is the case in the above-described example, when the latitude $\theta$ and the longitude $\phi$ are calculated in the image data conversion process shown in FIG. 51, the values are rounded into integral numbers by omitting or raising decimals.

In the latitude-longitude table shown in FIG. 53A, image data representing an image of a subject seen from an infinite point in a direction specified by latitude $\theta$ and longitude $\phi$, produced by orthogonally projecting pixels of original image data onto a plane $I(\theta, \phi)$, is stored in a field corresponding to the latitude $\theta$ and the longitude $\phi$, wherein the image data stored in each field includes pixel values of pixels at projected points with x and y coordinates $x_\alpha$ and $y_\alpha$ in a 2-dimensional coordinate system defined on the plane $I(\theta, \phi)$. More specifically, each field of the latitude-longitude table shown in FIG. 53A has a table (referred to as a pixel value table) sectioned, as shown in FIG. 53B, by values of x and y coordinates $x_\alpha$ and $y_\alpha$ in the 2-dimensional coordinate system defined on the plane $I(\theta, \phi)$, and a pixel value $p(x_\alpha, y_\alpha)$ of a pixel of the original image data orthogonally projected to a point having x and y coordinates $x_\alpha$ and $y_\alpha$ is described in a field, corresponding to the x and y coordinates $x_\alpha$ and $y_\alpha$, of the pixel value table.

In FIG. 53B, $x_1$ and $y_1$ denote smallest values of x and y coordinates of points on the plane $I(\theta, \phi)$ onto which pixels of the original image data are orthogonally projected, and $x_2$ and $y_2$ denote greatest values of x and y coordinates of points on the plane I(θ, φ) onto which pixels of the original image data are orthogonally projected. Although in the example shown in FIG. 53B, the values of x and y coordinates are changed in steps of 1, the step value is not limited to a particular value, as with the step value for latitude θ and longitude φ.

Figure 54:
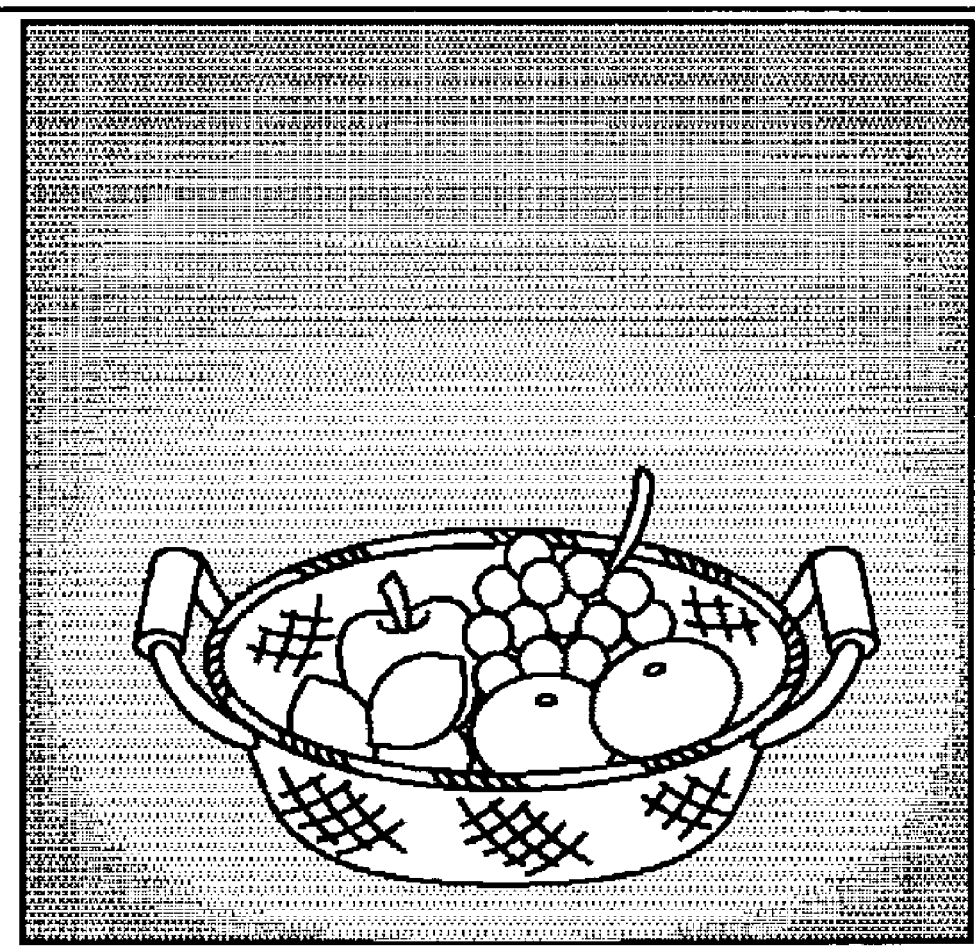
FIG. 54 is a diagram showing image data in the form of intermediate image data.

FIG. 54 shown an example of image data representing an image of a subject seen from an infinite point, described in each field of the latitude-longitude table in FIG. 53A. In the example shown in FIG. 54, the image data represents an image of a subject including fruits placed in a basket.

The image data seen from an infinite point described in each field of the latitude-longitude table shown in FIG. 53A has properties similar to those of image data produced by a camera, and thus image processing (such as edge enhancement or noise reduction) performed using the properties (such as correlation) of image data is also possible for the image data described in each field of the latitude-longitude table shown in FIG. 53A.

Because image data including pixel values described in the pixel value table (FIG. 53B) registered in each field of the latitude-longitude table shown in FIG. 53A is composed of pixel values of pixels orthogonally projected from original image data onto a plane I(θ, φ) specified by latitude θ and longitude φ corresponding to the field, there is a possibility that some pixel values lost depending on the original image data stored in the image database 2.

That is, the range on the plane I(θ, φ) into which the original image data is orthogonally projected (hereinafter, the range will be referred to as an effective range) is defined by the range of x coordinate from $x_1$ to $x_2$ and the range of y coordinate from $y_1$ to $y_2$, and pixels values in this effective range are described in the pixel value table. However, pixels of the original data are not necessarily orthogonally projected to all points on the plane I(θ, φ) (that is, all points having an integral x coordinate value within the range from $x_1$ to $x_2$ and an integral y coordinate value within the range form $y_1$ to $y_2$), but there is a possibility that no pixels are orthogonally projected to some points.

Thus, there is a possibility that no pixel values are assigned to some pixels in the effective range on the plane I(θ, φ). In this case, the image data in the effective range, that is, the image data composed of pixel values described in the pixel value table (FIG. 53B) corresponding to the I(θ, φ) lacks pixel values for some pixels, as shown in FIG. 55A.

Figure 55B:
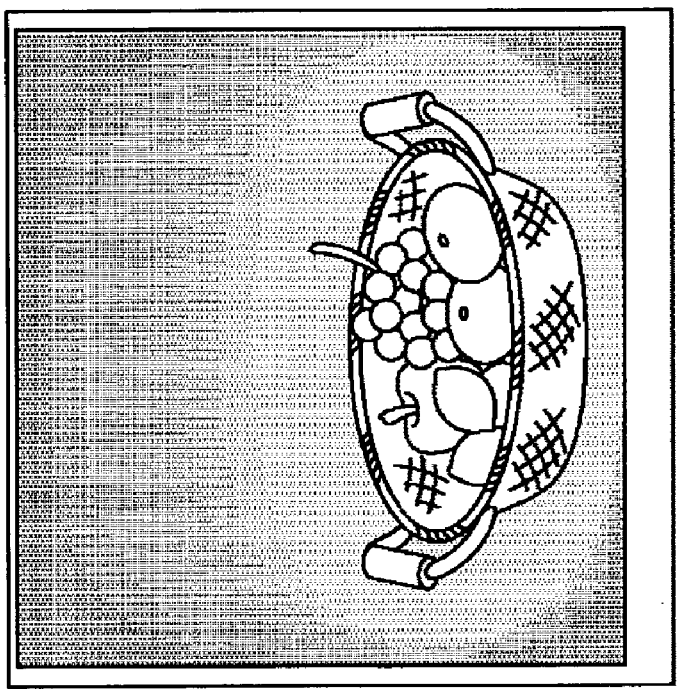
FIG. 55 is a diagram showing interpolation of image data in the form of intermediate image data.
Figure 55A:
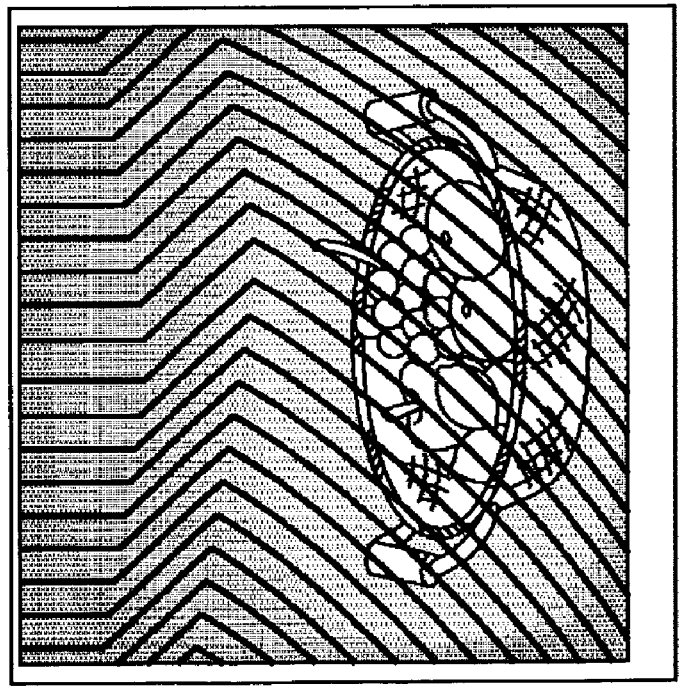

In the example shown in FIG. 55A, no pixel values are assigned to pixels on black stripes.

In a case in which no pixel values are assigned in the effective range on the plane I(θ, φ), that is, in a case in which no pixel values are described in some fields of the pixel value table, the lost pixel values are recovered by means of a pixel value interpolation process. That is, the pixel value table including lacked pixel values shown in FIG. 55A (or the image composed of the pixel values described in the pixel value table shown in FIG. 55A) is converted into a pixel value table having no lacked pixel values such as that shown in FIG. 55B.

The pixel value interpolation process for a pixel value table can be performed, for example, as follows.

When a pixel value I(θ, φ)($x_α$, $y_α$) at a point ($x_α$, $y_α$) in the effective range on the plane I(θ, φ) is lacked, if, in an effective range of a plane I(θ', φ') having a slightly different value of latitude or longitude, there is a pixel value I(θ', φ')($x_α$, $y_α$) at a point with the same coordinates as those of the point ($x_α$, $y_α$), the lacked pixel value I(θ, φ)($x_α$, $y_α$) can be recovered by interpolating the pixel value I(θ', φ')($x_α$, $y_α$) on the plane I(θ', φ').

For example, in a case in which the longitude is limited to integral values, θ' equal to θ±1 or θ±2 can be employed.

The pixel value interpolation process described above may be performed, for example, by the image data conversion unit 31 after completion of the image data conversion process shown in FIG. 51.

Referring to a flow chart shown in FIG. 56, the pixel value interpolation process performed by the image data conversion unit 31 is described below. Herein, for simplicity, it is assumed that the latitude θ, the longitude φ, the x coordinate $x_α$, and the y coordinate $y_α$ in the effective range on the I(θ, φ) take only integral numbers.

In a first step S41 in the pixel value interpolation process, the image data conversion unit 31 initializes parameters θ and φ indicating the latitude and the longitude, respectively, to minimum values −90° and −180° and also initializes parameters $x_α$ and $y_α$ indicating the x coordinate and the y coordinate, respectively, on the plane I(θ, φ) to minimum values $x_1$ and $y_1$.

The process then proceeds to step S42. In step S42, the image data conversion unit 31 determines whether a pixel value is assigned to intermediate image data I(θ, φ)($x_α$, $y_α$).

The determination as to whether a pixel value is assigned to intermediate image data I(θ, φ)($x_α$, $y_α$) can be made, for example, as follows. Before performing the image data conversion process shown in FIG. 51, array parameters I(θ, φ)($x_α$, $y_α$) of the intermediate image data are set to an initial value which cannot be actually taken as pixel values, and, in the image data conversion process, it is determined whether I(θ, φ)($x_α$, $y_α$) still has the initial value.

If it is determined in step S42 that a pixel value is set to the intermediate image data I(θ, φ)($x_α$, $y_α$), that is, the intermediate image data I(θ, φ)($x_α$, $y_α$) does not lack a pixel value, the process jumps to step S45 without performing steps S43 and S44.

On the other hand, if it is determined in step S42 that no pixel value is set to the intermediate image data I(θ, φ)($x_α$, $y_α$), that is, intermediate image data I(θ, φ)($x_α$, $y_α$) does not have its pixel value, the process proceeds to step S43. In step S43, the image data conversion unit 31 retrieves (searches for) a plane I(θ', φ') having a point ($x_α$, $y_α$) to which a pixel value is assigned from those planes having latitude θ' and longitude φ' within the ranges of θ−Δθ<θ'<θ+Δθ and φ−Δφ<φ'<φ+Δφ, where Δθ and Δφ are each small positive integral numbers.

The process then proceeds to step S44. In step S44, the image data conversion unit 31 sets the value (pixel value) of the intermediate image data I(θ', φ')($x_α$, $y_α$) having the value retrieved in step S43 to the intermediate image data I(θ, φ)($x_α$, $y_α$) having no pixel value. Thereafter, the process proceeds to step S45.

If, in step S43, a plurality of planes I(θ', φ') having a point ($x_α$, $y_α$) to which a pixel value is assigned are found from those planes having latitude θ' and longitude φ' within the ranges of θ−Δθ<θ'<θ+Δθ and φ−Δφ<φ'<φ+Δφ, then, in step S44, the image data conversion unit 31 selects, from the planes found, a plane which is, for example, smallest in the sum of the square of the absolute value of a difference in latitude |θ−θ'| and the square of the absolute value of a difference in longitude |φ−φ'|, and sets the value I(θ', φ')($x_α$, $y_α$) on the selected plane to the intermediate image data I(θ, φ)($x_α$, $y_α$).

On the other hand, if, in step S43, no plane I(θ', φ') having a point ($x_α$, $y_α$) to which a pixel value is assigned is found from those planes having latitude θ' and longitude φ' within the ranges of θ−Δθ<θ'<θ+Δθ and φ−Δφ<φ'<φ+Δφ, then, in step S44, the image data conversion unit 31 retrieves a point closest to the point $(x_\alpha, y_\alpha)$ from points having pixel values on the plane $I(\theta, \phi)$ and sets the pixel value of the retrieved point to the point $(x_\alpha, y_\alpha)$.

In the pixel value interpolation process described above, when pixel value are interpolated to points $(x_\alpha, y_\alpha)$ having no pixel values on a plane $I(\theta, \phi)$, there is a possibility that a pixel value at a point is interpolated by an interpolated pixel value. The above problem can be avoided by setting an interpolation flag for an interpolated point to indicate that the point has been interpolated, and inhibiting the interpolated pixel value from being used to interpolate another pixel value (by excluding the interpolated pixel value from those searched in step S43).

In step S45, the image data conversion unit 31 determines whether the parameter $y_\alpha$ indicating the y coordinates on the plane $I(\theta, \phi)$ is equal to the maximum allowable value $y_2$. If it is determined in step S45 that the y coordinate $y_\alpha$ is not equal to the maximum allowable value $y_2$, the process proceeds to step S44. In step S46, the image data conversion unit 31 increments the y coordinate $y_\alpha$ by 1. The process then returns to step S42 to repeat the above-described process.

On the other hand, if it is determined in step S45 that the y coordinate $y_\alpha$ is equal to the maximum allowable value $y_2$, the process proceeds to step S47. In step S47, the image data conversion unit 31 resets the y coordinate value $y_\alpha$ to the minimum allowable value $y_1$, and the process proceeds to step S48.

In step S48, the image data conversion unit 31 determines whether the parameter $x_\alpha$ indicating the x coordinate on the plane $I(\theta, \phi)$ is equal to the maximum allowable value $x_2$. If it is determined in step S48 that the x coordinate $x_\alpha$ is not equal to the maximum allowable value $x_2$, the process proceeds to step S49. In step S49, the image data conversion unit 31 increments the x coordinate $x_\alpha$ by 1. The process then returns to step S42 to repeat the above-described process.

On the other hand, if it is determined in step S48 that that the x coordinate $x_\alpha$ is equal to the maximum allowable value $x_2$, the process proceeds to step S50. In step S50, the image data conversion unit 31 resets the x coordinate value $x_\alpha$ to the minimum allowable value $x_1$, and the process proceeds to step S51.

In step S51, the image data conversion unit 31 determines whether the parameter $\phi$ indicating the longitude is equal to the maximum allowable value 179°. If it is determined in step S51 that the longitude $\phi$ is not equal to the maximum allowable value 179°, the process proceeds to step S52. In step S52, the image data conversion unit 31 increments the longitude $\phi$ by 1. The process then returns to step S42 to repeat the above-described process.

On the other hand, if it is determined in step S51 that the longitude $\phi$ is equal to the maximum allowable value 179', the process proceeds to step S53. In step S53, the image data conversion unit 31 resets the longitude $\phi$ to the minimum allowable value −180°. Thereafter, the process proceeds to step S54.

In step S54, the image data conversion unit 31 determines whether the parameter $\theta$ indicating the latitude is equal to the maximum allowable value 90°. If it is determined in step S54 the latitude $\theta$ is not equal to the maximum allowable value 90°, the process proceeds to step S55. In step S55, the image data conversion unit 31 increments the latitude $\theta$ by 1. The process then returns to step S42 to repeat the above-described process.

On the other hand, if it is determined in step S54 that the latitude $\theta$ is equal to the maximum allowable value 90°, the process is ended.

Although in the embodiment described above, the pixel value interpolation process is performed by the image data conversion unit 31, the pixel value interpolation process may be performed by another unit such as the intermediate image data conversion unit 32 (FIG. 29) after completion of the image data conversion process shown in FIG. 51.

Figure 56:
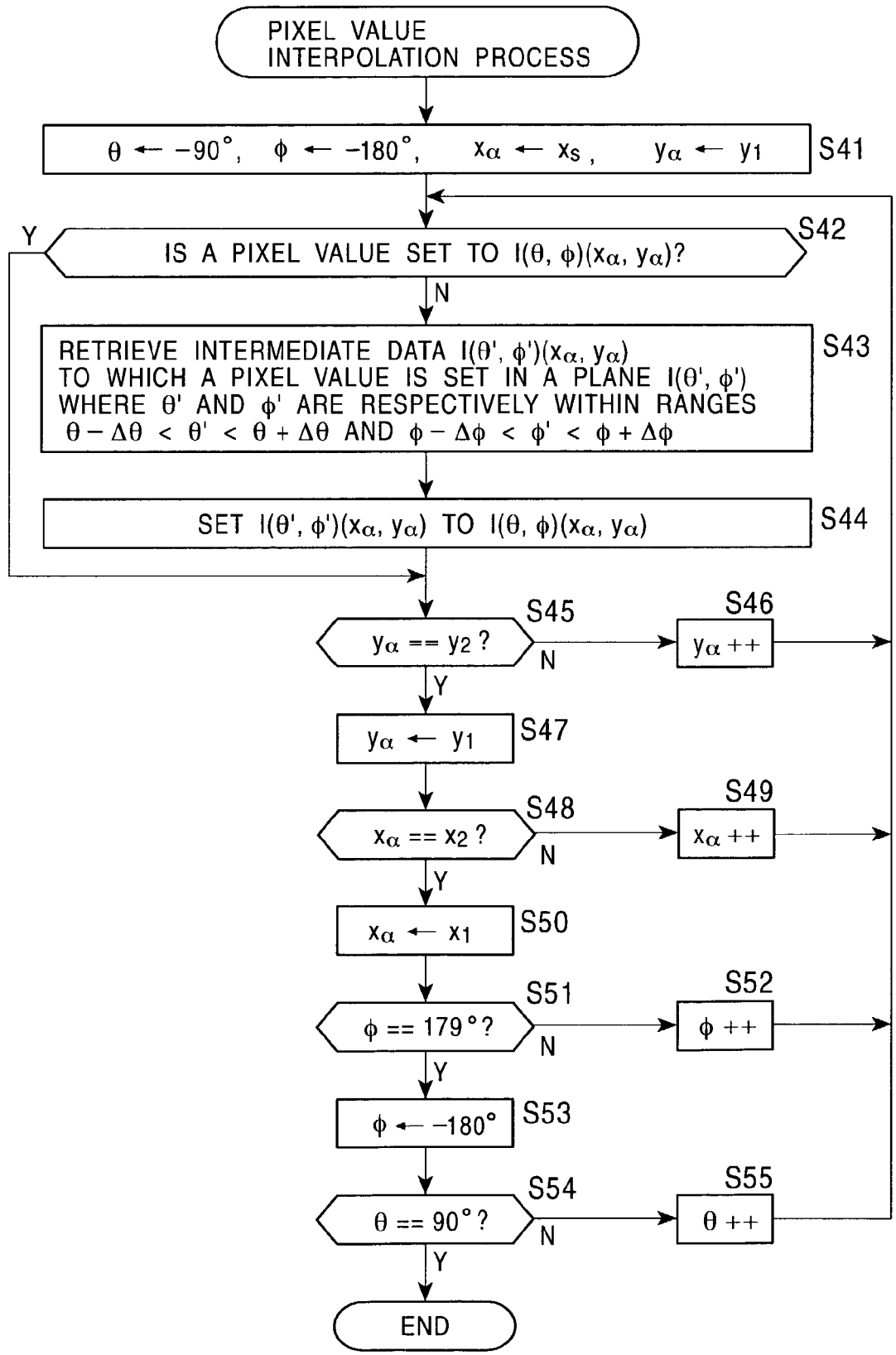
FIG. 56 is a flow chart showing a pixel value interpolation process for interpolating image data in the form of intermediate image data.

In the pixel value interpolation process shown in FIG. 56, the interpolation is performed in such a manner that a pixel value assigned to a certain point is directly used as a pixel value of another point having no pixel value. The pixel values of image data obtained by such a pixel interpolation process are not equal to true pixel values of the image data formed on the plane $I(\theta, \phi)$.

It is desirable that pixel values of image data should be as close to true values as possible, even though they are not equal to true values.

For example, a classification and adaptation process, which has been proposed by the present applicant for the invention, may be used to convert the image data produced by the pixel value interpolation process shown in FIG. 56 into image data having values closer to real values.

The classification and adaptation process includes a classification process and an adaptation process. In the classification process, data is classified according to the properties of the data. Thereafter, an adaptation process is performed for each class.

In the adaptation process, for example, an image with low image quality (hereinafter, referred to as a low-quality image) is converted into an image with high image quality (hereinafter, referred to as a high-quality image), as described below.

The image data produced by the pixel value interpolation process shown in FIG. 56 can be regarded as a low-quality image relative to a true-value image, and the true-value image can be regarded as a high-quality image relative to the image data produced by the pixel value interpolation process shown in FIG. 56.

In the adaptation process, improved pixel values are predicted by calculating linear combinations of pixels a low-quality image (hereinafter, referred to as low-quality pixels) and particular tap coefficients, thereby producing a high-quality image having improved pixel values.

More specifically, for example, high-quality image data to be used as teacher data is prepared, and low-quality image data to be used as student data is produced by degrading the high-quality image data. High-quality image data is produced from the low-quality image data by predicting a pixel value E[y] for the pixel value y of each pixel of the high-quality image data (hereinafter, such a pixel will be referred to as a high-quality pixel) using a linear combination a certain number of pixel values $x_1, x_2, \ldots$ of the low-quality pixels and particular tap coefficients $w_1, w_2, \ldots$, wherein the predicted value E[y] is given by the following equation.

$$E[y] = w_1 x_1 + w_2 x_2 + \ldots \qquad (50)$$

To generalize the expression in equation (50), a matrix W of sets of tap coefficient $w_j$, a matrix X of sets of student data $x_{ij}$, and a matrix Y' of sets of predicted values $E[y_j]$ are defined as follows.

$$X = \begin{pmatrix} X_{11} & X_{12} & \cdots & X_{1J} \\ X_{21} & X_{22} & \cdots & X_{2J} \\ \cdots & \cdots & \cdots & \cdots \\ X_{I1} & X_{I2} & \cdots & X_{IJ} \end{pmatrix} \qquad (51)$$

$$W = \begin{pmatrix} w_1 \\ w_2 \\ \cdots \\ w_J \end{pmatrix}, Y' = \begin{pmatrix} E[y_1] \\ E[y_2] \\ \cdots \\ E[y_I] \end{pmatrix}$$

Thus, an observation equation is obtained as follows.

$$XW = Y' \quad (52)$$

Herein, an element $x_{ij}$ of the matrix X is jth student data in a ith set of student data (a set of student data used to predict ith teacher data $y_i$), and an element $w_j$ of the matrix W is a tap coefficient to be multiplied by the jth student data in the ith set of student data. Furthermore, $y_i$ denotes ith teacher data, and thus $E[y_i]$ denotes a predicted value for the ith teacher data. In equation (50), y on the left-hand side is an abbreviated expression of an element $y_i$ of the matrix Y, and $x_1, x_2, \ldots$, and so on are abbreviated expressions of elements $x_{ij}$ of the matrix X wherein suffix i is omitted.

By applying the least square method to the observation equation (52), predicted values E[y] close to the high-quality pixel values y are determined as described below. First, a matrix Y of a set of true pixel values y of the high-quality pixels used as the teacher data, and a matrix E of a set of residuals e of the predicted values E[y] relative to the pixel values y of the high-quality pixels are defined as follows.

$$E = \begin{pmatrix} e_1 \\ e_2 \\ \cdots \\ e_I \end{pmatrix}, Y = \begin{pmatrix} y_1 \\ y_2 \\ \cdots \\ y_I \end{pmatrix} \quad (53)$$

From equation (52), a residual equation is obtained as follows.

$$XW = Y + E \quad (54)$$

In the least square method, the sum of square errors given by the following equation is used as a measure of goodness of the tap coefficients $w_j$ used in the calculation of the predicted values E[y] close to the pixel values y of the high-quality pixels.

$$\sum_{i=1}^{I} e_i^2 \quad (55)$$

The tap coefficients $w_j$ used in the calculation of the predicted values E[y] close to the pixel values y of the high-quality image data can be obtained by minimizing the sum of square errors given by equation (55).

That is, when the derivative of the sum of square errors in equation (55) with respect to the tap coefficients $w_j$ is equal to 0, that is, when the tap coefficients $w_j$ satisfy the following equation, the tap coefficients $w_j$ have optimum values which result in best predicted values E[y] close to the pixel values y of the high-quality image data.

$$e_1 \frac{\partial e_1}{\partial w_j} + e_2 \frac{\partial e_1}{\partial w_j} + \ldots + e_I \frac{\partial e_I}{\partial w_j} = 0 \quad (j = 1, 2, \ldots, J) \quad (56)$$

By differentiating equation (54) with respect to the tap coefficient $w_j$, the following equation is obtained.

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \quad (57)$$

From equations (56) and (57), the following equation is obtained.

$$\sum_{i=1}^{I} e_i x_{i1} = 0, \sum_{i=1}^{I} e_i x_{i2} = 0, \ldots \sum_{i=1}^{I} e_i x_{iJ} = 0 \quad (58)$$

By taking into account the relationship among the student data $x_{ij}$, the tap coefficient $w_j$, the teacher data $y_i$, and the residuals (errors) are given by equation (54), a normal equation is obtained from equation (58) as follows.

$$\begin{cases} \left(\sum_{i=1}^{I} x_{i1} x_{i1}\right) w_1 + \left(\sum_{i=1}^{I} x_{i1} x_{i2}\right) w_2 + \ldots + \left(\sum_{i=1}^{I} x_{i1} x_{iJ}\right) w_J = \left(\sum_{i=1}^{I} x_{i1} y_i\right) \\ \left(\sum_{i=1}^{I} x_{i2} x_{i1}\right) w_1 + \left(\sum_{i=1}^{I} x_{i2} x_{i2}\right) w_2 + \ldots + \left(\sum_{i=1}^{I} x_{i2} x_{iJ}\right) w_J = \left(\sum_{i=1}^{I} x_{i2} y_i\right) \\ \cdots \\ \left(\sum_{i=1}^{I} x_{iJ} x_{i1}\right) w_1 + \left(\sum_{i=1}^{I} x_{iJ} x_{i2}\right) w_2 + \ldots + \left(\sum_{i=1}^{I} x_{iJ} x_{iJ}\right) w_J = \left(\sum_{i=1}^{I} x_{iJ} y_i\right) \end{cases} \quad (59)$$

Using the vector W defined by equation (51), a matrix (co-variance matrix) A and a vector v are defined as follows.

$$A = \begin{pmatrix} \sum_{i=1}^{I} x_{i1} x_{i1} & \sum_{i=1}^{I} x_{i1} x_{i2} & \cdots & \sum_{i=1}^{I} x_{i1} x_{iJ} \\ \sum_{i=1}^{I} x_{i2} x_{i1} & \sum_{i=1}^{I} x_{i2} x_{i2} & \cdots & \sum_{i=1}^{I} x_{i2} x_{iJ} \\ \sum_{i=1}^{I} x_{iJ} x_{i1} & \sum_{i=1}^{I} x_{iJ} x_{i2} & \cdots & \sum_{i=1}^{I} x_{iJ} x_{iJ} \end{pmatrix} \quad (60)$$

$$v = \begin{pmatrix} \sum_{i=1}^{I} x_{i1} y_i \\ \sum_{i=1}^{I} x_{i2} y_i \\ \vdots \\ \sum_{i=1}^{I} x_{iJ} y_i \end{pmatrix}$$

Thus, the normal equation (59) can be rewritten as follows.

$$AW = v \quad (61)$$

By preparing a sufficient number of sets of student data $x_{ij}$ and sets of teacher data $y_i$, it is possible to provide as many normal equations (61) equivalent to (59) as there are tap coefficients $w_j$ (as many as the number of j) to be determined. Thus, by solving equation (61) with respect to the vector W, it is possible to obtain optimum tap coefficients $w_j$ (note that equation (61) can be solved when the matrix A in equation (61) is regular). Equation (61) can be resolved by means of, for example, the sweeping out method (Gauss-Jordan elimination method).

In the adaptation process, as described above, learning for determining optimum tap coefficients $w_j$ is performed using student data and teacher data, and predicted values E[y] close to the teacher data y are determined using the optimum tap coefficients $w_j$ in accordance with equation (50) The adaptation process is different from the simple interpolation in that components which are not included in low-quality image data but included in high-quality image data are reproduced. When only equation (50) is viewed, the adaptation process looks like a simple interpolation process using an interpolation filter. However, in the adaptation process, unlike the simple interpolation, the tap coefficients w corresponding to the tap coefficients of the interpolation filter are optimized through the learning process using the teacher data y, and thus it is possible to reproduce components included in high-quality image data. In this sense, the adaptation process can be said to be capable of creative an image.

Figure 57:
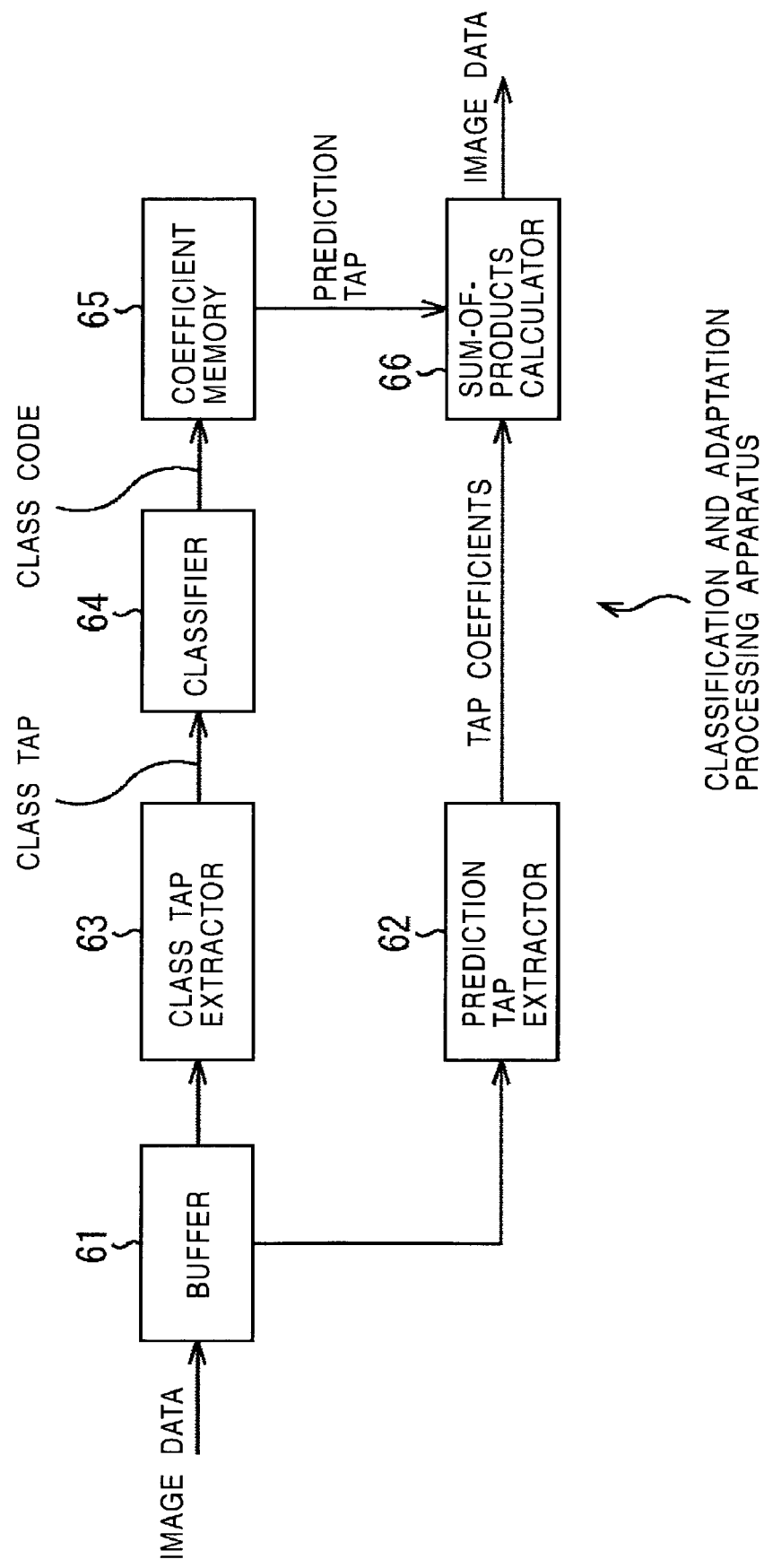
FIG. 57 is a block diagram showing an example of a construction of a classification and adaptation processing apparatus for performing a classification and adaptation process.

FIG. 57 is a block diagram showing an example of a construction of a classification and adaptation processing apparatus for performing a classification and adaptation process.

The classification and adaptation apparatus may be disposed, for example, in the image data conversion unit 31 or the intermediate image data conversion unit 32 shown in FIG. 29, and may be used to perform the classification and adaptation process on intermediate image data subjected to the pixel value interpolation process shown in FIG. 56. Alternatively, the classification and adaptation apparatus may be disposed separately from the image data conversion unit 31 and the intermediate image data conversion unit 32 shown in FIG. 29, and may be used to perform the classification and adaptation process on intermediate image data which is stored in the intermediate image database 3 after being subjected to the pixel value interpolation process shown in FIG. 56.

Intermediate image data subjected to the pixel value interpolation process (hereinafter, referred to as interpolated intermediate image data), that is, low-quality image data is supplied to a buffer 61 and temporarily stored therein.

A prediction tap extractor 62 selects a pixel as a pixel of interest, one by one, from high-quality image data having true pixel values for intermediate image data, to be determined by a sum-of-products calculator 66 described later. Furthermore, the prediction tap extractor 62 extracts pixels (low-quality pixels) used in prediction of the pixel of interest, from the low-quality image data stored in the buffer 61 to employ them as prediction tap s.

More specifically, the prediction tap extractor 62 reads, from the buffer 61, pixel values of some low-quality pixels at locations close to the location of the pixel of interest and employs them as prediction tap s.

If the prediction tap for the pixel of interest are acquired, the prediction tap extractor 62 supplies them to the sum-of-products calculator 66.

In the above process, the prediction tap extractor 62 may extract, as prediction taps, some low-quality pixels at locations close to the location of the pixel of interest from the pixels, in the plane $I(\theta, \phi)$, of the intermediate image data used as the low-quality image data corresponding to the pixel of interest. The prediction tap extractor 62 may also extract, as prediction taps, some low-quality pixels at locations close to the location of the pixel of interest from the pixels in a plane $I(\theta', \phi')$ which is slightly different in latitude and/or longitude from the plane $I(\theta, \phi)$.

Meanwhile, a class tap extractor 63 extracts, from the buffer 61, low-quality pixels to be used in classifying the pixel of interest into one of classes and employs them as class taps.

Herein, for simplicity, the prediction taps extracted by the prediction tap extractor 62 and the class taps extracted by the class tap extractor 63 are assumed to have the same tap structure, although the prediction taps and the class taps may have independent (different) tap structures.

The class taps extracted by the class tap extractor 63 for the pixel of interest are supplied to a classifier 64. The classifier 64 classifies the pixel of interest on the basis of the class taps received from the class tap extractor 63 and outputs a class code indicating the determined class.

The classification may be performed, for example, in accordance with an ADRC (Adaptive Dynamic Range Coding) algorithm.

In the case in which the ADRC algorithm is used, pixel values of pixels extracted as class taps are subjected to the ADRC processing, and the class of the pixel of interest is determined in accordance with a ADRC code obtained via the ADRC processing.

In a case in which K-bit ADRC is employed, the maximum value MAX and the minimum value MIN of the pixel values of pixels extracted as class taps are detected, and the local dynamic range of the set of pixels is determined as DR=MAX−MIN. The pixel values of the class taps are then requantized into values expressed in K bits in accordance with the dynamic range DR. That is, the minimum value MIN is extracted from the pixel values of pixel of the class taps, and the resultant respective values are divided (quantized) by $DR/2^K$. The resultant K-bit pixel values of pixels of the class taps are arranged in a predetermined order into a bit string, and the resultant bit string is output as a ADRC code. For example, in a case in which 1-bit ADRC is employed, the minimum value MIN is subtracted from the pixel values of respective pixels of class taps, and the resultant values are divided by the difference between the maximum value MAX and the minimum value MIN, thereby converting the respective pixel values into 1-bit values (two-level values). The resultant 1-bit pixel values are then arranged in the predetermined order into a bit string, and the result is output as a ADRC code.

Alternatively, the classifier 64 may directly output a level distribution pattern of pixel values of pixels of class taps as a class code. In this case, when class taps include pixel values of N pixels each represented in K bits, a class code output from the classifier 64 is selected from as many class codes as $(2^N)^K$, which is very huge.

Thus, it is desirable that the classifier 64 perform classification after reducing the amount of information of class taps by means of the ADRC processing or vector quantization.

The class code output by the classifier 64 is supplied as an address to a coefficient memory 65.

In the coefficient memory 65, tap coefficients produced via a learning process performed by a learning apparatus described later are stored. In response to receiving the class code from the classifier 64, the coefficient memory 65 outputs tap coefficients stored at an address corresponding to the received class code and supplies them to the sum-of-products calculator 66.

If the sum-of-products calculator 66 acquires the prediction taps output by the prediction tap extractor 62 and the tap coefficients output by the coefficient memory 65, the sum-of-products calculator 66 performs a linear prediction (calculation of the sum of products) using the acquired prediction taps and tap coefficients in accordance with equation (50) and outputs the result as a high-quality pixel value for the pixel of interest.

Figure 58:
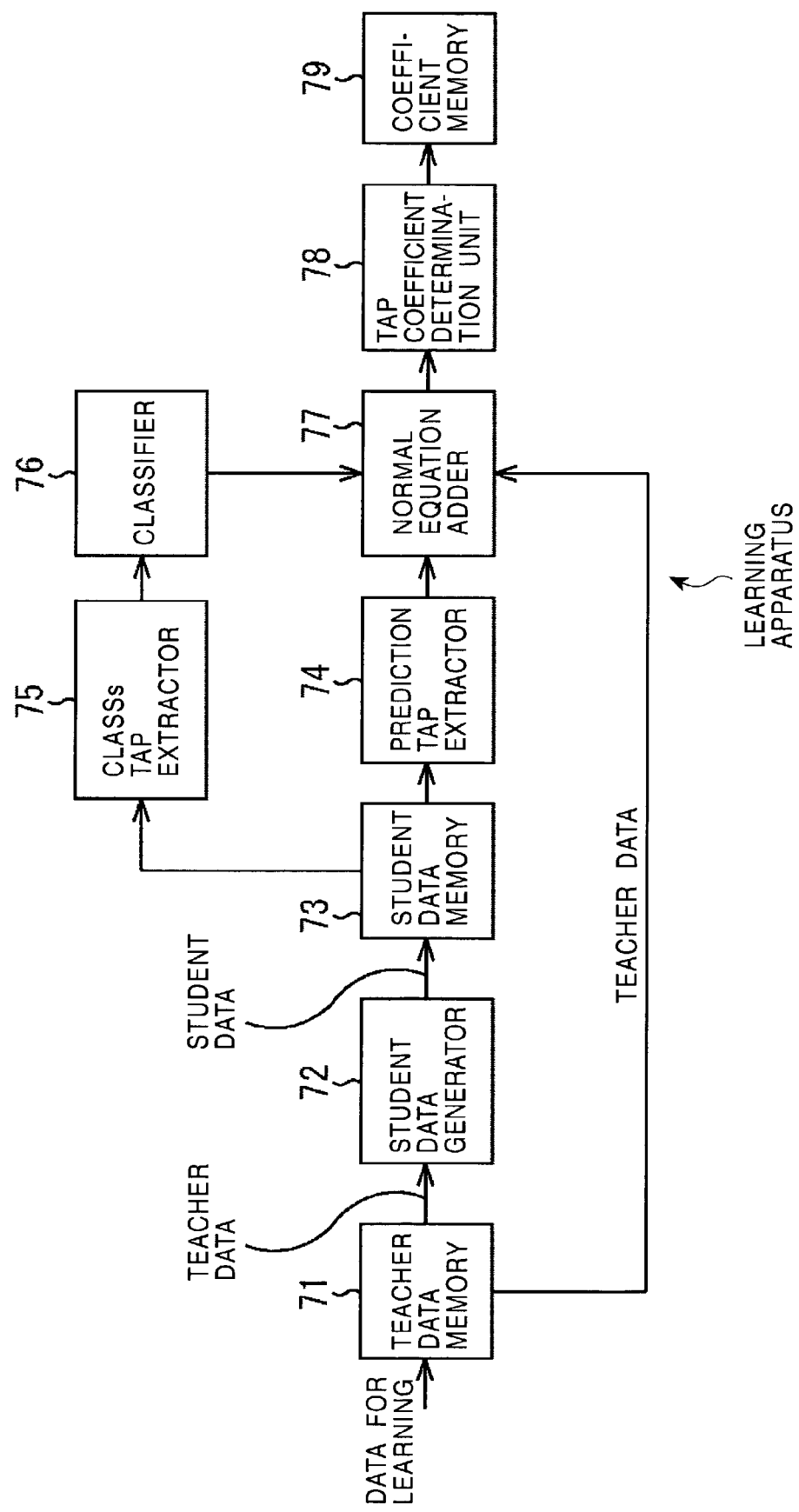
FIG. 58 is a block diagram showing an example of a construction of a learning apparatus for learning tap coefficients used in the classification and adaptation process.

FIG. 58 shows an embodiment of the learning apparatus for performing learning associated with tap coefficients to be stored in the coefficient memory 65 shown in FIG. 57.

Data used in learning is supplied to a teacher data memory 71. As for the data for learning, for example, high-quality intermediate image data having true values may be employed. For example, intermediate image data having no lacked pixels is produced by performing the image data conversion process shown in FIG. 51 on image data produced by taking images from a large number of viewpoints, and the produced intermediate image data is used as data for learning.

The teacher data memory 71 stores the high-quality image data supplied as the teacher data. A student data generator 72 produces student data used as a student in learning process, from the teacher data stored in the teacher data memory 71.

More specifically, the student data generator 72 removes some pixel values from the image data stored as the teacher data in the teacher data memory 71 and performs the pixel value interpolation process shown in FIG. 56 on the resultant image data lacking some pixel values. The student data generator 72 outputs the resultant low-quality image data obtained through the pixel value interpolation process and supplies it as student data to the student data memory 73. The student data memory 73 stores the received student data.

If the student data is produced from the teacher data stored in the teacher data memory 71 and is stored in the student data memory 73, the prediction tap extractor 74 selects a pixel of interest one by one from the teacher data stored in the teacher data memory 71. The prediction tap extractor 74 then extracts student data, to be used in prediction associated with the pixel of interest, from the student data memory 73 and forms prediction taps having the same tap structure as the prediction taps formed by the prediction tap extractor 62 shown in FIG. 57.

The prediction taps extracted by the prediction tap extractor 74 are supplied to a normal equation adder 77.

Meanwhile, the class tap extractor 75 extracts student data to be used in classification of the pixel of interest from the student data memory 73, and forms class taps having the same structure as the class taps extracted by the class tap extractor 63 shown in FIG. 57. The resultant class taps are supplied to the classifier 76.

If the classifier 76 receives the class taps associated with the pixel of interest from the class tap extractor 75, the classifier 76 performs the classification process similar to that performed by the classifier 64 shown in FIG. 57, and supplies a class code indicating a class of the pixel of interest to the normal equation adder 77.

The normal equation adder 77 reads teacher data of the pixel of interest from the teacher data memory 71 and adds the student data supplied as the prediction taps from the prediction tap extractor 74 and the teacher data of the pixel of interest, for each class supplied from the classifier 76.

More specifically, the normal equation adder 77 calculates the products between student data $(x_{in}x_{im})$ in each component of the matrix A in equation (60) and further calculates the sum of the products, using the prediction taps (student data) for each class corresponding to the class code supplied from the classifier 76.

Furthermore, the normal equation adder 77 calculates the products of student data and teacher data $(x_{in}y_i)$ in each component of the vector v in equation (60) and then calculates the sum of the products, using the prediction taps (student data) and the pixel of interest (teacher data) for each class corresponding to the class code supplied from the classifier 76.

The normal equation adder 77 performs the adding operation for all teacher data read as the pixel of interest from the teacher data memory 71, to produce a normal equation as shown in equation (61) for each class.

Thereafter, the tap coefficient determination unit 78 determines tap coefficients for each class by solving the normal equation produced for each class by the normal equation adder 77 and supplies the resultant tap coefficients to the coefficient memory 79, at an address corresponding to each class. As a result, the tap coefficients for each class supplied from the tap coefficient determination unit 78 are stored in the coefficient memory 79.

In the format of intermediate image data shown in FIG. 53, for each direction (specified by latitude θ and longitude φ) of a light ray incident on a pixel of original image data, a plane perpendicular to that direction is imagined, and pixel values corresponding to light rays incident at a right angle on respective points in that plane are represented in intermediate image data. Alternatively, intermediate image data may also be expressed, for example, in a format shown in FIG. 59.

In the format shown in FIG. 53, intermediate image data is represented by a latitude-longitude table (FIG. 53A) sectioned according to the values of latitude θ and longitude φ, wherein each field of the latitude-longitude table has a pixel value table in which pixel values of pixels projected from the original image data onto a plane I(θ, φ) defined by latitude θ and longitude φ corresponding to that field are described in the form of an array of x and y coordinates $x_\alpha$ and $y_\alpha$ in a 2-dimensional coordinate system defined on that plane I(θ, φ).

On the other hand, in the format of intermediate image data shown in FIG. 59, for each point in a plane perpendicular to the direction of a light ray incident on a pixel of original image data, pixel values corresponding to respective directions of light rays are described.

That is, in the format shown in FIG. 59, intermediate image data is represented, as shown in FIG. 59A, by a table (referred to as a coordinate table) sectioned according to the values of x and y coordinates $x_\alpha$ and $y_\alpha$ in a 2-dimensional coordinate system defined on a plane I(θ, φ) onto which pixel values of pixels of original image data are orthogonally projected, wherein each field of the coordinate table has a table (also referred to as a pixel value table) in which pixel values of pixels projected from the original image data onto a point defined by x and y coordinates $x_\alpha$ and $y_\alpha$ corresponding to that field are described, as shown in FIG. 59B, in the form of an array of latitude θ and longitude φ each defining a plane I(θ, φ) onto which pixel values of the original image data are orthogonally projected.

In the format shown in FIG. 59, pixel values of original image data orthogonally projected onto a point having the same coordinates in planes defined by respective values of latitude θ and longitude φ are described in each field of the coordinate table, and thus this format is more convenient for use in the pixel value interpolation process shown in FIG. 56 than the format shown in FIG. 53.

That is, in the pixel value interpolation process shown in FIG. 56, when a pixel value I(θ, φ)($x_\alpha$, $y_\alpha$) at a point ($x_\alpha$, $y_\alpha$) on the plane I(θ, φ) is lacked, the lacked pixel value I(θ, φ)($x_\alpha$, $y_\alpha$) is interpolated by a pixel value I(θ', φ')($x_\alpha$, $y_\alpha$) at a point which has the same coordinates as the point ($x_\alpha$, $y_\alpha$) but which is in a plane I(θ', φ') slightly shifted in latitude and/or longitude from the plane I(θ, φ).

When intermediate image data expressed in the format shown in FIG. 53 is used in the pixel value interpolation process, it is required to search the latitude-longitude table (FIG. 53A) to detect a pixel value I(θ', φ')($x_\alpha$, $y_\alpha$) corresponding to a plane $I(\theta', \phi')$ described in a field different from the field corresponding to the plane $I(\theta, \phi)$ lacking the pixel value $I(\theta, \phi)(x_\alpha, y_\alpha)$.

On the other hand, in the case of intermediate image data expressed in the format shown in FIG. 59, pixel values at a point having the same coordinates $(x_\alpha, y_\alpha)$ in planes having respective values of latitude $\theta$ and longitude $\phi$ are described in one field of the coordinate table (FIG. 59A), and thus, in the pixel value interpolation process, a pixel value $I(\theta', \phi')(x_\alpha, y_\alpha)$ can be directly read from the same field as that corresponding to the point $(x_\alpha, y_\alpha)$ in the plane $I(\theta, \phi)$ lacking the pixel value. That is, when the format shown in FIG. 59 is used, it is not needed to examine different fields of the coordinate table (FIG. 59A) other than the field corresponding to the point $(x_\alpha, y_\alpha)$ in the plane $I(\theta, \phi)$ lacking the pixel value.

Referring to a flow chart shown in FIG. 60 and referring to FIG. 61, the intermediate image data conversion process performed in step S3 shown in FIG. 30 by the intermediate image data conversion unit 32 shown in FIG. 29, that is, the process of converting intermediate image data into image data (presentation image data) representing an image seen from a viewpoint of a user is described below.

Figure 61:
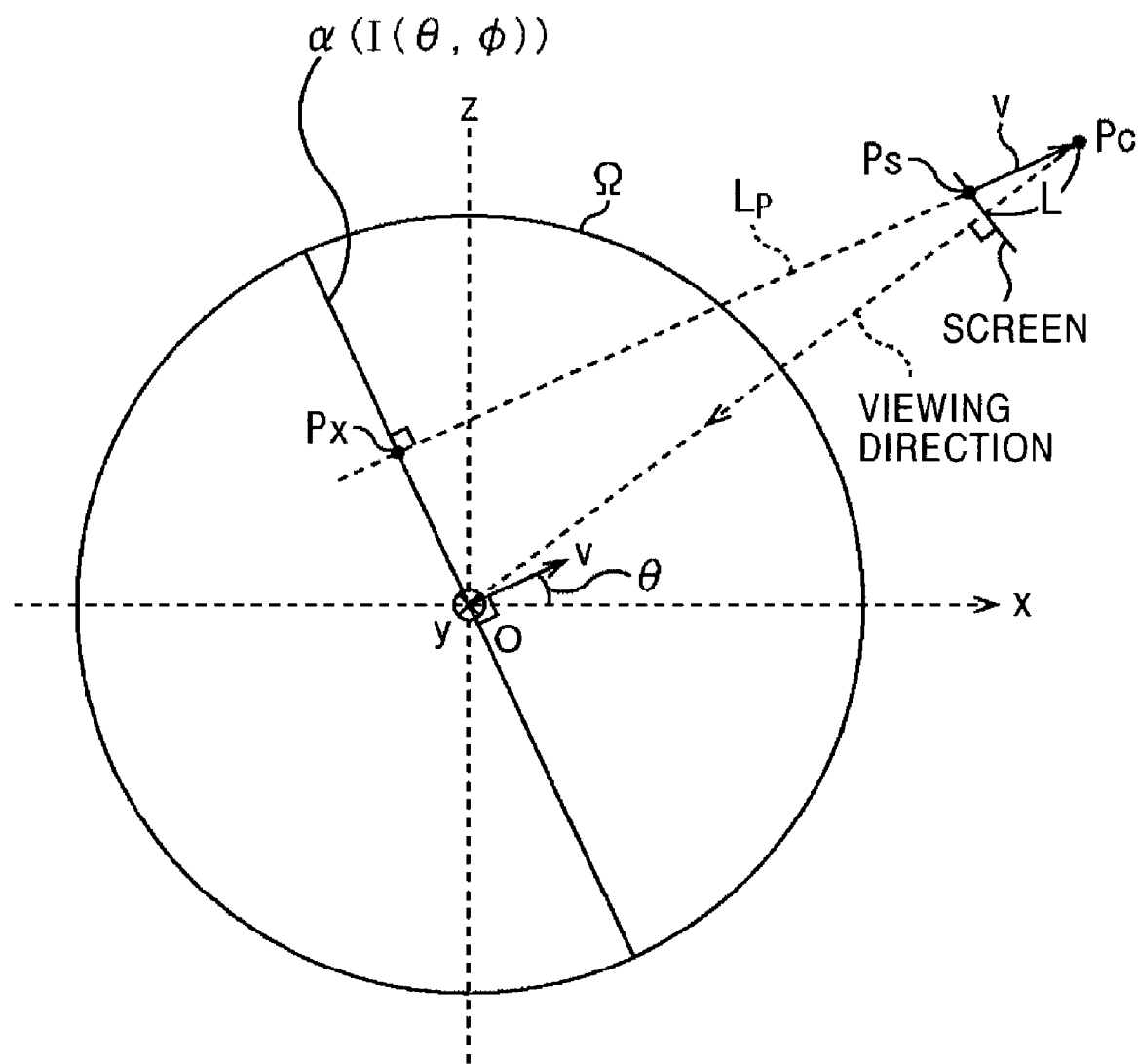
FIG. 61 is a diagram showing the intermediate image data conversion process for converting intermediate image data into image data to be displayed.

First in step S61, for the user's viewpoint $P_x$ set in step S2 in FIG. 30, the intermediate image data conversion unit 32 sets a rectangular plane perpendicular to an user's viewing direction as a virtual screen at a location a particular distance L apart from an user's viewpoint $P_c$ in the same direction as the viewing direction as shown in FIG. 61.

In the present embodiment, it is assumed, for simplicity, that the image data conversion process described earlier with reference to FIG. 51 is performed using an image taking coordinate system whose origin is set at a certain point (such as the center of gravity) of a subject.

In the intermediate image data conversion process, a 3-dimensional coordinate system used in displaying an image on the display 6 (FIG. 26) depending on the user's viewpoint is defined. Hereinafter, this 3-dimensional coordinate system is referred to as a display coordinate system. The origin of the display coordinate system is assumed to be set at the center of the screen (at the intersection point of diagonal lines of the screen) of the display 6. Furthermore, the line of sight of the user is assumed in a direction from the viewpoint $P_c$ to the origin of the display coordinate system.

In the next step S62, the intermediate image data conversion unit 32 selects a pixel which has not yet been employed as a pixel of interest $P_s$ from the pixels on the virtual screen set for the user's viewpoint $P_c$ and employs the selected pixel as the pixel of interest.

After completion of step S62, the process proceeds to step S63. In step S63, the intermediate image data conversion unit 32 determines a vector v starting from the pixel of interest $P_s$ and ending at the user's viewpoint Pc. Thereafter, the process proceeds to step S64.

In the example shown in FIG. 61, the vector v lies in the xz plane in the display coordinate system and has a direction with an angle $\theta$ from the xy plane to the z axis. That is, in the specific example shown in FIG. 61, the vector v points in the direction with latitude of $\theta$ and longitude of 0.

Although in the example shown in FIG. 61, the user's viewing direction points to the origin of the display coordinate system from the user's viewpoint $P_c$ as described above, the user's viewing direction is not necessarily needed to point to the origin of the display coordinate system, as long as the user's viewing direction can be detected.

Furthermore, in FIG. 61, as in FIG. 52, the subject is enclosed in a closed spherical surface serving as the curved surface $\Omega$.

In step S64, the intermediate image data conversion unit 32 determines a plane $\alpha$ which is perpendicular to the vector v and which contains a predetermined point (the origin, for example) in the display coordinate system. Thereafter, the process proceeds to step S65.

Note that the plane $\alpha$ is not necessarily needed to contain the origin.

In step S65, the intermediate image data conversion unit 32 determines the latitude $\theta$ and the longitude $\phi$ of the vector v determined in step S63, wherein the latitude $\theta$ is an angle made by the vector v and the xy plane, and the longitude $\phi$ is an angle made by the vector v and the xz plane, and the process proceeds to step S66.

Herein, the latitude $\theta$ and the longitude $\phi$ of the vector v are identical to the latitude $\theta$ and the longitude $\phi$ of the normal of the plane $\alpha$ determined in step S64. This means that the plane $\alpha$ containing the origin selected as the predetermined point can be specified by the latitude $\theta$ and the longitude $\phi$. Thus, hereinafter, the plane $\alpha$ specified by latitude $\theta$ and the longitude $\phi$ will also be expressed as plane $I(\theta, \phi)$, as in the image data conversion process described earlier.

In step S66, as shown in FIG. 61, the intermediate image data conversion unit 32 determines a line $L_p$ that links an user's viewpoint $P_c$ and the pixel of interest Ps. Furthermore, in this step S66, the intermediate image data conversion unit 32 determines the intersection point $P_x$ of the line $L_p$ and the plane $\alpha$ ($I(\theta, \phi)$) determined in step S64. The process then proceeds to step S67. In step S67, the intermediate image data conversion unit 32 determines the coordinates $(x_\alpha, y_\alpha)$ of the point $P_x$ on the plane $\alpha$.

The coordinates $(x_\alpha, y_\alpha)$ of the point $P_x$ in the plane $\alpha$ can be determined in a similar manner as in step S27 in FIG. 51.

In a case in which the user's viewing direction from the user's viewpoint $P_c$ does not point to the origin of the display coordinate system, it is needed to offset the coordinates $(x_\alpha, y_\alpha)$ of the point $P_x$ by amounts corresponding to the coordinates, expressed in the 2-dimensional coordinates system on the plane $\alpha$, of the intersection point between the line of sight and the plane $\alpha$, as in step S27 in FIG. 51.

The process then proceeds to step S68. In step S68, the intermediate image data conversion unit 32 assigns, to the pixel of interest $P_s$ on the virtual screen, a pixel value equal to the pixel value of the pixel at the point $P_x$ in the plane $\alpha$, More specifically, when the plane $\alpha$ is a plane $I(\theta, \phi)$ specified by latitude $\theta$ and longitude $\phi$ and the coordinates of the point $P_x$ in the plane $\alpha$ are $(x_\alpha, y_\alpha)$ the intermediate image data conversion unit 32 reads a pixel value $I(\theta, \phi)(x_\alpha, y_\alpha)$ from the intermediate image database and employs the pixel value $I(\theta, \phi)(x_\alpha, y_\alpha)$ as the pixel value of the pixel of interest Ps.

The process then proceeds to step S69. In step S69, the intermediate image data conversion unit 32 determines whether all pixels on the virtual screen set for the user's viewpoint $P_c$ have been employed as the pixel of interest. If it is determined that there is a pixel which has not yet been employed as the pixel of interest, the process returns to step S62 to repeat the above-described process.

If it is determined in step S69 that that all pixels on the virtual screen have been employed as the pixel of interest, that is, image data (presentation image data) representing an image seen from the user's viewpoint has been formed on the virtual screen, the process is ended.

The presentation image data produced in the above-described manner is displayed, in step S4 in FIG. 30, on the display 6.

That is, the image of the subject seen from the user's viewpoint is displayed on the display 6 in accordance with the presentation image data.

As described above, according to the present technique in which original image data is converted into presentation image data seen from a user's viewpoint, using light ray information indicating the trajectories of light rays in taking the image of the original image data and also indicating the pixel values corresponding to the respective light rays, it is possible to easily change the image displayed in response to a change in the user's viewpoint, even for an actually taken image. That is, when the user changes his/her viewpoint, the image displayed on the display 6 is changed in response to the change in the viewpoint in a similar manner to that in which an image of an actual subject viewed by the user in the real world changes.

More specifically, for example, if the user changes his/her viewpoint to left or right with respect to the display 6, the image displayed on the display 6 is changed such that a part on the left-hand side or a part on the right-hand side of the subject is displayed although such a part is not displayed before the user's viewpoint is changed. On the other hand, if the user changes his/her viewpoint toward or away from the display 6, the image of the subject displayed on the display 6 becomes greater or smaller compared with the image before the viewpoint is changed.

As a result, the user feels as if he/she were viewing an actual subject in the real world.

When image data of space or image data of a microscopic structure is given as original image data, if the image processing shown in FIG. 30 is performed on the original image data using the image processing apparatus 1 shown in FIG. 29, it is possible to provide an interface which allows a user to intuitively understand a structure which cannot be viewed by other methods or apparatus.

Furthermore, in the image processing apparatus 1 shown in FIG. 29, original image data is converted in advance into intermediate image data representing an image of a subject seen from an infinite point, and presentation image data is easily produced from the intermediate image data, depending on the user's viewpoint.

Figure 60:
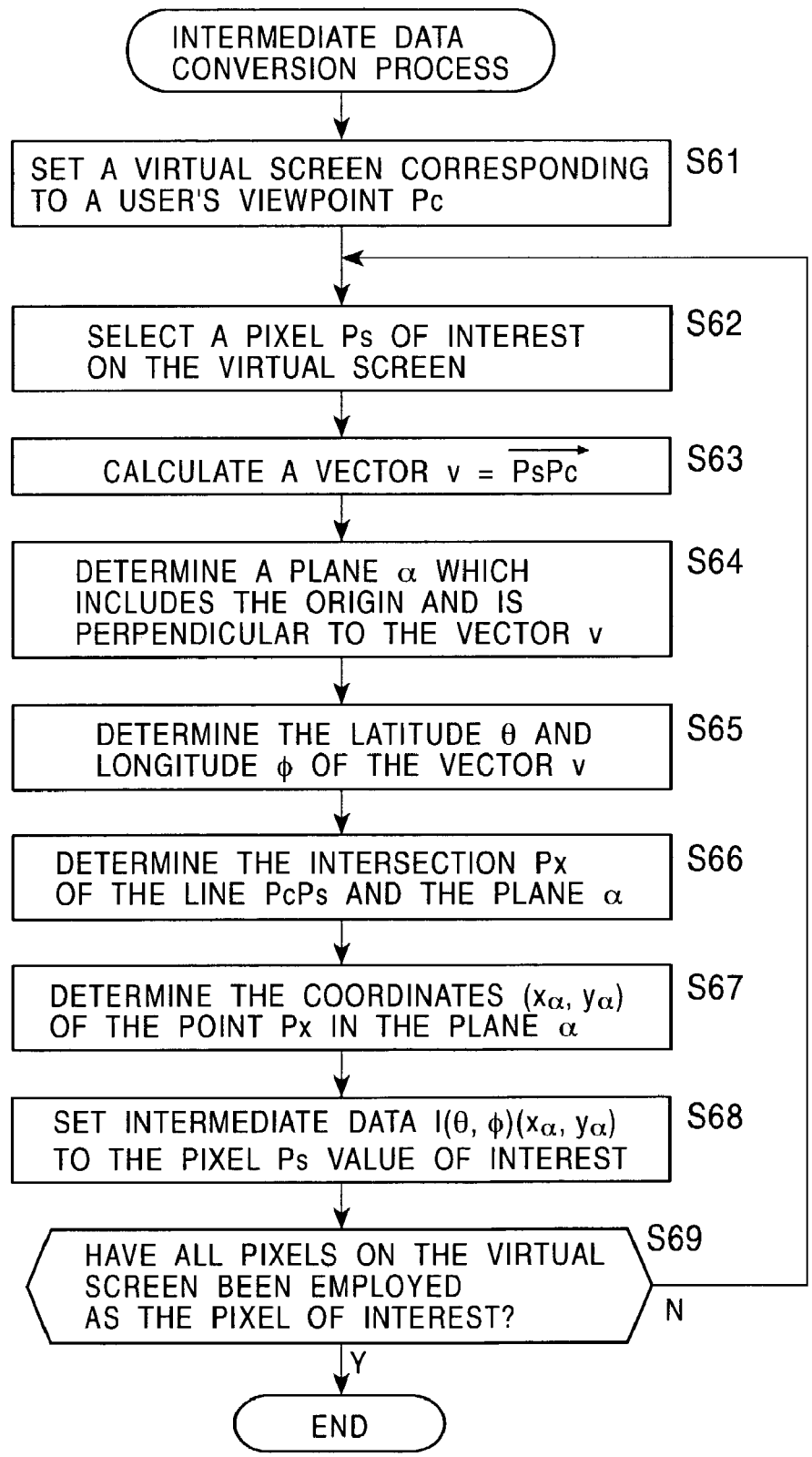
FIG. 60 is a flow chart of an intermediate image data conversion process for converting intermediate image data into image data to be displayed.

Note that intermediate image data may be produced independently for each of a plurality of subjects, and images of different subjects may be combined when presentation image data is produced in the intermediate image data conversion process shown in FIG. 60.

The intermediate image data may be edited before it is subjected to the intermediate image data conversion process shown in FIG. 60. For example, some part of the intermediate image data may be removed or another image data such as another intermediate image data may be added.

The image processed by the image processing apparatus 1 shown in FIG. 29 is not limited to actually taken images.

In the embodiments described above, the location of a user is detected, and the intermediate image data conversion process shown in FIG. 60 is performed assuming that the user's viewpoint is at the detected location of the user. However, in the image processing apparatus 1 shown in FIG. 29, the user's viewpoint is not limited to particular locations, but the user's viewpoint can be set at an arbitrary location.

For example, the user's viewpoint may be moved along a circumference of a circle with a particular radius in a particular plane, wherein the center of the circle may be set, for example, at the origin of the display coordinate system. In this case, the image displayed on the display 6 is changed in a similar manner to that in which the image of the subject changes when the image is taken while panning around the subject.

The user's viewpoint may also be moved in a certain direction along a line passing through the origin of the display coordinate system. In this case, the image displayed on the display 6 is changed in a similar manner to that in which the image of the subject changes when the image is taken while moving the camera toward or away from the subject.

In the embodiments described above, an image of a still subject placed on the motion base or the turn table is taken by the camera 41 while moving the motion base or the turn table thereby producing original image data representing the image seen from a large number of viewpoints. The image processing apparatus 1 shown in FIG. 29 may also process an image of a moving subject. However, in this case, it is required to simultaneously take images of the moving subject using a plurality of cameras at different viewpoints. Furthermore, it is required to produce intermediate image data for each of frames of image data produced by the respective cameras. When an image of the subject is displayed, it is required to produce presentation image data for each frame from the intermediate image data of that frame.

The image producing apparatus shown in FIG. 2 or 9 may be used to produce original image data stored in the image database 2.

Figure 62:
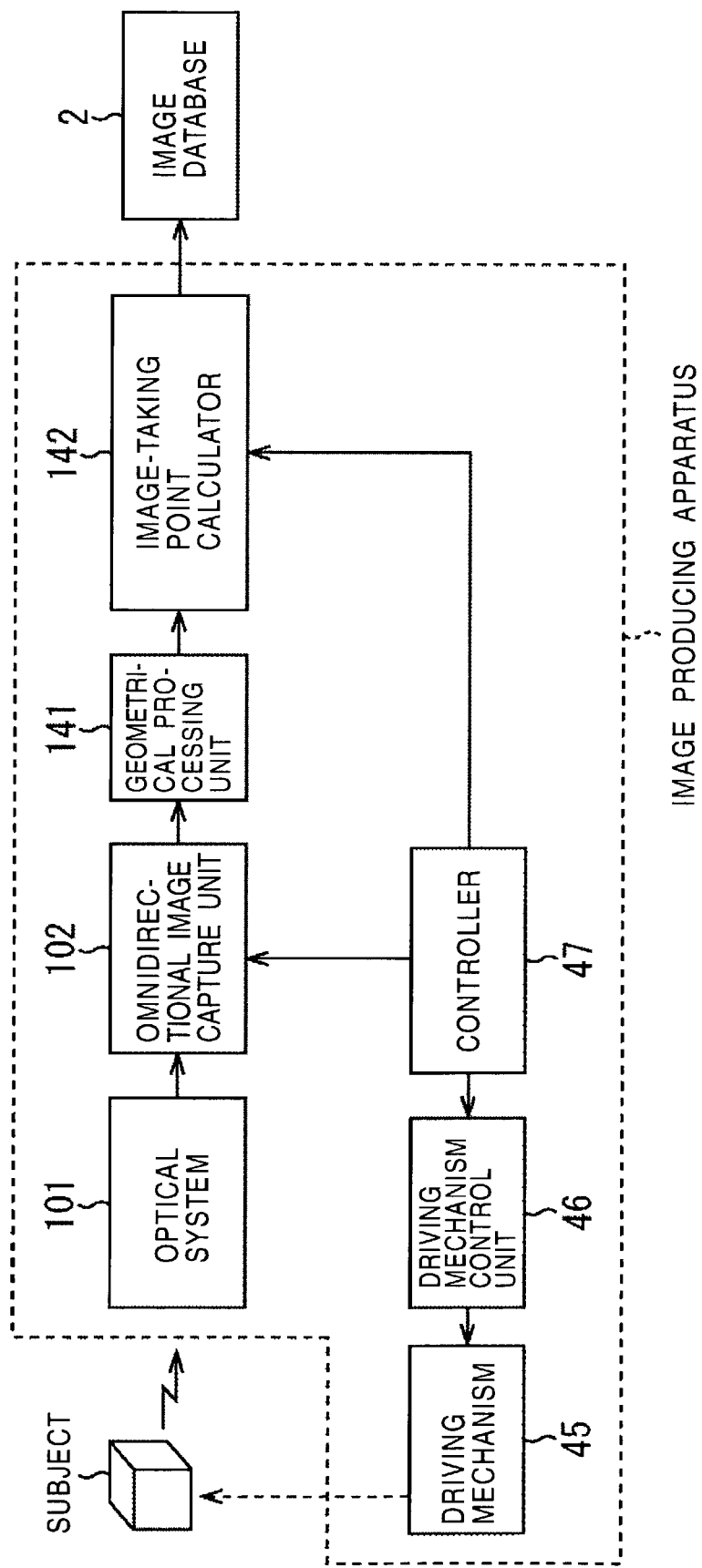
FIG. 62 is a block diagram showing an image producing apparatus according to a third embodiment of the present invention.

FIG. 62 shows still another embodiment of an image producing apparatus according to the present invention. In FIG. 62, similar parts to those in FIG. 2, 9, or 31 are denoted by similar reference numerals, and they are not described in further detail herein. The image producing apparatus shown in FIG. 62 includes an optical system 101 for capturing light rays at continuously varying viewpoints and an omnidirectional image capture unit 102, which are similar to those shown in FIG. 2, a geometric processing unit 141 similar to that shown in FIG. 9, and a driving mechanism 45, a driving mechanism control unit 46 and a controller 47, which are similar to those shown in FIG. 31. Furthermore, the image producing apparatus shown in FIG. 62 additionally includes an image-taking point calculator 142.

In the embodiment shown in FIG. 62, for example, the elliptic mirror 111 shown in FIG. 4 is used as the optical system 101 for capturing light rays at continuously varying viewpoints, although the parabolic mirrors 121A and 121B shown in FIG. 5 may also be employed to form the optical system 101 shown in FIG. 62 for capturing light rays at continuously varying viewpoints.

Figure 63:
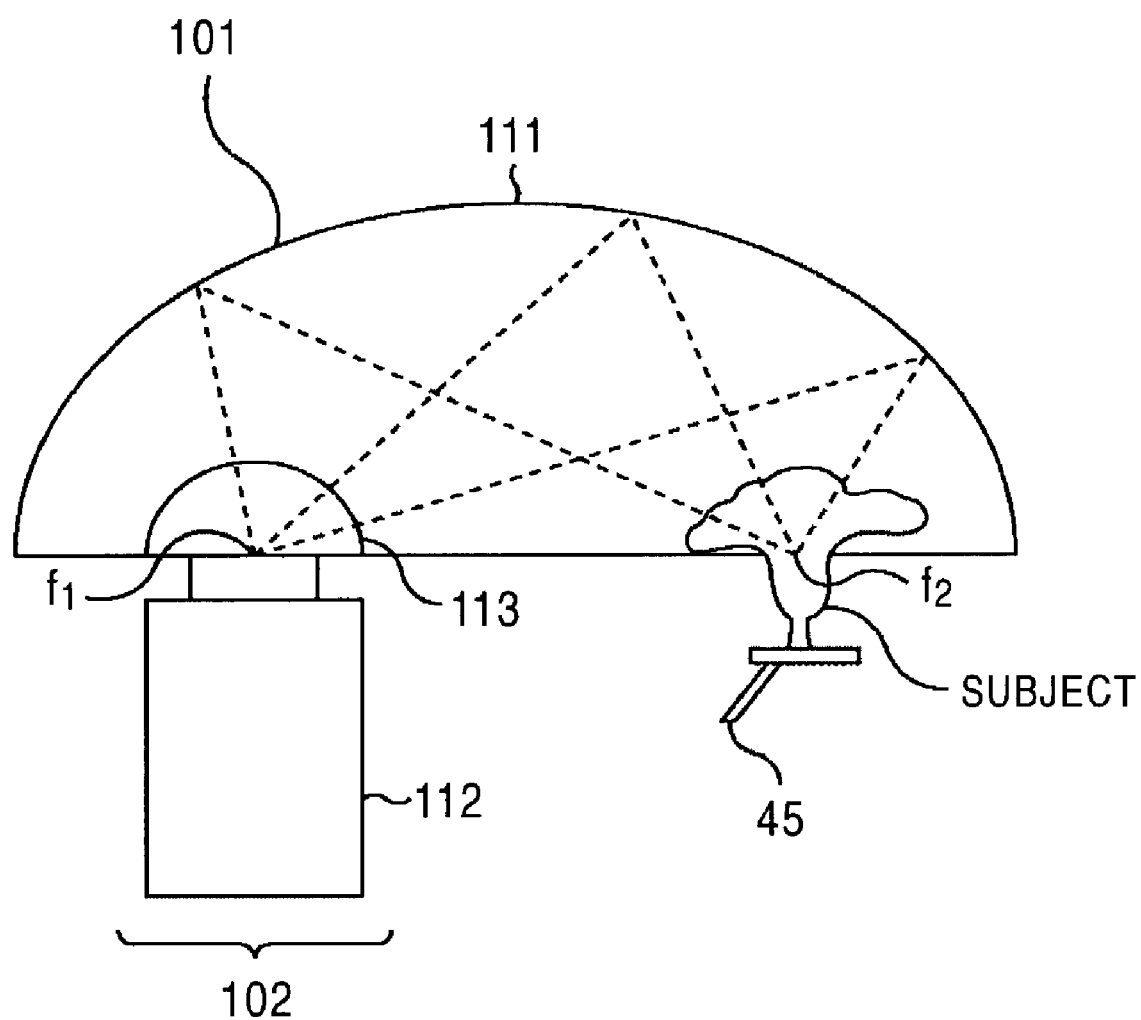
FIG. 63 is a diagram showing a location at which a motion base serving as a driving mechanism is disposed.

In the embodiment shown in FIG. 62, for example, the motion base described earlier with reference to FIG. 33 or 34 may be used as the driving mechanism 45. In the case in which the motion base is used as the driving mechanism 45, the motion base used as the driving mechanism 45 is disposed, for example, at a location close to the focal point $f_2$ of the elliptic mirror 111 used as the optical system 101 for capturing light rays at continuously varying viewpoints, as shown in FIG. 63. A subject is placed on the notion base used as the driving mechanism 45, and the motion base is moved together with the subject up and down, left to right, and back and forth. In the embodiment shown in FIG. 62, the turn table described earlier with reference to FIG. 35 may also be used as the driving mechanism 45.

On the basis of the information supplied from the controller 47, the image-taking point calculator 142 calculates the image taking points employed when taking images of image data of image information output by the geometric processing unit 141.

In the embodiment shown in FIG. 62, as described earlier with reference to FIG. 31, the controller 47 controls the driving speed and/or driving direction of the driving mechanism 45 driven by the driving mechanism control unit 46 and also controls the timing of taking an image performed by the fisheye camera 112 (FIG. 4) serving as the omnidirectional image capture unit 102.

As described earlier, the controller 47 controls the fisheye camera 112 and the driving mechanism control unit 46 such that the location of a subject is changed by moving the motion base serving as the driving mechanism 45 and an image of the subject at a changed location is taken by the fisheye camera 112. The controller 47 selects a particular location (for example, an initial location of the subject) as a reference location, and measures the amount of movement of the subject from the reference location to a location at which an image of the subject is taken (or the distance of the subject from the reference location to the location at which the image of the subject is taken). The measured amount of movement of the subject is supplied to the image-taking point calculator 142.

From the amount of movement of the subject measured and supplied in the above-described manner by the controller 47 for a particular timing of taking an image of the subject, the image-taking point calculator 142 calculates the image taking point of the image data in the image information output by the geometric processing unit 141.

Figure 64:
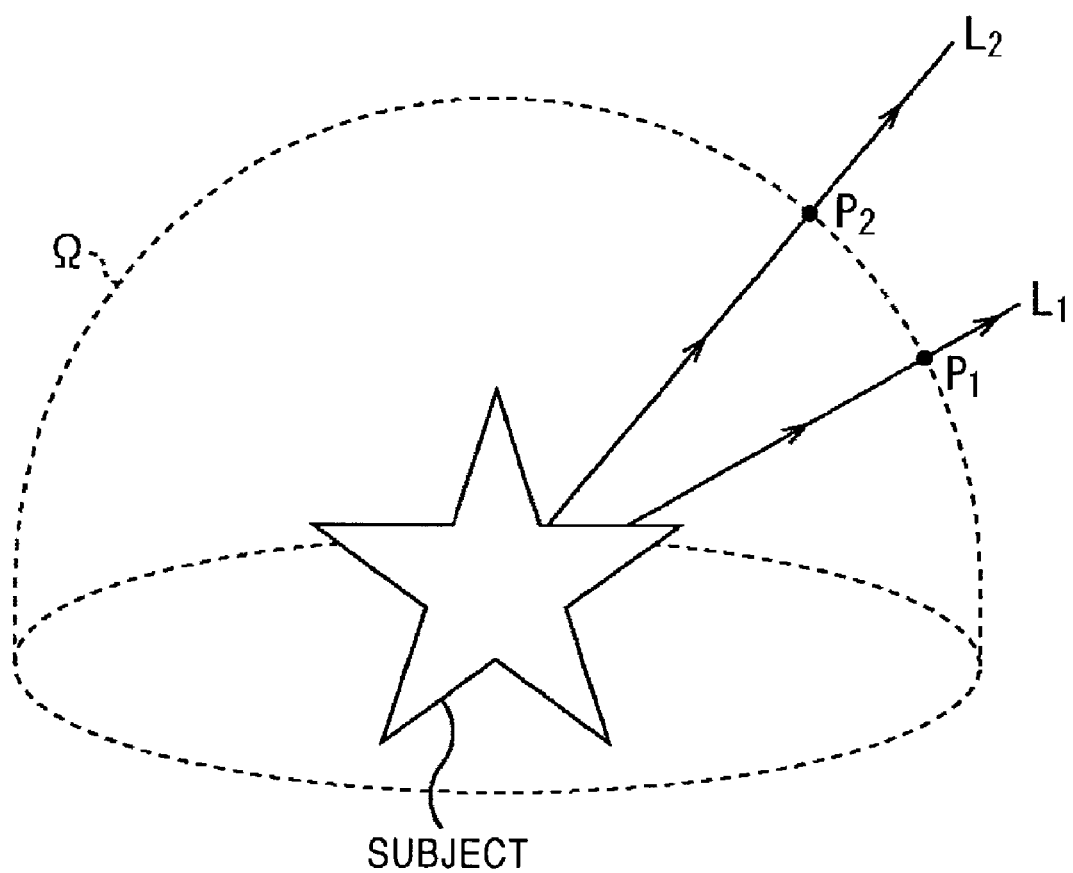
FIG. 64 is a diagram showing a process performed by an image-taking point calculator.

More specifically, the image-taking point calculator 142 assumes that there is a curved surface $\Omega$ having the same shape of that of the elliptic mirror 111, as shown in FIG. 64, and the image-taking point calculator 142 determines the intersection point between the curved surface $\Omega$ and a light ray in a light ray direction represented in the image information. The detected intersection point is employed as the image taking point of the pixel related to that light ray direction.

In the example shown in FIG. 64. a light ray $L_1$ radiated from the subject intersects, at point $P_1$, with the curved surface $\Omega$. In this case, the image-taking point calculator 142 determines that the point $P_1$ is the image taking point of the pixel related, in the image information, to the light ray direction of the light ray $L_1$. Furthermore, in the example shown in FIG. 64, a light ray $L_2$ radiated from the subject intersects with the curved surface Q at point $P_2$. In this case, the image-taking point calculator 142 determines that the point $P_2$ is the image taking point of the pixel related, in the image information, to the light ray direction of the light ray $L_2$.

In a case in which the subject is, for example, at the reference location, the image-taking point calculator 142 determines the image taking point for each pixel of image data represented in the image information in the above described manner. In a case in which the subject is at a location other than the reference location, the image-taking point calculator 142 determines the image taking point as follows.

Figure 65:
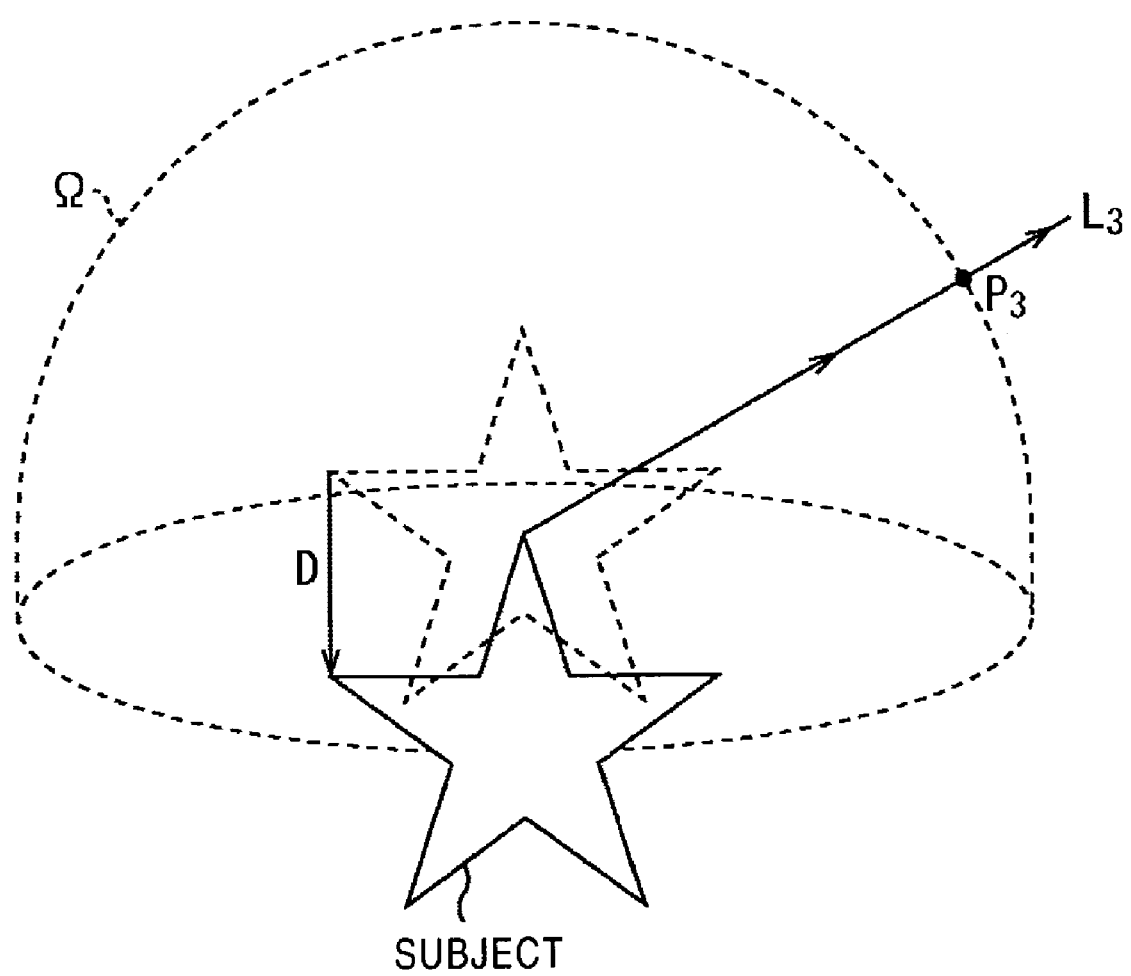
FIG. 65 is a diagram showing a process performed by an image-taking point calculator.

For example, let it be assumed that the subject has been moved downward by a distance D from the reference location shown in FIG. 64, and let it be further assumed that, as shown in FIG. 65, image information including a light ray direction of a light ray $L_3$ intersecting with the curved surface $\Omega$ at point $P_3$ has been supplied from the geometric processing unit 141 to the image-taking point calculator 142.

The controller 47 supplies, to the image-taking point calculator 142, information indicating the amount of movement of the subject from the reference location (in this specific example, the amount of movement is equal to the distance D in a downward direction). The image-taking point calculator 142 moves the light ray $L_3$ with the light ray direction described in the image information by an amount equal to the movement of the subject informed by the controller 47 but in an opposite direction to that of the movement of the subject. Herein, if the amount of movement of the subject is expressed by $(\Delta x, \Delta y, \Delta z)$ where $\Delta x$, $\Delta y$, and $\Delta z$ indicate amounts of movement of the subject in directions left to right, back and forth, and up and down, respectively, the image-taking point calculator 142 moves the light ray $L_3$ by $(-\Delta x, -\Delta y, -\Delta z)$.

Figure 66:
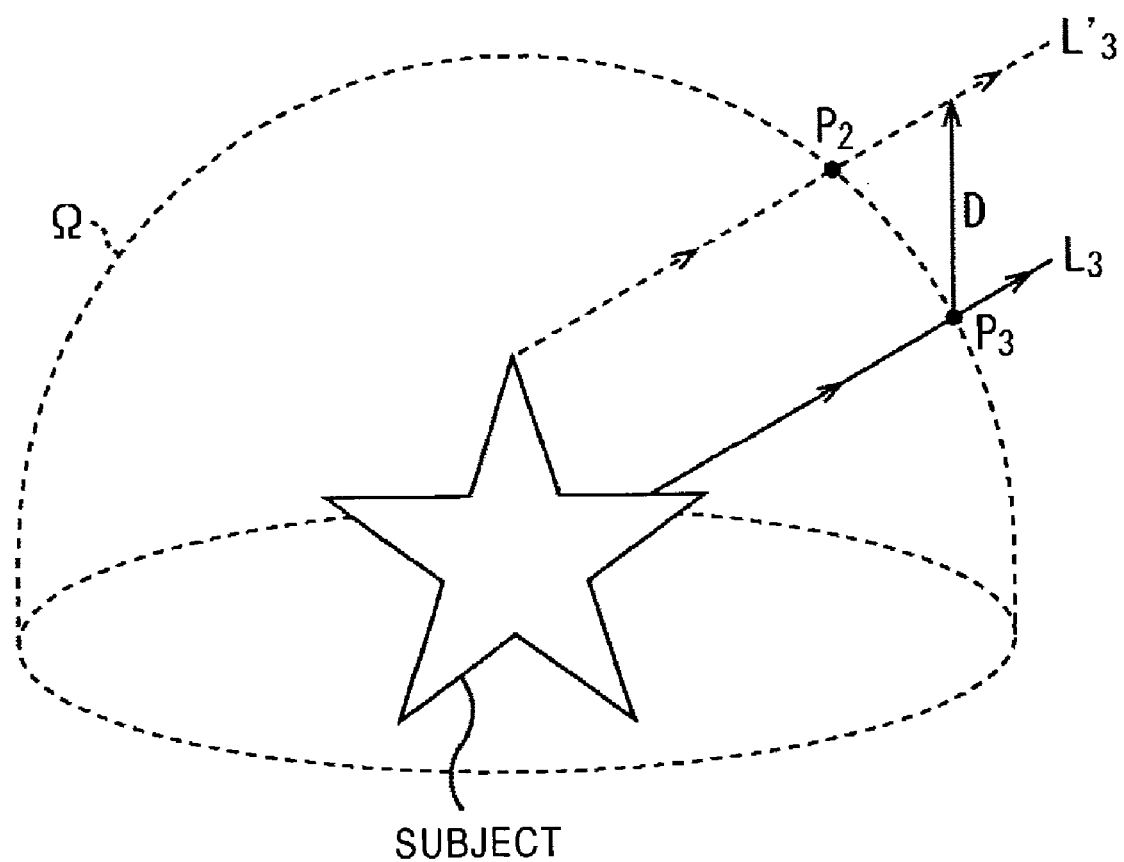
FIG. 66 is a diagram showing a process performed by the image-taking point calculator.

As a result, as shown in FIG. 66, the light ray $L_3$ shown in FIG. 65 is moved upward by distance D.

Let the light ray $L_3$ moved by the amount corresponding to the amount of movement of the subject be denoted as a light ray $L_3'$. The image-taking point calculator 142 detects the intersection point between the light ray $L_3'$ and the curved surface $\Omega$ and determines the detected intersection point as the image taking point of the pixel related, in the image information, to the light ray direction of the light ray $L_3$.

Figure 67:
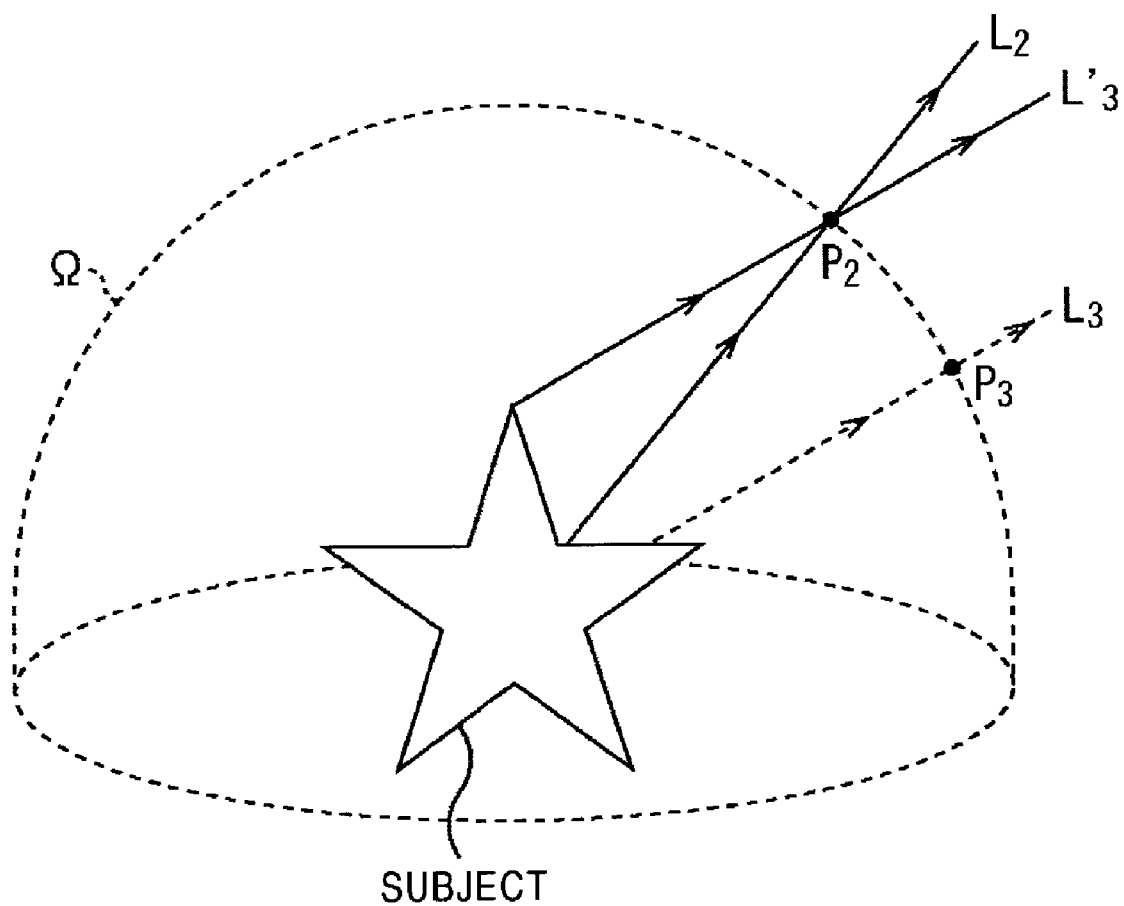
FIG. 67 is a diagram showing a process performed by the image-taking point calculator.

In the example shown in FIG. 66, the light ray $L_3'$ intersects with the curved surface $\Omega$ at point $P_2$, and thus, as shown in FIG. 67, the point $P_2$ is determined as the image taking point for both the pixel related, in the image information, to the light ray direction of the light ray $L_2$ and the pixel related to the light ray direction of the light ray $L_3$.

If the image taking point is determined in the above-described manner for each pixel of image data in the image information supplied from the geometric processing unit 141, the image-taking point calculator 142 outputs information indicating the image taking point related to each pixel (the pixel value of each pixel) in the image information.

Thus, in the image producing apparatus shown in FIG. 62, for each pixel (for the pixel value of each pixel) of image data produced by the fisheye camera 112 (FIG. 4) serving as the omnidirectional image capture unit 102, the light ray direction of a light ray corresponding to the pixel and the image taking point corresponding thereto are detected, and image information indicating the pixel values, corresponding light ray direction, and corresponding image taking points, which are related to each other, is output.

Figure 68:
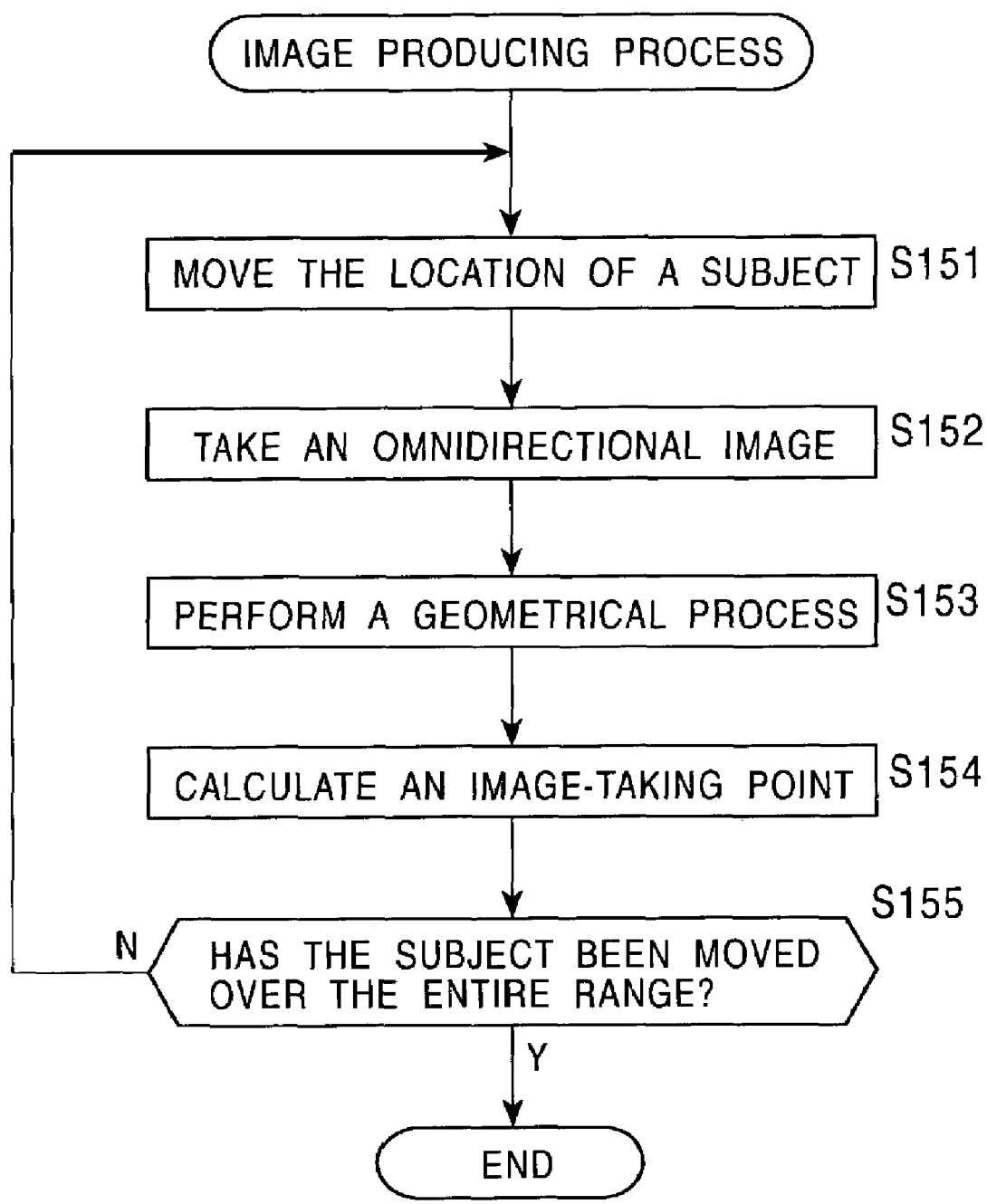
FIG. 68 is a flow chart of a process performed by the image producing apparatus.

Referring to a flow chart shown in FIG. 68, a process (image producing process) performed by the image producing apparatus shown in FIG. 62 is described in further detail below.

First, the controller 47 controls the fisheye camera 112 serving as the omnidirectional image capture unit 102 and the driving mechanism control unit 46 so as to move a subject to a particular location and take an image of the subject. The controller 47 informs the image-taking point calculator 142 of the amount of movement of the subject from a reference location to the particular location.

In step S151, under the control of the controller 47, the driving mechanism control unit 46 controls the driving mechanism 45 to change the location of the subject. Thereafter, the process proceeds to step S152. In step S152, the fisheye camera 112 serving as the omnidirectional image capture unit 102 takes an image of the subject under the control of the controller 47 and supplies a resultant one frame of image data to the geometric processing unit 141.

In step S153, the geometric processing unit 141 converts the image data supplied from the fisheye camera 112 serving as the omnidirectional image capture unit 102 into image information indicating the pixel value of each pixel of the image data and also indicating the direction of a corresponding light ray related to the pixel value. The geometric processing unit 141 supplies the resultant image information to the image-taking point calculator 142. Thereafter, the process proceeds to step S154.

In step S154, on the basis of the amount of movement of the subject informed by the controller 47, the image-taking point calculator 142 determines the image taking point for each pixel of image data in the image information supplied by the geometric processing unit 141. Furthermore, in this step S154, the image-taking point calculator 142 relates the image taking point determined for each pixel in the image information to that pixel and outputs information indicating pixels and corresponding image taking points related to the pixels. The information is supplied to the image database 2 and stored therein.

After completion of step S154, the process proceeds to step S155. In step S155, the controller 47 determines, as in step S15 in FIG. 32, whether the subject has been moved over the entire range including the predetermined locations. If it is determined that the subject has not been moved over the entire range, the controller 47 commands the fisheye camera 112 serving as the omnidirectional image capture unit 102 and the driving mechanism control unit 46 to move the subject to a location, to which the subject has not yet been moved, and take an image of the subject at that location, and the controller 47 supplies to the image-taking point calculator 142 information indicating the amount of movement of the subject to that location. Thereafter, the process returns to step S151 and the above-described process is repeated.

On the other hand, if it is determined in step S155 that the subject has been moved over the entire ranges including the predetermined locations, that is, if images of the subject have been taken at all predetermined locations, the process is ended.

In the image producing apparatus shown in FIG. 62, image information is produced which includes information indicating each pixel (the pixel value of each pixel) of image data produced by the fisheye camera 112 serving as the omnidirectional image capture unit 102, the light ray direction ($\theta_2$, $\phi_2$) corresponding to each pixel, and the image taking point of each pixel, which are related to each other. However, the image information produced by the image producing apparatus shown in FIG. 62 is different from that produced by the image producing apparatus shown in FIG. 31. Therefore, in the case in which the image information produced by the image producing apparatus shown in FIG. 62 is stored in the image database 2, the image data conversion unit 31 shown in FIG. 29 produces intermediate image data by performing image data conversion process in a manner different from that of the image data conversion process shown in FIG. 51.

Figure 69:
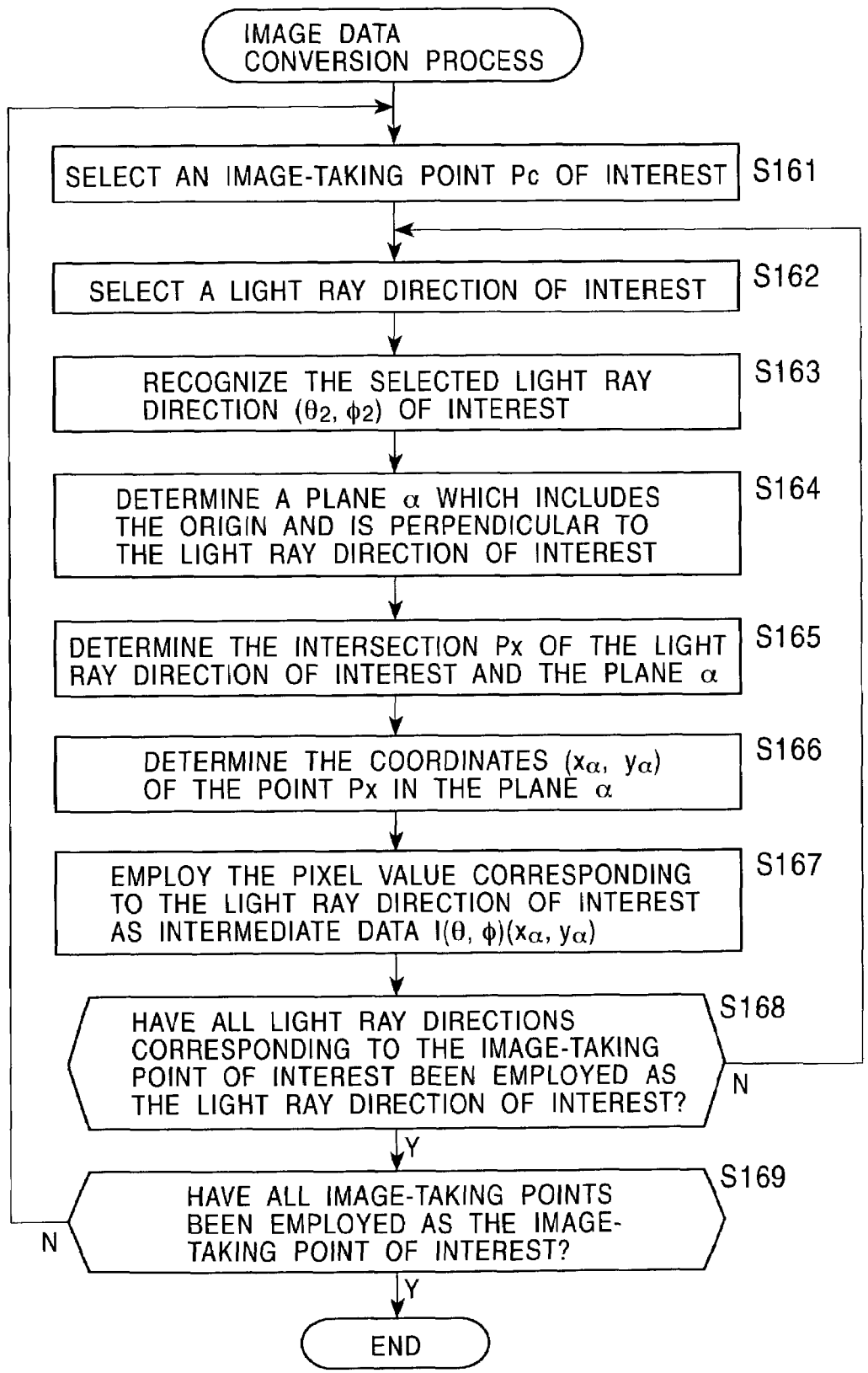
FIG. 69 is a flow chart showing a process performed by an image data conversion unit.

Referring to a flow chart shown in FIG. 69, the image data conversion process, which is performed by the image data conversion unit 31 shown in FIG. 29 in the case in which the image information is stored in the image database 2, is described below.

First in step S161, the image data conversion unit 31 selects an image taking point to be employed as an image taking point of interest $P_c$ from the image taking points included in the image information stored in the image database 2.

The process then proceeds to step S162. In step S162, the image data conversion unit 31 retrieves an image taking point identical to the image taking point of interest from the image information and selects a light ray direction identical to the light ray direction of interest from light ray directions related to the retrieved image taking point. The process then proceed to step S163.

In step S163, the image data conversion unit 31 detects the angles $\theta_2$ and $\phi_2$ indicating the light ray direction of interest, and the process proceeds to step S164. In step S164, the image data conversion unit 31 determines a plane $\alpha$ which is perpendicular to the light ray direction of interest and which contains a predetermined point (the origin, for example) in the image taking coordinate system. Thereafter, the process proceeds to step S165. In the present process, the origin of the image taking coordinate system is set, for example, at the focal point $f_2$ of the elliptic mirror 111 (FIG. 63) serving as the optical system 101 for capturing light rays at continuously varying viewpoints in the image producing apparatus shown in FIG. 62.

The light ray direction ($\theta_2$, $\phi_2$) related to each pixel in the image information produced by the image producing apparatus shown in FIG. 62 is expressed, as described earlier with reference to FIG. 20, by the angles $\theta_2$ and $\phi_2$ wherein the angle $\theta_2$ is an angle between a light ray R' radiated from the subject and the xy plane and the angle $\phi_2$ is an angle between the x axis and the projection, on the xy plane, of the light ray R'. Herein, if the direction of the light ray R' is represented by a vector v, the angle $\theta_2$ is identical to the latitude $\theta$ of the vector v determined in step S165 shown in FIG. 51, and the angle ($\phi_2$ is identical to the longitude $\phi$ of the vector v determined in step S165 shown in FIG. 51.

Hence, as in FIG. 51, the angles $\theta_2$ and $\phi_2$ indicating the light ray direction of interest are identical to the latitude $\theta_2$ and the longitude $\phi_2$ of the normal of the plane $\alpha$ determined in step S164. Because the plane $\alpha$ containing the origin selected as the predetermined point can be specified by the latitude $\theta_2$ and the longitude $\phi_2$, the plane specified by the latitude $\theta_2$ and the longitude $\phi_2$ can also be expressed as a plane I($\theta_2$, $\phi_2$), as described earlier with reference to FIG. 51.

In step S165, the image data conversion unit 31 determines a line passing through the image taking point of interest $P_c$ and extending in the same direction as the light ray direction of interest, that is, a line identical to the line $L_p$ shown in FIG. 52. Furthermore, in this step S165, the image data conversion unit 31 determines the intersection point $P_x$ of the line identical to the line $L_p$ and the plane $\alpha$ (I($\theta_2$, $\phi_2$)) determined in step S164. Thereafter, the process proceeds to step S166. In step S166, the image data conversion unit 31 determines the coordinates ($x_\alpha$, $y_\alpha$) of the point $P_x$ on the plane $\alpha$ in a similar manner as in step S27 in FIG. 51.

The process then proceeds to step S167. In step S167, the image data conversion unit 31 detects the pixel value of the pixel related, in the image information, to the light ray direction of interest and employs the detected pixel value as the pixel value of the pixel at the point $P_x$ on the plane $\alpha$. This process in step S167 is described in further detail below. Herein, as in FIG. 51, let the pixel value of the pixel at the point $P_x$ on the plane $\alpha$ be expressed as I($\theta_2$, $\phi_2$)($x_\alpha$, $y_\alpha$) using I($\theta_2$, $\phi_2$) indicating the plane $\alpha$ and ($x_\alpha$, $y_\alpha$) indicating the coordinates of the point $P_x$ on the plane $\alpha$. In the present step S167, the image data conversion unit 31 employs the pixel value of the pixel related, in the image information, to the light ray direction of interest as the pixel value I($\theta_2$, $\phi_2$)($x_\alpha$, $y_\alpha$) of the pixel at the point $P_x$ on the plane $\alpha$.

That is, the pixel corresponding to the light ray in the light ray direction of interest is orthogonally projected onto a point $P_x$ (=($x_\alpha$, $y_\alpha$)) in the plane I($\theta_2$, $\phi_2$) perpendicular to the light ray direction of interest, and the pixel value at the point $P_x$ in the plane I($\theta_2$, $\phi_2$) is set to be equal to the pixel value of the pixel corresponding to the light ray in the light ray direction of interest, thereby producing intermediate image data I($\theta_2$, $\phi_2$)($x_\alpha$, $y_\alpha$) indicating the pixel value corresponding to the light ray in the light ray direction of interest.

The process then proceeds to step S168. In step S168, the image data conversion unit 31 determines whether all light ray directions related to the image taking point of interest $P_c$ have been employed as the light ray direction of interest. If it is determined that there is a light ray direction which has not yet been employed as the light ray direction of interest, the process returns to step S162. In step S162, the image data conversion unit 31 determines a light ray direction as a new light ray direction of interest from light ray directions which are related to the image taking point of interest $P_c$ and which have not yet been selected as the light ray direction of interest, and the image data conversion unit 31 repeats the above-described process.

If it is determined in step S168 that all light ray directions related to the image taking point of interest $P_c$ have been employed as the light ray direction of interest, the process proceeds to step S169. In step S169, the image data conversion unit 31 determines whether all image taking points in the image information stored in the image database 2 have been employed as the image taking point of interest.

If it is determined in step S169 that the image information stored in the image database 2 includes more image taking points which have not yet been employed as the image taking point of interest, the process returns to step S161. In step S161, the image data conversion unit 31 selects one image taking point, which has not yet been selected as the image taking point of interest of interest, from image taking points in the image information, and the image data conversion unit 31 repeats the above-described process by employing the selected image taking point as a new image taking point of interest.

If it is determined in step S169 that all image taking points in the image information stored in the image database 2 have been employed as the image taking point of interest, the process is ended.

In the image data conversion process described above, image data indicating an image of a subject seen from an infinite point in a direction specified by latitude $\theta_2$ and longitude $\phi_2$ is produced on a plane I($\theta$, $\phi$) specified by the latitude $\theta_2$ and the longitude $\phi_2$, wherein the latitude $\theta_2$ and the longitude $\phi_2$ indicate a light ray direction in image information stored in the image database 2, and wherein the image data is produced in the format shown in FIG. 53. The produced image data is supplied as intermediate image data to the intermediate image database 3 and stored therein.

The image information stored in the image database 2 may also be converted into intermediate image data in a format shown in FIG. 59.

The process sequences performed by the geometric processing unit 141, the image conversion unit 171, and other blocks described above, may be performed by hardware or software. When the processes are performed by software, a software program is installed on a general-purpose computer or the like.

Figure 70:
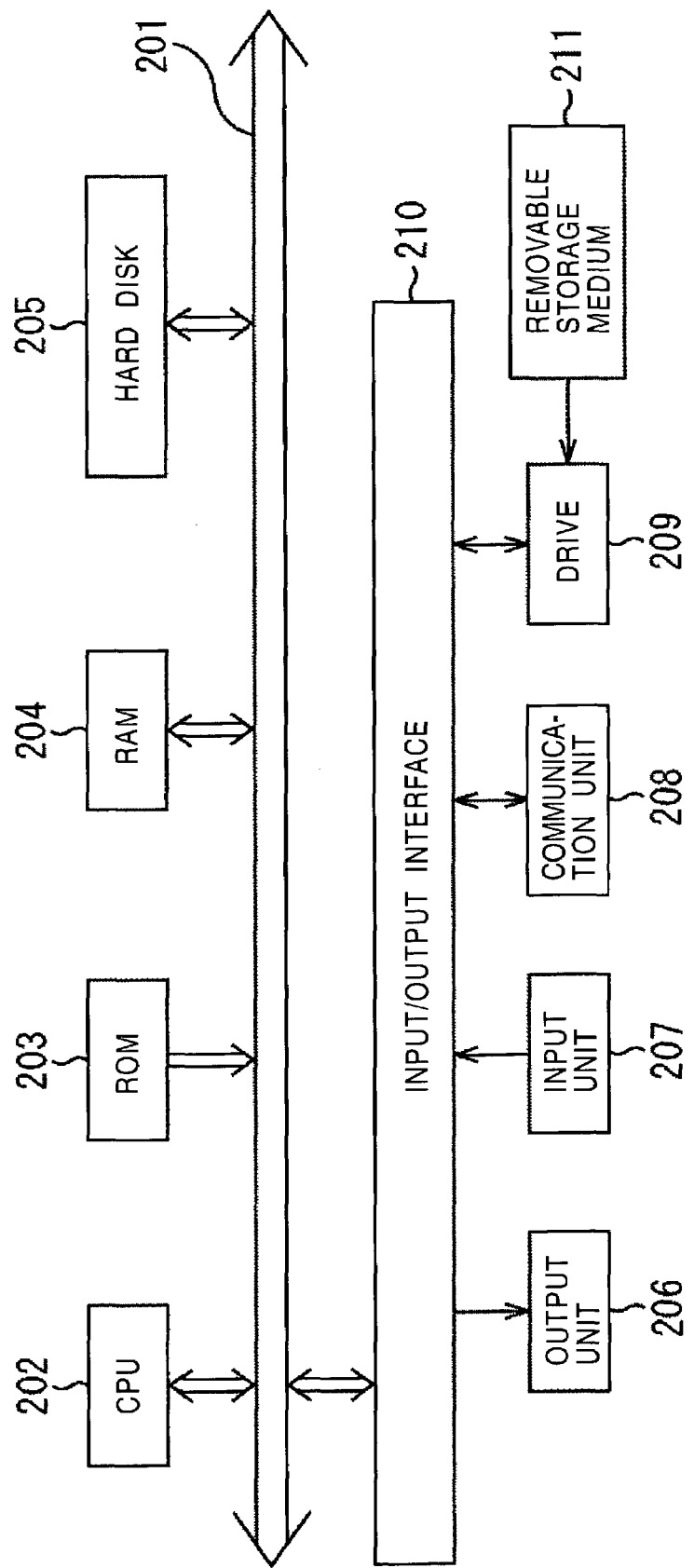
FIG. 70 is a block diagram showing an example of a construction of a computer according to an embodiment of the present invention.

FIG. 70 illustrates an embodiment of the invention in which a program used to execute the processes described above is installed on a computer.

The program may be stored, in advance, on a hard disk 205 serving as a storage medium or in a ROM 203 which are disposed inside the computer.

Alternatively, the program may be stored (recorded) temporarily or permanently on a removable storage medium 211 such as a flexible disk, a CD-ROM (Compact Disc Read Only Memory), a MO (Magnetooptical) disk, a DVD (Digital Versatile Disc), a magnetic disk, or a semiconductor memory. Such a removable recording medium 211 may be provided in the form of so-called package software.

Instead of installing the program from the removable storage medium 211 onto the computer, the program may also be transferred to the computer from a download site via a digital broadcasting satellite by means of radio transmission or via a network such as a LAN (Local Area Network) or the Internet by means of wire communication. In this case, the computer receives, using a communication unit 208, the program transmitted in such a manner and installs the program on the hard disk 205 disposed in the computer.

The computer includes a central processing unit (CPU) 202. The CPU 202 is connected to an input/output interface 210 via a bus 201. When a user inputs a command by operating an input unit 207 including a keyboard, a mouse, and a microphone, the command is transferred to the CPU 202 via the input/output interface 210. In accordance with the command, the CPU 202 executes a program stored in a read only memory (ROM) 203. Alternatively, the CPU 202 may execute a program loaded in a RAM (Random Access Memory) 204 wherein the program may be loaded into the RAM 204 by transferring a program stored on the hard disk 205 into the RAM 204, or transferring a program which has been installed on the hard disk 205 after being received from a satellite or a network via the communication unit 208, or transferring a program which has been installed on the hard disk 205 after being read from a removable recording medium 211 loaded on a drive 209. By executing the program, the CPU 202 performs the process described above with reference to the flow chart or the process described above with reference to the block diagrams. The CPU 202 outputs the result of the process, as required, to an output device including a LCD (Liquid Crystal Display) and/or a speaker via an input/output interface 210. The result of the process may also be transmitted via the communication unit 208 or may be stored on the hard disk 205.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

Although in the embodiments described above, the elliptic mirror 111 or the combination of two parabolic mirrors 121A and 121A is used as the optical system 101 for capturing light rays at continuously varying viewpoints, another type of optical system, such as a concave mirror which has two focal points and which focuses light rays radiated from one of the two focal points onto the other focal point, may also be used as the optical system 101 for capturing light rays at continuously varying viewpoints.

Furthermore, although in the embodiments described above, the fisheye camera 112 is used as the omnidirectional image capture unit 102, another type of camera, such as a camera using a wide-angle lens and capable of focusing light incident from a wide range of directions onto a light sensing plane (such as that known as an omnidirectional camera), may also be sued as the omnidirectional image capture unit 102.

The image producing apparatus shown in FIG. 2 and the image display apparatus shown in FIG. 6 or 23 may be integrated into the form of a single apparatus. Similarly, the image producing apparatus shown in FIG. 9 and the image display apparatus shown in FIG. 21 may be integrated into the form of a single apparatus.

What is claimed is:

1. An image taking apparatus comprising:
 a concave mirror disposed so as to cover a subject, for reflecting light from the subject; and
 image taking means for taking an image of the subject by receiving the light reflected by the concave mirror, the image taking means being located at a first focal point of the concave mirror, wherein the subject is located at a second focal point of the concave mirror, and wherein the image taking means is an omnidirectional image taking device.

2. An image taking apparatus according to claim 1, wherein the concave mirror is formed of a first parabolic mirror and a second parabolic mirror;

the first and second parabolic mirrors are disposed such that optical axes thereof coincide with each other and such that openings of thereof face each other;

the first parabolic mirror is disposed to locate the subject at the second focal point, wherein the second focal point is a focal point of the first parabolic mirror; and the image taking means is disposed at the first focal point, wherein the first focal point is focal point of the second parabolic mirror so light reflected by the first parabolic mirror is reflected by the second parabolic mirror and received by the image taking means.

3. An image taking apparatus according to claim 1, wherein the concave mirror is an elliptic mirror;

the elliptic mirror is disposed such that the subject is located at the second focal point, wherein the second focal point is one of two focal points of the elliptic mirror; and the image taking means is disposed at the first focal point, wherein the first focal point is a remaining one of the two focal points of the elliptic mirror so that light traveling from the second focal point of the elliptic mirror toward the elliptic mirror is reflected by the elliptic mirror toward the first focal point and received by the image taking means.

4. An image taking apparatus according to claim 1, further comprising display means for displaying image data of the subject produced by the image taking means by taking an image of the subject.

5. An image taking apparatus according to claim 4, wherein the concave mirror is an elliptic mirror;

the elliptic mirror is disposed such that the subject is located at one of two focal points of the elliptic mirror;

the image taking means is disposed at the other one of the two focal points of the elliptic mirror so that light traveling from the one focal point of the elliptic mirror toward the elliptic mirror is reflected by the elliptic mirror toward the other focal point and received by the image taking means; and the display means includes:

a second elliptic mirror having a shape similar to that of the elliptic mirror used as the concave mirror;

light emitting means disposed at one of two focal points of the second elliptic mirror, for emitting light corresponding to the image data of the subject; and a screen disposed at the other one of the two focal points of the second elliptic mirror, for receiving light emitted by the light emitting means and reflected by the second elliptic mirror.

6. An image taking apparatus according to claim 1, further comprising light ray processing means for determining light ray directions of light rays traveling from the subject toward the concave mirror, for each light ray corresponding to a pixel value of each pixel of image data of the subject produced by the image taking means by taking the image of the subject, and then producing image information indicating the pixel value of each pixel and the corresponding light ray direction related to the pixel value of each pixel.

7. An image taking apparatus according to claim 6, wherein the light ray processing means includes first calculation means for calculating light ray directions in which light travels toward the image taking means after being reflected by the concave mirror; and second calculation means for determining light ray directions of light rays traveling from the subject toward the concave mirror, for each light ray corresponding to a pixel value of each pixel of image data of the subject, on the basis of the light ray directions calculated by the first calculation means.

8. An image taking apparatus according to claim 6, further comprising display means for displaying the image data of the subject, in accordance with the image information.

9. An image taking apparatus according to claim 8, wherein the display means includes light emitting means for emitting light corresponding to each pixel value represented in the image information; and a screen for receiving the light emitted by the light emitting means.

10. An image taking apparatus according to claim 9, further comprising conversion means for converting the image data including pixel values of the respective pixels in the image information into image data composed of pixel values assigned to light ray directions such that when the light emitting means emits light corresponding to the pixel values, the light ray direction of the emitted light becomes coincident with the light ray direction of the corresponding pixel in the image information.

11. An image taking method comprising the steps of:

reflecting light from a subject by a concave mirror disposed as to cover the subject;

locating an omnidirectional image taking device at a first focal point of the mirror; and taking an image of the subject by receiving the light reflected by the concave mirror to the first focal point of the concave mirror, wherein the subject is located at a second focal point of the concave mirror.

12. An image processing apparatus comprising:

acquisition means for acquiring image data of a subject by reflecting light from the subject by a concave mirror disposed as to cover the subject; and taking an image of the subject by receiving the light reflected by the concave mirror; and light ray processing means for determining light ray directions of light rays traveling from the subject toward the concave mirror, for each light ray corresponding to a pixel value of each pixel of image data of the subject, and then producing image information indicating the pixel value of each pixel and the corresponding light ray direction related to the pixel value of each pixel.

13. An image processing apparatus according to claim 12, wherein the light ray processing means includes first calculation means for calculating light ray directions in which light travels after being reflected by the concave mirror; and second calculation means for determining light ray directions of light rays traveling from the subject toward the concave mirror, for each light ray corresponding to a pixel value of each pixel of image data of the subject, on the basis of the light ray directions calculated by the first calculation means.

14. An image processing apparatus according to claim 12, further comprising display means for displaying an image of the subject in accordance with the image information.

15. An image processing apparatus according to claim 14, wherein light emitting means for emitting light corresponding to the pixel value of each pixel indicated in the image information; and a screen for receiving the light emitted by the light emitting means.

16. An image processing apparatus according to claim 15, further comprising conversion means for converting the image data including pixel values of the respective pixels in the image information into image data composed of pixel values assigned to light ray directions such that when the light emitting means emits light corresponding to the pixel values, the light ray direction of the emitted light becomes coincident with the light ray direction of the corresponding pixel in the image information.

17. An image processing method comprising the steps of:
  acquiring image data of a subject by reflecting light from the subject by a concave mirror disposed as to cover the subject; and
  taking an image of the subject by receiving the light reflected by the concave mirror; and
  determining light ray directions of light rays traveling from the subject toward the concave mirror, for each light ray corresponding to a pixel value of each pixel of image data of the subject, and then producing image information indicating the pixel value of each pixel and the corresponding light ray direction related to the pixel value of each pixel.

18. A computer-readable medium encoded with a program for causing a computer to perform a process comprising the steps of:
  acquiring image data of a subject by reflecting light from the subject by a concave mirror disposed as to cover the subject; and
  taking an image of the subject by receiving the light reflected by the concave mirror; and
  determining light ray directions of light rays traveling from the subject toward the concave mirror, for each light ray corresponding to a pixel value of each pixel of image data of the subject, and then producing image information indicating the pixel value of each pixel and the corresponding light ray direction related to the pixel value of each pixel.

19. The image taking apparatus of claim 1, wherein the omnidirectional image capture device comprises:
  an image recording device; and
  a fisheye lens.

\* \* \* \* \*